US012472448B2

(12) United States Patent
Wulff et al.

(10) Patent No.: US 12,472,448 B2
(45) Date of Patent: Nov. 18, 2025

(54) COMPACT HYDROXAMATE-BASED AFFINITY TAGS FOR ARTIFICIALLY TAGGING BIOLOGICAL MACROMOLECULES

(71) Applicant: The Board of Trustees of the Leland Stanford Junior University, Stanford, CA (US)

(72) Inventors: Bjorn-Erik Wulff, East Palo Alto, CA (US); Jenna G. Caldwell, Bethesda, MD (US); Pehr B. Harbury, Portola Valley, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 1153 days.

(21) Appl. No.: 17/413,912

(22) PCT Filed: Jan. 23, 2020

(86) PCT No.: PCT/US2020/014847
§ 371 (c)(1),
(2) Date: Jun. 14, 2021

(87) PCT Pub. No.: WO2020/154541
PCT Pub. Date: Jul. 30, 2020

(65) Prior Publication Data
US 2022/0054955 A1 Feb. 24, 2022

Related U.S. Application Data

(60) Provisional application No. 62/796,430, filed on Jan. 24, 2019, provisional application No. 62/796,403, filed on Jan. 24, 2019, provisional application No. 62/796,475, filed on Jan. 24, 2019, provisional application No. 62/796,424, filed on Jan. 24, 2019.

(51) Int. Cl.
*B01D 15/38* (2006.01)
*B01J 20/02* (2006.01)
*B01J 20/281* (2006.01)
*C07K 1/22* (2006.01)

(52) U.S. Cl.
CPC ...... *B01D 15/3828* (2013.01); *B01J 20/0207* (2013.01); *B01J 20/0225* (2013.01); *B01J 20/281* (2013.01); *C07K 1/22* (2013.01); *B01J 2220/4806* (2013.01)

(58) Field of Classification Search
CPC .............. B01D 15/3828; B01J 20/0207; B01J 20/0225; B01J 20/281; B01J 2220/4806; C07K 1/1077; C07K 1/22
See application file for complete search history.

(56) References Cited

U.S. PATENT DOCUMENTS

| | | | |
|---|---|---|---|
| 6,670,194 B1 * | 12/2003 | Aebersold | G01N 33/6842 436/174 |
| 9,676,872 B2 | 6/2017 | O'Connell et al. | |
| 2004/0086460 A1 * | 5/2004 | DuFour | C07C 259/06 548/542 |
| 2011/0318380 A1 * | 12/2011 | Brix | A61K 2239/57 424/193.1 |
| 2015/0299275 A1 * | 10/2015 | Lihme | C08L 89/00 252/182.12 |

FOREIGN PATENT DOCUMENTS

AU 2016253598 A1 5/2018

OTHER PUBLICATIONS

Braich et al. "Immobilised metal affinity chromatography for the capture of hydroxamate-containing siderophores and other Fe(III)-binding metabolites" DOI: 10.1039/b802355g (Year: 2008).*
Liu et al. Immobilized Zinc Affinity Chromatography of Pectin Hydroxamic Acids for Purification of Trypsin Inhabitors from Soybean and Sweet Potato (Year: 2005).*
Sun et al. Application of immobilized metal affinity chromatography in proteomics (Year: 2005).*
Braich et al "Immobilised metal affinity chromatography for the capture of hydroxamate-containing siderophores and other Fe(III)-binding metabolites directly from bacterial culture supernatants" (Year: 2008).*
MA "Studies on ↑±-Nucleophiles for Efficient Protein Labeling" (Year: 2017).*
Braich et al., "Immobilised metal affinity chromatography for the capture of hydroxamate-containing siderophores and other Fe(Ill)-binding metabolites directly from bacterial culture supernatants", Analyst, 2008, 133: 877-880.

(Continued)

*Primary Examiner* — Krishnan S Menon
*Assistant Examiner* — Tak L Chiu
(74) *Attorney, Agent, or Firm* — James S. Keddie; Bozicevic, Field & Francis LLP

(57) ABSTRACT

Methods for purifying biological macromolecules are provided. Aspects of the subject methods include contacting the biological macromolecule with an exemplary hydroxamate affinity tag to produce a tagged moiety followed by purification of the tagged moiety by immobilized metal affinity chromatography (IMAC). Also provided are kits comprising an exemplary subject hydroxamate affinity tag, an IMAC resin and a metal ion configured for loading onto the resin, wherein the metal ion is capable of binding to a compound containing the hydroxamate affinity tag.

12 Claims, 39 Drawing Sheets

Specification includes a Sequence Listing.

(56) References Cited

OTHER PUBLICATIONS

Liu et al., "Immobolized Zinc Affinity Chromatography of Pectin Hydroxamic Acids for Purification of Trypsin Inhibitors from Soybean and Sweet Potato", Journal of Agricultural and Food Chemistry, 2005, 53: 10219-10223.

Sun et al., "Application of immobilized metal affinity chromatography in proteomics", Expert Rev. Proteomics, 2005, 2 (5): 649-657.

* cited by examiner cysteine-reactive group
$^{13}C/^{12}C$ mass tag
cationic group (variable for multiplexing)
affinity tag Δ = mass of ethylene glutathione

SEQUENCE LISTING

<160> NUMBER OF SEQ ID NOS: 9

<210> SEQ ID NO 1
<211> LENGTH: 5
<212> TYPE: PRT
<213> ORGANISM: Artificial sequence
<220> FEATURE:
<223> OTHER INFORMATION: synthetic sequence

<400> SEQUENCE: 1

Ala Asp Asn Gly Lys
1               5

<210> SEQ ID NO 2
<211> LENGTH: 8
<212> TYPE: PRT
<213> ORGANISM: Artificial sequence
<220> FEATURE:
<223> OTHER INFORMATION: synthetic sequence

<400> SEQUENCE: 2

Asn Phe Glu Ala Cys Thr Tyr Lys
1               5

<210> SEQ ID NO 3
<211> LENGTH: 10
<212> TYPE: PRT
<213> ORGANISM: Artificial sequence
<220> FEATURE:
<223> OTHER INFORMATION: synthetic sequence

<400> SEQUENCE: 3

Tyr Trp Glu Tyr Ala Lys Ala Glu Ser Ala
1               5                   10

<210> SEQ ID NO 4
<211> LENGTH: 6
<212> TYPE: PRT
<213> ORGANISM: Artificial sequence
<220> FEATURE:
<223> OTHER INFORMATION: synthetic sequence

<400> SEQUENCE: 4

Ser Trp Asn Trp Cys Lys
1               5

<210> SEQ ID NO 5
<211> LENGTH: 9
<212> TYPE: PRT
<213> ORGANISM: Artificial sequence
<220> FEATURE:
<223> OTHER INFORMATION: synthetic sequence

<400> SEQUENCE: 5

Tyr Ser Trp Asp His Met Asn Phe Arg
1               5

<210> SEQ ID NO 6
<211> LENGTH: 9
<212> TYPE: PRT
<213> ORGANISM: Artificial sequence
<220> FEATURE:
<223> OTHER INFORMATION: synthetic sequence

<400> SEQUENCE: 6

Tyr Ser Trp Asp His Cys Asn Phe Arg
1               5

```
<210> SEQ ID NO 7
<211> LENGTH: 9
<212> TYPE: PRT
<213> ORGANISM: Artificial sequence
<220> FEATURE:
<223> OTHER INFORMATION: synthetic sequence

<400> SEQUENCE: 7

Tyr Trp Asp His His His Cys Asn Arg
1               5

<210> SEQ ID NO 8
<211> LENGTH: 9
<212> TYPE: PRT
<213> ORGANISM: Artificial sequence
<220> FEATURE:
<223> OTHER INFORMATION: synthetic sequence

<400> SEQUENCE: 8

Tyr Ser Trp Asp His Gly Asn Phe Arg
1               5

<210> SEQ ID NO 9
<211> LENGTH: 9
<212> TYPE: PRT
<213> ORGANISM: Artificial sequence
<220> FEATURE:
<223> OTHER INFORMATION: synthetic sequence

<400> SEQUENCE: 9

Tyr Ser Trp Asp His Met Asn Phe Arg
1               5
```

COMPACT HYDROXAMATE-BASED AFFINITY TAGS FOR ARTIFICIALLY TAGGING BIOLOGICAL MACROMOLECULES

CROSS-REFERENCING

This application is a § 371 national phase of International Application No. PCT/US2020/014847, filed on Jan. 23, 2020, which claims the benefit of U.S. provisional application Ser. No. 62/796,403, filed on Jan. 24, 2019, 62/796,424, filed on Jan. 24, 2019, 62/796,430, filed on Jan. 24, 2019, and 62/796,475, filed on Jan. 24, 2019, each of which is incorporated by reference herein for all purposes.

INTRODUCTION

The study of biological molecules often requires isolating the molecule of interest from a large background of contaminating molecules. For instance, one might want to isolate a particular protein from the proteome to study its structure or function. However, isolating the molecule of interest can be quite difficult and time-consuming, as it often shares many physical and chemical properties with the contaminating molecules. Isolating the molecule of interest is simplified if one can imbue it with a unique characteristic that distinguishes it from the background by adding an "affinity tag" to it.

A useful affinity tag has three main properties. First, it can be attached to a biological macromolecule of interest. This can be done chemically, employing reactions that target specific chemical moieties that occur in macromolecules. For example, one could use an iodoacetamide moiety that can react with thiols in proteins. It can also be done genetically; for example, one could use the DNA sequence in an expression vector so that the cell adds a hexahistidine tag to a protein of interest while it is being translated. Second, the tag is able to interact tightly and specifically with an immobilized cognate ligand. This isolates the tagged molecule of interest from the background molecules, which do not interact with the ligand. Third, the interaction between the tag and the immobilized ligand can be reversed, allowing for recovery of the purified molecule of interest.

There is an ongoing need in the art for improved affinity tags and purification techniques for use in purifying biological molecules.

SUMMARY

Methods for purifying biological macromolecules are provided. Aspects of the subject methods include contacting the biological macromolecule with an exemplary hydroxamate affinity tag to produce a tagged moiety followed by purification of the tagged moiety by immobilized metal affinity chromatography (IMAC). Also provided are kits comprising an exemplary subject hydroxamate affinity tag, an IMAC resin and a metal ion configured for loading onto the resin, wherein the metal ion is capable of binding to a compound containing the hydroxamate affinity tag.

Affinity tags and methods for using the same for purification of cross-linked peptides, are also provided. The affinity tags include a scaffold containing a hydroxamate moiety, and a scaffold containing a biotin moiety (e.g., desbiotin). The subject affinity tags are configured to bind selectively to the peptide N-termini. Compositions comprising a mixture of an affinity tag containing a hydroxamate moiety and an affinity tag containing a biotin moiety are also provided. Methods of using the subject composition to purify a cross-linked peptide are also provided. In aspects of the subject purification methods, a sample is cross-linked to produce a cross-linked sample; the cross-linked sample is reacted with a subject composition (e.g., as to produce an orthogonally tagged composition containing a hydroxamate affinity tagged N-termini and a biotin affinity tagged N-termini); and purifying the tagged composition, thereby isolating cross-linked peptides from the sample. Methods of purifying cross-linked samples comprising only hydroxamate tags are also provided. These reagents and methods find use in a variety of applications in which isolation of cross-linked peptides is desired.

Aspects of the present disclosure also include thiol alkylating agents, e.g., compounds of formula (I), and an in vivo footprinting technique that can quantitatively monitor solvent accessibility at virtually all of a protein's residues using the subject thiol alkylating agents, enabling sensitive detection of footprinted peptides by mass spectrometry. Aspects of the subject thiol alkylating agents include, a thiol reactive group, a moiety capable of forming an ionic species (e.g., a cation), a heavy and light isotopic pair, and optionally a hydroxamate-containing affinity tag. The subject thiol alkylating agents (e.g., of formula (I)) offer many advantageous properties for use in footprinting proteins, including, but not limited to compact size, solubility in aqueous media, cell-permeability, and gas phase cleavability. The subject footprinting technique may also find use in vitro.

New short crosslinking agents that can be incorporated into proteins chemically or translationally and that are mass spectrometry cleavable are also provided. Exemplary crosslinking agents disclosed herein include a diazirine group. In one embodiment, the subject crosslinking agents reacts chemically with cysteines in proteins in vitro or in vivo. In another embodiment, the subject crosslinking agents are isosteric with small hydrophobic amino acids. Some translation systems incorporate them into proteins in place of other amino acids during translation.

After it is chemically or translationally anchored to the protein, the crosslinking agent may be irradiated with light (e.g., at about 350 nm), which causes the diazirine-containing anchored moiety to eject a molecular nitrogen, leaving a carbene that reacts relatively non-specifically with anything within range of its anchoring point, forming a crosslink to that item.

Once the crosslinks are formed, they are typically read out by mass spectrometry. This generally begins with digesting the protein into peptides, for example by using an enzyme such as trypsin. To activate the crosslinker's mass spectrometry-cleavability, the thioether formed by the subject crosslinking agent upon reaction with a cysteine is oxidized to form sulfoxides. This can be done by treating the peptides with hydrogen peroxide. However, it is often useful to create a sulfoxide that contains the isotope $^{18}O$ for the crosslink to produce distinct signatures during mass spectrometry. This is practically done by drying the peptides down before resuspending them in $^{18}O$-water containing the oxidizer chloramine-T. This oxidation is then quenched with dithiothreitol. The subject crosslinks may then be detected by mass spectrometry.

These and other advantages and features of the disclosure will become apparent to those persons skilled in the art upon reading the details of the compositions and methods of use, which are more fully described below.

DEFINITIONS

Figure 1:
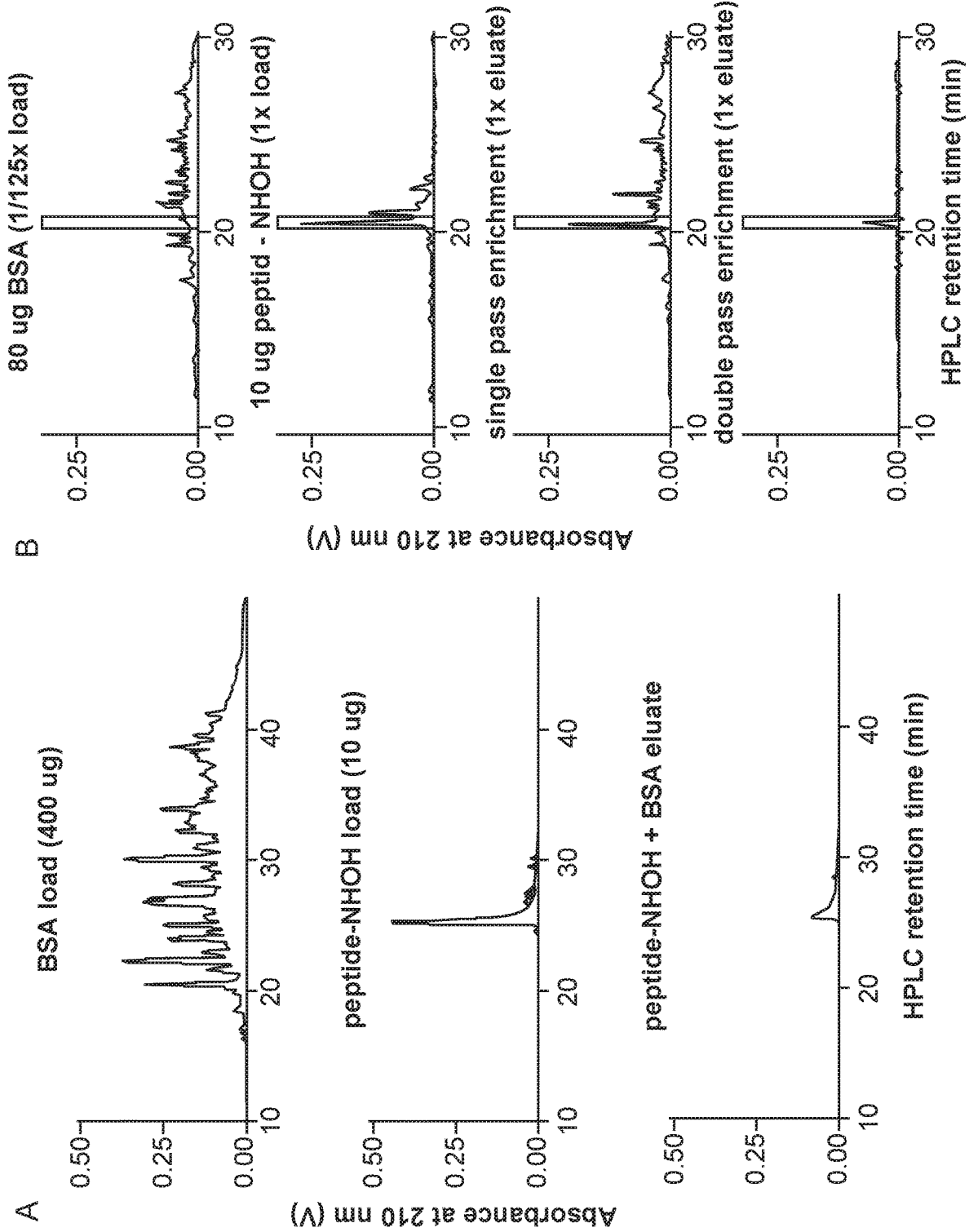
FIG. 1 illustrates that introduction of a compact affinity tag into the cysteine-labeling agent increases the fractional abundance of probe-site peptides, improving coverage and quantification in complex samples.
Figure 1:

Before embodiments of the present disclosure are further described, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Any methods and materials similar or equivalent to those described herein can also be used in the practice or testing of embodiments of the present disclosure.

It must be noted that as used herein and in the appended claims, the singular forms "a", "and", and "the" include plural referents unless the context clearly dictates otherwise. Thus, for example, reference to "a compound" includes not only a single compound but also a combination of two or more compounds, reference to "a substituent" includes a single substituent as well as two or more substituents, and the like.

In describing and claiming the present disclosure, certain terminology will be used in accordance with the definitions set out below. It will be appreciated that the definitions provided herein are not intended to be mutually exclusive. Accordingly, some chemical moieties may fall within the definition of more than one term.

As used herein, the phrases "for example," "for instance," "such as," or "including" are meant to introduce examples that further clarify more general subject matter. These examples are provided only as an aid for understanding the disclosure, and are not meant to be limiting in any fashion.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

As used herein, the terms "determining," "measuring," "assessing," and "assaying" are used interchangeably and include both quantitative and qualitative determinations.

The term "selective reactive group" refers to a reactive group that specifically react chemically or chemo-enzymatically with groups that are found in biological molecules, or modified biological molecules. Selective reactive groups include an active ester such as an amino-reactive NHS ester, a thiol-reactive maleimide or iodoacetamide groups, an azide group or an alkyne group, etc). Selective groups of interest include, but are not limited to, aldehyde, thiol, thiophosphate, iodoacetyl groups, maleimide, azido, alkynyl (e.g., a cyclooctyne group), phosphine groups, Click chemistry groups, groups for Staudinger ligation, and the like. A thiol or thiophosphate group may be compatible with an iodoacetyl group and/or a maleimide group. Azido and alkynyl groups may be conjugated via a Click chemistry. Any convenient cycloaddition chemistry, including Click chemistries or Staudinger ligation chemistries may be utilized.

The terms "polypeptide" and "protein", used interchangeably herein, refer to a polymeric form of amino acids of any length, which can include coded and non-coded amino acids, chemically or biochemically modified or derivatized amino acids, and polypeptides having modified peptide backbones. The term includes fusion proteins, including, but not limited to, fusion proteins with a heterologous amino acid sequence, fusions with heterologous and native leader sequences, with or without N-terminal methionine residues; immunologically tagged proteins; fusion proteins with detectable fusion partners, e.g., fusion proteins including as a fusion partner a fluorescent protein, β-galactosidase, luciferase, etc.; and the like.

The terms "nucleic acid molecule" and "polynucleotide" are used interchangeably and refer to a polymeric form of nucleotides of any length, either deoxyribonucleotides or ribonucleotides, or analogs thereof. Polynucleotides may have any three-dimensional structure, and may perform any function, known or unknown. Non-limiting examples of polynucleotides include a gene, a gene fragment, exons, introns, messenger RNA (mRNA), transfer RNA, ribosomal RNA, ribozymes, cDNA, recombinant polynucleotides, branched polynucleotides, plasmids, vectors, isolated DNA of any sequence, control regions, isolated RNA of any sequence, nucleic acid probes, and primers. The nucleic acid molecule may be linear or circular.

As used herein, the phrase "having the formula" or "having the structure" is not intended to be limiting and is used in the same way that the term "comprising" is commonly used. The term "independently selected from" is used herein to indicate that the recited elements, e.g., R groups or the like, can be identical or different.

As used herein, the terms "may," "optional," "optionally," or "may optionally" mean that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The term "alkyl" refers to a branched or unbranched saturated hydrocarbon group (i.e., a mono-radical) typically although not necessarily containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although not necessarily, alkyl groups herein may contain 1 to about 18 carbon atoms, and such groups may contain 1 to about 12 carbon atoms. The term "lower alkyl" intends an alkyl group of 1 to 6 carbon atoms. "Substituted alkyl" refers to alkyl substituted with one or more substituent groups, and this includes instances wherein two hydrogen atoms from the same carbon atom in an alkyl substituent are replaced, such as in a carbonyl group (i.e., a substituted alkyl group may include a —C(=O)— moiety). The terms "heteroatom-containing alkyl" and "heteroalkyl" refer to an alkyl substituent in which at least one carbon atom is replaced with a heteroatom, as described in further detail infra. If not otherwise indicated, the terms "alkyl" and "lower alkyl" include linear, branched, cyclic, unsubstituted, substituted, and/or heteroatom-containing alkyl or lower alkyl, respectively.

The term "substituted alkyl" is meant to include an alkyl group as defined herein wherein one or more carbon atoms in the alkyl chain have been optionally replaced with a heteroatom such as —O—, —N—, —S—, —S(O)n- (where n is 0 to 2), —NR— (where R is hydrogen or alkyl) and having from 1 to 5 substituents selected from the group consisting of alkoxy, substituted alkoxy, cycloalkyl, substituted cycloalkyl, cycloalkenyl, substituted cycloalkenyl, acyl, acylamino, acyloxy, amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-aryl, —SO-heteroaryl, —SO$_2$-alkyl, —SO$_2$-aryl, —SO$_2$-heteroaryl, and —NRaRb, wherein R' and R" may be the same or different and are chosen from hydrogen, optionally substituted alkyl, cycloalkyl, alkenyl, cycloalkenyl, alkynyl, aryl, heteroaryl and heterocyclic.

The term "alkynyl" refers to a linear or branched hydrocarbon group of 2 to 24 carbon atoms containing at least one triple bond, such as ethynyl, n-propynyl, and the like. Generally, although again not necessarily, alkynyl groups herein may contain 2 to about 18 carbon atoms, and such groups may further contain 2 to 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The terms "halo" and "halogen" are used in the conventional sense to refer to a chloro, bromo, fluoro or iodo substituent.

By "substituted" as in "substituted alkyl," and the like, as alluded to in some of the aforementioned definitions, is meant that in the alkyl, or other moiety, at least one hydrogen atom bound to a carbon (or other) atom is replaced with one or more non-hydrogen substituents. Examples of such substituents include, without limitation, functional groups, and the hydrocarbyl moieties C1-C24 alkyl (including C1-C18 alkyl, further including C1-C12 alkyl, and further including C1-C6 alkyl), C2-C24 alkenyl (including C2-C18 alkenyl, further including C2-C12 alkenyl, and further including C2-C6 alkenyl), C2-C24 alkynyl (including C2-C18 alkynyl, further including C2-C12 alkynyl, and further including C2-C6 alkynyl), C5-C30 aryl (including C5-C20 aryl, and further including C5-C12 aryl), and C6-C30 aralkyl (including C6-C20 aralkyl, and further including C6-C12 aralkyl). The above-mentioned hydrocarbyl moieties may be further substituted with one or more functional groups or additional hydrocarbyl moieties such as those specifically enumerated. Unless otherwise indicated, any of the groups described herein are to be interpreted as including substituted and/or heteroatom-containing moieties, in addition to unsubstituted groups.

By the term "functional groups" is meant chemical groups such as halo, hydroxyl, sulfhydryl, C1-C24 alkoxy, C2-C24 alkenyloxy, C2-C24 alkynyloxy, C5-C20 aryloxy, acyl (including C2-C24 alkylcarbonyl (—CO-alkyl) and C6-C20 arylcarbonyl (—CO-aryl)), acyloxy (—O-acyl), C2-C24 alkoxycarbonyl (—(CO)—O-alkyl), C6-C20 aryloxycarbonyl (—(CO)—O-aryl), halocarbonyl (—CO)—X where X is halo), C2-C24 alkylcarbonato (—O—(CO)—O-alkyl), C6-C20 arylcarbonato (—O—(CO)—O-aryl), carboxy (—COOH), carboxylato (—COO—), carbamoyl (—(CO)—NH$_2$), mono-substituted C1-C24 alkylcarbamoyl (—(CO)—NH(C1-C24 alkyl)), di-substituted alkylcarbamoyl (—(CO)—N(C1-C24 alkyl)$_2$), mono-substituted arylcarbamoyl (—(CO)—NH-aryl), thiocarbamoyl (—(CS)—NH$_2$), carbamido (—NH—(CO)—NH$_2$), cyano (—C≡N), isocyano (—N+≡C—), cyanato (—O—C≡N), isocyanato (—O—N+≡C—), isothiocyanato (—S—C≡N), azido (—N=N+=N—), formyl (—(CO)—H), thioformyl (—(CS)—H), amino (—NH$_2$), mono- and di-(C1-C24 alkyl)-substituted amino, mono- and di-(C5-C20 aryl)-substituted amino, C2-C24 alkylamido (—NH—(CO)-alkyl), C5-C20 arylamido (—NH—(CO)-aryl), imino (—CR=NH where R=hydrogen, C1-C24 alkyl, C5-C20 aryl, C6-C20 alkaryl, C6-C20 aralkyl, etc.), alkylimino (—CR=N(alkyl), where R=hydrogen, alkyl, aryl, alkaryl, etc.), arylimino (—CR=N(aryl), where R=hydrogen, alkyl, aryl, alkaryl, etc.), nitro (—NO$_2$), nitroso (—NO), sulfo (—SO$_2$—OH), sulfonato (—SO$_2$—O—), C1-C24 alkylsulfanyl (—S-alkyl; also termed "alkylthio"), arylsulfanyl (—S-aryl; also termed "arylthio"), C1-C24 alkylsulfinyl (—(SO)-alkyl), C5-C20 arylsulfinyl (—(SO)-aryl), C1-C24 alkylsulfonyl (—SO$_2$-alkyl), C5-C20 arylsulfonyl (—SO$_2$-aryl), phosphono (—P(O)(OH)$_2$), phosphonato (—P(O)(O—)$_2$), phosphinato (—P(O)(O—)), phospho (—PO$_2$), and phosphino (—PH$_2$), mono- and di-(C1-C24 alkyl)-substituted phosphino, mono- and di-(C5-C20 aryl)-substituted phosphine. In addition, the aforementioned functional groups may, if a particular group permits, be further substituted with one or more additional functional groups or with one or more hydrocarbyl moieties such as those specifically enumerated above.

By "linking" or "linker" as in "linking group," "linker moiety," etc., is meant a linking moiety that connects two groups via covalent bonds. The linker may be linear, branched, cyclic or a single atom. Examples of such linking groups include alkyl, alkenylene, alkynylene, arylene, alkarylene, aralkylene, and linking moieties containing functional groups including, without limitation: amido (—NH—CO—), ureylene (—NH—CO—NH—), imide (—CO—NH—CO—), epoxy (—O—), epithio (—S—), epidioxy (—O—O—), carbonyldioxy (—O—CO—O—), alkyldioxy (—O—(CH2)n-O—), epoxyimino (—O—NH—), epimino (—NH—), carbonyl (—CO—), etc. In certain cases, one, two, three, four or five or more carbon atoms of a linker backbone may be optionally substituted with a sulfur, nitrogen or oxygen heteroatom. The bonds between backbone atoms may be saturated or unsaturated, usually not more than one, two, or three unsaturated bonds will be present in a linker backbone. The linker may include one or more substituent groups, for example with an alkyl, aryl or alkenyl group. A linker may include, without limitations, poly(ethylene glycol) unit(s) (e.g., —(CH$_2$—CH$_2$—O)—); ethers, thioethers, amines, alkyls (e.g., (C1-C12) alkyl), which may be straight or branched, e.g., methyl, ethyl, n-propyl, 1-methylethyl (iso-propyl), n-butyl, n-pentyl, 1,1-dimethylethyl (t-butyl), and the like. The linker backbone may include a cyclic group, for example, an aryl, a heterocycle or a cycloalkyl group, where 2 or more atoms, e.g., 2, 3 or 4 atoms, of the cyclic group are included in the backbone. A linker may be cleavable or non-cleavable. Any convenient orientation and/or connections of the linkers to the linked groups may be used.

When the term "substituted" appears prior to a list of possible substituted groups, it is intended that the term apply to every member of that group. For example, the phrase "substituted alkyl and aryl" is to be interpreted as "substituted alkyl and substituted aryl."

In addition to the disclosure herein, the term "substituted," when used to modify a specified group or radical, can also mean that one or more hydrogen atoms of the specified group or radical are each, independently of one another, replaced with the same or different substituent groups as defined below.

In addition to the groups disclosed with respect to the individual terms herein, substituent groups for substituting for one or more hydrogens (any two hydrogens on a single carbon can be replaced with =O, =NR$^{70}$, =N—OR$^{70}$, =N$_2$ or =S) on saturated carbon atoms in the specified group or radical are, unless otherwise specified, —R$^{60}$, halo, =O, —OR$^{70}$, —SR$^{70}$, —NR$^{80}$R$^{80}$, trihalomethyl, —CN, —OCN, —SCN, —NO, —NO$_2$, =N$_2$, —N$_3$, —SO$_2$R$^{70}$, —SO$_2$O$^-$M$^+$, —SO$_2$OR$^{70}$, —OSO$_2$R$^{70}$, —OSO$_2$O$^-$M$^+$, —OSO$_2$OR$^{70}$, —P(O)(O$^-$)$_2$(M$^+$)$_2$, —P(O)(OR$^{70}$)O$^-$M$^+$, —P(O)(OR$^{70}$)$_2$, —C(O)R$^{70}$, —C(S)R$^{70}$, —C(NR$^{70}$)R$^{70}$, —C(O)O$^-$M$^+$, —C(O)OR$^{70}$, —C(S)OR$^{70}$, —C(O)NR$^{80}$R$^{80}$, —C(NR$^{70}$)NR$^{80}$R$^{80}$, —OC(O)R$^{70}$, —OC(S)R$^{70}$, —OC(O)O$^-$M$^+$, —OC(O)OR$^{70}$, —OC(S)OR$^{70}$, —NR$^{70}$C(O)R$^{70}$, —NR$^{70}$C(S)R$^{70}$, —NR$^{70}$CO$_2^-$M$^+$, —NR$^{70}$CO$_2$R$^{70}$, —NR$^{70}$C(S)OR$^{70}$, —NR$^{70}$C(O)NR$^{80}$R$^{80}$, —NR$^{70}$C(NR$^{70}$)R$^{70}$ and —NR$^{70}$C(NR$^{70}$)NR$^{80}$R$^{80}$, where R$^{60}$ is selected from the group consisting of optionally substituted alkyl, cycloalkyl, heteroalkyl, heterocycloalkylalkyl, cycloalkylalkyl, aryl, arylalkyl, heteroaryl and heteroarylalkyl, each R$^{70}$ is independently hydrogen or R$^{60}$; each R$^{80}$ is independently R$^{70}$ or alternatively, two R$^{80}$'s, taken together with the nitrogen atom to which they are bonded, form a 5-, 6- or 7-membered heterocycloalkyl which may optionally include from 1 to 4 of the same or different additional heteroatoms selected from the group consisting of O, N and S, of which N may have —H or C$_1$-C$_3$ alkyl substitution; and each M$^+$ is a counter ion with a net single positive charge. Each M$^+$ may independently be, for example, an alkali ion, such as K$^+$, Na$^+$, Li$^+$; an ammonium ion, such as $^+$N(R$^{60}$)$_4$; or an alkaline earth ion, such as [Ca$^{2+}$]$_{0.5}$, [Mg$^{2+}$]$_{0.5}$, or [Ba$^{2+}$]$_{0.5}$ ("subscript 0.5 means that one of the counter ions for such divalent alkali earth ions can be an ionized form of a compound of the invention and the other a typical counter ion such as chloride, or two ionized compounds disclosed herein can serve as counter ions for such divalent alkali earth ions, or a doubly ionized compound of the invention can serve as the counter ion for such divalent alkali earth ions). As specific examples, —NR$^{80}$R$^{80}$ is meant to include —NH$_2$, —NH-alkyl, N-pyrrolidinyl, N-piperazinyl, 4N-methyl-piperazin-1-yl and N-morpholinyl.

In addition to the disclosure herein, substituent groups for hydrogens on unsaturated carbon atoms in "substituted" heteroaryl groups and the like, are, unless otherwise specified, —R$^{60}$, halo, —O$^-$M$^+$, —OR$^{70}$, —SR$^{70}$, —S$^-$M$^+$, —NR$^{80}$R$^{80}$, trihalomethyl, —CF$_3$, —CN, —OCN, —SCN, —NO, —NO$_2$, —N$_3$, —SO$_2$R$^{70}$, —SO$_3^-$M$^+$, —SO$_3$R$^{70}$, —OSO$_2$R$^{70}$, —OSO$_3^-$M$^+$, —OSO$_3$R$^{70}$, —PO$_3^{-2}$(M$^+$)$_2$, —P(O)(OR$^{70}$)O$^-$M$^+$, —P(O)(OR$^{70}$)$_2$, —C(O)R$^{70}$, —C(S)R$^{70}$, —C(NR$^{70}$)R$^{70}$, —CO$_2^-$M$^+$, —CO$_2$R$^{70}$, —C(S)OR$^{70}$, —C(O)NR$^{80}$R$^{80}$, —C(NR$^{70}$)NR$^{80}$R$^{80}$, —OC(O)R$^{70}$, —OC(S)R$^{70}$, —OCO$_2^-$M$^+$, —OCO$_2$R$^{70}$, —OC(S)OR$^{70}$, —NR$^{70}$C(O)R$^{70}$, —NR$^{70}$C(S)R$^{70}$, —NR$^{70}$CO$_2^-$M$^+$, —NR$^{70}$CO$_2$R$^{70}$, —NR$^{70}$C(S)OR$^{70}$, —NR$^{70}$C(O)NR$^{80}$R$^{80}$, —NR$^{70}$C(NR$^{70}$)R$^{70}$ and —NR$^{70}$C(NR$^{70}$)NR$^{80}$R$^{80}$, where R$^{60}$, R$^{70}$, R$^{80}$ and M$^+$ are as previously defined, provided that in case of substituted alkene or alkyne, the substituents are not —O$^-$M$^+$, —OR$^{70}$, —SR$^{70}$, or —S$^-$M$^+$.

In addition to the groups disclosed with respect to the individual terms herein, substituent groups for hydrogens on nitrogen atoms in "substituted" heteroalkyl and cycloheteroalkyl groups are, unless otherwise specified, —R$^{60}$, —O$^-$M$^+$, —OR$^{70}$, —SR$^{70}$, —S$^-$M$^+$, —NR$^{80}$R$^{80}$, trihalomethyl, —CF$_3$, —CN, —NO, —NO$_2$, —S(O)$_2$R$^{70}$, —S(O)$_2$O$^-$M$^+$, —S(O)$_2$OR$^{70}$, —OS(O)$_2$R$^{70}$, —OS(O)$_2$O$^-$M$^+$, —OS(O)$_2$OR$^{70}$, —P(O)(O$^-$)$_2$(M$^+$)$_2$, —P(O)(OR$^{70}$)O$^-$M$^+$, —P(O)(OR$^{70}$)(OR$^{70}$), —C(O)R$^{70}$, —C(S)R$^{70}$, —C(NR$^{70}$)R$^{70}$, —C(O)OR$^{70}$, —C(S)OR$^{70}$, —C(O)NR$^{80}$R$^{80}$, —C(NR$^{70}$)NR$^{80}$R$^{80}$, —OC(O)R$^{70}$, —OC(S)R$^{70}$, —OC(O)OR$^{70}$, —OC(S)OR$^{70}$, —NR$^{70}$C(O)R$^{70}$, —NR$^{70}$C(S)R$^{70}$, —NR$^{70}$C(O)OR$^{70}$, —NR$^{70}$C(S)OR$^{70}$, —NR$^{70}$C(O)NR$^{80}$R$^{80}$, —NR$^{70}$C(NR$^{70}$)R$^{70}$ and —NR$^{70}$C(NR$^{70}$)NR$^{80}$R$^{80}$, where R$^{60}$, R$^{70}$, R$^{80}$ and M$^+$ are as previously defined.

In addition to the disclosure herein, in a certain embodiment, a group that is substituted has 1, 2, 3, or 4 substituents, 1, 2, or 3 substituents, 1 or 2 substituents, or 1 substituent.

Unless indicated otherwise, the nomenclature of substituents that are not explicitly defined herein are arrived at by naming the terminal portion of the functionality followed by the adjacent functionality toward the point of attachment.

As to any of the groups disclosed herein which contain one or more substituents, it is understood, of course, that such groups do not contain any substitution or substitution patterns which are sterically impractical and/or synthetically non-feasible. In addition, the subject compounds include all stereochemical isomers arising from the substitution of these compounds.

In certain embodiments, a substituent may contribute to optical isomerism and/or stereo isomerism of a compound. Salts, solvates and hydrate forms of a compound are also of interest. All such forms are embraced by the present disclosure. Thus, the compounds described herein include salts, solvates, hydrates, and isomer forms thereof, including the pharmaceutically acceptable salts, solvates, hydrates and isomers thereof.

Unless otherwise specified, reference to an atom is meant to include isotopes of that atom. For example, reference to H is meant to include $^1$H, $^2$H (i.e., D) and $^3$H (i.e., T), and reference to C is meant to include $^{12}$C and all isotopes of carbon (such as $^{13}$C).

As used herein, the terms "affinity" refers to the strength of binding, increased binding affinity being correlated with a lower K$_D$.

The terms "bind" and "bound" as used herein refer to a binding interaction between two or more entities. Where two entities, e.g., molecules, are bound to each other, they may be directly bound, i.e., bound directly to one another, or they may be indirectly bound, i.e., bound through the use of an intermediate linking moiety or entity. In either case the binding may covalent; e.g., through covalent bonds; or non-covalent, e.g., through ionic bonds, hydrogen bonds, electrostatic interactions, hydrophobic interactions, Van der Waals forces, or a combination thereof.

The terms "specific binding," "specifically bind," and the like, refer to the ability of a first binding molecule or moiety (e.g., a subject biomolecule) to preferentially bind directly to a second binding molecule or moiety (e.g., an affinity tag of formula (I)) relative to other molecules or moieties in a reaction mixture. In certain embodiments, the affinity between a first binding molecule or moiety and a second binding molecule or moiety when they are specifically bound to each other is characterized by a K$_D$ (dissociation constant) of less than 10$^{-6}$ M, less than 10$^{-7}$ M, less than 10$^{-8}$ M, less than 10$^{-9}$ M, less than 10$^{-10}$ M, less than 10$^{-11}$ M, less than 10$^{-12}$ M, less than 10$^{-13}$ M, less than 10$^{-14}$ M, or less than 10$^{-15}$ M. In some cases, the affinity between a capture agent and analyte when they are specifically bound in a capture agent/analyte complex is at least 10$^{-8}$ M, at least 10$^{-9}$ M, or at least 10$^{-10}$ M. In some instances, a specific binding interaction will discriminate between desirable and undesirable analytes in a sample with a specificity of 10-fold or more for a desirable analyte over an undesirable analytes, such as 100-fold or more, or 1000-fold or more.

Definitions of other terms and concepts appear throughout the detailed description.

DETAILED DESCRIPTION

Methods for purifying biological macromolecules are provided. Aspects of the subject methods include contacting the biological macromolecule with an exemplary hydroxamate affinity tag to produce a tagged moiety followed by purification of the tagged moiety by immobilized metal affinity chromatography (IMAC). Also provided are kits comprising an exemplary subject hydroxamate affinity tag, an IMAC resin and a metal ion configured for loading onto the resin, wherein the metal ion is capable of binding to a compound containing the hydroxamate affinity tag.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods

As summarized above, the subject methods include a method of purifying a biological macromolecule, the method comprising:
(a) contacting the biological macromolecule with a compound of formula (I):

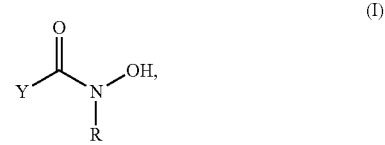

wherein:
Y is a selective reactive group configured to react with the biological macromolecule chemically or chemo-enzymatically to produce a tagged moiety; R is selected from hydrogen, alkyl or substituted alkyl; and
(b) purifying the tagged moiety by immobilized metal affinity chromatography (IMAC).

In certain embodiments, R is hydrogen. In certain embodiments, R is an alkyl group. In certain embodiments, R is a substituted alkyl group.

In certain embodiments of the method, the biological macromolecule includes but is not limited to, a protein, a nucleic acid, a lipid or a carbohydrate. In certain cases, the biological macromolecule is a protein. In certain cases, the biological macromolecule is a nucleic acid. In certain cases, the biological macromolecule is a lipid. In certain cases, the biological macromolecule is a carbohydrate.

Accordingly, in certain embodiments of the method, the selective reactive group may be configured to react with a protein, a nucleic acid, a lipid or a carbohydrate. In certain cases, Y is a protein reactive group. In certain cases, Y is a peptide reactive group. In certain cases, Y is a polysaccharide reactive group. In certain other cases, Y is a lipid reactive group. In certain cases, Y is an amino-reactive group. In certain cases, Y is a thiol-reactive group. In some cases, Y is a hydroxyl-reactive group. In certain other cases, Y is an imidazolyl-reactive or guanidinyl-reactive group. In certain cases, Y includes an aldehyde. In certain other cases, Y includes an alkyl halide. In certain other cases, Y includes a mesylate. In certain other cases, Y includes a maleimide. In certain other cases, Y includes a thiosulfate. In certain other cases, Y includes a pyridyl disulfide. The properties of the selective group Y will be discussed further below.

In certain embodiments, Y is an amino acid capable of being translationally inserted into proteins using natural or engineered tRNA synthetases.

In certain embodiments of the method, the compound of formula (I) may be of the formula (II), (IIA), (IIA1)-(IIA6) or (Ill), or a compound of structure (1)-(3) (e.g., as described herein).

In accordance with the subject methods, the tagged moiety is purified by immobilized metal affinity chromatography (IMAC). Immobilized Metal Ion Affinity Chromatography (IMAC) is a technique used for purification of proteins containing affinity sites for metal ions. IMAC is a separation principle that utilizes the differential affinity of proteins for immobilized metal ions to effect their separation. This differential affinity derives from the coordination bonds formed between metal ions and certain amino acid side chains exposed on the surface of the protein molecules. Since the interaction between the immobilized metal ions and the side chains of amino acids has a readily reversible character, it can be utilized for adsorption and then be disrupted using mild (i.e., non-denaturing) conditions. Proper choice of immobilized metal ion, loading conditions and elution conditions can yield up to about 95-98% pure protein in a single chromatographic step. Moreover, recovery generally is higher than 85%.

The principles of IMAC are described in Wong et al Immobilized Metal Ion Affinity Chromatography (IMAC) Chemistry and Bioseparation Applications Separation and Purification Methods 20: 49-106 2006, and Porath et al Immobilized metal ion affinity chromatography. Protein Expr Purif. 1992 August; 3(4):263-81., which are incorporated herein by reference.

Hydroxamates are small chemical moieties that bind tightly to certain metals. Natural hydroxamates have long been used, for example as chelators for iron poisoning. Artificial hydroxamates occur in drugs targeting metalloproteinases. As described herein the subject methods provide the use of hydroxamates for artificial tagging of biological macromolecules, e.g. proteins, polysacharides, lipids, etc.

Hydroxamates are incorporated into affinity tags, e.g., a compound of formula (I). This enabled affinity tagged material to be purified using immobilized metal affinity chromatography (IMAC) resins. These resins were loaded with metal ions, including but not limited to nickel ion Ni(II) and ytterbium ion Yb(III), which hydroxamates bind tightly. Hydroxamate-tagged material plus any non-tagged background material is poured onto a metal ion-IMAC resin (e.g., Yb(III)-IMAC resin) at high pH. Non-tagged material is then washed away while the hydroxamate-tagged molecules remain tightly bound to the resin. The pH is then lowered, which releases the hydroxamate-tagged molecules from the resin. One or more additional washing steps may optionally be included to remove undesired components of the sample applied to the resin. Two or more different resins may be used.

In one embodiment, the subject tagged hydroxamate moieties may be loaded on to a commercially available IMAC resin loaded with Yb(III) metal ions. The inventors observed that found that exemplary tagged hydroxamate moieties and Yb(III)—IMAC resins gave excellent purification of the tagged hydroxamate moieties away from the non-tagged material originally contaminating them. For example, in an exemplary example, agarose resin derivatized with nitrilotriacetic acid (NTA) loaded with Yb(III) enables an 86-fold increase in the fractional abundance and >50% recovery of peptides labeled with the hydroxamate compound (2) at a cysteine residue. The fold-enrichment can be increased to >300 using two Yb-IMAC columns in series.

As such, the strength of binding between the subject hydroxamate tagged moiety and the metal ion Yb(III) is very high; thus, isolation of the tagged moieties is very selective. However, association between the tagged moiety and the metal ion ligand is also reversible. Once the hydroxamate tagged moiety has been allowed to associate or adsorb with the metal ion ligand, the tagged moiety can be disassociated or eluted from the metal ion/adsorbent by addition of competitive ligand such as imidazole, or by decreasing the pH. Because of this reversibility, the hydroxamate tagged moiety is recovered in a purified, unbound form. Further, regeneration and reuse of the metal ion/adsorbent or support multiple times—even more than 100 times—is possible.

In certain embodiments, the IMAC resin is loaded with a nickel (II) ion (Ni(II)). In certain other embodiments, the IMAC resin is loaded with a cobalt (II) ion (Co(II)).

Sample Preparation

The subject tagged moieties may be prepared by contacting a biological macromolecule with a subject hydroxamate-containing affinity tags (e.g., a compound of formula (I)). In certain embodiments, the biological macromolecule is a protein and the subject affinity tag targets the N-termini of the protein. In other cases, the subject affinity tag targets a cysteine residue of the protein. The starting biological macromolecule may be subjected to one or more treatments before being applied to a metal ion chelating resin. Such treatments include, but are not limited to, centrifugation, to remove cell debris, etc.; salt precipitation; application to a size exclusion chromatographic column; and application to an ion exchange chromatographic column.

Metal Ion Affinity Resins

Any of a variety of available metal ion chelating resins can be used. In general, a metal ion chelating resin comprises a carrier matrix, optionally a spacer, and a moiety that comprises a metal ion, e.g., an organic ligand that immobilizes a metal ion. Carrier matrices include, but are not limited to, cross-linked dextrans, polystyrenes, nylon, agarose, and polyacrylamides. Metal chelating ligands include, but are not limited to, carboxymethyl aspartate (CM-Asp); iminodiacetic acid (IDA); tris(carboxymethyl)ethylene diamine (TED); nitrilo triacetic acid (NTA). Several of these are commercially available.

The metal ion chelating resin can be provided in the form of a chromatography column, e.g., wherein the resin is packed in a column; or a solid support of any shape or configuration.

Metal ions can be chosen based on their preferential reactivity towards nucleophiles. Metal ions include, $Fe^{3+}$, $Ca^{2+}$, $Al^{3+}$, $Cu^+$, $Hg^{2+}$, $Ag^+$, $Yb^{3+}$, $Cu^{2+}$, $Ni^{2+}$, $Zn^{2+}$, $Co^{2+}$. Hydroxamate bind $Yb^{3+}$ and $Ni^{2+}$ metal ions with high affinity. In certain embodiments of the subject method, the metal ion is $Yb^{3+}$.

In some embodiments, the metal ion chelate resin is a $Ni^{2+}$-immobilizing resin. Such resins are described in WO2018081858A1, the contents of which are incorporated herein by reference.

In certain embodiments of the subject method, the metal ion chelate resin is a $Co^{2+}$-immobilizing resin.

In some embodiments, the subject method provides methods of purifying a subject hydroxamate tagged moiety using multiple metal ion affinity resins, e.g., two or more different metal ion affinity resins. In some cases, the subject method includes two or more Yb(III)-IMAC columns in series.

Conditions for Binding

The conditions under which a sample comprising a subject hydroxamate tagged moiety is applied to a metal ion affinity resin will vary according to various parameters, including the inherent properties of the tagged moiety, the properties of the undesired components of the sample, etc.

Generally, the sample is applied to the metal ion affinity resin, and the resin is equilibrated with a solution. "Conditions for binding" include a condition of the sample being applied, as well as any equilibration conditions. Those skilled in the art can readily determine appropriate conditions for binding of a hydroxamate tagged moiety in a sample to a metal ion affinity resin, based on known and determined properties of the tagged moiety, etc. The pH conditions suitable for applying a sample comprising a subject fusion protein to a metal ion affinity resin range from about 9 to about 14, from about 10 to about 14, from about 11 to about 14, from about 12 to about 14, from about 9 to 10, from about 9.0 to about 11, or from about 9 to about 12. Temperature conditions suitable for applying a sample comprising a subject tagged moiety to a metal ion affinity resin range from about 15° C. to about 40° C., from about 20° C. to about 37° C., or from about 22° C. to about 25° C. Various additional substances may be included, including, but not limited to, detergents (e.g., sodium dodecyl sulfate, e.g., from about 0.05% to about 2%); non-ionic detergents, e.g., Tween 20™, and the like; chaotropic agents and denaturants, e.g., urea, and guanidinium HCl; buffers, e.g., Tris-based buffers, borate-based buffers, phosphate-based buffers, imidazole, HEPES, PIPES, MOPS, PIPES, TES, and the like.

Purification Steps

In some embodiments, the subject method provides a method of purifying a hydroxamate tagged moiety from a sample comprising the tagged moiety, comprising contacting a sample comprising the tagged moiety with an immobilized metal ion affinity resin under conditions which favor binding of the hydroxamate tagged moiety to the immobilized metal ion, thereby immobilizing the tagged moiety; and eluting the immobilized tagged moiety.

In the subject methods, the affinity is generally greater than about 50%, such as greater than 80%, greater than 100% (or 2-fold), greater than 4-fold, greater than 5-fold, greater than 7-fold, greater than 10-fold, greater than 20-fold, greater than 50-fold, or greater than 100-fold, or even more.

Washing

One or more washing steps may be included, to remove undesired components. A washing step may be performed after a hydroxamate tagged moiety is immobilized on a resin. The composition and temperature of a washing solution may vary according to the desired result. The optimal composition and temperature of a washing solution can readily be determined by those skilled in the art, based on known properties of the immobilized tagged moiety. Wash solutions may comprise a buffer, and may further comprise additional components, as necessary, including, but not limited to, a detergent.

Eluting

The immobilized hydroxamate tagged moiety can be eluted using a pH gradient; addition of a competitor, e.g., an organic acid, phosphates; addition of a displacer such as imidazole; and the like. In certain cases, the tagged moiety is eluted by lowering the pH. For example, the pH conditions suitable for eluting a sample from a metal ion affinity resin range from about 7 to about 1, from about 6 to about 1, from about 5 to about 1, from about 4 to about 1, from about 3 to 1, from about 7 to about 6, from about 7 to about 5, or from about 7 to about 4.

Compounds

Aspects of the invention also include compounds, e.g., a hydroxamate affinity tag of formula (I):

Wherein Y is a selective reactive group configured to react with a biological macromolecule chemically or chemoenzymatically; and R is selected from hydrogen, alkyl or substituted alkyl. Any convenient selective reactive groups may be utilized in the subject affinity tags. The subject selective reaction groups include groups that are capable of selectively reacting with a compatible functional group in a biological macromolecule to form a covalent bond. In certain cases, Y is a protein reactive group. In certain cases, Y is a peptide reactive group. In certain cases, Y is a polysaccharide reactive group. In certain other cases, Y is a lipid reactive group. In certain cases, Y is an amino-reactive group. In certain cases, Y is a thiol-reactive group. In some cases, Y is a hydroxyl-reactive group. In certain other cases, Y is an imidazolyl-reactive or guanidinyl-reactive group. In certain embodiments, Y is an amino acid capable of being translationally inserted into proteins using natural or engineered tRNA synthetases.

Selective functional groups of interest include, but are not limited to, any convenient pairs of compatible reactive functional groups such as thiols and maleimides, thiols and iodoacetamides, aldehydes or ketones and alkoxyamines, or aldehydes or ketones and hydrazides; pairs of groups that can react with one another via Click chemistry, e.g., azide and alkyne groups (e.g., cyclooctyne groups); pairs of groups that can react with one another via Staudinger ligation chemistry such as azides and phosphines. In some embodiments of the affinity tag, Y is a selective reactive group that includes a group selected from an alkyne, an azide, a phosphine (e.g., a substituted triphenyl phosphine), a thiol, a maleimide or iodoacetyl, an aldehyde, a hydrazide, a sulfonate and an alkoxyamine. In certain instances, Y includes an azide. In some instances, Y includes an alkyne. In some cases, the selective tag includes an aldehyde. In some cases the selective tag is a pyridyl aldehyde. In certain instances, Y includes an alkyl halide. In certain instances, Y includes a sulfonate. In certain cases, Y is a group that includes a mesolate. In certain cases Y includes a maleimide. In certain cases, Y includes a thiosulfate. In certain cases, Y includes a pyridyl disulfide. In some cases, Y is a selective reactive group selected from the group consisting of, an alkyne, an azide, an alkyl halide, a phosphine, a thiol, a maleimide or iodoacetyl, an aldehyde, a thiosulfate, a pyridyl disulfide and an alkoxyamine.

In some embodiments of formula (I), the compound is of formula (II):

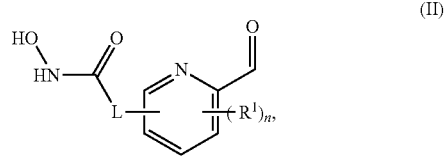

wherein:
L is an optional linker
R¹ is an optional group selected from halogen, deuterium, alkyl and substituted alkyl; and
n is an integer from 0 to 3.

In some embodiments, the compound of formula (II) has the formula (IIB), (IIE), (IIC) or (IID):

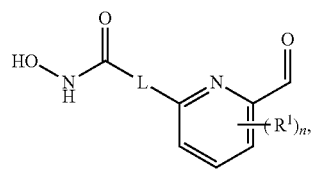
(IIB)

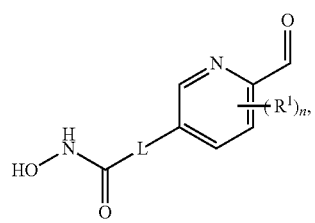
(IIC)

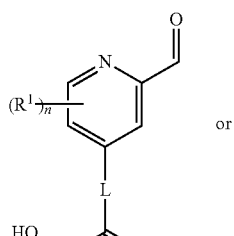
(IID)

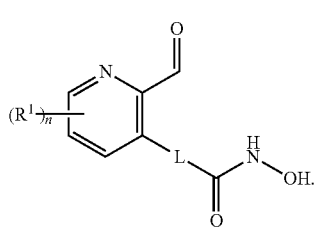
or

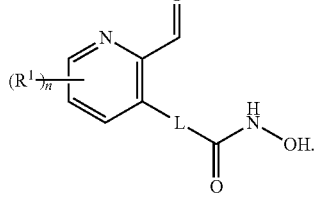
(IIE)

In certain cases of any one of formula (II) or (IIB) to (IIE), n is 0, so that R¹ is absent. In certain other cases, n is greater than 0, such as 1, 2 or 3. In certain cases n is 1 and R¹ is a lower alkyl group. In certain cases, n is 2 and each R¹ group is a lower alkyl group. In certain cases, n is 3 and each R¹ is a lower alkyl group. In certain cases, n is 1, 2 or 3, and each R¹ is deuterium. In certain cases, n is 1, 2 or 3 and each R¹ is selected from a halogen or an alkyl halide.

In certain cases of any one of formula (II) or (IIB) to (IIE), a linking group, L, is present. In certain cases, L is an alkyl group. In certain cases, L includes an amine moiety. In certain cases, L is a branched alkyl group. In certain other cases of any one of formula (II) or (IIB) to (IID), L is absent, such that there is no linking group between the pyridyl ring and the hydroxamate group.

In certain embodiments of a compound of any one of formula (I), (II) or (IIB) to (IIE), has the structure (1) or (3):

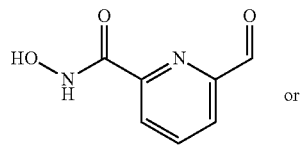
(1)
or

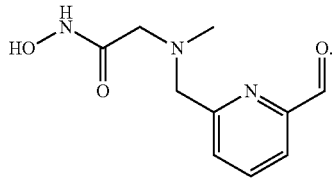
(3)

In some embodiments of formula (I), the compound is of the formula (IIIA):

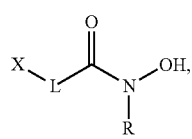
(IIA)

wherein:
L is an optional linker
R is selected from hydrogen, alkyl or substituted alkyl; and
X is selected from an alkyl halide, haloacetyl, maleimide, thiosulfate or pyridyl disulfide.

In certain cases, the compound of formula (IIA) is of the formula (IIA1) to (IIA6):

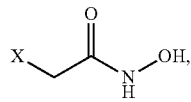
(IIA1)

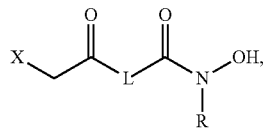
(IIA2)

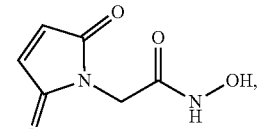
(IIA3)

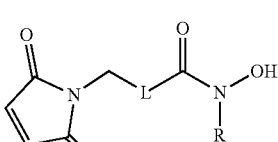
(IIA4)

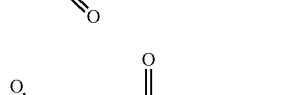
(IIA5)

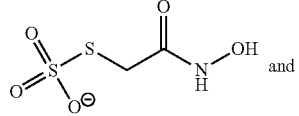
and

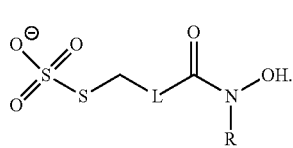

(IIA6)

In some embodiments of formula (I) or (IIA2), the compound is of formula (III):

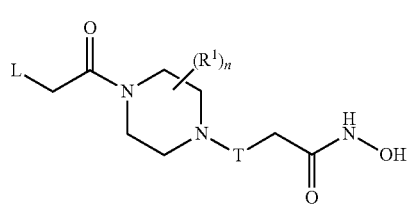

(III)

wherein:
T is an optional linker;
L is a leaving group;
$R^1$ is an optional group selected from halogen, deuterium, alkyl and substituted alkyl; and
n is an integer from 0 to 8.

In certain cases of formula (III), a linking group T is present. In certain cases, L is an alkyl group. In certain cases, L is a branched alkyl group. In certain other cases of formula (III), T is absent, such that there is no additional linking group present.

In certain cases of formula (III), n is 0, so that $R^1$ is absent. In certain other cases, n is greater than 0, such as 1, 2, 3, 4, 5, 6, 7 or 8. In certain cases n is 1 and $R^1$ is a lower alkyl group. In certain cases, n is greater than 1 and each $R^1$ group is a lower alkyl group. In certain cases, n is 1, 2, 3, 4, 5, 6, 7 or 8 and each $R^1$ is deuterium. In certain cases, n is 1, 2, 3, 4, 5, 6, 7 or 8 and each $R^1$ is selected from a halogen or an alkyl halide.

In certain cases of formula (III), the leaving group L is selected from halogen or sulfonate. In certain cases, the leaving group is iodide. In certain cases, the leaving group is a mesylate.

In some embodiments of the formula (III), the compound is of the structure (2):

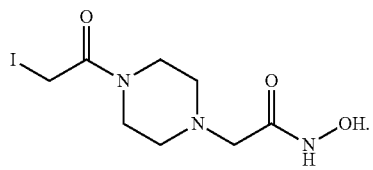

(2)

In certain cases of any one of the subject formulae (e.g., as described herein) or compounds (1) to (3), at least one isotopic label is included. In certain cases, the isotopic label is selected from $^2H$, $^{13}C$, $^{14}C$ $^{15}N$, $^{18}O$ and $^{17}O$. In certain cases, the isotopic label is $^{13}C$.

In certain embodiments an exemplary compound of formula (I) has a size ranging from 60 Da to 230 Da, such as 60 to 210 Da, 60 to 190 Da, 60 to 170 Da, 60 to 150 Da, 60 to 130 Da, 60 to 110 Da or 60 to 90 Da. In certain cases, the compound of formula (I) is less than 230 Da, such as less than 220 Da, less than 200 Da, less than 180 Da, less than 160 Da, less than 140 Da, less than 120 Da or less than 100 Da, or even less. In certain embodiments, the compound of formula (I) has a size ranging from 60 Da to 170 Da.

Kits

Aspects of the present disclosure also include kits. The kits may include, e.g., a hydroxamate-containing affinity tag (e.g., a compound of formula (I) as described herein), and suitable components for purification by immobilized metal affinity chromatography (e.g., as described herein).

Accordingly, in certain aspects there is provided a kit comprising:

a compound of formula (I)

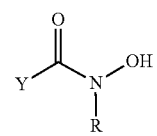

(I)

wherein:
Y is a selective reactive group configured to react with a biological macromolecule chemically or chemo-enzymatically;
R is selected from hydrogen, alkyl and substituted alkyl; and
an immobilized metal affinity chromatography (IMAC) resin; and
a metal ion configured for loading onto the resin, wherein the metal ion is capable of binding a compound of formula (I).

In some cases of formula (I), R is hydrogen. In other cases of formula (I), R is alkyl. In other cases of formula (I), R is substituted alkyl.

In some cases, the metal ion may be pre-loaded onto the IMAC resin in the kit (e.g., on a column). In other cases, the metal ion is provided as a separate component to the IMAC resin. In certain cases, the metal ion is a nickel ion. In certain cases, the nickel ion is nickel (II). In certain cases, the metal ion is a ytterbium ion. In certain cases, the ytterbium ion is ytterbium (III). It will be understood that any convenient metal ion may find use in the subject kits, provided that the metal ion is capable of binding a compound of formula (I).

The selective reactive group, Y, may be a selective group as described herein. In certain cases, Y is a protein reactive group. In certain cases, Y is a peptide reactive group. In certain cases, Y is a polysaccharide reactive group. In certain other cases, Y is a lipid reactive group. In certain cases, Y is an amino-reactive group. In certain cases, Y is a thiol-reactive group. In some cases, Y is a hydroxyl-reactive group. In certain other cases, Y is an imidazolyl-reactive or guanidinyl-reactive group. In certain embodiments, Y is an amino acid capable of being translationally inserted into proteins using natural or engineered tRNA synthetases.

In certain cases, Y comprises an aldehyde group. In certain cases, Y comprises an alkyl halide group. In certain other cases, Y comprises a mesylate group. In certain cases, Y comprises a maleimide group. In certain cases, Y comprises a thiosulfate group. In certain cases Y comprises a pyridyl disulfide group.

In some embodiments of the kit, the compound of formula (I) is a compound of formula (II), e.g., as described herein. In some embodiments, the compound of formula (II) has the structure of compound (1) or compound (2), e.g., as defined herein.

In some embodiments of the kit, the compound of formula (I) is a compound of formula (IIA), e.g., as described herein. In some embodiments, the compound of formula (IIA) is of any one of the formulae (IIA1) to (IIA6), e.g., as defined herein.

In some embodiments of the kit, the compound of formula (I) is a compound of formula (III), e.g., as described herein. In some embodiments, the compound of formula (III) has the structure of compound (2), e.g., as defined herein.

In certain embodiments of the kits, an exemplary compound of formula (I) has a size ranging from 60 Da to 230 Da, such as 60 to 210 Da, 60 to 190 Da, 60 to 170 Da, 60 to 150 Da, 60 to 130 Da, 60 to 110 Da or 60 to 90 Da. In certain cases, the compound of formula (I) is less than 230 Da, such as less than 220 Da, less than 200 Da, less than 180 Da, less than 160 Da, less than 140 Da, less than 120 Da or less than 100 Da, or even less. In certain embodiments, the compound of formula (I) has a size ranging from 60 Dato 170 Da.

In some instances, the kit includes containers or packaging for containing each of the compound of formula (I); the IMAC resin; and the metal ion for configured loading onto the resin. In certain embodiments, the packaging may be a sealed packaging, e.g., in a water vapor-resistant container, optionally under an air-tight and/or vacuum seal. In certain instances, the packaging is a sterile packaging, configured to maintain each of the components enclosed in the packaging in a sterile environment. By "sterile" is meant that there are substantially no microbes (such as fungi, bacteria, viruses, spore forms, etc.). The kits may further include a fluid (e.g., a liquid). For instance, the kit may include a liquid, such as a liquid in which the compounds of formula (I) and/or the metal ion are provided. For example, the compound of formula (I) and/or the metal ion may be dispersed in the liquid. The kit may optionally provide additional components that are useful in the subject methods, including, but not limited to, buffers, developing reagents, labels, reacting surfaces, means for detections, control samples, standards, and interpretive information In addition to the above components, the subject kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Another means would be a computer readable medium, e.g., CD, DVD, Blu-Ray, computer-readable memory (e.g., flash memory), etc., on which the information has been recorded or stored. Yet another means that may be present is a website address which may be used via the Internet to access the information at a removed site. Any convenient means may be present in the kits.

Utility

The subject methods and kits find use in a wide variety of situations. By using the subject hydroxamate affinity tags to tag a pure molecule before adding it to a reaction, one can re-purify that molecule after the reaction. Activating a subject affinity tag's attachment mechanism in a particular cellular compartment lets researchers isolate only those molecules present in that compartment. By using a subject affinity tag to target a specific chemical moiety, one can specifically purify the molecules containing that moiety. Affinity tagging a large, dense molecule and then breaking it up makes it possible to purify the pieces that originated from the molecule's surface. Genetically altering a protein's sequence by appending an enzyme that reacts with an affinity tag, one can simplify purification of the protein after its expression.

The subject hydroxamate affinity tags can generally be applied in place of biotin affinity tags, which are common. (A notable exception is that some biotin strategies use enzymes, like BirA, that evolved to deal with biotin specifically). The hydroxamate tagged biological biomolecules can then be purified by immobilized metal affinity chromatography, e.g., as described herein. In addition, the subject hydroxamate-based affinity tags provide a second affinity tag to work in conjunction with biotin when two orthogonal affinity tags need to be used together, e.g., to purify cross-linked polypeptides.

Existing affinity tags can typically be purified because they contain a biotin moiety or an alkyne moiety, which can later be converted into a biotin. Many affinity tags need to be tiny to serve their intended purposes. Biotin moieties are too large to fit into such affinity tags. This is the typical reason for using an alkyne instead. However, the extra steps involved in later converting the alkyne into a biotin causes undesirable complexity that leads to yield losses and often to unforeseen complications. Hydroxamates have the size advantage of alkynes without requiring any conversion before purification.

This has multiple advantages over biotin, which is commonly used for this purpose today. Hydroxamates are much smaller than biotin (e.g., 60 Da vs 244 Da), enabling their incorporation into smaller affinity tags. They also have better solubility properties in water than biotin. Streptavidin resin for purifying biotin tags is an expensive single-use reagent, while IMAC resin to be loaded with Yb(III) for purifying hydroxamates can be re-used almost indefinitely.

Finally, hydroxamate-based affinity tags provide a second affinity tag to work in conjunction with biotin when two orthogonal affinity tags need to be used together.

Aspects of the present disclosure, uses hydroxamate-containing affinity tags, that are capable of targeting either the N-termini of peptides or cysteine residues. The subject affinity tags can be loaded onto IMAC resins to achieve excellent purification of the affinity tagged material away from the non-tagged material originally contaminating them. Furthermore, the enriched peptides provided improvements for downstream analysis, for example by providing much purer samples for mass spectrometric analysis of protein structure.

Alternative Embodiments I

Affinity tags and methods for using the same for purification of cross-linked peptides, are provided. The affinity tags include a scaffold containing a hydroxamate moiety, and a scaffold containing a biotin moiety (e.g., desbiotin). The subject affinity tags are configured to bind selectively to the peptide N-termini. Compositions comprising a mixture of an affinity tag containing a hydroxamate moiety and an affinity tag containing a biotin moiety are also provided. Methods of using the subject composition to purify a cross-linked peptide are also provided. In aspects of the subject purification methods, a sample is cross-linked to produce a cross-linked sample; the cross-linked sample is reacted with a subject composition (e.g., as to produce an orthogonally tagged composition containing a hydroxamate affinity tagged N-termini and a biotin affinity tagged N-termini); and purifying the tagged composition, thereby isolating crosslinked peptides from the sample. Methods of purifying cross-linked samples comprising only hydroxamate tags are also provided.

Compounds

Aspects of the invention also include affinity tag compounds, e.g., a compound of formula (I)—(IIID) or a compound of structure (1)-(3).

In some embodiments, the affinity tag compound is of the formula (I):

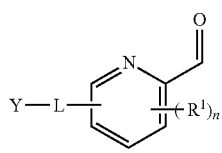

(I)

wherein:
Y is selected from a hydroxamate moiety and a biotin moiety;
L is an optional linker
R¹ is a group selected from halogen, deuterium, alkyl, substituted alkyl (e.g., alkyl halide etc.); and
n is an integer from 0 to 3.

In certain embodiments of formula (I), the R¹ groups together provide a molecular weight of less than 80 Da, such as less than 70 Da, less than 60 Da or less than 50 Da. In some instances, n is 0 and R¹ is absent.

In certain cases of formula (I), Y is a hydroxamate moiety. The hydroxamate moiety is capable of specifically binding with high affinity to a support e.g., a immobilized metal affinity chromatography (IMAC) resin that is loaded with nickel (II) or ytterbium (Ill) metal ion. In some cases, a IMAC resin loaded with ytterbium (III) may be used to specifically bind hydroxamate labelled crosslinked peptides with moderate affinity thereby allowing bound crosslinked peptides to be later eluted competitively after non-hydroxamate labelled polypeptides have been washed away.

In some embodiments of formula (I), the compound is of formula (II):

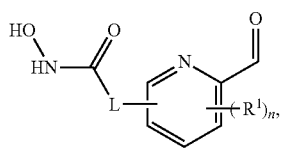

(II)

wherein:
L is an optional linker
R¹ is an optional group selected from halogen, deuterium, alkyl, substituted alkyl (e.g., alkyl halide); and
n is an integer from 0 to 3.

In some embodiments, the compound of formula (II) has the formula (IIA), (IIB), (IIC) or (IID):

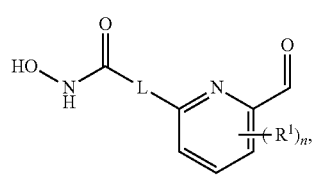

(IIA)

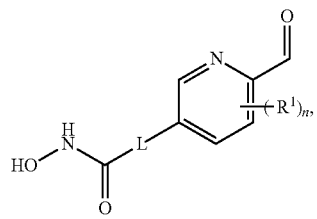

(IIB)

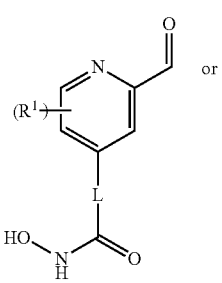

(IIC)

or

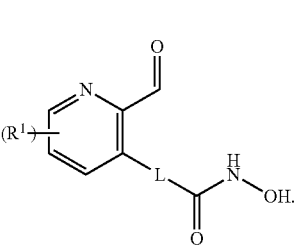

(IID)

In certain cases of any one of formula (II) to (IID), n is 0, so that R¹ is absent. In certain other cases, n is greater than 0, such as 1, 2 or 3. In certain cases n is 1 and R¹ is a lower alkyl group. In certain cases, n is 2 and each R¹ group is a lower alkyl group. In certain cases, n is 3 and each R¹ is a lower alkyl group. In certain cases, n is 1, 2 or 3, and each R¹ is deuterium. In certain cases, n is 1, 2 or 3 and each R¹ is selected from a halogen or an alkyl halide.

In certain cases of any one of formula (II) to (IID), a linking group, L, is present. In certain cases, L is an alkyl group. In certain cases, L is a branched alkyl group. In certain cases, L includes an amine or a substituted amine. In certain cases, L is selected from —CH$_2$N(CH$_3$)— and CH$_2$NH$_2$—. In certain other cases of any one of formula (II) to (IID), L is absent, such that there is no linking group between the pyridyl ring and the hydroxamate group.

In certain embodiments of a compound of any one of formula (I), (II) or (IIA) to (IID), has the structure (1):

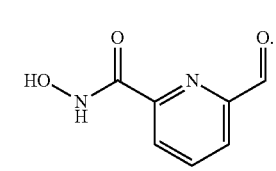

(1)

In certain embodiments of a compound of any one of formula (I), (II) or (IIA) to (IID), has the structure (2):

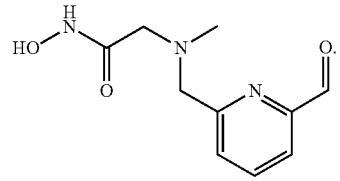

(2)

In some embodiments of formula (I), Y is a biotin moiety. In some embodiments, the biotin moiety includes, biotin, desthiobiotin, oxybiotin, 2'-iminobiotin, diaminobiotin, biotin sulfoxide, biocytin, etc. In some cases, the biotin moiety is desthiobiotin. It will be understood that any convenient biotin moiety may find use in the subject compounds, provided that the biotin moiety is compatible with the subject methods (e.g., as described herein). The biotin moiety is capable of specifically binding with high affinity to a support e.g., a chromatography support that contains immobilized avidin, neutravidin or streptavidin. In some cases, a monomeric avidin support may be used to specifically bind biotinylated crosslinked peptides with moderate affinity thereby allowing bound crosslinked peptides to be later eluted competitively (e.g., with a 2 mM biotin solution or using a highly organic elution solution, e.g., 70% acetonitrile) after non-biotinylated polypeptides have been washed away.

In some embodiments of formula (I), Y is a desthiobiotin moiety. In certain instances, the compound of formula (I) has the formula (III):

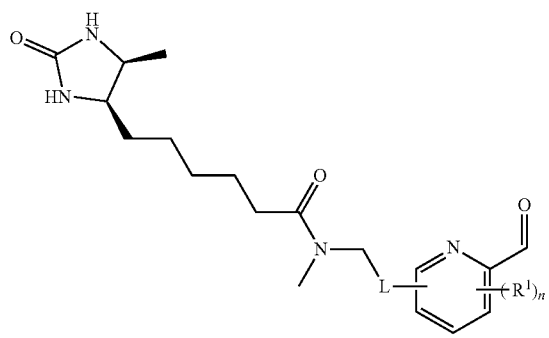

(III)

wherein:
L is an optional linker
$R^1$ is an optional group selected from halogen, deuterium, alkyl, substituted alkyl (e.g., alkyl halide); and
n is an integer from 0 to 3.

In some embodiments, the compound of formula (III) has the formula (IIIA), (IIIB), (IIIC) or (IIID):

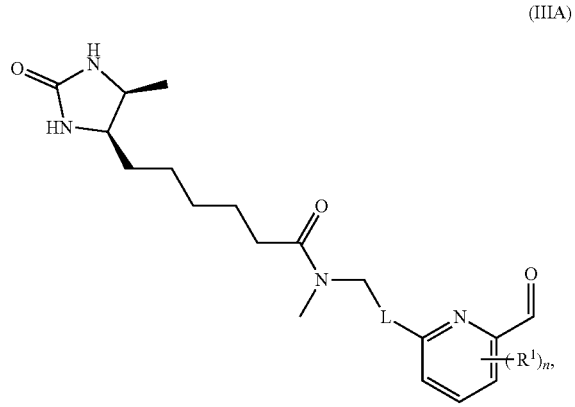

(IIIA)

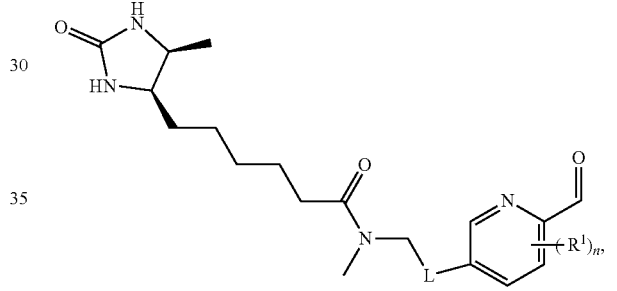

(IIIB)

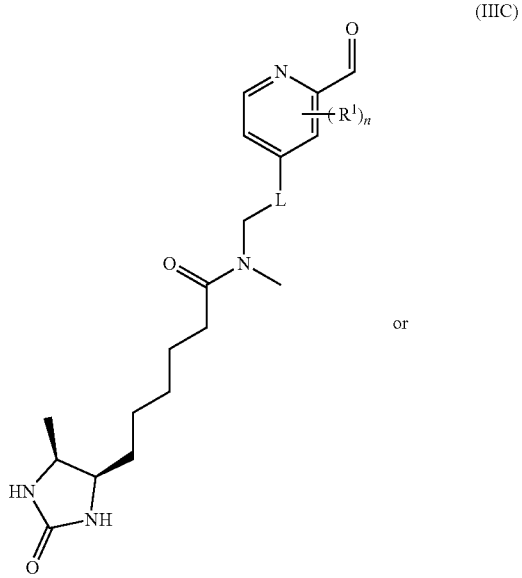

(IIIC)

or

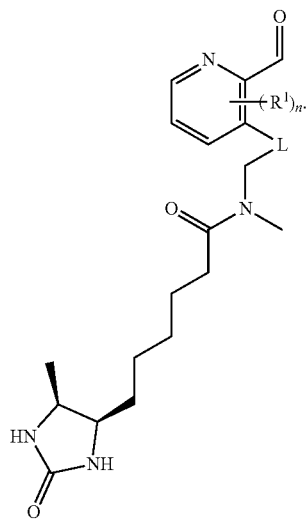

(IIID)

In certain cases of any one of formula (III) to (IIID), n is 0, so that $R^1$ is absent. In certain other cases, n is greater than 0, such as 1, 2 or 3. In certain cases n is 1 and $R^1$ is a lower alkyl group. In certain cases, n is 2 and each $R^1$ group is a lower alkyl group. In certain cases, n is 3 and each $R^1$ is a lower alkyl group. In certain cases, n is 1, 2 or 3, and each $R^1$ is deuterium. In certain cases, n is 1, 2 or 3 and each $R^1$ is selected from a halogen or an alkyl halide.

In certain cases of any one of formula (III) to (IIID), a linking group, L, is present. In certain cases, L is an alkyl group. In certain cases, L is a methylene group. In certain cases, L is a branched alkyl group. In certain other cases of any one of formula (II) to (IID), L is absent, such that there is no linking group between the pyridyl ring and the desthiobiotin group.

In certain embodiments of a compound of any one of formula (I), (III) or (IIIA) to (IIID), has the structure (3):

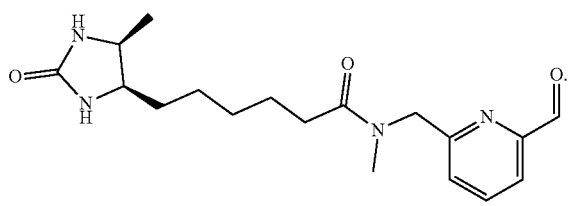

(3)

In certain cases of any one of formulae (I), (II), (IIA) to (IID), (Ill), or (IIIA) to (IIID), or compounds (1) or (2), at least one isotopic label is included. In certain cases, the isotopic label is selected from $^2H$, $^3H$, $^{11}C$, $^{13}C$, $^{14}C$ $^{15}N$, $^{18}O$ and $^{17}O$. In certain cases, the isotopic label is $^{13}C$.

In certain embodiments an exemplary compound of formula (I) has a size ranging from 70 to 400 Da, such as 100 to 300 Da, 100 to 200 Da or 120 to 150 Da. In certain cases, the compound of formula (I) has a size of less than 400 Da, such as less than 350 Da, less than 300 Da, less than 250 Da, less than 200 Da, less than 150 Da, less than 100 Da, or even less.

Compositions

Aspects of the invention also include compositions, e.g., compositions containing a mixture of compounds of formula (I). In some embodiments the composition includes, a mixture of a compound of formula (I), where Y is a hydroxamate moiety (e.g., as described herein); and a compound of formula (I), where Y is a biotin moiety (e.g., as described herein). In certain cases, the composition includes a mixture of a compound of formula (II) and a compound of formula (III):

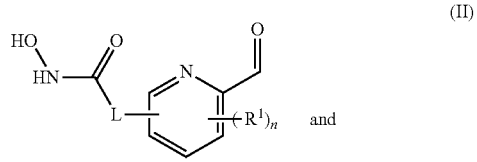

(II)

and

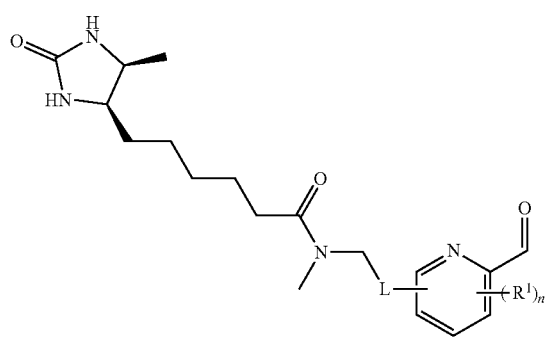

(III)

(e.g., as described herein).

Generally, the ratio of the compound of formula (II) to the compound of formula (III) in the subject composition is about 50:50, such as 49:51, or 48:52, or 47:53, or 46:54, 45:55, or 55:45, 54:46, or 53:47, or 52:48, or 51:49. In some embodiments, the ratio of the compound of formula (II) to the compound of formula (III) in the subject compositions is 1:1. In some embodiments, the ratio of the compound of formula (II) to the compound of formula (III) in the subject compositions is less that 50:50, such as 49:51, or 48:52, or 47:53, or 46:54, 45:55, or even less. In some embodiments, the ratio of the compound of formula (II) to the compound of formula (III) in the subject compositions is more than 50:50, such as 51:49, or 52:48 or 53:47, or 54:46, or 55:45, or even more.

In certain embodiments of the subject composition, the compound of formula (II) has the structure of compound (1):

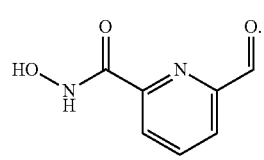

(1)

In certain embodiments of the subject composition, the compound of formula (II), has the structure of compound (2):

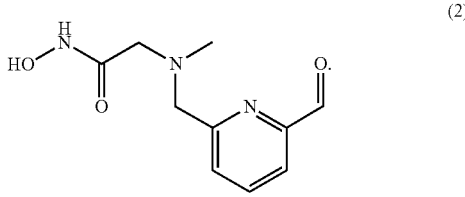 [SMILES: CN(CC(=O)NO)Cc1cccc(C=O)n1]

(2)

In certain embodiments of the subject composition, the compound of formula (III) has the structure of compound (3):

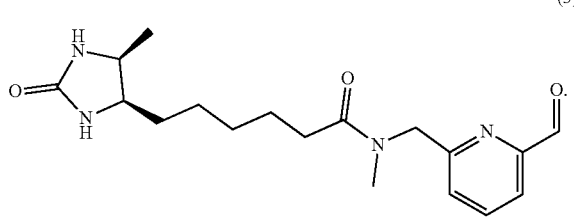

(3)

Methods

As summarized above, methods of using the subject composition to purify a cross-linked peptide are also provided. Accordingly, in one embodiment, the method includes:
(a) crosslinking a sample to produce a cross-linked sample;
(b) digesting the cross-linked sample into shorter cross-linked peptides;
(c) reacting the cross-linked sample with the composition to produce a tagged composition;
(d) purifying any peptides in the tagged composition that are tagged by both a hydroxamate moiety and a desthiobiotin moiety, thereby isolating cross-linked proteins from the sample; and
(e) optionally removing the tags attached to the N-termini in step (c).

In other embodiment, there is provided a method of purifying hydroxamate-tagged cross-linked peptides. The method includes:
(a) crosslinking a sample to produce a cross-linked sample;
(b) digesting the crosslinked protein into shorter cross-linked peptides;
(c) reacting the cross-linked peptides with a compound of formula (II)-(IID) or the compound of structure 1 or 2, to produce a hydroxamate-tagged composition;
(c) purifying the hydroxamate-tagged composition to isolate the cross-linked peptides from the sample; and
(d) optionally removing the tags attached to the N-termini in step (c).

In some embodiments, step (a) in the subject methods is omitted and step (b) involves digesting a sample containing natural cross-links into shorter crosslinked peptides.

In certain cases, the method for purification of the hydroxamate-tagged composition is facilitated by an IMAC column, wherein the retention time of molecules with two hydroxamate tags exceeds that of those with a single hydroxamate-tag sufficiently, thereby allowing isolation of the cross-linked peptides from the sample.

More generally, there is no variation in how many N-termini single peptides have. They all have a single one. Crosslinked peptides, however, have two. In the subject methods, this property is therefore exploited for separating linear and crosslinked peptides.

The subject compositions containing a mixture of a hydroxamate containing affinity tag and a biotin containing affinity tag can selectively label peptide N-termini through 2PCA chemistry. Hydroxamate containing moieties can be purified by immobilized metal affinity chromatography. Whereas, biotin containing moieties can be purified by streptavidin. When a protein digest is labeled with a 50:50 mixture of the subject hydroxamate containing affinity tags (e.g., of formula (II)) and biotin containing affinity tags (e.g., of formula (III)), only crosslinked peptides can have both tags coexisting in a single molecule. Linear peptides will have one N-tag or the other, but not both. Dual-labeled molecules are then purified by serial affinity chromatography selecting for the presence of both tags. First, immobilized metal affinity chromatography is used to discard all peptides that don't have a hydroxamate tag. Then, streptavidin resin is used to discard all peptides that don't have a biotin tag. This leaves crosslinked peptides no longer adulterated by the linear peptides. The purification method can be fully automated on standard FPLC equipment. After purification, the hydroxamate tag and the biotin tag can be removed to yield pure crosslinked peptides for further analysis, e.g., by mass spectrometry. The subject implementation exceeds 100-fold enrichment while being agnostic to the crosslinker and protease used.

In accordance with the subject methods, the tagged cross-linked moiety is first purified by immobilized metal affinity chromatography (IMAC) to discard all molecules that don't have a hydroxamate tag. Immobilized Metal Ion Affinity Chromatography (IMAC) is a technique used for purification of proteins containing affinity sites for metal ions. IMAC is a separation principle that utilizes the differential affinity of proteins for immobilized metal ions to effect their separation. This differential affinity derives from the coordination bonds formed between metal ions and certain amino acid side chains exposed on the surface of the protein molecules. Since the interaction between the immobilized metal ions and the side chains of amino acids has a readily reversible character, it can be utilized for adsorption and then be disrupted using mild (i.e., non-denaturing) conditions. Proper choice of immobilized metal ion, loading conditions and elution conditions can yield up to about 95-98% pure protein in a single chromatographic step. Moreover, recovery generally is higher than 85%.

The principles of IMAC are described in Wong et al Immobilized Metal Ion Affinity Chromatography (IMAC) Chemistry and Bioseparation Applications Separation and Purification Methods 20: 49-106 2006, and Porath et al Immobilized metal ion affinity chromatography. Protein Expr Purif. 1992 August; 3(4):263-81., which are incorporated herein by reference.

Hydroxamates are small chemical moieties that bind tightly to certain metals. Natural hydroxamates have long been used, for example as chelators for iron poisoning. Artificial hydroxamates occur in drugs targeting metalloproteinases. As described herein the subject methods provide the use of hydroxamates for artificial tagging of biological macromolecules, e.g. proteins, polysacharides, lipids, etc.

Hydroxamates are incorporated into affinity tags, e.g., a compound of formula (II). This enabled affinity tagged material to be purified using immobilized metal affinity chromatography (IMAC) resins. These resins were loaded with metal ions, including but not limited to nickel ion Ni(II) and ytterbium ion Yb(III), which hydroxamates bind tightly. Hydroxamate-tagged material plus any non-tagged background material is poured onto a metal ion-IMAC resin (e.g., Yb(III)—IMAC resin) at high pH. Non-tagged material is then washed away while the hydroxamate-tagged molecules remain tightly bound to the resin. The pH is then lowered, which releases the hydroxamate-tagged molecules from the resin. One or more additional washing steps may optionally be included to remove undesired components of the sample applied to the resin. Two or more different resins may be used.

In one embodiment, the subject tagged hydroxamate moieties may be loaded on to a commercially available IMAC resin loaded with Yb(III) metal ions. The inventors observed that found that exemplary tagged hydroxamate moieties and Yb(III)—IMAC resins gave excellent purification of the tagged hydroxamate moieties away from the non-tagged material originally contaminating them. For example, in an exemplary example, agarose resin derivatized with nitrilotriacetic acid (NTA) loaded with Yb(III) enables an 86-fold increase in the fractional abundance and >50% recovery of peptides labeled with the hydroxamate compound (2) at a cysteine residue. The fold-enrichment can be increased to >300 using two Yb-IMAC columns in series.

As such, the strength of binding between the subject hydroxamate tagged moiety and the metal ion Yb(III) is very high; thus, isolation of the tagged moieties is very selective. However, association between the tagged moiety and the metal ion ligand is also reversible. Once the hydroxamate tagged moiety has been allowed to associate or adsorb with the metal ion ligand, the tagged moiety can be disassociated or eluted from the metal ion/adsorbent by addition of competitive ligand such as imidazole, or by decreasing the pH. Because of this reversibility, the hydroxamate tagged moiety is recovered in a purified, unbound form. Further, regeneration and reuse of the metal ion/adsorbent or support multiple times—even more than 100 times—is possible. As disclosed herein, in one embodiment, this IMAC technique may be used to isolated hydroxamate-tagged cross-linked peptides from linear hydroxamate-tagged peptides.

Sample Preparation

The subject tagged moieties may be prepared by contacting a cross-linked sample with a subject composition (e.g., comprising a mixture of a hydroxamate-containing affinity tag and a biotin-containing affinity tag). In certain embodiments, the subject affinity tags are selective for the N-termini of the cross-linked sample. The starting crosslinked sample may be subjected to one or more treatments before being applied to a metal ion chelating resin. Such treatments include, but are not limited to, centrifugation, to remove cell debris, etc.; salt precipitation; application to a size exclusion chromatographic column; and application to an ion exchange chromatographic column.

Metal Ion Affinity Resins

Any of a variety of available metal ion chelating resins can be used. In general, a metal ion chelating resin comprises a carrier matrix, optionally a spacer, and a moiety that comprises a metal ion, e.g., an organic ligand that immobilizes a metal ion. Carrier matrices include, but are not limited to, cross-linked dextrans, polystyrenes, nylon, agarose, and polyacrylamides. Metal chelating ligands include, but are not limited to, carboxymethyl aspartate (CM-Asp); iminodiacetic acid (IDA); tris(carboxymethyl)ethylene diamine (TED); nitrilo triacetic acid (NTA). Several of these are commercially available.

The metal ion chelating resin can be provided in the form of a chromatography column, e.g., wherein the resin is packed in a column; or a solid support of any shape or configuration.

Metal ions can be chosen based on their preferential reactivity towards nucleophiles. Metal ions include, $Fe^{3+}$, $Ca^{2+}$, $Al^{3+}$, $Cu^+$, $Hg^{2+}$, $Ag^+$, $Yb^{3+}$, $Cu^{2+}$, $Ni^{2+}$, $Zn^{2+}$, $Co^{2+}$. Hydroxamate bind $Yb^{3+}$ and $Ni^{2+}$ metal ions with high affinity. In certain embodiments of the subject method, the metal ion is $Yb^{3+}$. In some embodiments, a metal ion chelate resin is a $Ni^{2+}$-immobilizing resin. Such resins are described in WO2018081858A1, the contents of which are incorporated herein by reference.

In some embodiments, the subject method provides methods of purifying a subject hydroxamate tagged moiety using multiple metal ion affinity resins, e.g., two or more different metal ion affinity resins. In some cases, the subject method includes two or more Yb(III)-IMAC columns in series.

Conditions for Binding

The conditions under which a sample comprising a subject hydroxamate tagged moiety is applied to a metal ion affinity resin will vary according to various parameters, including the inherent properties of the tagged moiety, the properties of the undesired components of the sample, etc. Generally, the sample is applied to the metal ion affinity resin, and the resin is equilibrated with a solution. "Conditions for binding" include a condition of the sample being applied, as well as any equilibration conditions. Those skilled in the art can readily determine appropriate conditions for binding of a hydroxamate tagged moiety in a sample to a metal ion affinity resin, based on known and determined properties of the tagged moiety, etc. The pH conditions suitable for applying a sample comprising a subject fusion protein to a metal ion affinity resin range from about 9 to about 14, from about 10 to about 14, from about 11 to about 14, from about 12 to about 14, from about 9 to 10, from about 9.0 to about 11, or from about 9 to about 12. Temperature conditions suitable for applying a sample comprising a subject tagged moiety to a metal ion affinity resin range from about 15° C. to about 40° C., from about 20° C. to about 37° C., or from about 22° C. to about 25° C. Various additional substances may be included, including, but not limited to, detergents (e.g., sodium dodecyl sulfate, e.g., from about 0.05% to about 2%); non-ionic detergents, e.g., Tween 20™, and the like; chaotropic agents and denaturants, e.g., urea, and guanidinium HCl; buffers, e.g., Tris-based buffers, borate-based buffers, phosphate-based buffers, imidazole, HEPES, PIPES, MOPS, PIPES, TES, and the like.

Purification Steps

In some embodiments, the subject method provides a method of purifying a hydroxamate tagged sample from a sample comprising a mixture of linear and crosslinked peptides that don't comprise a hydroxamate tag, comprising contacting a sample comprising the mixture with an immobilized metal ion affinity resin under conditions which favor binding of the hydroxamate tagged moieties to the immobilized metal ion, thereby immobilizing the tagged moiety; and eluting the immobilized tagged moiety.

In the subject methods, the affinity is generally greater than about 50%, such as greater than 80%, greater than 100% (or 2-fold), greater than 4-fold, greater than 5-fold, greater than 7-fold, greater than 10-fold, greater than 20-fold, greater than 50-fold, or greater than 100-fold, or even more.

Washing

One or more washing steps may be included, to remove undesired components. A washing step may be performed after a hydroxamate tagged moiety is immobilized on a resin. The composition and temperature of a washing solution may vary according to the desired result. The optimal composition and temperature of a washing solution can readily be determined by those skilled in the art, based on known properties of the immobilized tagged moiety. Wash solutions may comprise a buffer, and may further comprise additional components, as necessary, including, but not limited to, a detergent.

Eluting

The immobilized hydroxamate tagged moieties can be eluted using a pH gradient; addition of a competitor, e.g., an organic acid, phosphates; addition of a displacer such as imidazole; and the like. In certain cases, the tagged moiety is eluted by lowering the pH. For example, the pH conditions suitable for eluting a sample from a metal ion affinity resin range from about 7 to about 1, from about 6 to about 1, from about 5 to about 1, from about 4 to about 1, from about 3 to 1, from about 7 to about 6, from about 7 to about 5, or from about 7 to about 4.

In accordance with the subject methods, the eluted hydroxamate-tagged moieties are then purified by affinity chromatography under conditions suitable for purifying biotin-containing molecules, e.g., streptavidin. The biotin-containing crosslinked moieties are capable of specifically binding with high affinity to a support e.g., a chromatography support, that contains immobilized avidin, neutravidin or streptavidin. In some cases, a monomeric avidin support may be used to specifically bind biotinylated crosslinked peptides with moderate affinity thereby allowing any remaining peptides that do not contain a biotin moiety (e.g., cross-linked molecules containing only hydroxamate moieties) to be washed away. Accordingly, the bound crosslinked molecules contain a mixture of hydroxamate and biotin tags and can be later eluted competitively (e.g., with a 2 mM biotin solution or using a highly organic elution solution, e.g., 70% acetonitrile) to provide crosslinked peptides no longer adulterated by the linear peptides, or cross-linked peptides containing a single class of affinity tag.

Kits

Aspects of the present disclosure also include kits. The kits may include, e.g., a subject composition (e.g., a mixture of a compound of formula (II) and a compound of formula (III) as described herein), and suitable components for the purification of dual-labeled molecules by serial affinity chromatography selecting for the presence of both tags (e.g., as described herein).

In certain cases, the kit includes a resin for purification by immobilized metal affinity chromatography (IMAC). In some cases, the metal ion may be pre-loaded onto the IMAC resin in the kit (e.g., on a column). In other cases, the metal ion is provided as a separate component to the IMAC resin. In certain cases, the metal ion is a nickel ion. In certain cases, the nickel ion is nickel (II). In certain cases, the metal ion is a ytterbium ion. In certain cases, the ytterbium ion is ytterbium (Ill). It will be understood that any convenient metal ion may find use in the subject kits, provided that the metal ion is capable of binding a compound of formula (I).

In certain cases, the kit includes a chromatography support that contains immobilized avidin, neutravidin or streptavidin.

In some embodiments of the kit, the compound of formula (I) is a compound of formula (II), e.g., as described herein. In some embodiments, the compound of formula (II) has the structure of compound (1), e.g., as defined herein.

In some embodiments of the kit, the compound of formula (I) is a compound of formula (III), e.g., as described herein.

In some embodiments, the compound of formula (III) has the structure of compound (2), e.g., as defined herein.

In certain embodiments of the kits, an exemplary compound of formula (I) has a size ranging from 70 to 400 Da, such as 100 to 300 Da, 100 to 200 Da or 120 to 150 Da. In certain cases, the compound of formula (I) has a size of less than 400 Da, such as less than 350 Da, less than 300 Da, less than 250 Da, less than 200 Da, less than 150 Da, less than 100 Da, or even less.

In some instances, the kit includes containers or packaging for containing each of the compound of formula (I); the IMAC resin; and the metal ion for configured loading onto the resin. In certain embodiments, the packaging may be a sealed packaging, e.g., in a water vapor-resistant container, optionally under an air-tight and/or vacuum seal. In certain instances, the packaging is a sterile packaging, configured to maintain each of the components enclosed in the packaging in a sterile environment. By "sterile" is meant that there are substantially no microbes (such as fungi, bacteria, viruses, spore forms, etc.). The kits may further include a fluid (e.g., a liquid). For instance, the kit may include a liquid, such as a liquid in which the compounds of formula (I) and/or the metal ion are provided. For example, the compound of formula (I) and/or the metal ion may be dispersed in the liquid. The kit may optionally provide additional components that are useful in the subject methods, including, but not limited to, buffers, developing reagents, labels, reacting surfaces, means for detections, control samples, standards, and interpretive information In addition to the above components, the subject kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Another means would be a computer readable medium, e.g., CD, DVD, Blu-Ray, computer-readable memory (e.g., flash memory), etc., on which the information has been recorded or stored. Yet another means that may be present is a website address which may be used via the Internet to access the information at a removed site. Any convenient means may be present in the kits.

Utility

The subject methods find use in purifying crosslinked peptides regardless of how they were made or will be detected. It is therefore applicable by all academic and industry work on crosslinked peptides. Existing pipelines do not need to be adjusted for the invention to be slotted into them and boost their data outputs.

Alternative Embodiments II

Aspects of the present disclosure include thiol alkylating agents, e.g., compounds of formula (I), and an in vivo footprinting technique that can quantitatively monitor solvent accessibility at virtually all of a protein's residues using the subject thiol alkylating agents, enabling sensitive detection of footprinted peptides by mass spectrometry. Aspects of the subject thiol alkylating agents include, a moiety capable of forming an ionic species (e.g., a cation), a hydroxamate affinity tag, and an isotopic agent.

Compounds

Aspects of the invention also include compounds, e.g., thiol alkylating compounds of formula (I).

$$L^1\text{-Y-A} \tag{I}$$

wherein:
Y is a group capable of forming an ionic species in the gas phase in a mass spectrometer;
L¹ is a cysteine reactive group; and
A is an optional affinity tag,
wherein the compound has at least one pair of heavy and light isotopic labels. In some embodiments of formula (I), L¹ is a haloacetyl group or a maleimide.

In some embodiments, the compound of formula (I) is of the formula (IA) or (IB).

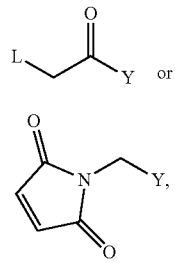

(IA)

(IB)

wherein L is a cysteine reactive group. In certain embodiments, the cysteine reactive group is a halogen, e.g., chloride, iodide, bromide or fluoride. In certain embodiments, the cysteine reactive group is iodide.

In other embodiments, the compound of formula (I) includes an affinity tag. In certain cases, the affinity tag is a hydroxamate moiety. In certain case, the compound of formula (I) is of the formula (IC):

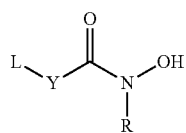

(IC)

wherein:
Y is a group capable of forming an ionic species in the gas phase in a mass spectrometer;
L is a cysteine reactive group; and
R is selected from hydrogen, alkyl or substituted alkyl.

In certain embodiments R is hydrogen. In certain embodiments, R is a lower alkyl group, such as methyl, ethyl, propyl, butyl, pentyl or hexyl. In some cases, R is a substituted alkyl group. In some cases, the substituted alkyl group is substituted by an amine moiety. In certain cases, formula (IC) is of the formula (IC1) or (IC2):

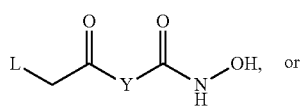

(IC1)

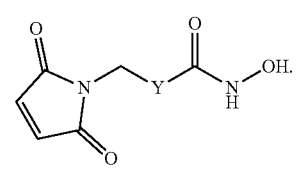

(IC2)

In certain cases, the formula (IC) is of the formula (IC3):

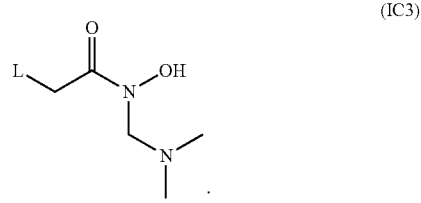

(IC3)

In certain embodiments of any one of formulae (I) to (IC3), the ionic species is a cationic species. In other cases, the ionic species is an anionic species.

In certain embodiments of any one of formulae (I) to (IC3), Y is selected from secondary amine, tertiary amine heterocycle, substituted heterocycle, heteroaryl and substituted heteroaryl. In certain cases, Y a group selected form, piperazine, substituted piperazine, piperidine, substituted piperidine, pyridine, substituted pyridine, pyrrolidine, substituted pyrrolidine, imidazole, substituted imidazole, thiazole, substituted thiazole, thiazoline, substituted thiazoline. In certain cases, Y is a piperazine or a substituted piperazine. In certain cases, Y is a pyridine or a substituted pyridine. In certain cases, Y is a thiazoline or a substituted thiazoline. It will be understood that any secondary amine, tertiary amine, heterocycle or heteraryl moiety capable of forming a cationic species may find use in the present disclosure.

In certain embodiments, the pair of heavy and light isotopic labels includes any of $^2H$, $^1H$; $^{13}C$, $^{12}C$, $^{15}N$, $^{14}N$, $^{18}O$, $^{17}O$, $^{16}O$, $^{33}S$, $^{34}S$, $^{35}S$ and $^{36}S$. In certain cases, the pair of heavy and light isotopic labels includes $^2H$. In certain cases, the pair of heavy and light isotopic labels includes $^{13}C$. In certain cases, In certain cases, the pair of heavy and light isotopic labels includes $^{15}N$. In certain cases, the pair of heavy and light isotopic labels includes $^{18}O$. In certain cases, the pair of heavy and light isotopic labels includes $^{17}O$. In certain cases, the pair of heavy and light isotopic labels includes $^{16}O$. In certain cases, the pair of heavy and light isotopic labels includes $^{33}S$. In certain cases, the pair of heavy and light isotopic labels includes $^{34}S$. In certain cases, the pair of heavy and light isotopic labels includes $^{35}S$. In certain cases, the pair of heavy and light isotopic labels includes $^{36}S$. In certain cases, the pair of heavy and light isotopic labels are $^{13}C$ and $^{12}C$.

In some embodiments of formula (IC1), the compound is of formula (II):

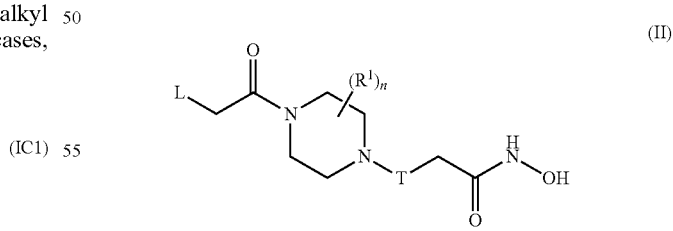

(II)

wherein:
T is an optional linker;
L is a cysteine reactive group;
R¹ is an optional group selected from halogen, deuterium, alkyl, substituted alkyl; and
n is an integer from 0 to 8, wherein the compound includes at least one pair of heavy and light isotopic labels.

In certain embodiments of formula (II), the compound is of the formula (IIA):

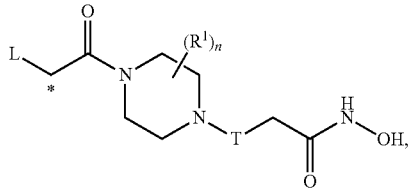
(IIA)

wherein * is a $^{13}$C isotope label.

In certain cases of formula (II) or (IIA), a linking group T is present. In certain cases, T is an alkyl group. In certain cases, T is a branched alkyl group. In certain other cases of formula (II) or (IIA), T is absent, such that there is no additional linking group is present.

In certain cases of formula (II) or (IIA), n is 0, so that R$^1$ is absent. In certain other cases, n is greater than 0, such as 1, 2, 3, 4, 5, 6, 7 or 8. In certain cases n is 1 and R$^1$ is a lower alkyl group. In certain cases, n is greater than 1 and each R$^1$ group is a lower alkyl group. In certain cases, n is 1, 2, 3, 4, 5, 6, 7 or 8 and each R$^1$ is deuterium. In certain cases, n is 1, 2, 3, 4, 5, 6, 7 or 8 and each R$^1$ is selected from a halogen or an alkyl halide.

In certain cases of formula (I), (IC), (IC1), (IC3), (II) or (IIA) the cysteine reactive group L is a halogen. In certain cases, L is iodide.

In some embodiments of the formula (II) or (IIA), the compound has the structure (1):

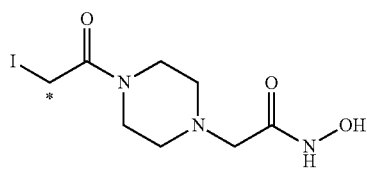
(1)

wherein * is a $^{13}$C isotope label.

In certain embodiments, the compound of formula (I) or (IA) is of the structure (2) to (11):

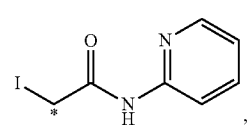
(2)

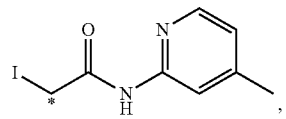
(3)

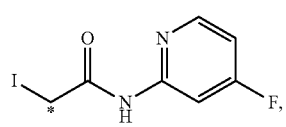
(4)

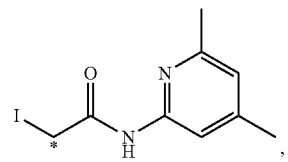
(5)

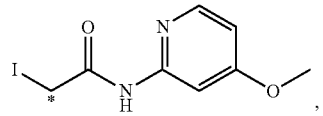
(6)

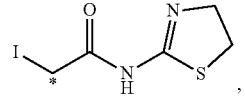
(7)

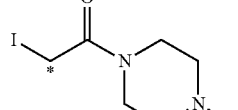
(8)

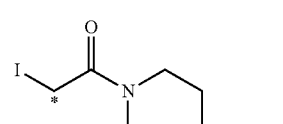
(9)

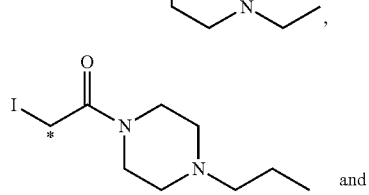
(10)

and

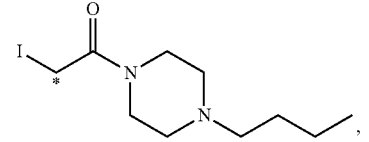
(11)

wherein * is a $^{13}$C isotope label.

The subject compounds are generally small in size, highly soluble in aqueous media, and are readily capable of crossing cell membranes. In certain embodiments of the compound of formula (I), the compound (excluding group L) has a size ranging from 70 Da to 400 Da, such as 70 to 350 Da, 70 to 300 Da, 70 to 250 Da, 70 to 200 Da or 70 to 150 Da. In certain embodiments, the compound has a size of less than 400 Da, such as less than 350 Da, less than 300 Da, less than 250 Da, less than 200 Da, less than 150 Da, or even less. In certain embodiments of formula (I), the compound (excluding group L) has a size ranging from 150 Da to 300 Da.

Methods

As summarized above, the present disclosure provides methods of footprinting a protein.

Disclosed herein is an in vivo footprinting technique that can quantitatively monitor solvent accessibility at virtually all of a protein's residues using a subject thiol alkylating agent (e.g., as described herein), enabling sensitive detection of footprinted peptides by mass spectrometry. Footprinting of proteins involves chemical modification of its amino acids, where the rates of modification report on the solvent accessibility of each of those amino acids, which serves as a proxy for the local conformation. In order to footprint in vivo, one must use a footprinting reagent that irreversibly labels the protein of interest, irreversibly encoding the solvent accessibility information in the labeling state prior to any purification or workup required for analysis. The alkylation of cysteine by an exemplary subject compound is an attractive approach, as thiols are relatively rare in the cell. This can be done on native cysteines, but this would provide solvent accessibility information only at sites that contain a native cysteine.

In order to probe large regions (or potentially all) of a protein of interest, the inventors have developed cysteine probe libraries in microplate format and pool cells expressing the mutants for one-pot, shotgun footprinting. Using commercially-available arrayed oligonucleotides, hundreds of single point mutants can be generated in an expression plasmid in one afternoon, using a modification of Pfunkel mutagenesis. By footprinting a pooled shotgun mutagenesis library, the relatively laborious and expensive process of isolating and sequencing clonally pure members of the library may be avoided. This is because the present methods take advantage of the mass spectrometer's ability to identify peptides whose residues have been mutated to cysteine. Other standard mutagenesis approaches could also find use in the present methods, but Pfunkel's cell-free mutagenesis is well suited to this approach because its main failure mode is production of a wild-type plasmid rather than a mutant plasmid. Unlike some methods of protein analysis where contamination with wild-type protein is deleterious, the present disclosure employs mass spectrometric identification of peptides and is able to exclude wild-type protein from the analysis. Each of the resulting cysteines serves as a probe for the local solvent accessibility at that site within the protein.

To probe solvent accessibility at the cysteine sites in the proteins, cysteine alkylating agents including an isotopic label (e.g., $^{13}C$) that are cheap, compact, cell-permeable, and gas-phase cleavable were used (e.g., compounds described herein). These cysteine alkylating agents enable precise kinetic footprinting analysis and LC-MS quantification of modified cysteine probes in MS2 spectra. Quantification of mass spectrometric signals is most accurate when comparing species that are chemically identical but that differ in the number of heavy or light isotopes. However, we and others have observed that direct quantification of peptides labeled with isotope tags is made difficult by surrounding background ions, particularly if the labels differ in mass by only a single Dalton, as is typical for the small labeling reagents that are most useful for footprinting applications. To combat this barrier to good quantification, labeling reagents that, after cleavage in the gas phase, produce reporter ions in a low-noise region of the mass spectrum, where the fragment ions can be more accurately quantified are desirable. However, the existing gas-phase cleavable reagents designed for proteomics are prohibitively expensive on the scales required for footprinting.

The subject cysteine alkylating agents meet several criteria for the subject footprinting methods. First, they irreversibly alkylate cysteine. Second, they produce detectable fragments in the gas phase. It has been observed that a sulfoxide species can, when activated with low collisional energy in the gas phase of a mass spectrometer, undergo a pericyclic rearrangement that produces a sulfenic acid fragment. Thus, oxidizing any alkylated cysteine to the sulfoxide prior to LC-MS analysis would enable production of similar fragments in the gas phase, producing a reporter ion and leaving behind a dehydroalanine in place of the alkylated cysteine in the peptide chain. For these sulfenic acid reporter fragments to be directly visible in the mass spectrometer, they need to be charged (e.g., have a positive charge). Thus, exemplary cysteine alkylating agents (e.g., a compound of formula (II)) were designed to include a piperazinyl group that would be protonated in the low pH of the mass spectrometer. Lastly, the subject cysteine alkylating agents are easily synthesized in forms with both heavy and light isotopes. In some embodiments, the synthesis of an exemplary cysteine alkylating agent includes the use of chloroacetyl chloride, which is commercially available with a heavy $^{13}C$ label as well as the standard $^{12}C$.

Examples of cationic gas-phase cleavable cysteine alkylating agents with masses allowing them to be distinguished in a mass spectrometer for multiplexed labeling were synthesized. The structures of which are shown below, where * represents a $^{13}C$ label:

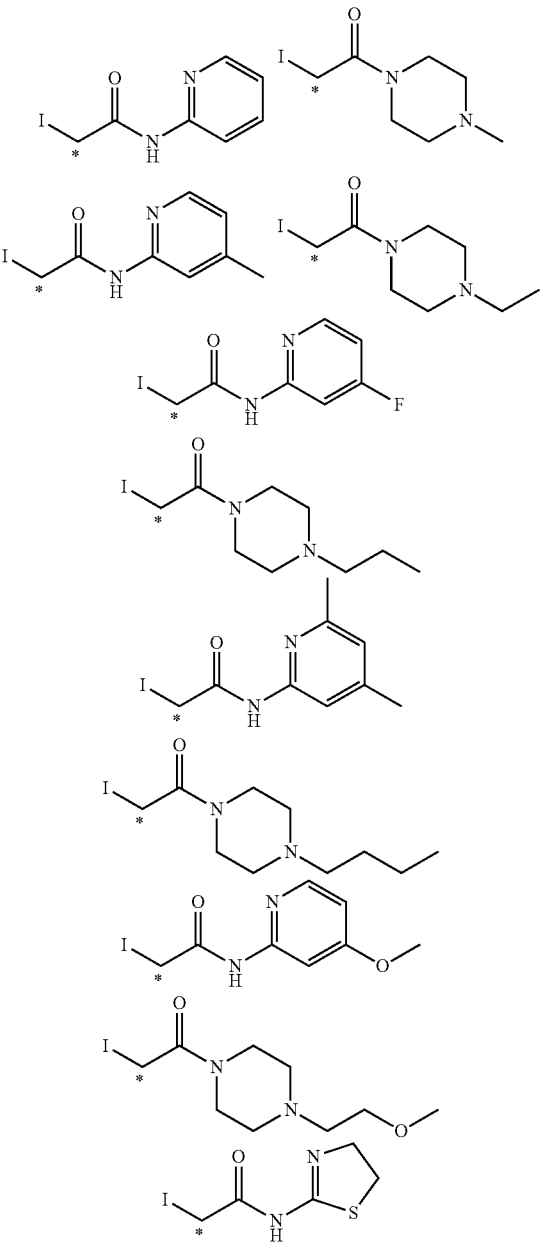

-continued

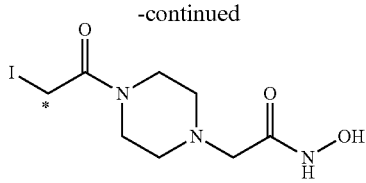

The agents shown above each produce measurable reporter ions in the gas phase when used to alkylate a cysteine-containing test peptide and oxidized to the sulfoxide prior to LC-MS injection. For exemplary compounds, the precision with which they can measure cysteine probe modification on single cysteine protein libraries was established. LC-MS quantification of cysTRAQ reporter ions in MS2 spectra at known heavy:light ratios between 1:99 and 99:1 were highly correlated ($R^2 \geq 0.999$) with expected values and had standard deviations of less than 2.5% heavy for measurements on separate peptides.

Analysis of footprinted proteins by mass spectrometry is complicated by the fact that the informative peptides are significantly outnumbered by uninformative wild-type peptides that saturate the instrument, leading to poor detection and quantification of informative peptides. To overcome this hurdle, the subject methods include enriching the informative peptides, which contain an alkylated cysteine. To this end, cysteine alkylating agents including hydroxamate affinity labels are provided. Accordingly, proteins modified with the hydroxamate-containing cysteine alkylating agents may be purified by immobilized metal affinity chromatography (IMAC), as will be described further below. Notably, this hydroxamate affinity label is compact, adding just 60 Da to the footprinting reagent and keeping the van der Waals radius of the footprinting reagent small. Enrichment of exemplary cysteine alkylated peptides containing a hydroxamate affinity tag was observed after subjecting the sample to IMAC. For example, after a single pass, greater than 80-fold increase in the fractional abundance of labeled peptides was observed, with greater than 50% recovery. The fold-enrichment could be increased to greater than 300 using two IMAC columns in series. Enrichment of labeled peptides from a proteolyzed cysteine mutant library resulted in a 26-fold average improvement in reporter ion signal intensity in MS2 spectra, indicating that we had depleted the 27-fold excess of unlabeled peptides expected from proteolyzing a 271 amino acid protein that is fully labeled at all cysteines. Enrichment provided sensitive detection at up to 88% of the 92 interrogated probe sites. Accordingly, hydroxamate-mediated IMAC enrichment improves both signal-to-background in isotope-ratio data and amino-acid coverage in the target proteins.

Finally, the subject footprinting methods demonstrated herein in live cells can map a dynamic protein-protein interface. The inventors first compared the footprints of a bacterial ribose-binding protein in three different environments: in purified form, in the periplasm of E. coli (its native environment), and in the cytoplasm of E. coli. The labeling rates of cysteine probes were correlated with $R^2 \geq 0.98$ (periplasm vs. in vitro) and $R^2 \geq 0.88$ (cytoplasm vs. in vitro). The rates covered three orders of magnitude, indicating that data could be aquired for both exposed and buried regions of the protein. Importantly, the periplasmic data set pin-pointed the dynamic ligand-binding interface of ribose binding protein. The 15 residues with ribose-dependent changes in solvent exposure were all located in the mouth and hinge regions of the structure previously implicated in ribose binding.

Accordingly, herein there is provided a method of footprinting a protein, the method comprising:
(a) contacting a cysteine containing protein with a compound of formula (I) to produce a cysteine tagged protein:

$$L^1\text{-}Y\text{-}A \qquad (I)$$

wherein:
Y is a group capable of forming an ionic species in the gas phase in a mass spectrometer;
$L^1$ is a cysteine reactive group; and
A is an optional affinity tag,
wherein the compound has at least one pair of heavy and light isotopic labels.
(b) digesting the cysteine tagged protein to one or more cysteine tagged peptides;
(c) oxidizing the cysteine tagged peptides to sulfoxide species;
(d) subjecting the cysteine tagged peptides to mass spectrometry; and
(e) detecting fragments arising from the cysteine tagged peptides.

In the subject methods, the fragments arising from the cysteine tagged peptides comprise dehydroalanine and sulfenic acid fragments, wherein the sufenic acid fragments are produced by pericyclic rearrangement of the sulfoxide species in the gas phase.

Some steps of the subject methods may be readily adapted from U.S. Pat. Nos. 7,288,382, 9,777,266 and 9,388,132 and PCT application WO2018/081858, which are incorporated herein by reference for teaching how to purify proteins.

In certain embodiments of the method, the compound of formula (I) is of the formula (III), (IIIA) or (IC1), e.g., as described herein. In certain cases, the compound of formula (IC1) is of the structure (1).

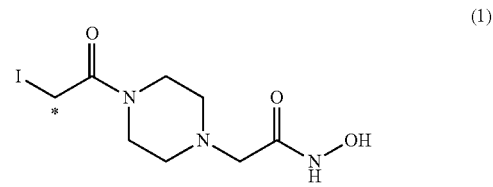 [SMILES: O=C(CN1CCN(C(=O)CI)CC1)NO]

(1)

wherein * is a $^{13}C$ isotope label.

In certain embodiments, when the compound of formula (I) comprises a hydroxamate affinity tag (e.g., a compound of formula (II)), the subject methods further comprise the step of purification of the cysteine tagged peptide fragment by immobilized metal affinity chromatography (IMAC) after step (b).

In accordance with the subject methods, the cysteine tagged moieties are purified by immobilized metal affinity chromatography (IMAC). Immobilized Metal Ion Affinity Chromatography (IMAC) is a technique used for purification of proteins containing affinity sites for metal ions. IMAC is a separation principle that utilizes the differential affinity of proteins for immobilized metal ions to effect their separation. This differential affinity derives from the coordination bonds formed between metal ions and certain amino acid side chains exposed on the surface of the protein molecules. Since the interaction between the immobilized metal ions and the side chains of amino acids has a readily reversible character, it can be utilized for adsorption and then be disrupted using mild (i.e., non-denaturing) conditions. Proper choice of immobilized metal ion, loading conditions and elution conditions can yield up to about 95-98% pure protein in a single chromatographic step. Moreover, recovery generally is higher than 85%.

The principles of IMAC are described in Wong et al Immobilized Metal Ion Affinity Chromatography (IMAC) Chemistry and Bioseparation Applications Separation and Purification Methods 20: 49-106 2006, and Porath et al Immobilized metal ion affinity chromatography. Protein Expr Purif. 1992 August; 3(4):263-81., which are incorporated herein by reference.

Hydroxamates are small chemical moieties that bind tightly to certain metals. Natural hydroxamates have long been used, for example as chelators for iron poisoning. Artificial hydroxamates occur in drugs targeting metalloproteinases. As described herein the subject methods provide the use of hydroxamates for artificial tagging of biological macromolecules, e.g. proteins, polysacharides, lipids, etc.

Hydroxamate affinity tags are incorporated into thiol alkylating agents, e.g., a compound of formula (II). This enabled affinity tagged material to be purified using immobilized metal affinity chromatography (IMAC) resins. These resins were loaded with metal ions, including but not limited to nickel ion Ni(II), ytterbium ion Yb(III) and cobalt ion Co(II), which hydroxamates bind tightly. Hydroxamate-tagged material plus any non-tagged background material is poured onto a metal ion-IMAC resin (e.g., Yb(III)—IMAC resin) at high pH. Non-tagged material is then washed away while the hydroxamate-tagged molecules remain tightly bound to the resin. The pH is then lowered, which releases the hydroxamate-tagged molecules from the resin. One or more additional washing steps may optionally be included to remove undesired components of the sample applied to the resin. Two or more different resins may be used.

In one embodiment, the subject tagged hydroxamate moieties may be loaded on to a commercially available IMAC resin loaded with Yb(III) metal ions. The inventors observed that found that exemplary tagged hydroxamate moieties and Yb(III)—IMAC resins gave excellent purification of the tagged hydroxamate moieties away from the non-tagged material originally contaminating them. For example, in an exemplary example, agarose resin derivatized with nitrilotriacetic acid (NTA) loaded with Yb(III) enables an 86-fold increase in the fractional abundance and >50% recovery of peptides labeled with the hydroxamate compound (1) at a cysteine residue. The fold-enrichment can be increased to >300 using two Yb-IMAC columns in series.

As such, the strength of binding between the subject hydroxamate tagged moiety and the metal ion Yb(III) is very high; thus, isolation of the tagged moieties is very selective. However, association between the tagged moiety and the metal ion ligand is also reversible. Once the hydroxamate tagged moiety has been allowed to associate or adsorb with the metal ion ligand, the tagged moiety can be disassociated or eluted from the metal ion/adsorbent by addition of competitive ligand such as imidazole, or by decreasing the pH. Because of this reversibility, the hydroxamate tagged moiety is recovered in a purified, unbound form. Further, regeneration and reuse of the metal ion/adsorbent or support multiple times—even more than 100 times—is possible.

In another embodiment, the subject tagged hydroxamate moieties may be loaded on to a commercially available IMAC resin loaded with Ni(II) metal ions In yet another embodiment, the subject tagged hydroxamate moieties may be loaded on to a commercially available IMAC resin loaded with Co(II) metal ions Sample Preparation The subject tagged moieties may be prepared by contacting a protein with a subject hydroxamate-containing affinity tags (e.g., a compound of formula (II)). The starting proteins may be subjected to one or more treatments before being applied to a metal ion chelating resin. Such treatments include, but are not limited to, centrifugation, to remove cell debris, etc.; salt precipitation; application to a size exclusion chromatographic column; and application to an ion exchange chromatographic column.

Metal Ion Affinity Resins

Any of a variety of available metal ion chelating resins can be used. In general, a metal ion chelating resin comprises a carrier matrix, optionally a spacer, and a moiety that comprises a metal ion, e.g., an organic ligand that immobilizes a metal ion. Carrier matrices include, but are not limited to, cross-linked dextrans, polystyrenes, nylon, agarose, and polyacrylamides. Metal chelating ligands include, but are not limited to, carboxymethyl aspartate (CM-Asp); iminodiacetic acid (IDA); tris(carboxymethyl)ethylene diamine (TED); nitrilo triacetic acid (NTA). Several of these are commercially available.

The metal ion chelating resin can be provided in the form of a chromatography column, e.g., wherein the resin is packed in a column; or a solid support of any shape or configuration.

Metal ions can be chosen based on their preferential reactivity towards nucleophiles. Metal ions include, $Fe^{3+}$, $Ca^{2+}$, $Al^{3+}$, $Cu^+$, $Hg^{2+}$, $Ag^+$, $Yb^{3+}$, $Cu^{2+}$, $Ni^{2+}$, $Zn^{2+}$, $Co^{2+}$. Hydroxamate bind $Yb^{3+}$ and $Ni^{2+}$ metal ions with high affinity. In certain embodiments of the subject method, the metal ion is $Yb^{3+}$. In certain embodiments of the subject method, the metal ion is $Ni^{2+}$. In certain embodiments of the subject method, the metal ion is $Co^{2+}$.

In some embodiments, a metal ion chelate resin is a $Ni^{2+}$-immobilizing resin. Such resins are described in WO2018081858A1, the contents of which are incorporated herein by reference.

In some embodiments, the subject method provides methods of purifying a subject hydroxamate tagged moiety using multiple metal ion affinity resins, e.g., two or more different metal ion affinity resins. In some cases, the subject method includes two or more Yb(III)-IMAC columns in series.

Conditions for Binding

The conditions under which a sample comprising a subject hydroxamate tagged moiety is applied to a metal ion affinity resin will vary according to various parameters, including the inherent properties of the tagged moiety, the properties of the undesired components of the sample, etc. Generally, the sample is applied to the metal ion affinity resin, and the resin is equilibrated with a solution. "Conditions for binding" include a condition of the sample being applied, as well as any equilibration conditions. Those skilled in the art can readily determine appropriate conditions for binding of a hydroxamate tagged moiety in a sample to a metal ion affinity resin, based on known and determined properties of the tagged moiety, etc. The pH conditions suitable for applying a sample comprising a subject fusion protein to a metal ion affinity resin range from about 9 to about 14, from about 10 to about 14, from about 11 to about 14, from about 12 to about 14, from about 9 to 10, from about 9.0 to about 11, or from about 9 to about 12. Temperature conditions suitable for applying a sample comprising a subject tagged moiety to a metal ion affinity resin range from about 15° C. to about 40° C., from about 20° C. to about 37° C., or from about 22° C. to about 25° C. Various additional substances may be included, including, but not limited to, detergents (e.g., sodium dodecyl sulfate, e.g., from about 0.05% to about 2%); non-ionic detergents, e.g., Tween 20™, and the like; chaotropic agents and denaturants, e.g., urea, and guanidinium HCl; buffers, e.g., Tris-based buffers, borate-based buffers, phosphate-based buffers, imidazole, HEPES, PIPES, MOPS, PIPES, TES, and the like.

Purification Steps

In some embodiments, the subject method provides a method of purifying a hydroxamate tagged moiety from a sample comprising the tagged moiety, comprising contacting a sample comprising the tagged moiety with an immobilized metal ion affinity resin under conditions which favor binding of the hydroxamate tagged moiety to the immobilized metal ion, thereby immobilizing the tagged moiety; and eluting the immobilized tagged moiety.

In the subject methods, the affinity is generally greater than about 50%, such as greater than 80%, greater than 100% (or 2-fold), greater than 4-fold, greater than 5-fold, greater than 7-fold, greater than 10-fold, greater than 20-fold, greater than 50-fold, or greater than 100-fold, or even more.

Washing

One or more washing steps may be included, to remove undesired components. A washing step may be performed after a hydroxamate tagged moiety is immobilized on a resin. The composition and temperature of a washing solution may vary according to the desired result. The optimal composition and temperature of a washing solution can readily be determined by those skilled in the art, based on known properties of the immobilized tagged moiety. Wash solutions may comprise a buffer, and may further comprise additional components, as necessary, including, but not limited to, a detergent.

Eluting

The immobilized hydroxamate tagged moiety can be eluted using a pH gradient; addition of a competitor, e.g., an organic acid, phosphates; addition of a displacer such as imidazole; and the like. In certain cases, the tagged moiety is eluted by lowering the pH. For example, the pH conditions suitable for eluting a sample from a metal ion affinity resin range from about 7 to about 1, from about 6 to about 1, from about 5 to about 1, from about 4 to about 1, from about 3 to 1, from about 7 to about 6, from about 7 to about 5, or from about 7 to about 4.

In some embodiments, the subject methods are in vitro by contacting purified protein with an exemplary compound to produce cysteine-tagged proteins. In some embodiments, the method is done by contacting cells with the compound and incubating the cells to produce cysteine-tagged proteins within the cell. In certain cases, the cells are prokaryotic. In some cases, the cells are mammalian cells.

In some embodiments, the subject method is performed on cells, with or without a treatment with a chemical agent, and the method further comprises comparing a footprint obtained from treatment with the chemical agent to a footprint obtained without treatment with the chemical agent. In certain cases, the footprint obtained from treatment with a chemical agent is compared to a footprint obtained from treatment with a different chemical agent.

In certain embodiments, the method is performed on a library of single cysteine mutants of a protein of interest. In some cases, the library of cysteine mutants is a shotgun library produced by mutagenesis without the requirement of isolating the library members to confirm their sequences.

In some embodiments of the disclosure, the subject methods can be used for drug screening, e.g., to determine the effect of an agent, such as a drug, on cells.

Kits

Aspects of the present disclosure also include kits. Aspects of the present disclosure additionally include kits that include the thiol alkylating compounds as described in detail herein. In some instances, the kit includes a packaging for containing the thiol alkylating compounds. In certain embodiments, the packaging may be a sealed packaging, e.g., in a water vapor-resistant container, optionally under an air-tight and/or vacuum seal. In certain instances, the packaging is a sterile packaging, configured to maintain the thiol alkylating compounds enclosed in the packaging in a sterile environment. By "sterile" is meant that there are substantially no microbes (such as fungi, bacteria, viruses, spore forms, etc.). The kits may further include a fluid (e.g., a liquid). For instance, the kit may include a liquid, such as a liquid in which the thiol alkylating compounds are provided. For example, the compounds may be dispersed in the liquid. Liquids in which the compounds may be dispersed include, but are not limited to, water or a solvent (e.g., a pharmaceutically acceptable organic solvent), and the like.

In certain cases, the kit includes a resin for purification by immobilized metal affinity chromatography (IMAC). In some cases, the metal ion may be pre-loaded onto the IMAC resin in the kit (e.g., on a column). In other cases, the metal ion is provided as a separate component to the IMAC resin. It will be understood that any convenient metal ion may find use in the subject kits, provided that the metal ion is capable of binding a subject compound.

In addition to the above components, the subject kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Another means would be a computer readable medium, e.g., CD, DVD, Blu-Ray, computer-readable memory (e.g., flash memory), etc., on which the information has been recorded or stored. Yet another means that may be present is a website address which may be used via the Internet to access the information at a removed site. Any convenient means may be present in the kits.

Utility

The subject methods find use in many areas of biological study where it is useful to know which regions of a protein are exposed to solvent and how that changes under different environmental stimuli, including addition of a protein or small molecule binding partner. It is particularly valuable for proteins involved in large complexes or membrane proteins that are difficult to purify or otherwise reconstitute in vitro. It can be used to analyze protein receptors and their ligands, or multiple interacting proteins, to identify the interfaces where they interact. This can be used to design mutations to disrupt or alter those interactions. The subject footprinting methods can be used to study proteins involved in signaling, to see how their conformation changes in response to signal. For instance, it could be used to determine whether different drug candidates induce the same conformational changes in a target protein.

The subject footprinting methods can be used in vitro or in cell culture. We have used it for bacterial cells; it is likely to also be useful for cultured cells from other organisms such as yeast, insects, and mammals. The thiol alkylating compounds can be used on mutant cysteines, prepared by our shotgun mutagenesis approach or other mutagenesis strategies, or on native cysteines. The footprinting methods disclosed herein can be paired with the purification of a particular protein of interest, or used to probe cysteine solvent accessibility throughout the proteome. This could provide information about regulatory processes that modify cysteines, for instance with nitric oxide. The quantitative nature of the thiol alkylating agents allows thorough kinetic analysis of the labeling process, enabling study of the equilibria between different conformational states and the kinetics with which proteins move between these states.

Alternative Embodiments III

Aspects of the disclosure include diazirine-containing crosslinking compounds that can be used to analyze protein structures and interactions are provide. Also provided are methods for chemically and translationally incorporating the subject diazirine crosslinking compounds into proteins. Also provided are methods for the mass spectrometry cleavage of the resulting crosslinks.

Compositions

Aspects of the invention also include diazirine containing crosslinker compounds, e.g., of any one of formulae (I)—(II), or any one of compounds (1)-(6).

In one embodiment, there is provided a diazirine containing crosslinker compound of formula (I):

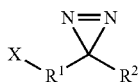

(I)

wherein:
X is a thiol reactive leaving group selected from halogen or a sulfonate;
$R^1$ is an inert linker; and
$R^2$ is selected from hydrogen, alkyl and substituted alkyl.

In certain cases of formula (I) $R^1$ is a lower alkyl group, such as methyl, ethyl, propyl, butyl, pentyl or hexyl. In certain cases, $R^1$ is methyl. In certain cases, $R^1$ is ethyl. In certain cases, $R^1$ is propyl. In certain cases, $R^1$ is butyl. In certain cases, $R^1$ is pentyl. In certain cases, $R^1$ is hexyl. In certain cases, $R^1$ is a substituted alkyl (e.g., as defined herein). In certain cases, $R^1$ is selected an alkyl halide. In some cases, $R^1$ is an alkyl group comprising $CF_2$. In certain cases, $R^1$ is selected from $—CF_2—$, $—CH_2CF_2—$, $—CH_2CH_2CF_2—$, $—CH_2CH_2CH_2CF_2—$, $—CH_2CH_2CH_2CH_2CF_2—$ and $—CH_2CH_2CH_2CH_2CH_2CF_2—$.

In some embodiments, the compound of formula (I) is selected from the formula (IA), (IB), (IC) and (ID):

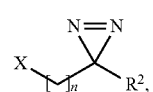

(IA)

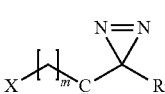

(IB)

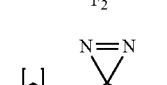

(IC)

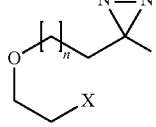

(ID)

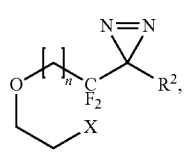

wherein:
n is an integer from 1 to 5; and
m is an integer from 0 to 4.

In certain cases of formula (IA), n is 1. In certain cases of formula (IA), n is 2. In certain cases of formula (IA), n is 3. In certain cases of formula (IA), n is 4. In certain other cases of formula (IA), n is 5.

In certain cases of formula (IB), m is 0. In certain cases of formula (IB), m is 1. In certain cases of formula (IB), m is 2. In certain cases of formula (IB), m is 3. In certain other cases of formula (IB), m is 4.

In certain cases of formula (IC), n is 1. In certain cases of formula (IC), n is 2. In certain cases of formula (IC), n is 3. In certain cases of formula (IC), n is 4. In certain other cases of formula (IC), n is 5.

In certain cases of formula (ID), n is 1. In certain cases of formula (ID), n is 2. In certain cases of formula (ID), n is 3. In certain cases of formula (ID), n is 4. In certain other cases of formula (ID), n is 5.

In certain cases of any one of formulae (1) to (ID), $R^2$ is hydrogen. In certain cases of any one of formulae (1) to (ID), $R^2$ is a lower alkyl group, such as methyl, ethyl, propyl, butyl, pentyl or hexyl. In certain cases, $R^2$ is methyl. In certain cases, $R^2$ is ethyl. In certain cases, $R^2$ is propyl. In certain cases, $R^2$ is butyl. In certain cases, $R^2$ is pentyl. In certain cases, $R^2$ is hexyl. In certain cases, $R^2$ is a substituted alkyl (e.g., as defined herein). In certain cases, $R^2$ is selected an alkyl halide. In some cases, $R^2$ is an alkyl group comprising $CF_2$. In certain cases, $R^2$ is selected from $—CF_2—$, $—CH_2CF_2—$, $—CH_2CH_2CF_2—$, $—CH_2CH_2CH_2CF_2—$, $—CH_2CH_2CH_2CH_2CF_2—$ and $CH_2CH_2CH_2CH_2CH_2CF_2—$.

In certain embodiments of any one of formulae (1) to (ID), the structure, excluding group X, has a molecular weight from 50 Da to 170 Da, such as 50 to 70 Da, 50 to 80 Da, 50 to 90 Da, 50 to 100 Da, 50 to 110 Da, 50 to 120 Da, 50 to 130 Da, 50 to 140 Da, 50 to 150 Da or 50 to 160 Da. In certain embodiments of any one of formulae (I) to (ID), the structure, excluding group X, has a molecular weight of less than 200 Da, such as less than 180 Da, less than 170 Da, less than 160 Da, less than 150 Da, less than 140 Da, less than 130 Da, less than 120 Da, less than 110 Da, less than 100 Da, less than 90 Da, less than 80 Da, less than 70 Da, less than 60 Da, or even less. In certain embodiments, the molecular weight, excluding group X, is from 54 Da to 162 Da.

In certain embodiments of any one of formulae (1) to (ID), the thiol reactive leaving group, X, is a mesylate group. In certain other embodiments, group X is a halogen. In certain cases, group X is a chloride.

In certain embodiments, any one of the formulae (1) to (ID) has a structure selected from:

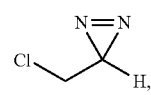

(1)

-continued

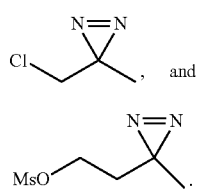
(2)

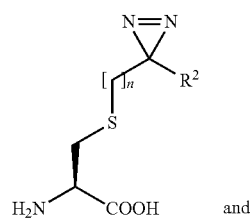
(IIA)

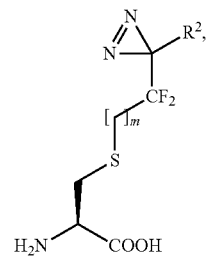
(IIB)

In certain embodiments, the structure of any one of formulae (I) to (ID) or a compound of any one of the structures (1) to (3) may be contacted with a cysteine residue to alkylate the cysteine residue. The cysteine residue may be a free cysteine residue, or a cysteine residue existing as part of a protein or peptide.

In one embodiment, there is provided a diazirine containing crosslinker compound that is an amino acid analogue of formula (II):

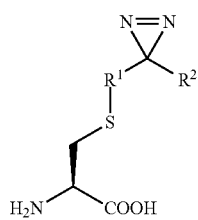
(II)

wherein:

$R^1$ is an inert linker; and $R^2$ is selected from hydrogen, alkyl and substituted alkyl.

In certain cases of formula (II) $R^1$ is a lower alkyl group, such as methyl, ethyl, propyl, butyl, pentyl or hexyl. In certain cases, $R^1$ is methyl. In certain cases, $R^1$ is ethyl. In certain cases, $R^1$ is propyl. In certain cases, $R^1$ is butyl. In certain cases, $R^1$ is pentyl. In certain cases, $R^1$ is hexyl. In certain cases, $R^1$ is a substituted alkyl (e.g., as defined herein). In certain cases, $R^1$ is selected an alkyl halide. In some cases, $R^1$ is an alkyl group comprising $CF_2$. In certain cases, $R^1$ is selected from —$CF_2$—, —$CH_2CF_2$—, —$CH_2CH_2CF_2$—, —$CH_2CH_2CH_2CF_2$—, —$CH_2CH_2CH_2CH_2CF_2$— and —$CH_2CH_2CH_2CH_2CH_2CF_2$—.

In certain cases of formula (II), $R^2$ is hydrogen. In certain cases of formula (II), $R^2$ is a lower alkyl group, such as methyl, ethyl, propyl, butyl, pentyl or hexyl. In certain cases, $R^2$ is methyl. In certain cases, $R^2$ is ethyl. In certain cases, $R^2$ is propyl. In certain cases, $R^2$ is butyl. In certain cases, $R^2$ is pentyl. In certain cases, $R^2$ is hexyl. In certain cases, $R^2$ is a substituted alkyl (e.g., as defined herein). In certain cases, $R^2$ is selected an alkyl halide. In some cases, $R^2$ is an alkyl group comprising $CF_2$. In certain cases, $R^2$ is selected from —$CF_2$—, —$CH_2CF_2$—, —$CH_2CH_2CF_2$—, —$CH_2CH_2CH_2CF_2$—, —$CH_2CH_2CH_2CH_2CF_2$— and $CH_2CH_2CH_2CH_2CH_2CF_2$—.

In some embodiments, the amino acid analogue of formula (II) is selected from the formula (IA) and (IB):

wherein:

$R^2$ are each independently selected from H, CHs or $CF_3$;

n is an integer from 1 to 5; and m is an integer from 0 to 4.

In certain cases of formula (IA), n is 1. In certain cases of formula (IA), n is 2. In certain cases of formula (IA), n is 3. In certain cases of formula (IA), n is 4. In certain other cases of formula (IA), n is 5.

In certain cases of formula (IB), m is 0. In certain cases of formula (IB), m is 1. In certain cases of formula (IB), m is 2. In certain cases of formula (IB), m is 3. In certain other cases of formula (IB), m is 4.

In certain cases of formulae (IA) or (IB), $R^2$ is H. In certain cases of formula (IA) or (IB), $R^2$ is methyl. In certain cases of formula (IA) or (IB), $R^2$ is $CF_3$.

In certain embodiments of any one of formulae (II) to (IIB), the structure has a molecular weight from 170 Da to 300 Da, such as 170 to 190 Da, 170 to 210 Da, 170 to 230 Da, 170 to 250 Da, 170 to 270 Da or 170 to 290 Da. In certain embodiments of any one of formulae (II) to (IIB), the structure has a molecular weight of less than 300 Da, such as less than 290 Da, less than 280 Da, less than 270 Da, less than 260 Da, less than 250 Da, less than 240 Da, less than 230 Da, less than 220 Da, less than 210 Da, less than 200 Da, less than 190 Da, less than 180 Da, or even less. In certain embodiments, the molecular weight of any one of formulae (II) to (11B), is from 174 Da to 286 Da.

In certain embodiments, any one of formulae (II) to (IIB) has a structure selected from any one of compounds (4) to (6):

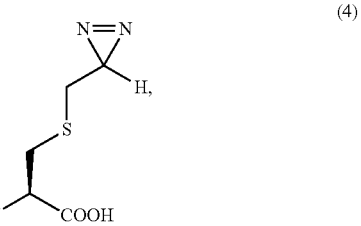
(4)

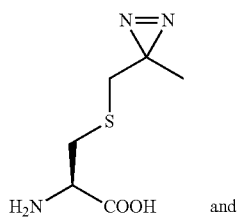 (5)

and

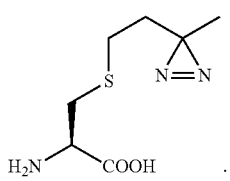 (6)

In certain embodiments, the amino acid analogue of any one of formulae (II) to (IIB) or an amino acid analogue of any one of the structures (4) to (6) may be incorporated into a protein. The method includes, combining a cell or an in vitro translation mix with the subject amino acid analogue; and incubating the cell or in vitro translation mix so that the amino acid analog is incorporated into the protein during translation. In certain embodiments, the cell or in vitro translation mix contains an exogenous engineered synthetase.

In some embodiments, the amino acid analog may be incorporated into protein by amber codon suppression technology (see, e.g., Wals et al Front Chem. 2014; 2: 15, and others).

Methods

As summarized above, provided herein are methods for chemically and translationally incorporating the subject diazirine crosslinking compounds into proteins. Also provided are methods for the mass spectrometry cleavage of the resulting crosslinks. The subject methods find use in gaining information about a particular protein's fold or interactions.

Accordingly, in one embodiment, there is provided a method of gaining data about a protein's fold or interactions, the method comprising:

(a) incorporating a diazirine containing crosslinker compound of formula (I) or formula (II) in a protein to form a thioether moiety of formula (III):

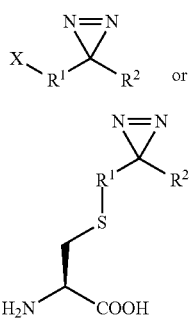

(I)

or (II)

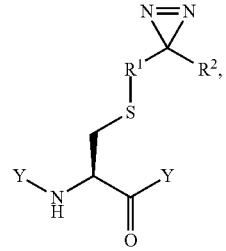 (III)

wherein:
X is a thiol reactive leaving group selected from halogen or a sulfonate;
$R^1$ is an inert linker;
$R^2$ is selected from hydrogen, alkyl and substituted alkyl; and
Y each represent a plurality of amino acid residues in the protein either side of the incorporated crosslinker compound;

(b) activating the crosslinker compound of formula (III) with light, such that the diazirine ring undergoes photolysis and inserts into a moiety selected from an adjacent Y residue, an adjacent second protein and an adjacent non-protein molecule, to form one or more crosslinks between the protein and either itself or the adjacent second protein or the adjacent non-protein molecule;

(c) digestion of the crosslinked proteins to crosslinked peptides, wherein the peptides are crosslinked to other peptides or to non-peptide molecules;

(d) oxidation of the thioether moiety in the crosslinked peptides to a sulfoxide species;

(e) subjecting the crosslinked peptides to mass spectrometry;

(f) detecting fragments arising from the crosslinked peptides; and (g) analyzing the detected fragments to gain information about the protein's structure or interactions.

In certain embodiments of the subject methods, the crosslinked peptides containing the sulfoxide species is of the formula (IV), and upon subjecting to mass spectrometry undergoes cleavage in the mass spectrometer's gas phase to form fragments (IVA) and (IVB):

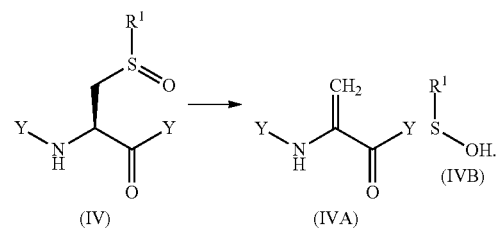

In certain embodiments, the compound of formula (IV) is CID-cleavable, e.g., fragments during low-energy collisional induced dissociation (CID) analysis. The fragments of formulae (IVA) and (IVB) and easily detected by mass spectrometry, providing for fast and reliable analysis.

As a general note, some steps of the subject methods may be readily adapted according to procedures disclosed in U.S. Pat. Nos. 9,222,943 and 7,167,819, the disclosure of which are incorporated herein by reference.

In certain embodiments of the methods, the crosslinking is done in a living cell.

In certain embodiments of the methods, the oxidation step (d) results in the inclusion of a heavy isotope of oxygen into the sulfoxides formed by the oxidation.

Purification of the Crosslinked Peptides

In certain embodiments, the subject methods further comprise a step of purification of the crosslinked peptides.

To this end, the cross-linked peptides may be reacted with a composition comprising a 50:50 mixture of an exemplary hydroxamate-containing affinity tag (e.g., compound 7) and a biotin-containing affinity tag (e.g., compound 8)

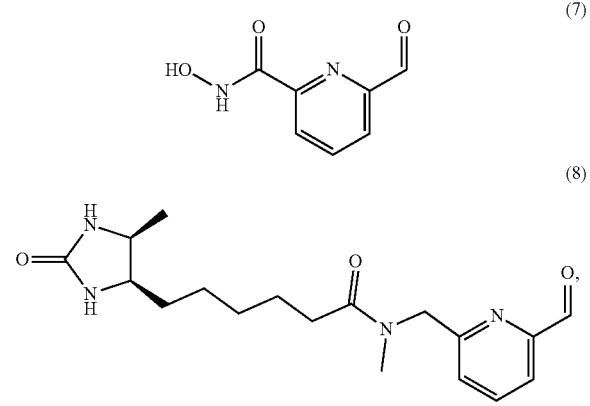

to produce a tagged composition (e.g., as to produce a tagged composition containing a mixture of hydroxamate affinity tagged peptides and biotin affinity tagged peptides); and purifying any peptides in the tagged composition that are tagged by a hydroxamate moiety and a desthiobiotin moiety, thereby isolating cross-linked proteins from the sample.

There is no variation in how many N-termini single peptides have. They all have a single one. Crosslinked peptides, however, have two. In the subject methods, this property is therefore exploited for separating linear and crosslinked peptides.

The subject compositions containing a mixture of a hydroxamate containing affinity tag and a biotin containing affinity tag can selectively label peptide N-termini through 2PCA chemistry. Hydroxamate containing moieties can be purified by immobilized metal affinity chromatography. Whereas, biotin containing moieties can be purified by streptavidin. When a protein digest is labeled with a 50:50 mixture of the subject hydroxamate containing affinity tags (e.g., compound 7) and biotin containing affinity tags (e.g., compound 8), only crosslinked peptides can have both tags coexisting in a single molecule. Linear peptides will have one N-tag or the other, but not both. Dual-labeled molecules are then purified by serial affinity chromatography selecting for the presence of both tags. First, immobilized metal affinity chromatography is used to discard all peptides that don't have a hydroxamate tag. Then, streptavidin resin is used to discard all peptides that don't have a biotin tag. This leaves crosslinked peptides no longer adulterated by the linear peptides. The purification method can be fully automated on standard FPLC equipment. After purification, the hydroxamate tag and the biotin tag can be removed to yield pure crosslinked peptides for further analysis, e.g., by mass spectrometry. The subject implementation exceeds 100-fold enrichment while being agnostic to the crosslinker and protease used.

In accordance with the subject methods, the tagged cross-linked moiety is first purified by immobilized metal affinity chromatography (IMAC) to discard all molecules that don't have a hydroxamate tag. Immobilized Metal Ion Affinity Chromatography (IMAC) is a technique used for purification of proteins containing affinity sites for metal ions. IMAC is a separation principle that utilizes the differential affinity of proteins for immobilized metal ions to effect their separation. This differential affinity derives from the coordination bonds formed between metal ions and certain amino acid side chains exposed on the surface of the protein molecules. Since the interaction between the immobilized metal ions and the side chains of amino acids has a readily reversible character, it can be utilized for adsorption and then be disrupted using mild (i.e., non-denaturing) conditions. Proper choice of immobilized metal ion, loading conditions and elution conditions can yield up to about 95-98% pure protein in a single chromatographic step. Moreover, recovery generally is higher than 85%.

The principles of IMAC are described in Wong et al Immobilized Metal Ion Affinity Chromatography (IMAC) Chemistry and Bioseparation Applications Separation and Purification Methods 20: 49-106 2006, and Porath et al Immobilized metal ion affinity chromatography. Protein Expr Purif. 1992 August; 3(4):263-81., which are incorporated herein by reference.

Hydroxamates are small chemical moieties that bind tightly to certain metals. This enabled affinity tagged material to be purified using immobilized metal affinity chromatography (IMAC) resins. These resins were loaded with metal ions, including but not limited to nickel ion Ni(II) and ytterbium ion Yb(III), which hydroxamates bind tightly. Hydroxamate-tagged material plus any non-tagged background material is poured onto a metal ion-IMAC resin (e.g., Yb(III)—IMAC resin) at high pH. Non-tagged material is then washed away while the hydroxamate-tagged molecules remain tightly bound to the resin. The pH is then lowered which releases the hydroxamate-tagged molecules from the resin. One or more additional washing steps may optionally be included to remove undesired components of the sample applied to the resin. Two or more different resins may be used.

In one embodiment, the subject tagged hydroxamate moieties may be loaded on to a commercially available IMAC resin loaded with Yb(III) metal ions. The inventors observed that found that exemplary tagged hydroxamate moieties and Yb(III)—IMAC resins gave excellent purification of the tagged hydroxamate moieties away from the non-tagged material originally contaminating them. For example, in an exemplary example, agarose resin derivatized with nitrilotriacetic acid (NTA) loaded with Yb(III) enables an 86-fold increase in the fractional abundance and >50% recovery of peptides labeled with the hydroxamate compound (2) at a cysteine residue. The fold-enrichment can be increased to >300 using two Yb-IMAC columns in series.

As such, the strength of binding between the subject hydroxamate tagged moiety and the metal ion Yb(III) is very high; thus, isolation of the tagged moieties is very selective. However, association between the tagged moiety and the metal ion ligand is also reversible. Once the hydroxamate tagged moiety has been allowed to associate or adsorb with the metal ion ligand, the tagged moiety can be disassociated or eluted from the metal ion/adsorbent by addition of competitive ligand such as imidazole, or by decreasing the pH. Because of this reversibility, the hydroxamate tagged moiety is recovered in a purified, unbound form. Further, regeneration and reuse of the metal ion/adsorbent or support multiple times—even more than 100 times—is possible.

Sample Preparation

The subject tagged moieties may be prepared by contacting a cross-linked sample with a subject composition (e.g., comprising a mixture of a hydroxamate-containing affinity tag and a biotin-containing affinity tag). In certain embodiments, the subject affinity tags are selective for the N-termini of the cross-linked sample. The starting crosslinked sample may be subjected to one or more treatments before being applied to a metal ion chelating resin. Such treatments include, but are not limited to, centrifugation, to remove cell debris, etc.; salt precipitation; application to a size exclusion chromatographic column; and application to an ion exchange chromatographic column.

Metal Ion Affinity Resins

Any of a variety of available metal ion chelating resins can be used. In general, a metal ion chelating resin comprises a carrier matrix, optionally a spacer, and a moiety that comprises a metal ion, e.g., an organic ligand that immobilizes a metal ion. Carrier matrices include, but are not limited to, cross-linked dextrans, polystyrenes, nylon, agarose, and polyacrylamides. Metal chelating ligands include, but are not limited to, carboxymethyl aspartate (CM-Asp); iminodiacetic acid (IDA); tris(carboxymethyl)ethylene diamine (TED); nitrilo triacetic acid (NTA). Several of these are commercially available.

The metal ion chelating resin can be provided in the form of a chromatography column, e.g., wherein the resin is packed in a column; or a solid support of any shape or configuration.

Metal ions can be chosen based on their preferential reactivity towards nucleophiles. Metal ions include, $Fe^{3+}$, $Ca^{2+}$, $Al^{3+}$, $Cu^+$, $Hg^{2+}$, $Ag^+$, $Yb^{3+}$, $Cu^{2+}$, $Ni^{2+}$, $Zn^{2+}$, $Co^{2+}$. Hydroxamate bind $Yb^{3+}$ and $Ni^{2+}$ metal ions with high affinity. In certain embodiments of the subject method, the metal ion is $Yb^{3+}$.

In some embodiments, a metal ion chelate resin is a $Ni^{2+}$-immobilizing resin. Such resins are described in WO2018081858A1, the contents of which are incorporated herein by reference.

In some embodiments, the subject method provides methods of purifying a subject hydroxamate tagged moiety using multiple metal ion affinity resins, e.g., two or more different metal ion affinity resins. In some cases, the subject method includes two or more Yb(III)-IMAC columns in series.

Conditions for Binding

The conditions under which a sample comprising a subject hydroxamate tagged moiety is applied to a metal ion affinity resin will vary according to various parameters, including the inherent properties of the tagged moiety, the properties of the undesired components of the sample, etc. Generally, the sample is applied to the metal ion affinity resin, and the resin is equilibrated with a solution. "Conditions for binding" include a condition of the sample being applied, as well as any equilibration conditions. Those skilled in the art can readily determine appropriate conditions for binding of a hydroxamate tagged moiety in a sample to a metal ion affinity resin, based on known and determined properties of the tagged moiety, etc. The pH conditions suitable for applying a sample comprising a subject fusion protein to a metal ion affinity resin range from about 9 to about 14, from about 10 to about 14, from about 11 to about 14, from about 12 to about 14, from about 9 to 10, from about 9.0 to about 11, or from about 9 to about 12.

Temperature conditions suitable for applying a sample comprising a subject tagged moiety to a metal ion affinity resin range from about 15° C. to about 40° C., from about 20° C. to about 37° C., or from about 22° C. to about 25° C. Various additional substances may be included, including, but not limited to, detergents (e.g., sodium dodecyl sulfate, e.g., from about 0.05% to about 2%); non-ionic detergents, e.g., Tween 20™, and the like; chaotropic agents and denaturants, e.g., urea, and guanidinium HCl; buffers, e.g., Tris-based buffers, borate-based buffers, phosphate-based buffers, imidazole, HEPES, PIPES, MOPS, PIPES, TES, and the like.

Purification Steps

In some embodiments, the subject method provides a method of purifying a hydroxamate tagged sample from a sample comprising a mixture of linear and crosslinked peptides that don't comprise a hydroxamate tag, comprising contacting a sample comprising the mixture with an immobilized metal ion affinity resin under conditions which favor binding of the hydroxamate tagged moieties to the immobilized metal ion, thereby immobilizing the tagged moiety; and eluting the immobilized tagged moiety.

In the subject methods, the affinity is generally greater than about 50%, such as greater than 80%, greater than 100% (or 2-fold), greater than 4-fold, greater than 5-fold, greater than 7-fold, greater than 10-fold, greater than 20-fold, greater than 50-fold, or greater than 100-fold, or even more.

Washing

One or more washing steps may be included, to remove undesired components. A washing step may be performed after a hydroxamate tagged moiety is immobilized on a resin. The composition and temperature of a washing solution may vary according to the desired result. The optimal composition and temperature of a washing solution can readily be determined by those skilled in the art, based on known properties of the immobilized tagged moiety. Wash solutions may comprise a buffer, and may further comprise additional components, as necessary, including, but not limited to, a detergent.

Eluting

The immobilized hydroxamate tagged moieties can be eluted using a pH gradient; addition of a competitor, e.g., an organic acid, phosphates; addition of a displacer such as imidazole, and the like. In certain cases, the tagged moiety is eluted by lowering the pH. For example, the pH conditions suitable for eluting a sample from a metal ion affinity resin range from about 7 to about 1, from about 6 to about 1, from about 5 to about 1, from about 4 to about 1, from about 3 to 1, from about 7 to about 6, from about 7 to about 5, or from about 7 to about 4.

In accordance with the subject methods, the eluted hydroxamate-tagged moieties are then purified by affinity chromatography under conditions suitable for purifying biotin-containing molecules, e.g., streptavidin. The biotin-containing crosslinked moieties are capable of specifically binding with high affinity to a support e.g., a chromatography support, that contains immobilized avidin, neutravidin or streptavidin. In some cases, a monomeric avidin support may be used to specifically bind biotinylated crosslinked peptides with moderate affinity thereby allowing any remaining peptides that do not contain a biotin moiety (e.g., cross-linked molecules containing only hydroxamate moieties) to be washed away. Accordingly, the bound cross-linked molecules contain a mixture of hydroxamate and biotin tags and can be later eluted competitively (e.g., with a 2 mM biotin solution or using a highly organic elution solution, e.g., 70% acetonitrile) to provide crosslinked peptides no longer adulterated by the linear peptides, or crosslinked peptides containing a single class of affinity tag.

Kits

Aspects of the present disclosure also include kits. Aspects of the present disclosure additionally include kits that include the diazirine containing crosslinker compounds as described in detail herein. In some instances, the kit includes a packaging for containing the diazirine containing crosslinker compounds. In certain embodiments, the packaging may be a sealed packaging, e.g., in a water vapor-resistant container, optionally under an air-tight and/or vacuum seal. In certain instances, the packaging is a sterile packaging, configured to maintain the crosslinker compounds enclosed in the packaging in a sterile environment. By "sterile" is meant that there are substantially no microbes (such as fungi, bacteria, viruses, spore forms, etc.). The kits may further include a fluid (e.g., a liquid). For instance, the kit may include a liquid, such as a liquid in which the crosslinker compounds are provided. For example, the crosslinkers may be dispersed in the liquid. Liquids in which the compounds may be dispersed include, but are not limited to, water or a solvent (e.g., a pharmaceutically acceptable organic solvent), and the like.

The kit may also include reagents for achieving the oxidation of the crosslinked peptides (e.g., as described herein), and suitable components for the purification of the crosslinked peptides (e.g., as described herein). In certain cases, the kit includes a resin for purification by immobilized metal affinity chromatography (IMAC). In some cases, the metal ion may be pre-loaded onto the IMAC resin in the kit (e.g., on a column). In other cases, the metal ion is provided as a separate component to the IMAC resin. It will be understood that any convenient metal ion may find use in the subject kits, provided that the metal ion is capable of binding a compound of formula (I). In certain cases, the kit also includes a chromatography support that contains immobilized avidin, neutravidin or streptavidin.

In addition to the above components, the subject kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Another means would be a computer readable medium, e.g., CD, DVD, Blu-Ray, computer-readable memory (e.g., flash memory), etc., on which the information has been recorded or stored. Yet another means that may be present is a website address which may be used via the Internet to access the information at a removed site. Any convenient means may be present in the kits.

Utility

The subject methods find use in identifying interactions of proteins with each other, with other macromolecules and with small molecules. The subject methods also find use in determining structures of proteins and their interaction interfaces. These are two major areas in both academia and industry where researchers would have use for kits containing the crosslinker with reagents for priming its cleavage. Previously, photomethionine has been used for similar applications. The competitive advantage of the present disclosure over photomethionine comes from the ability to detect the subject crosslinkers by mass spectrometry, whereas photomethionine crosslinks are very difficult to detect by mass spectrometry. The mass spectrometry cleavage of the subject crosslinkers (e.g., as described herein) provide easy and fast detection of the associated fragments, and thus information about the protein folding and interactions.

The subject crosslinkers find particular use in the pharma industry, to detect and define contacts between proteins and small molecules of interest. Mass spectrometry cleavage of a crosslink between a peptide and a small molecule gives predictable behavior by mass spectrometry and allows for automatic determination of the residues crosslinked to the small molecule.

Embodiments

The following embodiments are supported by the specification above, the data shown in FIGS. 1-7 and Examples 1-5 below.

Embodiment 1. A method of purifying a biological macromolecule, the method comprising:

(a) contacting the biological macromolecule with a compound of formula (I):

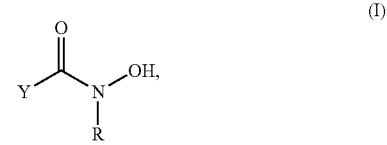

wherein:

Y is a selective reactive group configured to react with the biological macromolecule chemically or chemo-enzymatically to produce a tagged moiety;

R is selected from hydrogen, alkyl or substituted alkyl; and (b) purifying the tagged moiety by immobilized metal affinity chromatography (IMAC).

Embodiment 2. The method of embodiment 1, wherein R is hydrogen.

Embodiment 3. The method of embodiment 1 or 2, wherein the IMAC resin is loaded with an ytterbium (Ill) ion (Yb(III)).

Embodiment 4. The method of embodiment 1 or 2, wherein the IMAC resin is loaded with a nickel (II) ion (Ni(II)).

Embodiment 5. The method of embodiment 1 or 2, wherein the IMAC resin is loaded with a cobalt (II) ion (Co(II)).

Embodiment 6. The method of any one of embodiments 1 to 5, wherein Y is selected from a protein reactive group, a peptide reactive group, a polysaccharide reactive group and a lipid reactive group (e.g., amino-reactive, thiol-reactive, hydroxyl-reactive, imidazolyl-reactive or guanidinyl-reactive).

Embodiment 7. The method of any one of embodiments 1 to 5, wherein Y is an amino acid capable of being translationally inserted into proteins using natural or engineered tRNA synthetases.

Embodiment 8. The method of any one of embodiments 1 to 7, wherein Y comprises a group selected from aldehyde or alkyl halide, mesylate, maleimide, thiosulfate and pyridyl disulfide.

Embodiment 9. The method of any one of embodiments 1 to 8, wherein the compound is of the formula (II):

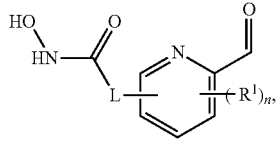 (II)

wherein:
L is an optional linker
R¹ is an optional group selected from halogen, deuterium, alkyl and substituted alkyl; and
n is an integer from 0 to 3.

Embodiment 10. The method of embodiment 9, having the structure (1) or (3):

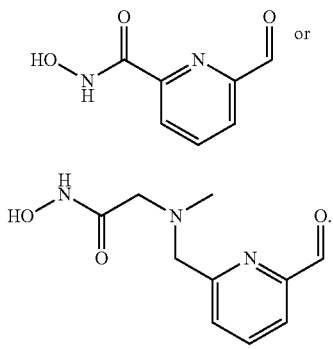

(1)

or (3)

Embodiment 11. The method of any one of embodiments 1 to 8, wherein the compound is of the formula (IIA):

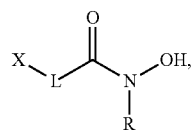 (IIA)

wherein:
L is an optional linker
R is selected from hydrogen, alkyl or substituted alkyl; and
X is selected from an alkyl halide, haloacetyl, maleimide, thiosulfate or pyridyl disulfide.

Embodiment 12. The method of embodiment 11, wherein the compound of formula (IIA) is of the formula (IIA1) to (IIA6):

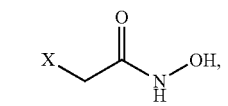 (IIA1)

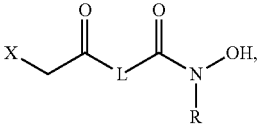 (IIA2)

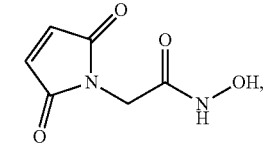 (IIA3)

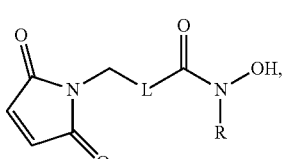 (IIA4)

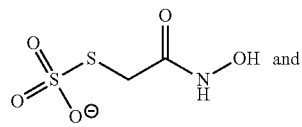 (IIA5)

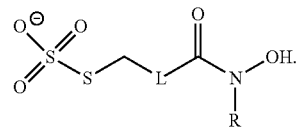 (IIA6)

Embodiment 13. The method of any one of embodiments 1 to 8, wherein the compound is of the formula (III):

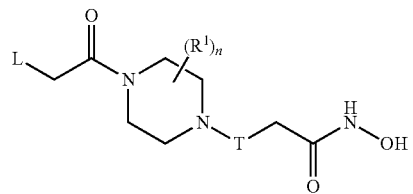 (III)

wherein:
T is an optional linker/tether;
L is a leaving group;
R¹ is an optional group selected from halogen, deuterium, alkyl and substituted alkyl; and
n is an integer from 0 to 8.

Embodiment 14. The method of embodiment 13, having the structure (2):

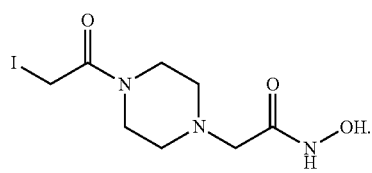 (2)

Embodiment 15. The method of any one of embodiments 1 to 19, wherein the compound of formula (I) has a size ranging from 60 Da to 230 Da.

Embodiment 16. The method of embodiment 20, wherein the compound of formula (1) has a size ranging from 60 Da to 170 Da.

Embodiment 17. A kit comprising:

a compound of formula (I)

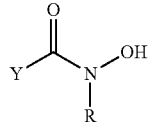
(I)

wherein:

Y is a selective reactive group configured to react with a biological macromolecule chemically or chemo-enzymatically;

R is selected from hydrogen, alkyl and substituted alkyl; and an immobilized metal affinity chromatography (IMAC) resin; and a metal ion configured for loading onto the resin, wherein the metal ion is capable of binding a compound of formula (I).

Embodiment 18. The kit of embodiment 17, wherein Y is selected from a protein reactive group, a peptide reactive group, a polysaccharide reactive group and a lipid reactive group (e.g., amino-reactive, thiol-reactive, hydroxyl-reactive, imidazolyl-reactive or guanidinyl-reactive).

Embodiment 19. The kid of embodiment 17, wherein Y is an amino acid capable of being translationally inserted into proteins using natural or engineered tRNA synthetases.

Embodiment 20. The kit of embodiment 17 or 18, wherein Y comprises a group selected from aldehyde or alkyl halide, mesylate, maleimide, thiosulfate and pyridyl disulfide.

Embodiment 21. The kit of any one of embodiments 17 to 20, wherein the compound is of the formula (II):

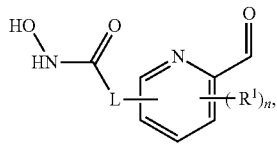
(II)

wherein:

L is an optional linker $R^1$ is an optional group selected from halogen, deuterium, alkyl and substituted alkyl; and n is an integer from 0 to 3.

Embodiment 22. The kit of embodiment 21, having the structure (1) or (3):

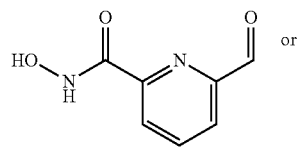
(1) or

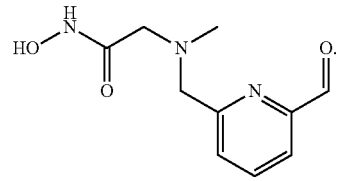
(3)

Embodiment 23. The kit of any one of embodiments 17 to 20, wherein the compound is of the formula (IIA):

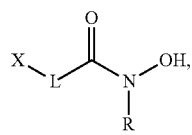
(IIA)

wherein:

L is an optional linker

R is selected from hydrogen, alkyl or substituted alkyl; and

X is selected from an alkyl halide, haloacetyl, maleimide, thiosulfate or pyridyl disulfide.

Embodiment 24. The kit of embodiment 25, wherein the compound of formula (IIA) is of the formula (IIA1) to (IIA6):

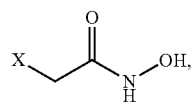
(IIA1)

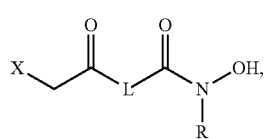
(IIA2)

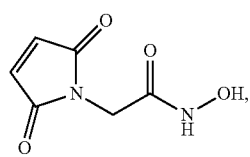
(IIA3)

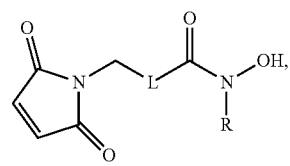
(IIA4)

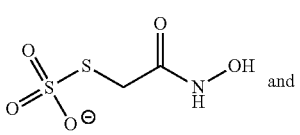
(IIA5) and

-continued

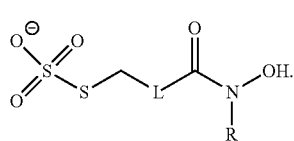
(IIA6)

Embodiment 25. The kit of any one of embodiments 17 to 20, wherein the compound is of the formula (III):

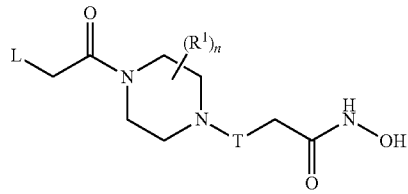
(III)

wherein:

T is an optional linker/tether;

L is a leaving group;

R¹ is an optional group selected from halogen, deuterium, alkyl and substituted alkyl; and n is an integer from 0 to 8.

Embodiment 26. The kit of embodiment 25, having the structure (2):

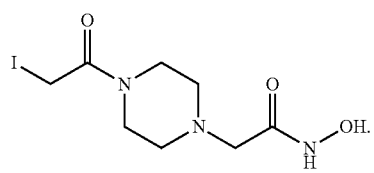
(2)

Embodiment 27. The kit of any one of embodiments 17 to 26, wherein the compound of formula (I) has a size ranging from 60 Da to 230 Da.

Embodiment 28. The kit of embodiment 27, wherein the compound of formula (I) has a size ranging from 60 Da to 170 Da.

Embodiment 29. The kit of any one of embodiments 17 to 28, wherein the metal ion configured for loading onto the resin is an ytterbium (III) ion (Yb(III)).

Embodiment 30. The kit of any one of embodiments 17 to 28, wherein the metal ion configured for loading onto the resin is a nickel (II) ion (Ni(II)).

Embodiment 31. The kit of any one of embodiments 17 to 28, wherein the metal ion configured for loading onto the resin is a cobalt (II) ion (Co(II)).

The following embodiments are supported by Alternative Embodiments I section of this disclosure as set forth above, U.S. provisional application 62/796,424, filed on Jan. 24, 2019, the data shown in FIGS. 8-19 and Examples 6-15 below.

Embodiment 1. A compound of formula (I):

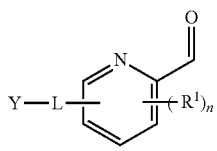
(I)

wherein:

Y is selected from a hydroxamate moiety and a desthiobiotin moiety;

L is an optional linker

R¹ is a group selected from halogen, deuterium, alkyl, substituted alkyl (e.g., alkyl halide); and n is an integer from 0 to 3.

Embodiment 2. The compound of embodiment 1, wherein the R¹ groups together provide a molecular weight of less than 80 Da.

Embodiment 3. The compound of embodiment 1 or 2, having formula (II):

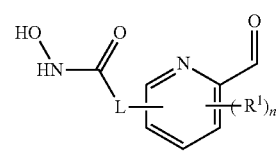
(II)

wherein:

L is an optional linker

R¹ is an optional group selected from halogen, deuterium, alkyl, substituted alkyl (e.g., alkyl halide); and n is an integer from 0 to 3.

Embodiment 4. The compound of embodiment 3, having the formula (IIA), (IIB), (IIC) or (IID):

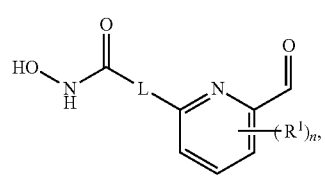
(IIA)

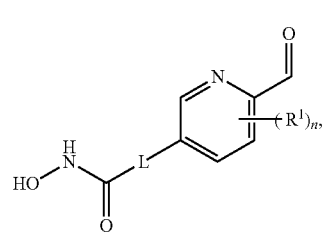
(IIB)

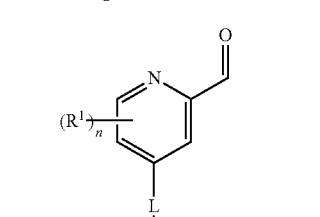
(IIC)

or

-continued

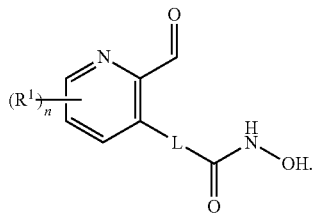
(IID)

Embodiment 5. The compound of any one of embodiments 1 to 4, having the structure (1) or (2):

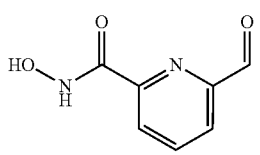
(1)

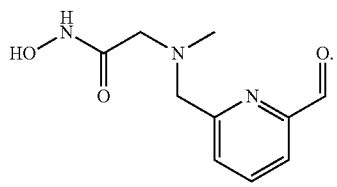
(2)

Embodiment 6. The compound of embodiment 1, wherein Y is a desthiobiotin moiety.

Embodiment 7. The compound of embodiment 6, having the formula (III):

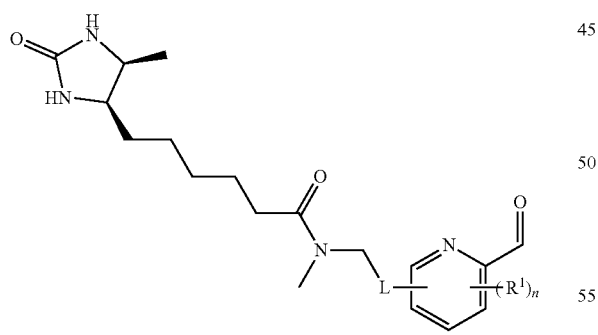
(III)

wherein:

L is an optional linker $R^1$ is an optional group selected from halogen, deuterium, alkyl, substituted alkyl (e.g., alkyl halide); and n is an integer from 0 to 3.

Embodiment 8. The compound of embodiment 7, wherein the $R^1$ groups together provide a molecular weight of less than 80 Da.

Embodiment 9. The compound of embodiment 6 or 7, having the formula (IIIA), (IIIB), (IIIC) or (IIID):

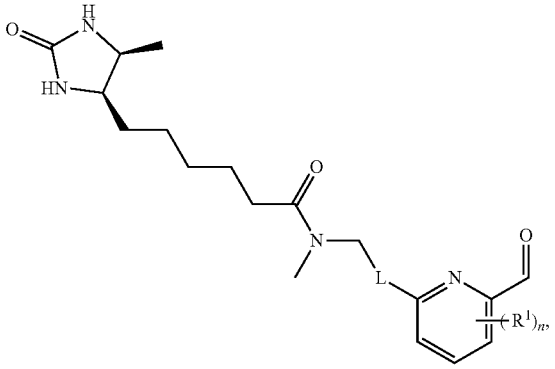
(IIIA)

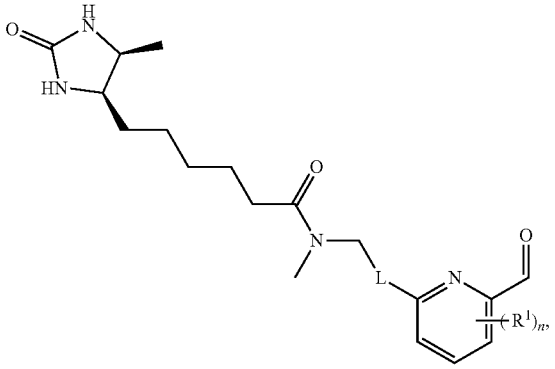
(IIIB)

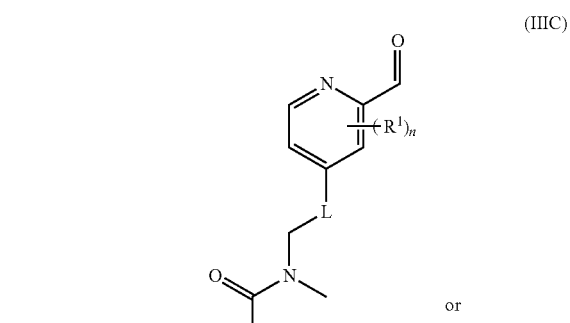
(IIIC)

or

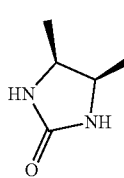

-continued (IIID)

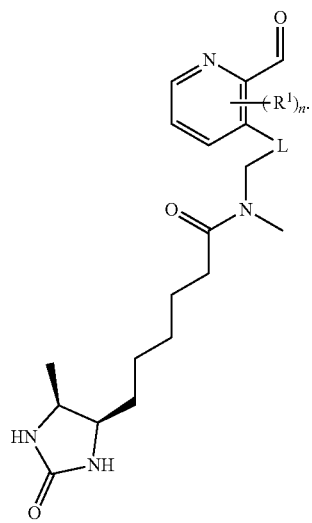

Embodiment 10. The compound of any one of embodiments 6 to 9, having the structure (3):

(3)

Embodiment 11. The compound of any one of embodiments 1 to 10, wherein the linker, if present, is methylene.

Embodiment 12. A composition comprising a mixture of a compound of formula (II) and a compound of formula (III):

(II)

-continued (III)

Embodiment 13. The composition of embodiment 12, wherein the ratio of the compound of formula (II) to the compound of formula (III) is 1:1.

Embodiment 14. The composition of embodiment 12 or 13, wherein the compound of formula (II) has the structure of compound (1) or compound (2):

(1)

or (2)

Embodiment 15. The composition of any one of embodiments 12 to 14, wherein the compound of formula (III) has the structure of compound (3):

(3)

Embodiment 16. A method comprising:
(a) crosslinking a sample to produce a cross-linked sample;
(b) digesting the cross-linked sample into shorter cross-linked peptides
(c) reacting the cross-linked sample with a composition of any of embodiments 12-15, to produce a tagged composition;

(d) purifying any peptides in the tagged composition that are tagged by both a hydroxamate moiety and a desthiobiotin moiety, thereby isolating cross-linked proteins from the sample; and (e) optionally removing the tags attached to the N-termini in step (c).

Embodiment 17. The method of embodiment 16, wherein step (a) is omitted and step (b) involves digesting a sample containing natural cross-links into shorter crosslinked peptides.

Embodiment 18. A method comprising:
(a) crosslinking a sample to produce a cross-linked sample;
(b) digesting the crosslinked protein into shorter cross-linked peptides;
(c) reacting the cross-linked peptides with compound from any of embodiments 3-5, to produce a hydroxamate-tagged composition;
(c) purifying the hydroxamate-tagged composition to isolate the cross-linked peptides from the sample;
(d) optionally removing the tags attached to the N-termini in step (c).

Embodiment 19. The method of embodiment 18, wherein step (a) is omitted and step (b) involves digesting a sample containing natural cross-links into shorter crosslinked peptides.

Embodiment 20. The method of embodiment 18 or 19, wherein the purification of the hydroxamate-tagged composition is facilitated by an IMAC column, wherein the retention time of molecules with two hydroxamate tags exceeds that of those with a single hydroxamate-tag sufficiently, thereby allowing isolation of the cross-linked peptides from the sample.

The following embodiments are supported by the Alternative Embodiments II section of this disclosure as set forth above, provisional application Ser. No. 62/796,430, filed on Jan. 24, 2019, the data shown in FIGS. 20-29 and Examples 16-18 below.

Embodiment 1. A compound of formula (I):

$$L^1\text{-Y-A} \qquad (I)$$

wherein:
Y is a group capable of forming an ionic species in the gas phase in a mass spectrometer;
$L^1$ is a cysteine reactive group; and
A is an optional affinity tag,
wherein the compound has at least one pair of heavy and light isotopic labels.

Embodiment 2. The compound of embodiment 1, of the formula (IA) or (IB):

(IA)

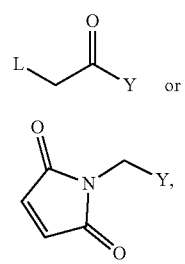

(IB)

wherein L is a cysteine reactive group.

Embodiment 3. The compound of embodiment 1, of the formula (IC):

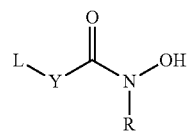

(IC)

wherein:
Y is a group capable of forming an ionic species in the gas phase in a mass spectrometer;
L is a cysteine reactive group; and
R is selected from hydrogen, alkyl or substituted alkyl.

Embodiment 4. The compound of embodiment 3, of the formula (IC1) or (IC2):

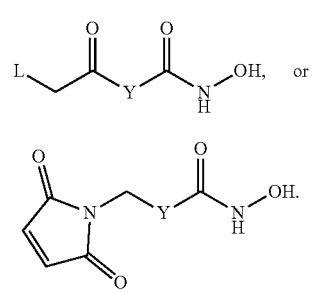

(IC1)

(IC2)

Embodiment 5. The compound of any one of embodiment 1, wherein the compound (excluding group L) has a size ranging from 70 Da to 400 Da.

Embodiment 6. The compound of any one of embodiments 1 to 5, wherein the compound (excluding group L) has a size ranging from 150 Da to 300 Da.

Embodiment 7. The compound of any one of embodiments 1 to 6, wherein the ionic species is a cationic species.

Embodiment 8. The compound of any one of embodiments 1 to 7, wherein Y is selected from secondary amine, tertiary amine, heterocycle, substituted heterocycle, heteroaryl and substituted heteroaryl.

Embodiment 9. The compound of embodiment 8, wherein Y is selected from piperazine, substituted piperazine, pyridine, substituted pyridine, thiazoline and substituted thiazoline.

Embodiment 10. The compound of any one of embodiments 1 to 4, wherein the heavy and light isotopic labels are selected from $^2H$, $^1H$; $^{13}C$ $^{12}C$, $^{15}N$, $^{14}N$, $^{18}O$, $^{17}O$, $^{16}O$, $^{33}S$, $^{34}S$, $^{35}S$ and $^{36}S$.

Embodiment 11. The compound of embodiment 10, wherein the pair of heavy and light isotopic labels are $^{13}C$ and $^{12}C$.

Embodiment 12. The compound of any one of embodiments 1 to 11, of the formula (II):

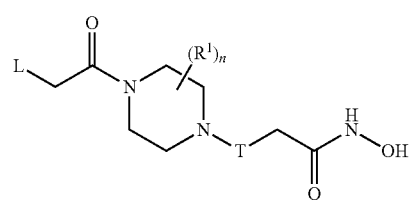

(II)

wherein:

T is an optional linker;

L is a leaving group;

R[1] is an optional group selected from halogen, deuterium, alkyl, substituted alkyl (e.g., alkyl halide); and n is an integer from 0 to 8, wherein the compound has at least one isotopic label.

Embodiment 13. The compound of embodiment 12, of the formula (IIA):

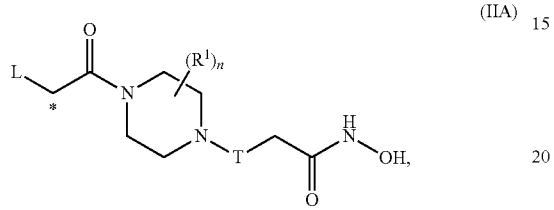

(IIA)

wherein * is a $^{13}C$ isotope label.

Embodiment 14. The compound of embodiment 1, wherein L[1] is a haloacetyl group or a maleimide.

Embodiment 15. The compound of any one of embodiments 2 to 13, wherein L is a halogen.

Embodiment 16. The compound of embodiment 14 or 15, wherein the halogen is iodide.

Embodiment 17. The compound of any one of embodiments 1 to 16 of the structure (1):

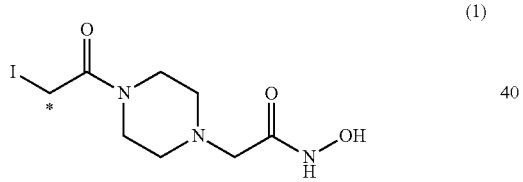

(1)

wherein * is a $^{13}C$ isotope label.

Embodiment 18. The compound of embodiment 1 or 2, selected from the structures (2) to (11):

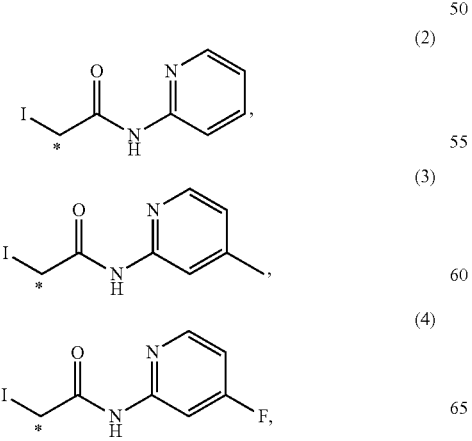

(2)

(3)

(4)

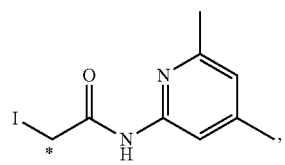

(5)

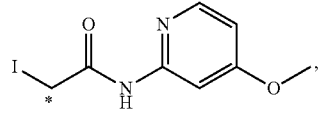

(6)

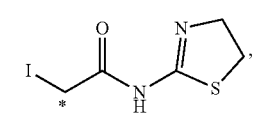

(7)

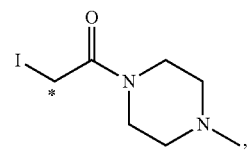

(8)

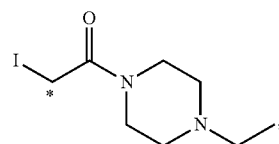

(9)

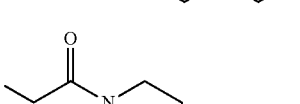

(10)

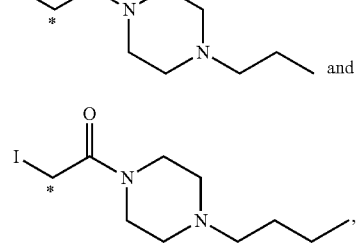

and (11)

wherein * is a $^{13}C$ isotope label.

Embodiment 19. A method of footprinting a protein, the method comprising:
(a) contacting a cysteine containing protein with a compound of formula (I) to produce a cysteine tagged protein:

$$L^1\text{-}Y\text{-}A \quad (I)$$

wherein:
Y is a group capable of forming an ionic species in the gas phase in a mass spectrometer;
L[1] is a cysteine reactive group; and
A is an optional affinity tag,
wherein the compound has at least one pair of heavy and light isotopic labels.
(b) digesting the cysteine tagged protein to one or more cysteine tagged peptides;
(c) oxidizing the cysteine tagged peptides to sulfoxide species;
(d) subjecting the cysteine tagged peptides to mass spectrometry; and (e) detecting fragments arising from the cysteine tagged peptides.

Embodiment 20. The method of embodiment 19, wherein the fragments arising from the cysteine tagged peptides comprise dehydroalanine and sulfenic acid fragments, wherein the sufenic acid fragments are produced by pericyclic rearrangement of the sulfoxide species in the gas phase.

Embodiment 21. The method of embodiment 19 or 20, wherein the compound of formula (I) is of the formula (III) or (IIIA)

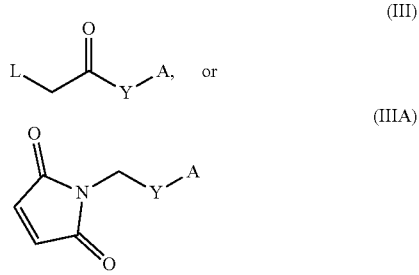

wherein:
L is a cysteine reactive group.

Embodiment 22. The method of any one of embodiments 19 to 21, wherein formula (III) is of the formula

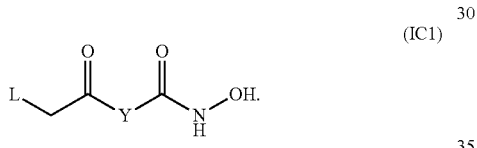

Embodiment 23. The method of embodiment 22, wherein formula (IC1) is of the structure (1).

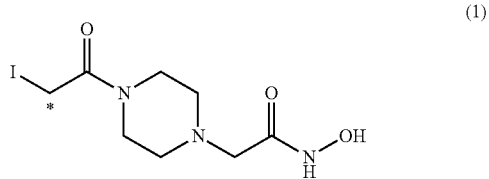

wherein * is a $^{13}$C isotope label.

Embodiment 24. The method of any one of embodiments 19 to 23, further comprising purification of the cysteine tagged peptide fragment by immobilized metal affinity chromatography (IMAC) after step (b).

Embodiment 25. The method of embodiment 24, wherein the IMAC is Yb(III)-IMAC.

Embodiment 26. The method of embodiment 24, wherein the IMAC is Ni(II)-IMAC.

Embodiment 27. The method of embodiment 24, wherein the IMAC is Co(II)-IMAC.

Embodiment 28. The method of any of embodiments 19 to 27, wherein the method is done in vitro by contacting purified protein with the compound to produce cysteine-tagged proteins.

Embodiment 29. The method of any of embodiments 19 to 27, wherein the method is done by contacting cells with the compound and incubating the cells to produce cysteine-tagged proteins within the cell.

Embodiment 30. The method of embodiment 29, wherein the cells are prokaryotic.

Embodiment 31. The method of embodiment 29, wherein the cells are mammalian cells.

Embodiment 32. The method of embodiment 29, wherein the method is performed on cells, with or without a treatment with a chemical agent, and the method further comprises comparing a footprint obtained from treatment with the chemical agent to a footprint obtained without treatment with the chemical agent.

Embodiment 33. The method of embodiment 32, wherein the footprint obtained from treatment with a chemical agent is compared to a footprint obtained from treatment with a different chemical agent.

Embodiment 34. The method of any of embodiments 19 to 33, wherein the method is performed on a library of single cysteine mutants of a protein of interest.

Embodiment 35. The method of embodiment 34, wherein the library of cysteine mutants is a shotgun library produced by mutagenesis without the requirement of isolating the library members to confirm their sequences.

The following embodiments are supported by Alternative Embodiments III section of this disclosure as set forth above, provisional application Ser. No. 62/796,475, filed on Jan. 24, 2019, the data shown in FIGS. 30-46 and Examples 19-36 below.

Embodiment 1. A compound of formula (I):

wherein:
X is a thiol reactive leaving group selected from halogen or a sulfonate;
$R^1$ is an inert linker; and
$R^2$ is selected from hydrogen, alkyl and substituted alkyl.

Embodiment 2. The compound of embodiment 1, wherein $R^1$ is selected from lower alkyl and substituted lower alkyl (e.g., alkyl halide).

Embodiment 3. The compound of embodiment 1 or 2, wherein the compound of formula (I) is selected from the formula (IA), (IB), (IC) and (ID):

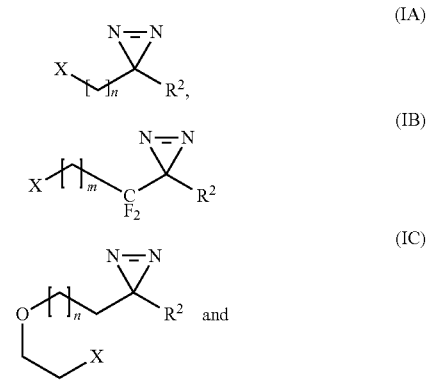

-continued

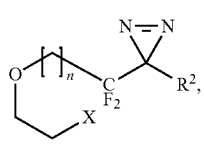
(ID)

wherein:

n is an integer from 1 to 5; and m is an integer from 0 to 4.

Embodiment 4. The compound of any one of embodiments 1 to 3, wherein the structure, excluding group X, has a molecular weight from 54 Da to 162 Da.

Embodiment 5. The compound of any one of embodiments 1 to 4, wherein the sulfonate is mesylate.

Embodiment 6. The compound of any one of embodiments 1 to 4, wherein the halogen is chloride.

Embodiment 7. The compound of any one of embodiments 1 to 6, selected from:

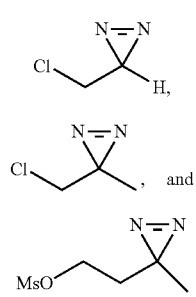

(1)

(2)

(3)

Embodiment 8. A method of alkylating a cysteine residue, the method comprising:

contacting the cysteine residue with a compound of any one of embodiments 1 to 7, wherein the cysteine residue is a free cysteine residue or a cysteine existing in a protein.

Embodiment 9. An amino acid analogue of formula (II):

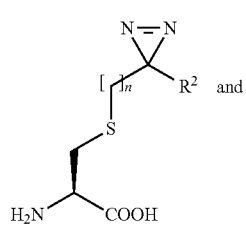

(II)

wherein:

$R^1$ is an inert linker; and $R^2$ is selected from hydrogen, alkyl and substituted alkyl.

Embodiment 10. The amino acid analogue of embodiment 8, wherein $R^1$ is selected from lower alkyl and substituted lower alkyl (e.g., alkyl halide).

Embodiment 11. The amino acid analogue of embodiment 9 or 10, selected from the formula (IIA) and (IIB):

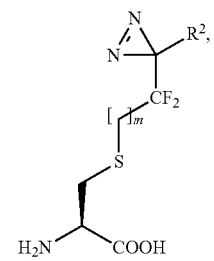

(IIA)

(IIB)

wherein:

$R^2$ are each independently selected from $CH_3$ or $CF_3$;

n is an integer from 1 to 5; and m is an integer from 0 to 4.

Embodiment 12. The amino acid analogue of any one of embodiments 9 to 11, having a molecular weight from 174 Da to 286 Da.

Embodiment 13. The amino acid analogue of any one of embodiments 9 to 12, selected from:

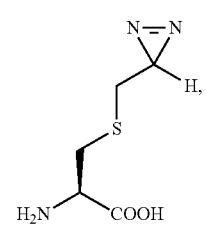

(4)

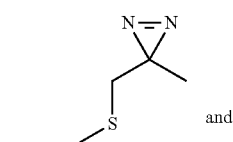

(5)

and

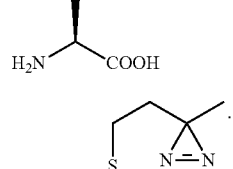

(6)

Embodiment 14. A method of incorporating an amino acid analogue in a protein, the method comprising:

combining a cell or an in vitro translation mix with a compound of any one of embodiments 9 to 13 and incubating the cell or in vitro translation mix so that the amino acid analog is incorporated into the protein during translation.

Embodiment 15. The method of embodiment 14, wherein the cell or in vitro translation mix contains an exogenous engineered synthetase.

Embodiment 16. A method of gaining data about a protein's fold or interactions, the method comprising:

(a) incorporating a diazirine containing crosslinker compound of formula (I) or formula (II) in a protein to form a thioether moiety of formula (III):

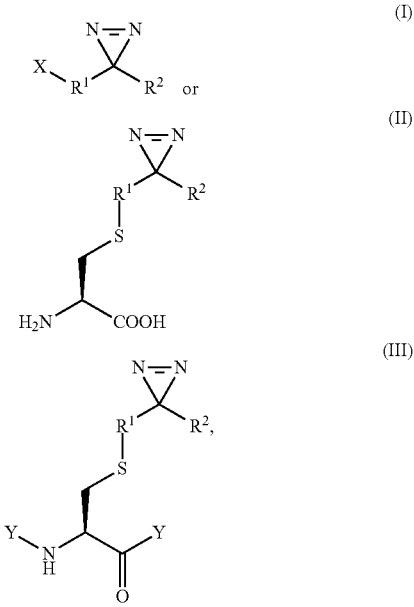

wherein:
X is a thiol reactive leaving group selected from halogen or a sulfonate;
$R^1$ is an inert linker;
$R^2$ is selected from hydrogen, alkyl and substituted alkyl; and
Y each represent a plurality of amino acid residues in the protein either side of the incorporated crosslinker compound;

(b) activating the crosslinker compound of formula (III) with light, such that the diazirine ring undergoes photolysis and inserts into a moiety selected from an adjacent Y residue, an adjacent second protein and an adjacent non-protein molecule, to form one or more crosslinks between the protein and either itself or the adjacent second protein or the adjacent non-protein molecule;

(c) digestion of the crosslinked proteins to crosslinked peptides, wherein the peptides are crosslinked to other peptides or to non-peptide molecules;

(d) oxidation of the thioether moiety in the crosslinked peptides to a sulfoxide species;

(e) subjecting the crosslinked peptides to mass spectrometry;

(f) detecting fragments arising from the crosslinked peptides; and (g) analyzing the detected fragments to gain information about the protein's structure or interactions.

Embodiment 17. The method of embodiment 16, wherein the crosslinked peptides containing the sulfoxide species is of the formula (IV), and upon subjecting to mass spectrometry undergoes cleavage in the mass spectrometer's gas phase to form fragments (IVA) and (IVB):

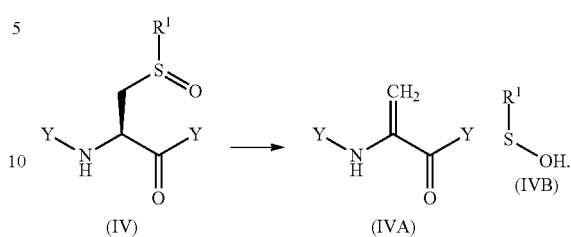

Embodiment 18. The method of embodiment 16 or 17, wherein the crosslinking is done in a living cell.

Embodiment 19. The method of any one of embodiments 16 to 18, wherein the oxidation step (d) results in the inclusion of a heavy isotope of oxygen into the sulfoxides formed by the oxidation.

The following example(s) is/are offered by way of illustration and not by way of limitation.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

General methods in molecular and cellular biochemistry can be found in such standard textbooks as Molecular Cloning: A Laboratory Manual, 3rd Ed. (Sambrook et al., HaRBor Laboratory Press 2001); Short Protocols in Molecular Biology, 4th Ed. (Ausubel et al. eds., John Wiley & Sons 1999); Protein Methods (Bollag et al., John Wiley & Sons 1996); Nonviral Vectors for Gene Therapy (Wagner et al. eds., Academic Press 1999); Viral Vectors (Kaplift & Loewy eds., Academic Press 1995); Immunology Methods Manual (I. Lefkovits ed., Academic Press 1997); and Cell and Tissue Culture: Laboratory Procedures in Biotechnology (Doyle & Griffiths, John Wiley & Sons 1998), the disclosures of which are incorporated herein by reference. Reagents, cloning vectors, cells, and kits for methods referred to in, or related to, this disclosure are available from commercial vendors such as BioRad, Agilent Technologies, Thermo Fisher Scientific, Sigma-Aldrich, New England Biolabs (NEB), Takara Bio USA, Inc., and the like, as well as repositories such as e.g., Addgene, Inc., American Type Culture Collection (ATCC), and the like.

Example 1: A Compact, Cysteine-Reactive Affinity Tap Enables Enrichment of Peptides Labeled with a Footprinting Reagent The structure of proteins can be studied by the process of footprinting, in which the reactivity of a protein's residues towards a label reveals which regions are solvent-accessible. After labeling, proteins are cleaved into shorter peptide pieces for mass spectrometric analysis to determine the extent of labeling. Analysis of proteins by mass spectrometry is complicated by the fact that the informative peptides are significantly outnumbered by uninformative wild-type peptides that saturate the instrument, leading to poor detection and quantification of informative peptides. Because the informative labeled peptides are rare relative to the unlabeled peptides, we sought to add an affinity tag to the label in order to enrich labeled peptides prior to analysis. However, use of a traditional biotin affinity tag would make the label too bulky—footprinting labels need to be as small as possible to provide a high-resolution map of a protein's surface. Using an alkyne in the footprinting label was also not ideal—although we could have added an affinity tag to the alkyne-labeled peptides after footprinting, this would have required conducting additional chemical steps on already rare samples, leading to unacceptable losses.

To overcome these problems, we synthesized an alkylating agent containing a hydroxamate moiety, which binds selectively to ytterbium, enabling Yb(III)-IMAC enrichment, while also satisfying criteria for producing reporter ions in the gas-phase. Notably, this label is compact, adding just 200 Da to the cysteine peptide, 60 Da of which is from the affinity reagent and the rest of which satisfies other requirements of footprinting labels.

To test the enrichment abilities of this affinity tag, we alkylated a synthetic cysteine-containing peptide with the hydroxamate label. We mixed this tagged peptide with a 1000-fold excess of tryptic peptides prepared from Bovine Serum Albumin, mimicking the abundance of a footprinted probe site in a 10,000 amino acid protein of interest. After loading the mixture onto an Yb-NTA column at pH 9, we eluted bound species at pH 3.75. A single pass over the column resulted in an 86-fold improvement in fractional abundance of an affinity-tagged synthetic peptide in a complex mixture of tryptic peptides, with a 70% yield for the peptide of interest. Subjecting enriched samples to a second enrichment column improved the fractional abundance of the affinity-tagged peptide >300-fold (FIG. 1).

FIG. 1 illustrates that introduction of a compact affinity tag into the cysteine-labeling agent increases the fractional abundance of probe-site peptides, improving coverage and quantification in complex samples. (A) HPLC chromatograms showing 10 μg of hydroxamate-labeled synthetic peptide and 400 ug tryptic BSA peptides before and after enrichment by Yb-NTA column. (B) HPLC chromatograms showing enrichment of 10 μg of hydroxamate-labeled synthetic peptide from 10,000 ug tryptic BSA peptides, by means of a single pass over a Yb-NTA column or by two passes over the column. (C) Improvement in mass spectrometric intensity of reporter ions from hydroxamate labeling of an RBP protein library with 88 single cysteine mutants in response to enrichment from wild-type RBP tryptic. Dashed lines indicate median reporter intensities. (D) Coverage of single-cysteine peptides quantified by mass spectrometry with and without enrichment. Hydroxamate-labeled cysteine-containing peptides from an RBP library of 88 cysteine mutants were measured in—or enriched from—a background of wildtype RBP peptides (in ~30-fold excess) supplemented with tryptic BSA peptides for resulting backgrounds of 100-fold excess or 1000-fold excess of uninformative, unlabeled peptides.

To test whether enrichment improved our ability to measure cysteine peptides by mass spectrometry, we labeled a Ribose Binding Protein library containing 88 single cysteine mutants with the affinity label and analyzed them by mass spectrometer with and without enrichment. Because tryptic peptides are on average 10 amino acids long and RBP is 271 amino acids long and trypsinization produces a single affinity-tagged peptide per protein molecule, we expect unlabeled peptides to outnumber affinity-tagged peptides 27 fold. Gratifyingly, enrichment improves the intensity of reporter ions from labeled peptides 26 fold, while slightly improving the detected percentage of interrogated sites from 66% to 70%. Many proteins of interest are much larger than the 271 amino acid RBP, presenting a more challenging hurdle for enrichment. To mimic labeling a protein sample with 10,000 amino acids, we mixed affinity-tagged RBP library peptides with a 1000-fold excess of tryptic BSA peptides. Without enrichment, only 7% of the 88 RBP sites interrogated are measurable by mass spectrometry. However, enrichment boosts this coverage, suggesting that hydroxamate-mediated enrichment will improve reporter signal and coverage of cysteine peptides in complex protein samples.

Synthesis of Compound (2)

Figure 2:
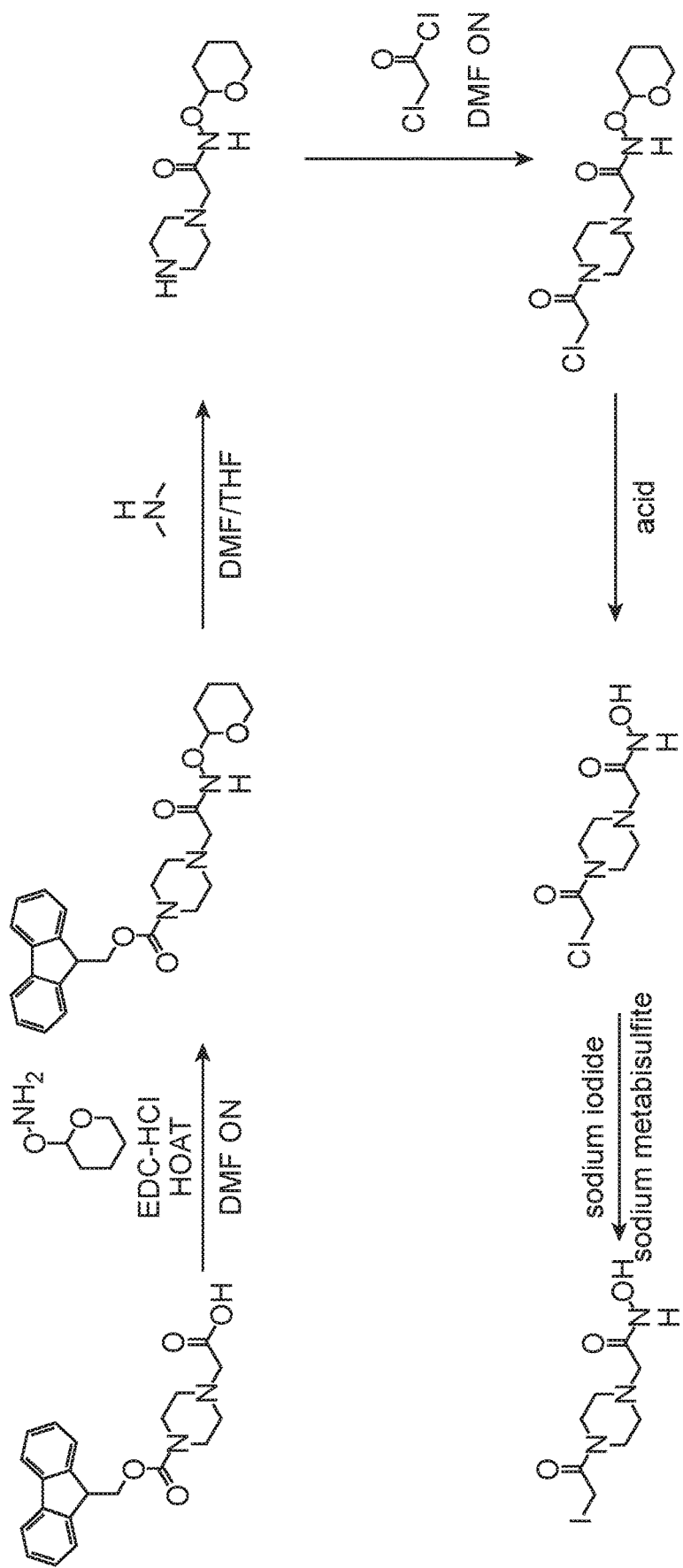
FIG. 2 provides the synthetic scheme for the synthesis of exemplary compound (2).
Figure 3:
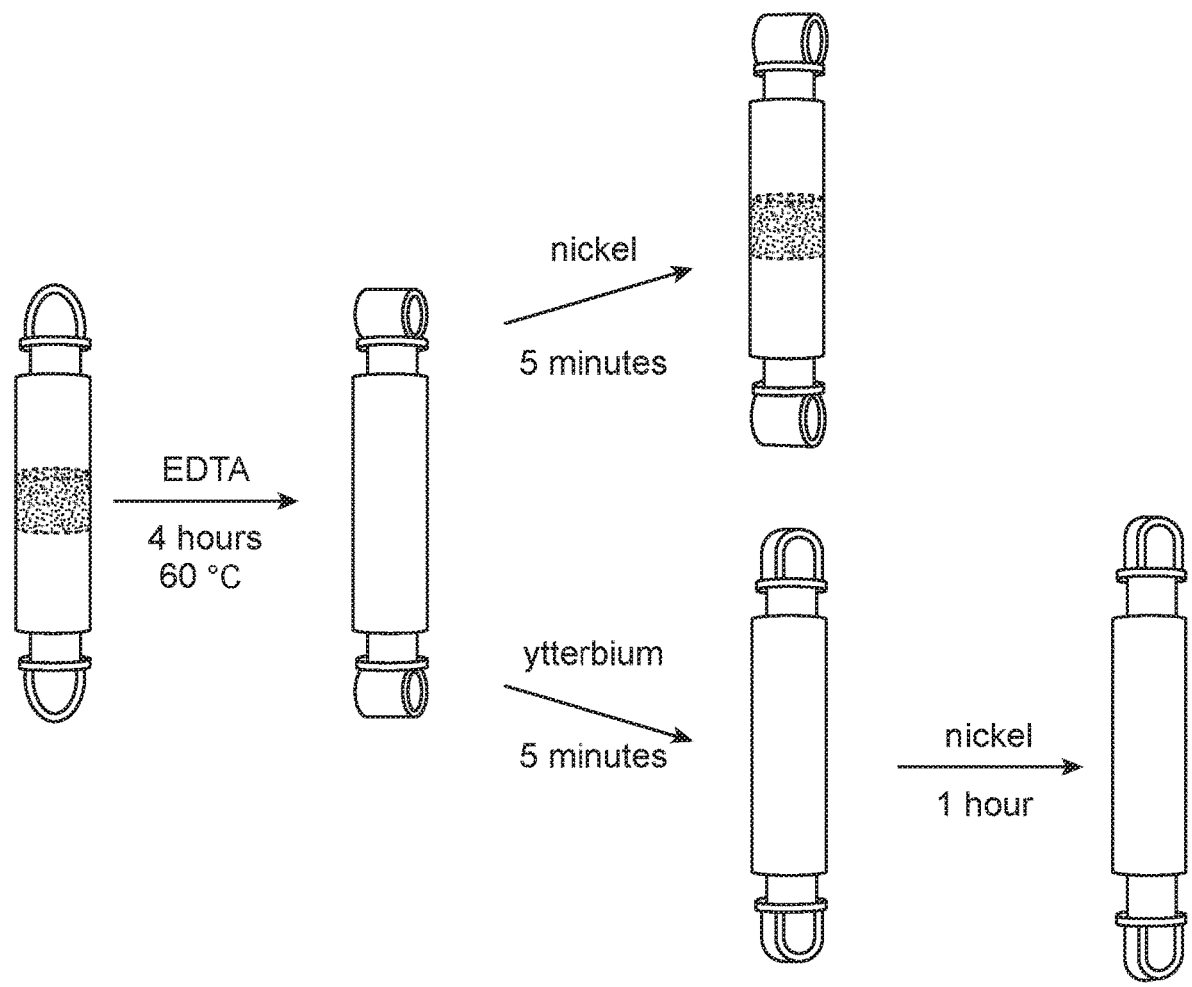
FIG. 3 illustrates the tight binding of ytterbium by an IMAC chelating column for enabling hydroxamate-IMAC purification.

The synthetic scheme for the synthesis of compound (2) is shown in FIG. 2. The procedure for the synthesis of compound (2) is outlined below:

FmocPipCOOH (1.831 g, 5 mmol) was dissolved in 483 mL anhydrous dimethylformamide, to which was added EDC-HCl (5.788 g, 30 mmol), THP-OHNH (893.5 mg, 7.5 mmol), and 16.67 mL 0.6 M HOAT in dimethylformamide. The mixture was stirred at room temperature overnight, then dried by rotary evaporation. The product was resuspended in 200 mL dichloromethane and extracted against 200 mL water; the organic phase was collected, dried by rotary evaporation, and resuspended in 10 mL anhydrous dimethylformamide. The product's Fmoc protective group was removed by stirring with 10 mL 2 M dimethylamine in tetrahydrofuran for 6 hours. The product was dried by rotary evaporation, resuspended in water, extracted against ethylacetate, and the aqueous phase was dried by rotary evaporation. The product was resuspended in 5.88 mL anhydrous dimethylformamide and split in half into two separate vials. While each vial was stirring on ice, chloroacetylchloride (93.5 μL, 1.176 mmol) was added dropwise to one vial and chloroacetylchloride-2-$^{13}$C (94.3 μL, 1.176 mmol) was added dropwise to the other vial. After addition, the mixtures were stirred at room temperature for 9 hours. The products were dried by rotary evaporation and resuspended in 11.18 mL of a solution of sodium bisulfite (1 mg/mL) in methanol. To this was added 1.76 mL of a solution of sodium iodide (100 mg/mL) in methanol. The mixtures were stirred at room temperature overnight. The products were dried by rotary evaporation and resuspended in 900 μL water to precipitate molecular iodine. The products were centrifuged for 2 min at 16000 g. The supernatant was aspirated, chilled on ice, and again centrifuged for 2 min at 16000 g. The resulting supernatant was stored at −20° C.

Example 2: Generation of an Ytterbium IMAC Column for Purification of Hydroxamate Affinity-Tagged Molecules We initially made ytterbium-chelating columns by stripping the nickel from HisTrap columns (GE, 17524701) using EDTA and then flowing in aqueous ytterbium nitrate. Hydroxamate-affinity tagged molecules bound such columns, could be washed while bound, and could be eluted with either a high concentration of acetohydroxamate or by lowering the pH. However, both elution conditions stripped the columns of their ytterbium. This led to time spent recharging columns and unwanted ytterbium in the eluates.

This was overcome using cOmplete His-Tag Purification resin (Sigma-Aldrich, 06781543001), which binds particularly tightly to its chelated metal. We stripped the nickel from this commercial resin by pumping a 175-mM EDTA disodium salt solution through columns of this resin at a rate of 1 ml/h/mm$^2$ for 4 hours while the column was submerged in a 60° C. water bath. This caused the originally strong blue color to fade completely, indicating that the columns were no longer chelating nickel.

Pumping a 5 ml of a 10-mM nickel sulfate solution through the column caused the blue color to return, indicating that the treatment had merely stripped the column of its nickel and not altered its chelation sites. Flowing 5 ml of a 10-mM ytterbium nitrate aqueous solution through the column caused no visual change, as ytterbium is generally not visible. However, this ytterbium treatment prevented the column from being affected by later nickel treatment. This indicates that the ytterbium firmly occupied all the chelating sites.

The column was washed thoroughly with water both before and after ytterbium treatment to prevent any ytterbium from crashing out on the column.

Example 3: A Hydroxamate Affinity Tag for Purification of Molecules Containing Peptide N-Termini We synthesized an N-terminus-specific hydroxamate affinity tag. This is to enable hydroxamate IMAC purification of peptides or proteins displaying free N-termini.

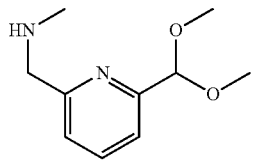

A 50-ml round-bottom flask with a stir bar was charged with 1 g of pyridinedicarboxyaldehyde, 20 ml of methanol, 5 ml of water and 50 mg of p-toluenesulfonic acid monohydrate. A water-cooled Dimroth condenser capped with a septum was attached to the neck. The septum was pierced by a needle attached to a balloon to allow pressure relief without exposing the reaction to the atmosphere. The reaction was stirred and refluxed in a mineral oil bath heated to 85° C. After 4 hours, the solvent was rotavaped off. The sample was then placed under vacuum overnight, which gave a crude desymmetrized affinity tag precursor as a cloudy orange oil.

This was resuspended in 50 ml of pentane. Some residue did not dissolve. A syringe was used to push the solution onto a 40-g silica column (SiliCycle, FLH-R10030B-ISO40) equilibrated with pentane. This column was then attached to an automated flash chromatography system using pentane as buffer A and diethyl ether as buffer B. The sample was separated by running a linear gradient from 0% to 75% buffer B over 30 minutes, with a flow rate of 40 ml/minute. This gave three peaks, of which we kept the middle peak. Its fractions were joined, rotavaped, and left under vacuum overnight to give 449 mg of the pure desymmetrized affinity tag precursor as a clear liquid that turned into a white solid when freeze-thawed. This equaled a yield of 33.5%.

A 100-ml round-bottom flask with a stir bar was cooled in an ice-water bath. It was charged with 50 ml of anhydrous methanol, 312 mg (5.77 mmol) of sodium methoxide and 500 mg (2.89 mmol) of benzenesulfohydroxamic acid. This mixture was stirred for 5 minutes before 402 mg (2.22 mmol) of the desymmetrized affinity tag precursor from above was added. The reaction was stirred for another 2 hours at room temperature with no bath. The methanol was rotavaped off, and the sample was redissolved in 50 ml of water. This solution was transferred to a 125-ml separatory funnel and washed twice with 50 ml of ethyl acetate. The aqueous solution was then acidified by adding 25 ml of 1-M sodium acetate buffered to pH 5.8. The product was extracted from the aqueous layer using three 50-ml portions of ethyl acetate. The ethyl acetate was rotavaped off, and the residue was placed under vacuum overnight. This yielded 290 mg of acetal hydroxamate as a clear oil.

Figure 4:
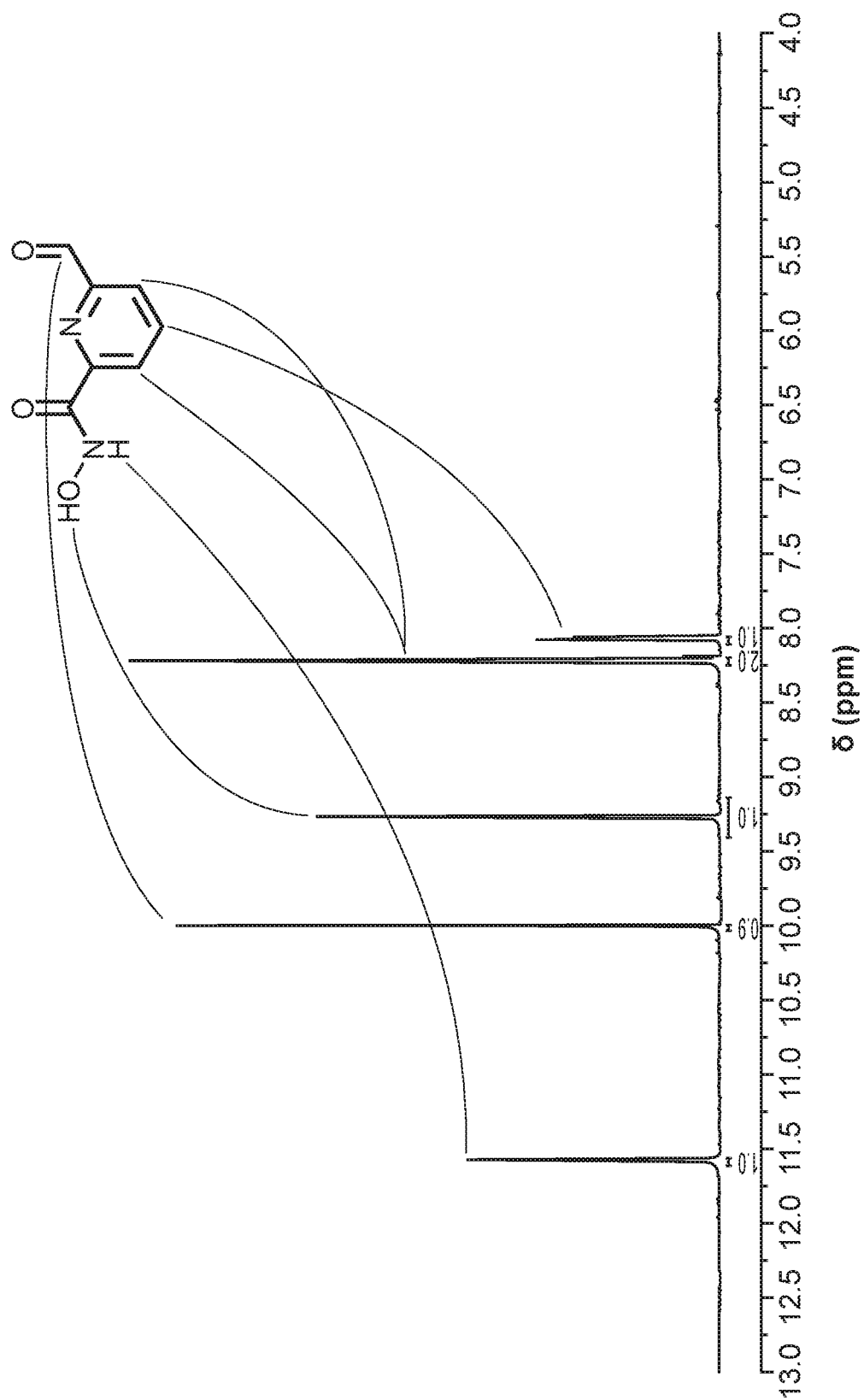
FIG. 4 provides $^1$H-NMR spectrum in deuterated DMSO of an affinity tag for enabling hydroxamate IMAC purification of proteins or peptides displaying free N-termini.

This material was dissolved in 3 ml of aqueous 1% HCl and stirred at 37° C. for 9 hours. This caused the initially clear solution to turn into a white slurry. The solvent was rotavaped off and the residue placed under vacuum overnight. This gave 222 mg of a white solid, equaling a yield of 61%. The identity of the product was verified by $^1$H-NMR (FIG. 4).

Figure 5:
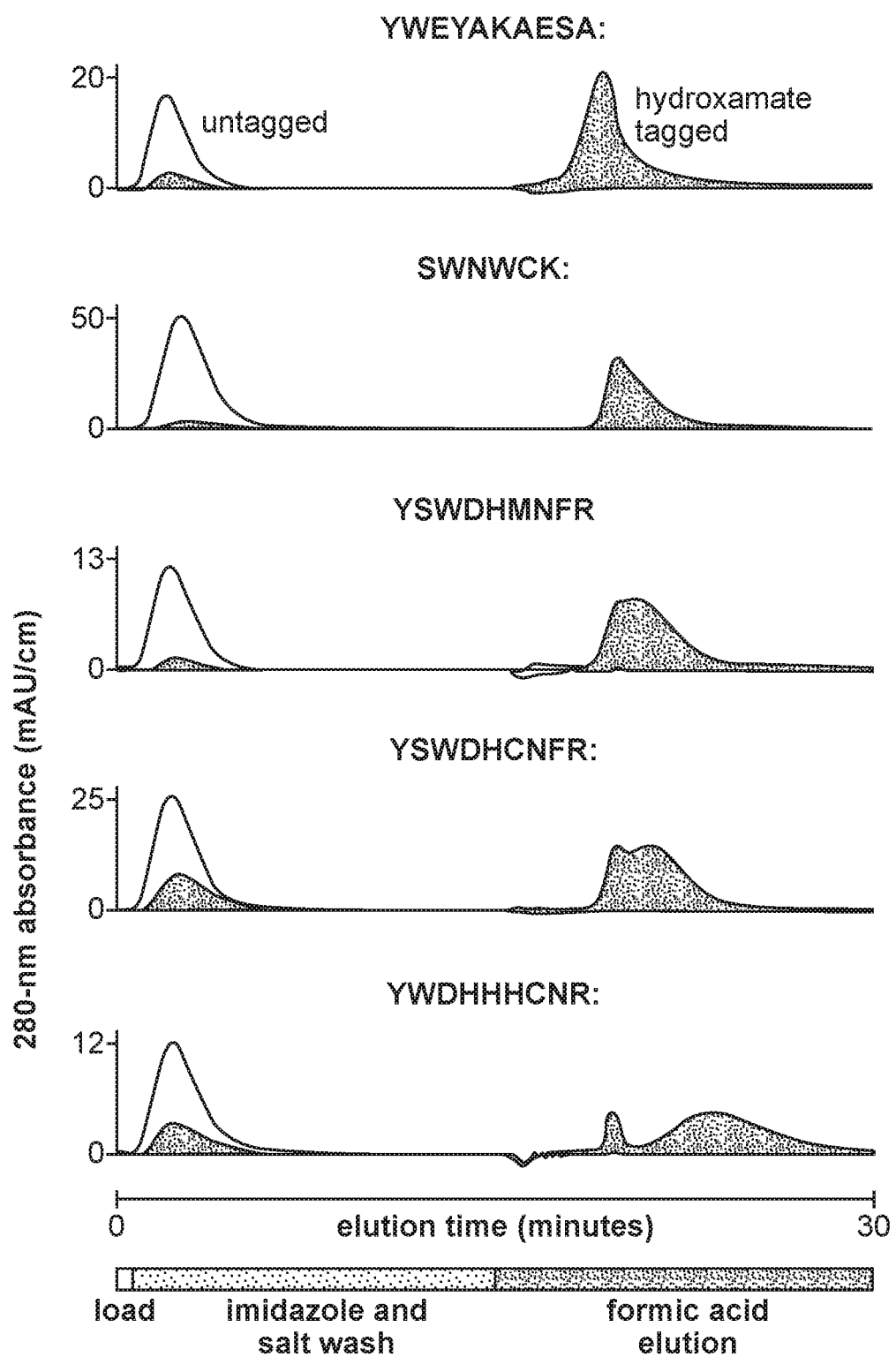
FIG. 5, illustrates that ytterbium IMAC is able to separate peptides depending on whether a hydroxamate affinity tag has been applied to their N-termini. The sequences are set forth from top to bottom in SEQ ID NOs: 3-7.

To test the ability of this molecule to enable the specific hydroxamate IMAC purification, a variety of peptides were loaded onto a 1-ml ytterbium chelating column made as in example 2. These were either unmodified or tagged with the above hydroxamate affinity tag (FIG. 5).

In every instance, the peptides remained bound to the column when, and only when, labeled with the hydroxamate affinity tag. This shows that this molecule is a successful implementation hydroxamate IMAC affinity tag for N-termini.

The ytterbium column was run at 1 ml per minute. It was washed with a solution of 500 mM NaCl, 50 mM imidazole, 100 mM bicine, pH 9.2. Elution was done with 0.1% formic acid, 5% acetonitrile. The peptides were loaded in wash buffer modified by the addition of 5 mM TCEP-HCl. To remove free N-terminus affinity tags prior to loading onto the ytterbium column, the tagged peptides were cleaned up by Sep-Pak, dried by rotary evaporation, and resuspended in load buffer. All the traces shown were made by subtracting the baseline produced by a peptide-less solution being treated the same way as each peptide sample.

Example 4: Synthesis of an Alternative Hydroxamate Affinity Tag for Purification of Molecules Containing Peptide N-Termini A second N-terminus-specific hydroxamate affinity tag was synthesized (compound (3)). Again, its purpose was to enable hydroxamate IMAC purification of peptides or proteins displaying free N-termini.

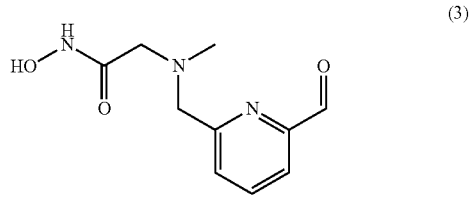

(3)

638 mg of Fmoc-sarcosine, 789 mg of 2-(N-morpholino) ethanesulfonic acid and 354 mg of N-hydroxysuccinimide were dissolved in 23.3 ml of THF and 20 ml of water. To this was added 393 mg of 1-Ethyl-3-(3-dimethylaminopropyl) carbodiimide. The mixture was stirred at room temperature for 1 hour, before a second dose of 393 mg of 1-Ethyl-3-(3-dimethylaminopropyl)carbodiimide was added. After an additional 20 minutes of stirring, the solvent was rotavaped off. The sample was resuspended in ethyl acetate and washed with water, saturated aqueous sodium bicarbonate, water, saturated aqueous citric acid and water. This produced Fmoc-protected and NHS-activated sarcosine molecule.

This molecule was dissolved in 25 ml of tetrahydrofuran and 480 mg of O-(Tetrahydro-2H-pyran-2-yl)hydroxylamine was added. The mixture was stirred for 1 hour at room temperature before the solvent was rotavaped off. The sample was resuspended in ether and washed thrice with water. This produced a hydroxamic acid version of sarcosine that was protected at the N-terminus by a Fmoc protecting group and at the hydroxamic acid by a THP protecting group.

This was resuspended in 29 ml of 2-M dimethylamine in THF and stirred for 1 hour at room temperature to remove the Fmoc protecting group. The solvent was rotavaped off and the residue dissolved in 18 ml of water that was washed thrice with 9 ml of dichloromethane. The water was then rotavaped off.

The product was dissolved together with 193 mg of the desymmetrized affinity tag precursor from example 3 in 4 ml of methanol. This solution was stirred for 30 minutes at room temperature before we quickly added 134 mg of sodium cyanoborohydride dissolved in 1.4 ml of methanol all at once. The sample was placed in an ice-water bath and stirred for another 5 minutes. This caused the reaction to gradually darken. We then added 2.5 ml of aqueous 50% acetic acid and stirred the reaction for another 10 minutes. The solvent was carefully rotavaped off and the sample redissolved in ethyl acetate and washed with saturated aqueous sodium carbonate. Finally, the ethyl acetate was rotavaped off. This gave a THP and acetal protected version of the final product.

Figure 6:
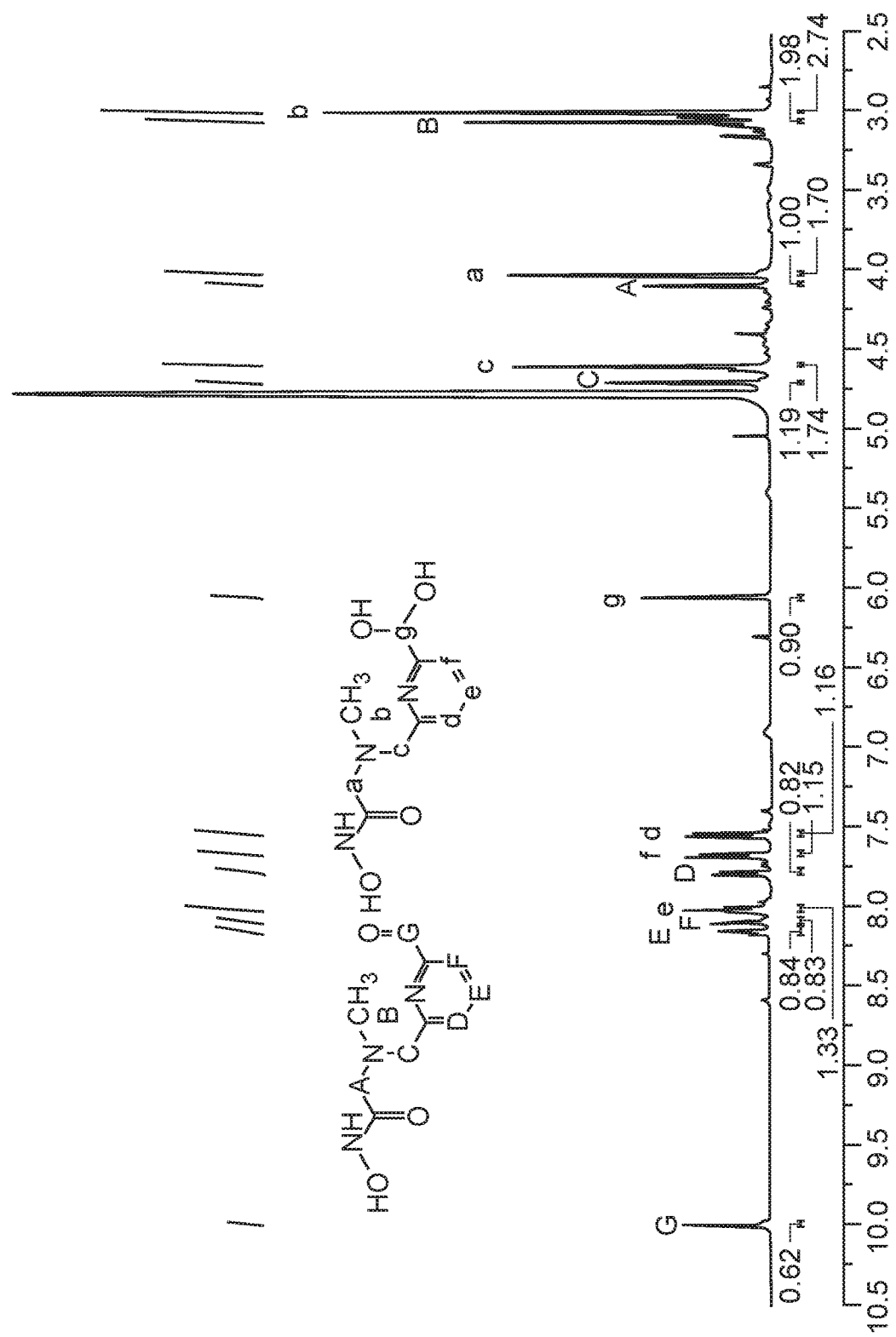
FIG. 6 shows the $^1$H-NMR spectrum in DMSO of exemplary compound (3).

This sample was dissolved in 4 ml of 0.2% aqueous HCl and stirred for 12 hours at room temperature. The solvent was rotavaped off and the product was dissolved in water. It was then washed twice with ethyl acetate before the water was rotavaped off. This gave 45 mg of the product as a solid with a slight yellow hue. FIG. 6 shows the molecule's $^1$H-NMR spectrum in DMSO.

Example 5: Synthesis of a Hydroxamate Affinity Tag for Enzymatic Labeling of Peptide N-Termini We synthesized the following molecule, which we found to be accepted as a substrate by trypsin in such a way that it could be enzymatically attached to the N-termini of peptides when they were incubated in ethanol with the molecule and bead-immobilized trypsin.

This was done to enable hydroxamate IMAC purification of peptides free N-termini by an enzymatic labeling mechanism.

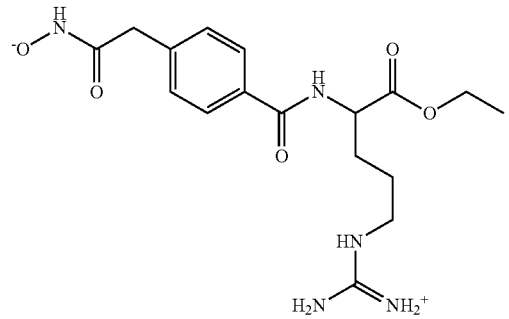

Into a flask were mixed 740 mg of 4-carboxymethyl benzoic acid, 16 ml of tetrahydrofuran, 1040 mg of N-hydroxysuccinic acid and 1865 mg of N,N'-Dicyclohexylcarbodiimide. This reaction was stirred at room temperature for 1 hours. It was then filtered to remove precipitate and the solvent was rotavaped off. The sample was resuspended in 15 ml of dioxane and filtered again to remove any traces of carbodiimide side products. Finally, it was rotavaped again.

This sample was resuspended together with 563 mg of O-(Tetrahydro-2H-pyran-2-yl)hydroxylamine in 120 ml of DMF and stirred for 24 hours. This nucleophile attacked the non-conjugated NHS ester. 1323 mg of arginine ethyl ester dihydrochloride was then added together with 1.3 ml of triethylamine. This was stirred for an additional 24 hours. This nucleophile attacked the conjugated NHS ester. Finally, the reaction was lyophilized, resuspended in water, washed twice with ethyl acetate, cleaned up by preparative HPLC and lyophilized again.

Figure 7:
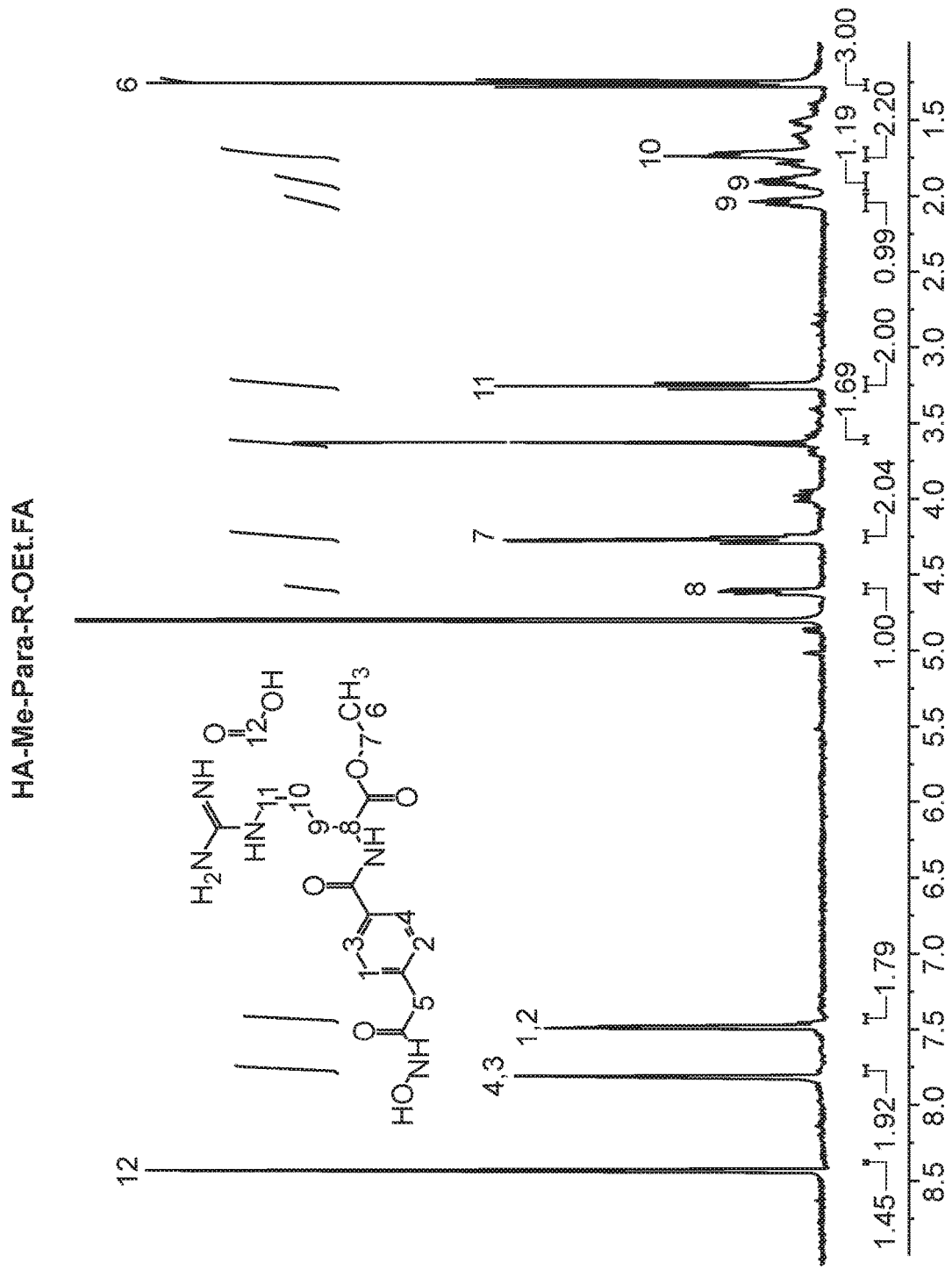
FIG. 7 shows the $^1$H-NMR spectrum in D2O of another exemplary hydroxamate affinity tag for enzymatic labeling of N-termini to allow their purification by IMAC.

This gave the THP protected product. This was dissolved in 4 ml of dioxane, 9 ml of methanol and 135 ul of 4-N HCl in dioxane. The reaction was stirred for 90 minutes in an ice-water bath before the solvent was rotavaped off. The sample was redissolved in water and washed twice with chloroform. The sample was then purified by preparative HPLC. This gave 65.2 mg of the intended product, as verified by NMR in $D_2O$ (FIG. 7).

Example 6: Synthesis of Desymmetrized N-Tag Precursor

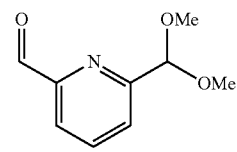 [SMILES: COC(OC)c1cccc(C=O)n1]

A 50-ml round-bottom flask with a stir bar was charged with 1 g of pyridinedicarboxyaldehyde, 20 ml of methanol, 5 ml of water and 50 mg of p-toluenesulfonic acid monohydrate. A water-cooled Dimroth condenser capped with a septum was attached to the neck. The septum was pierced by a needle attached to a balloon to allow pressure relief without exposing the reaction to the atmosphere. The reaction was stirred and refluxed in a mineral oil bath heated to 85° C. After 4 hours, the solvent was rotavaped off. The sample was then placed under vacuum overnight, which gave the crude desymmetrized N-tag precursor as a cloudy orange oil.

Figure 8:
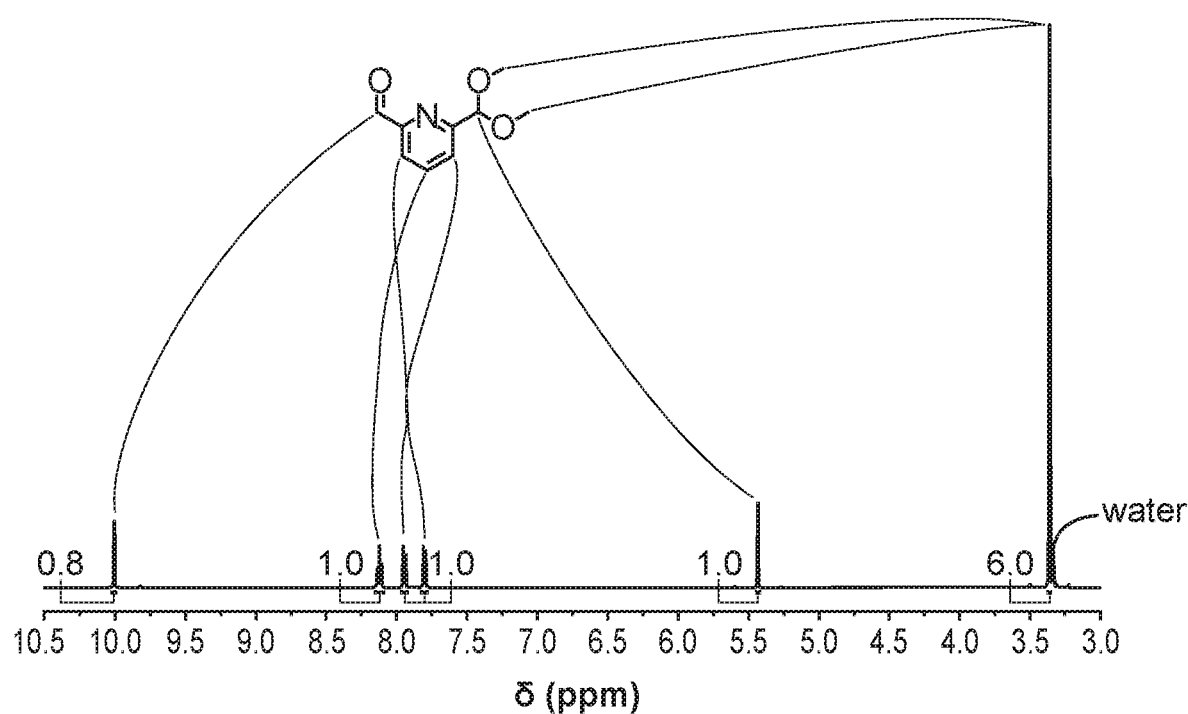
FIG. 8 provides a $^1$H-NMR spectrum of the desymmetrized N-tag precursor of example 6 in deuterated DMSO.

This was resuspended in 50 ml of pentane. Some residue did not dissolve. A syringe was used to push the solution onto a 40-g silica column (SiliCycle, FLH-R10030B-ISO40) equilibrated with pentane. This column was then attached to an automated flash chromatography system using pentane as buffer A and diethyl ether as buffer B. The sample was separated by running a linear gradient from 0% to 75% buffer B over 30 minutes, with a flow rate of 40 ml/minute. This gave three peaks, of which we kept the middle peak. Its fractions were joined, rotavaped, and left under vacuum overnight to give 449 mg of the pure desymmetrized N-tag precursor as a clear liquid that turned into a white solid when freeze-thawed. This equaled a yield of 33.5%. FIG. 8 shows the molecule's $^1$H-NMR spectrum in deuterated DMSO.

Example 7: Synthesis of Hydroxamate N-Tag

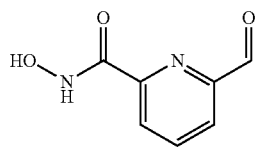 [SMILES: O=Cc1cccc(C(=O)NO)n1]

A 100-ml round-bottom flask with a stir bar was cooled in an ice-water bath. It was charged with 50 ml of anhydrous methanol, 312 mg (5.77 mmol) of sodium methoxide and 500 mg (2.89 mmol) of benzenesulfohydroxamic acid. This mixture was stirred for 5 minutes before 402 mg (2.22 mmol) of the desymmetrized N-tag precursor from example 6 was added. The reaction was stirred for another 2 hours at room temperature with no bath. The methanol was rotavaped off, and the sample was redissolved in 50 ml of water. This solution was transferred to a 125-ml separatory funnel and washed twice with 50 ml of ethyl acetate. The aqueous solution was then acidified by adding 25 ml of 1-M sodium acetate buffered to pH 5.8. The product was extracted from the aqueous layer using three 50-ml portions of ethyl acetate. The ethyl acetate was rotavaped off, and the residue was placed under vacuum overnight. This yielded 290 mg of acetal hydroxamate as a clear oil.

Figure 9:
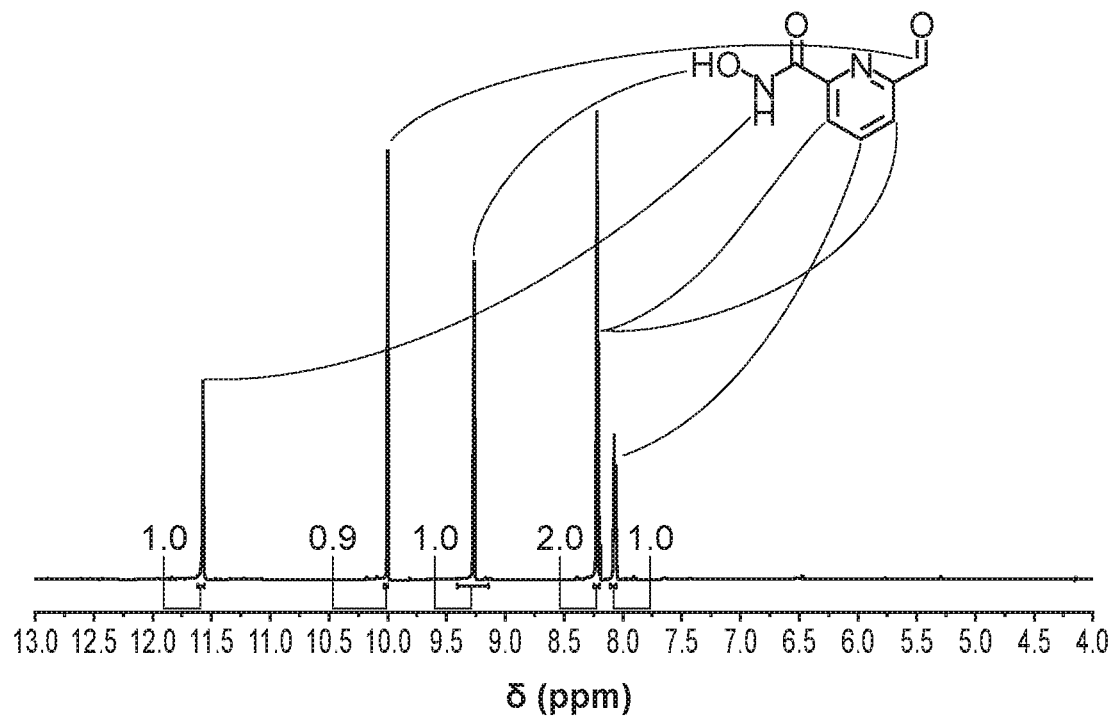
FIG. 9 provides a $^1$H-NMR spectrum of an exemplary hydroxamate N-tag (example 7) in deuterated DMSO.

This material was dissolved in 3 ml of aqueous 1% HCl and stirred at 37° C. for 9 hours. This caused the initially clear solution to turn into a white slurry. The solvent was rotavaped off and the residue placed under vacuum overnight. This gave 222 mg of a white solid, equaling a yield of 61%. FIG. 9 shows the molecule's $^1$H-NMR spectrum in deuterated DMSO.

A 25-mM stock solution was made for this molecule in 25% acetonitrile and 500 mM sodium phosphate that was buffered to pH 7.5 before addition of the acetonitrile.

Example 8: Synthesis of Hydroxamate N-Tag B

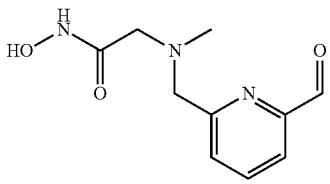

638 mg of Fmoc-sarcosine, 789 mg of 2-(N-morpholino) ethanesulfonic acid and 354 mg of N-hydroxysuccinimide were dissolved in 23.3 ml of THF and 20 ml of water. To this was added 393 mg of 1-Ethyl-3-(3-dimethylaminopropyl) carbodiimide. The mixture was stirred at room temperature for 1 hour, before a second dose of 393 mg of 1-Ethyl-3-(3-dimethylaminopropyl)carbodiimide was added. After an additional 20 minutes of stirring, the solvent was rotavaped off. The sample was resuspended in ethyl acetate and washed with water, saturated aqueous sodium bicarbonate, water, saturated aqueous citric acid and water. This produced Fmoc-protected and NHS-activated sarcosine molecule.

This molecule was dissolved in 25 ml of tetrahydrofuran and 480 mg of O-(Tetrahydro-2H-pyran-2-yl)hydroxylamine was added. The mixture was stirred for 1 hour at room temperature before the solvent was rotavaped off. The sample was resuspended in ether and washed thrice with water. This produced a hydroxamic acid version of sarcosine that was protected at the N-terminus by a Fmoc protecting group and at the hydroxamic acid by a THP protecting group.

This was resuspended in 29 ml of 2-M dimethylamine in THF and stirred for 1 hour at room temperature to remove the Fmoc protecting group. The solvent was rotavaped off and the residue dissolved in 18 ml of water that was washed thrice with 9 ml of dichloromethane. The water was then rotavaped off.

The product was dissolved together with 193 mg of the desymmetrized N-tag precursor from example 6 in 4 ml of methanol. This solution was stirred for 30 minutes at room temperature before we quickly added 134 mg of sodium cyanoborohydride dissolved in 1.4 ml of methanol all at once. The sample was placed in an ice-water bath and stirred for another 5 minutes. This caused the reaction to gradually darken. We then added 2.5 ml of aqueous 50% acetic acid and stirred the reaction for another 10 minutes. The solvent was carefully rotavaped off and the sample redissolved in ethyl acetate and washed with saturated aqueous sodium carbonate. Finally, the ethyl acetate was rotavaped off. This gave a THP and acetal protected version of the final product.

Figure 10:
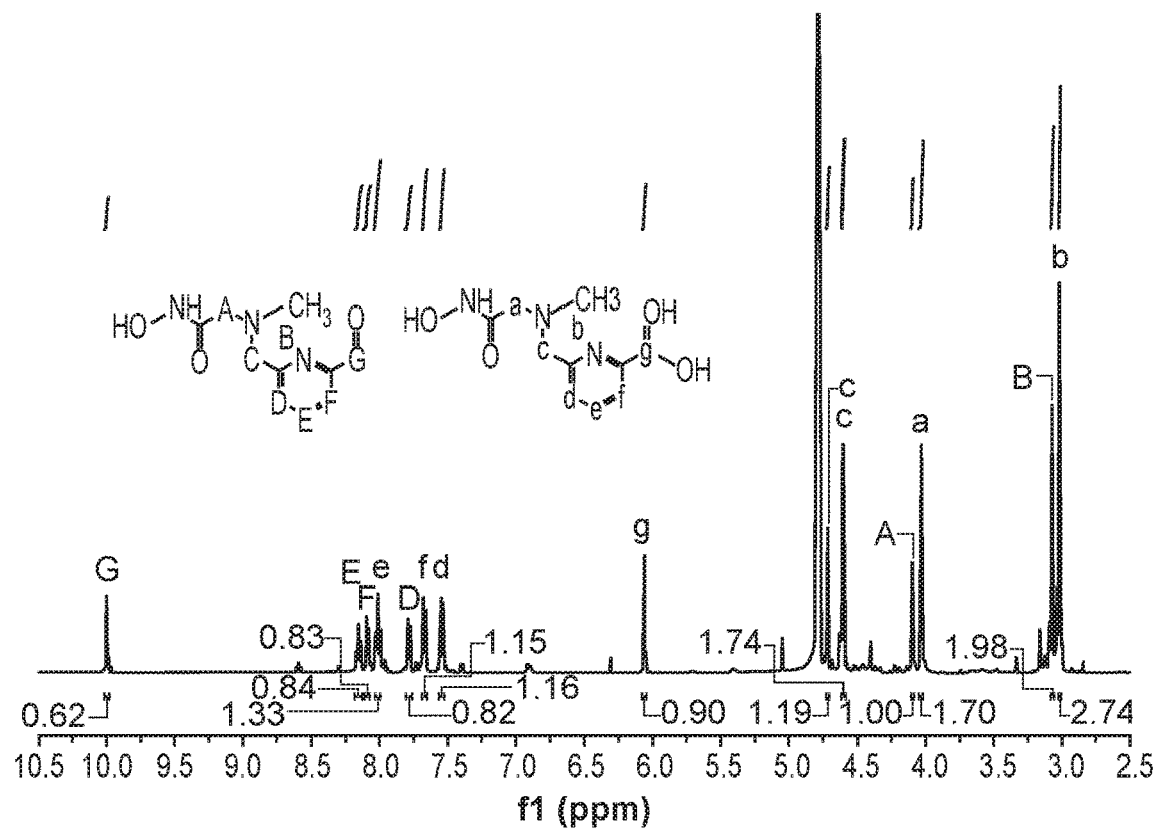
FIG. 10 provides a $^1$H-NMR spectrum of another exemplary hydroxamate N-tag (example 8) in deuterated $D_2O$.

This sample was dissolved in 4 ml of 0.2% aqueous HCl and stirred for 12 hours at room temperature. The solvent was rotavaped off and the product was dissolved in water. It was then washed twice with ethyl acetate before the water was rotavaped off. This gave 45 mg of the product as a solid with a slight yellow hue. FIG. 10 shows the molecule's $^1$H-NMR spectrum in D$_2$O.

Example 9: Synthesis of Amine N-Tap for Further Derivatization

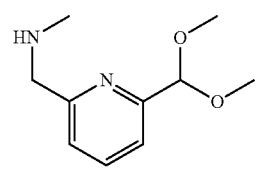

Figure 11:
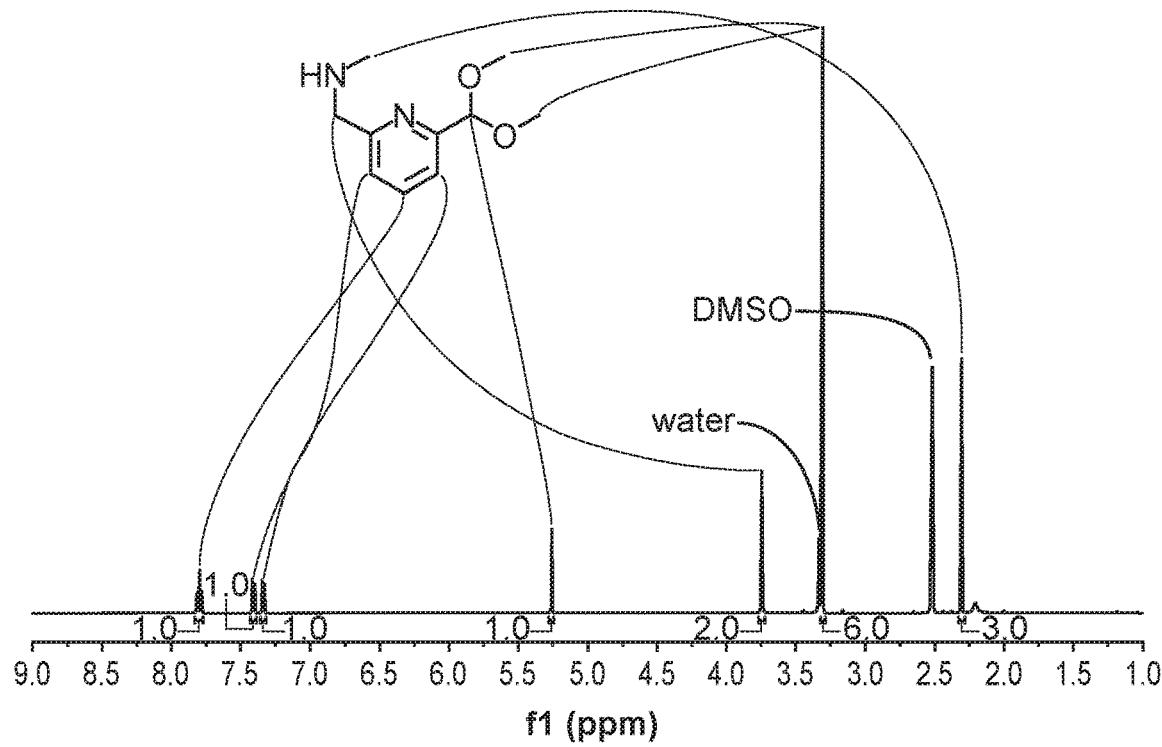
FIG. 11 provides a $^1$H-NMR spectrum of an amine N-tag (example 9) in deuterated DMSO.
Figure 12:
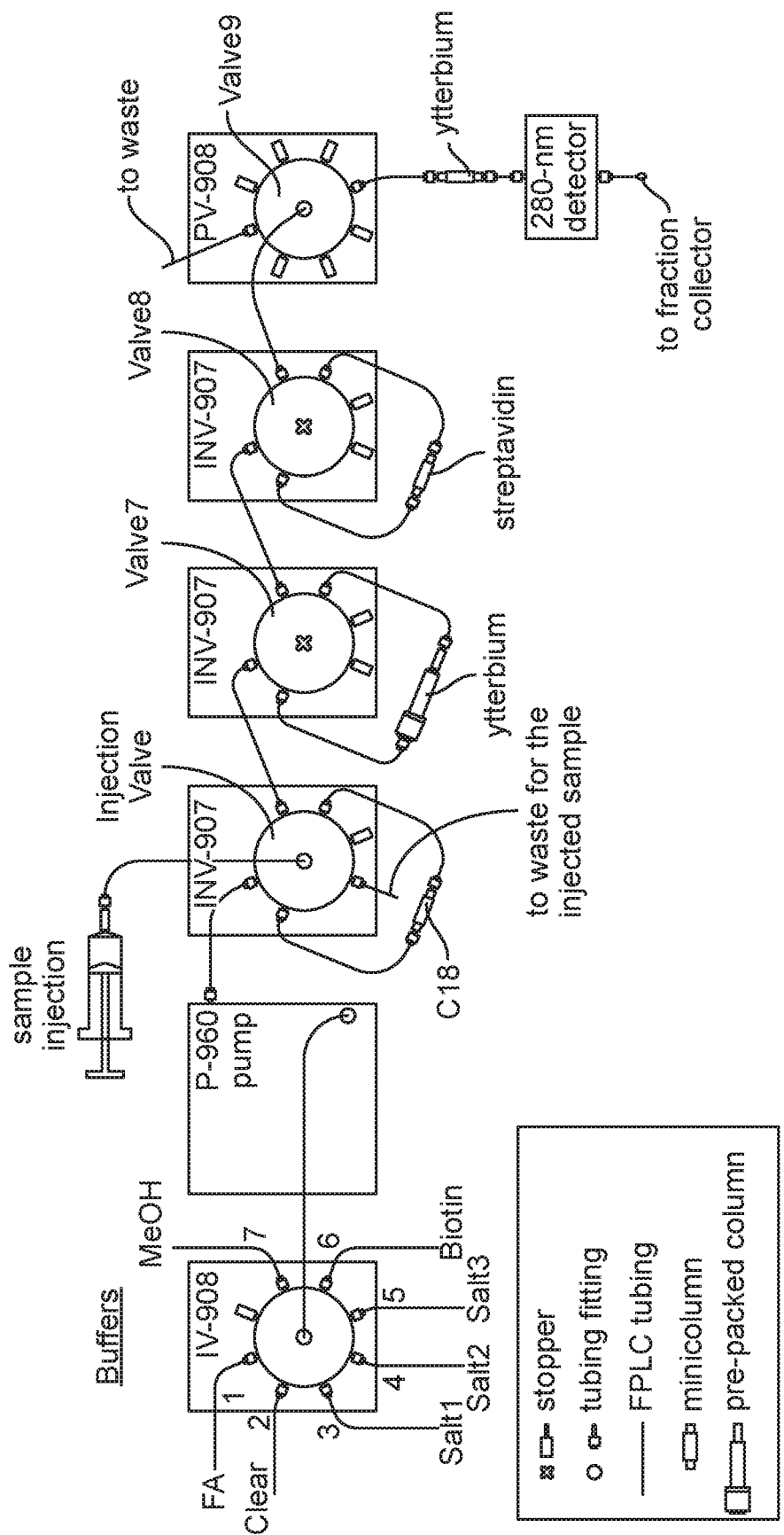
FIG. 12 illustrates a standard an ÄKTA FPLC system setup.
Figure 13:
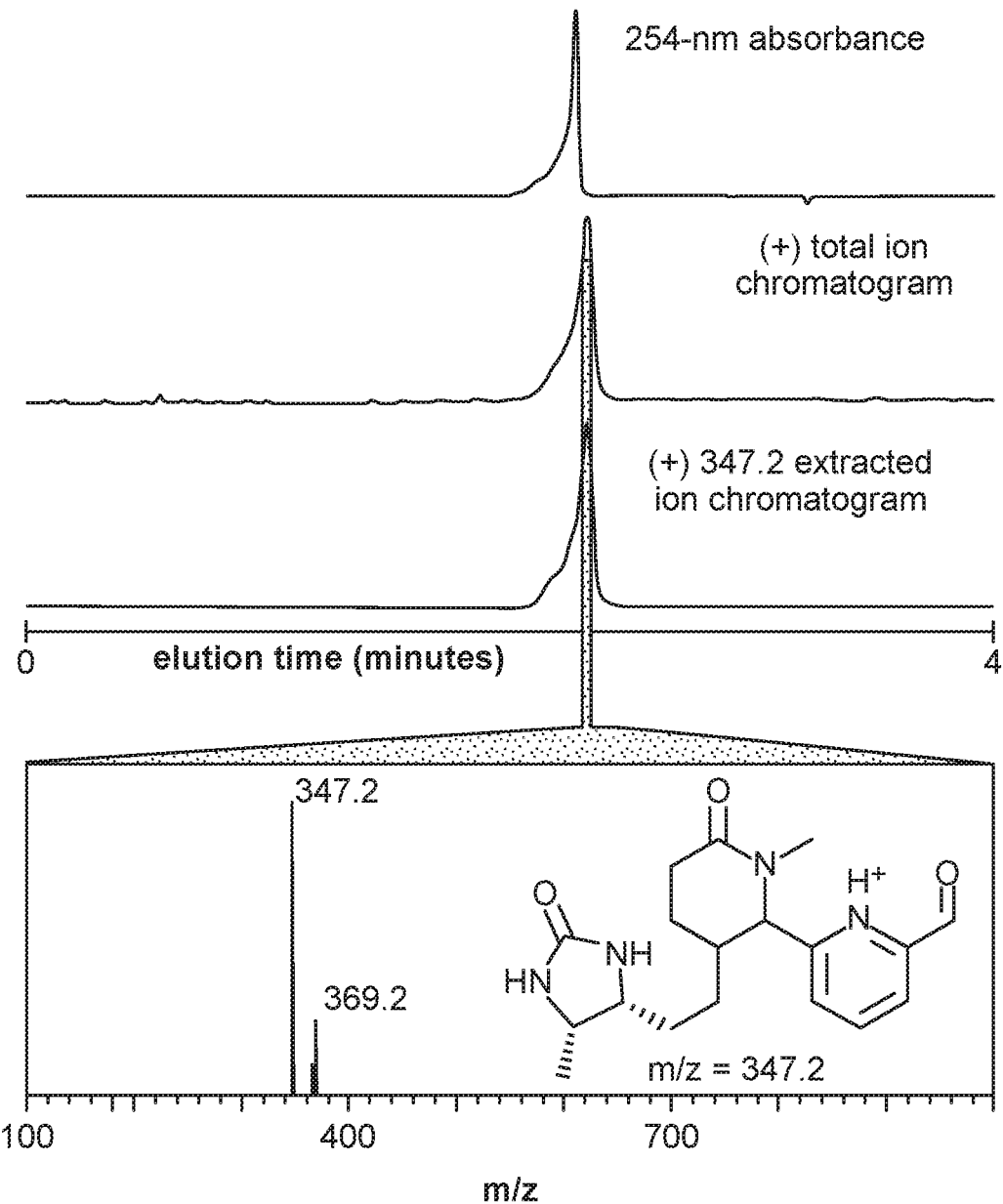
FIG. 13 provides LCMS trace of desthiobiotin N-tag (Example 10).
Figure 14:
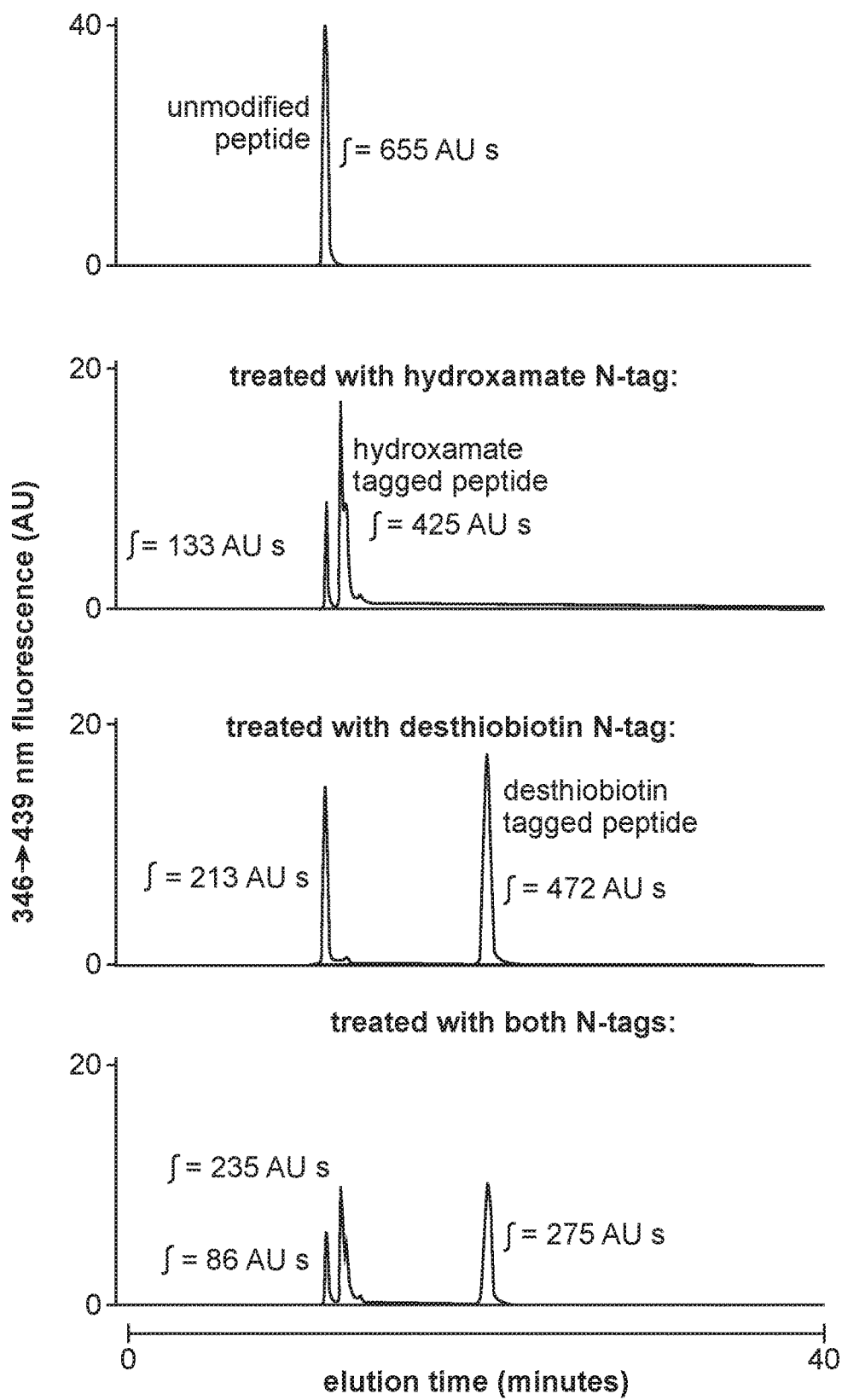
FIG. 14 provides HPLC traces observed in the N-tagging of peptides with orthogonal affinity tags (example 11).
Figure 15:
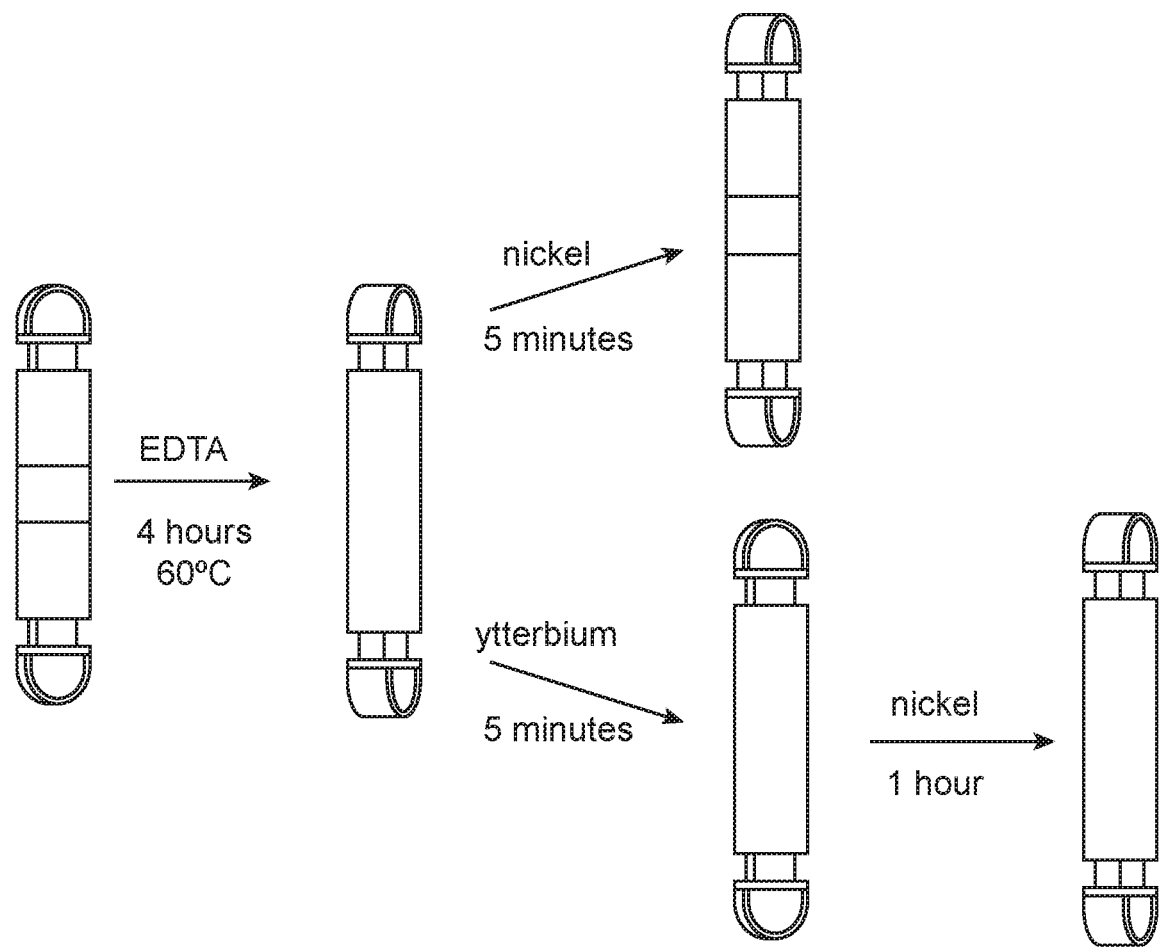
FIG. 15 illustrates the generation of ytterbium IMAC resin.
Figure 16:
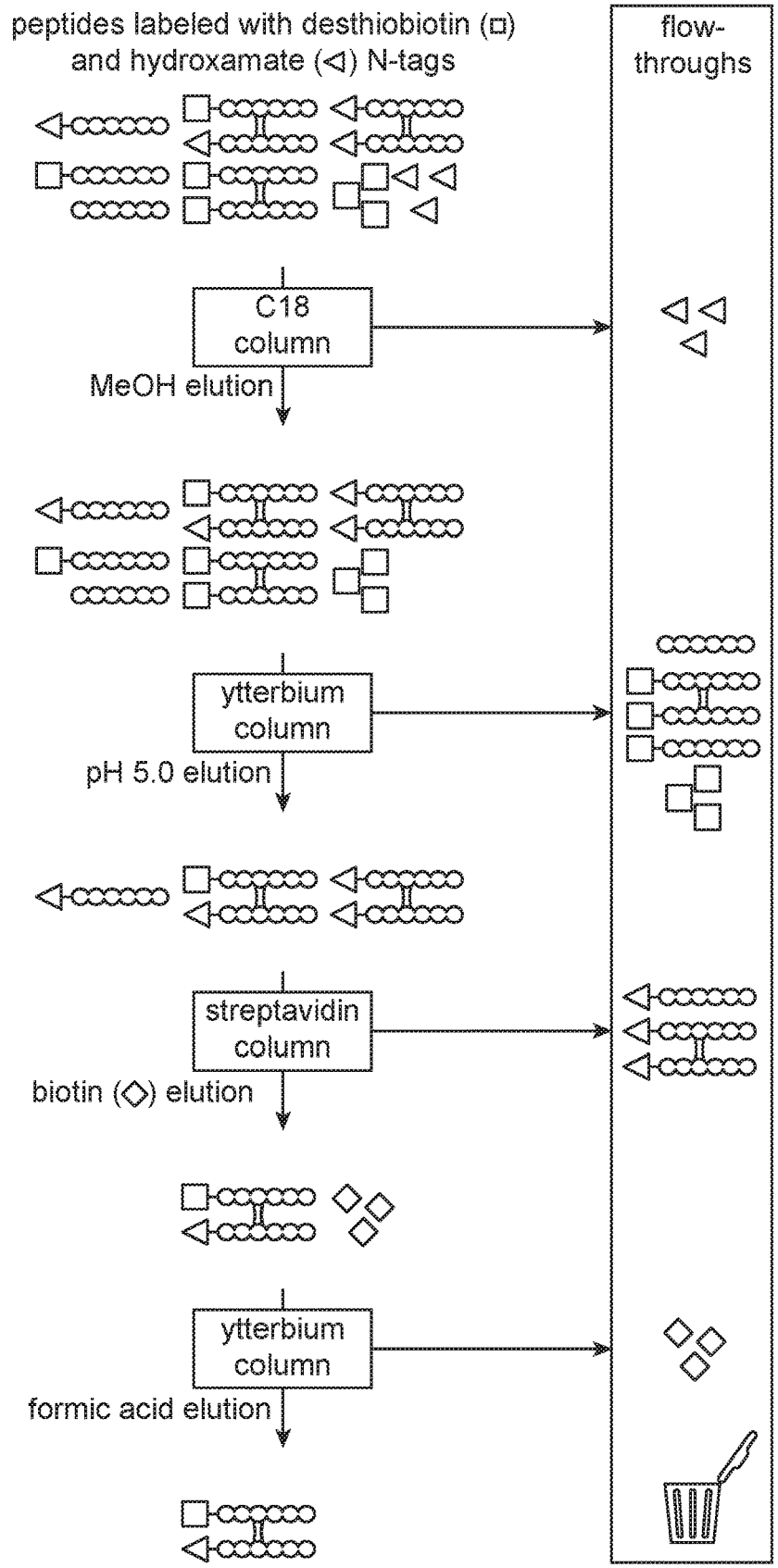
FIG. 16 illustrates the automated system for purification of peptides dual-tagged with orthogonal N-tags.

A 50-ml round-bottom flask with a stir bar was charged with 500 mg (2.8 mmol) of desymmetrized N-tag precursor from example 6, 7 ml of 2-M methylamine (13.8 mmol) in THF and 20 µl (0.34 mmol) of glacial acetic acid. This mixture was stirred at room temperature. After 30 minutes, a solution of 347 mg (5.5 mmol) of sodium cyanoborohydride in 3.5 ml of methanol were added. The reaction was placed in an ice-water bath and stirred. After 5 minutes, a mixture of 3 ml of water and 3 ml of glacial acetic acid was added to quench any remaining sodium cyanoborohydride. The solvent was rotavaped off, care being taken for its tendency to bump. The sample was then left under vacuum overnight. This gave a white solid, which was resuspended in 12 ml of water and washed twice with 1 ml of ethyl acetate. 1.8 g of sodium carbonate was added gradually over 5 minutes. The sample was extracted twice with 24 ml of ethyl acetate. These extracts were combined into a 100-ml round-bottom flask and washed with 2 ml of water. The ethyl acetate was rotavaped off, and the sample was placed under vacuum overnight. This gave a 372 mg of clear oil, equaling a yield of 69%. All extractions and washes were done by stirring the layers in the flask and separating them using a glass pasteur pipette. FIG. 11 shows the molecule's $^1$H-NMR spectrum in deuterated DMSO.

Example 10: Synthesis of Desthiobiotin N-Tag

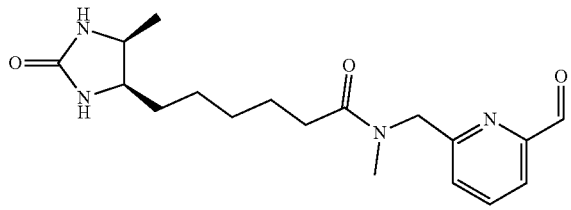 [SMILES: C[C@@H]1NC(=O)N[C@@H]1CCCCCC(=O)N(C)Cc1cccc(C=O)n1]

A 50-ml round-bottom flask with a stir bar was charged with 250 mg (1.2 mmol) of d-desthiobiotin, 201 mg (1.8 mmol) of NHS, and 12 ml of DMF. This mixture was stirred until everything was dissolved. 336 mg (1.8 mmol) of EDC were then added, and the reaction was stirred overnight at room temperature. The DMF was rotavaped off, and the sample was redissolved in 60 ml of ethyl acetate. The solution was transferred to a 125-ml separatory funnel and washed with 60 ml of 100-mM sodium citrate pH 6.3 and 60 ml of water. The ethyl acetate was rotavaped off, and the sample was placed under vacuum overnight. This gave a 217 mg of NHS desthiobiotin as a white powder, equaling a yield of 60%.

A 25-ml round-bottom flask with a stir bar was charged with 100 mg (0.51 mmol) of amine N-tag from example 9, 159 mg (0.51 mmol) of NHS-desthiobiotin, 4.5 ml of DMF and 89 μl (0.51 mmol) of DIEA. This mixture was stirred at room temperature. After 5 hours, 1 ml of water was added to quench any remaining NHS-desthiobiotin. After 1 hour, the solvent was rotavaped off, and the resulting clear oil was cleaned up by preparative HPLC. The solvent was again rotavaped off, and the sample was placed under vacuum overnight. This gave 140 mg of the acetal-protected desthiobiotin N-tag as a clear oil.

The purified sample was redissolved in 9 ml of aqueous 1% HCl and stirred at 37° C. for 12 hours. Afterwards, the solvent was rotavaped off, and the sample was placed under vacuum overnight. This gave a clear yellow solid, which was purified by preparative HPLC. The solvent was rotavaped off, and the sample was left under vacuum overnight. This gave 109 mg of a clear solid, equaling a yield of 55%. The identity of this product was investigated by LCMS (see, e.g., FIG. 13). The LCMS revealed a single LC as seen by both absorbance and total ion count that had an m/z value matching the intended product.

A 100-mM stock solution was made for this molecule in 50% acetonitrile.

Example 11: N-Tagging of Peptides with Orthogonal Affinity Tags

A modified peptide of the following form was synthesized:

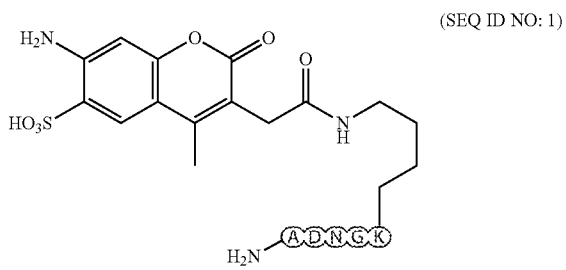

(SEQ ID NO: 1)

A peptide with the sequence ADNGK (SEQ ID NO: 1) was purchased with its N-terminal Fmoc protecting group still in place. This peptide was reacted with NHS-activated fluorophore Alexa-350 (ThermoFisher, A10168) before the Fmoc group was removed using piperidine and the peptide was purified by preparative HPLC. The resulting peptide was found to have the same 346→439-nm fluorescence intensity regardless of pH or solvent.

We treated this peptide with the N-tags form examples 7 and 10, either separately or in combination. This labeling done for 4 hours at 37° C. with 5 mM of each N-tag, 100 mM of sodium phosphate buffered to pH 7.5 and 10% acetonitrile. The resulting species were analyzed by reverse phase HPLC (see, e.g., FIG. 14). The data shows that we can efficiently label the peptides and achieve an approximately 50-50 labeling ratio by using the N-tags at a 1:1 ratio.

Example 12: Generation of Ytterbium IMAC Resin

We initially made ytterbium-chelating columns by stripping the nickel from HisTrap columns (GE, 17524701) using EDTA and then flowing in aqueous ytterbium nitrate. Hydroxamate-containing molecules bound such columns, could be washed while bound, and could be eluted with either a high concentration of acetohydroxamate or by lowering the pH. However, both elution conditions stripped the columns of their ytterbium. This led to time spent recharging columns and unwanted ytterbium in the eluates.

This was overcome using cOmplete His-Tag Purification resin (Sigma-Aldrich, 06781543001), which binds particularly tightly to bound metal. We stripped the nickel from this commercial resin by pumping a 175-mM EDTA disodium salt solution through columns of this resin at a rate of 1 ml/h/mm2 for 4 hours while the column was submerged in a 60° C. water bath. This caused the originally strong blue color to fade completely, indicating that the columns were no longer chelating nickel.

Pumping a 5 ml of a 10-mM nickel sulfate solution through the column caused the blue color to return, indicating that the treatment had merely stripped the column of its nickel and not altered its chelation sites. Flowing a 5 ml of a 10-mM ytterbium nitrate aqueous solution through the column caused no visual change, as ytterbium is generally not visible. However, this ytterbium treatment prevented the column from being affected by later nickel treatment. This indicates that the ytterbium firmly occupied all the chelating sites (e.g., see FIG. 15). The column was washed thoroughly Example 13: Design of an Automated System for Purification of Peptides Dual-Tagged with Orthogonal N-Tags We set up an ÄKTA FPLC system with multiple columns to separate molecules that contain both a hydroxamate and desthiobiotin N-tag from those that contain only one of the two. The system implemented the purification scheme shown in FIG. 16. This could be fully automated on a standard instrument with the setup shown in FIG. 12 and the buffers shown in Table 1:

TABLE 1

| Buffers |
| --- |
| Line 1-Buffer FA |
| 1% acetonitrile<br>0.1% formic acid |
| Line 2-Buffer Clear |
| 1% acetonitrile<br>10 mM sodium chloride<br>50 mM sodium bicine, pH 9.2 |
| Line 5-Buffer Salt1 |
| 500 mM NaCl<br>100 mM MES, pH 5.0<br>20% methanol, added after pH buffering |
| Line 4-Buffer Salt2 |
| 10 mM imidazole<br>500 mM NaCl<br>100 mM sodium bicine, pH 9.2<br>20% methanol, added after pH buffering |
| Line 5-Buffer Salt3 |
| 50 mM imidazole<br>500 mM NaCl<br>100 mM MES, pH 5.0<br>20% methanol, added after pH buffering |
| Line 6-Buffer Biotin |
| 5 mM biotin<br>500 mM NaCl<br>100 mM bicine, pH 9.2<br>20% methanol, added after pH buffering |
| Line 7-Buffer MeOH |
| 10 mM imidazole<br>500 mM NaCl<br>100 mM bicine, pH 9.2<br>60% methanol, added after pH buffering | with water both before and after ytterbium treatment to prevent any ytterbium from crashing out on the column.

The sample was injected onto the C18 column and the system utilized the buffers according to the program shown in Table 2, written in the AKTA UNICORN software for controlling the FPLC instrument.

TABLE 2

| Program | | |
| --- | --- | --- |
| Min. | ÄKTA command | Purpose |
| 0 | Pause INFINITE {Minutes} | Inj smple |
| -||- | BufferValveA A1 | wash |
| -||- | SampleFlow_960 0.5 | C18 |
| -||- | {ml/min} | |
| 10 | InjectionValve Inject<br>InjectionValve Load | |
| -||- | BufferValveA A2 | basify |
| -||- | SampleFlow_960 10.0 | C18 |
| 11 | {ml/min} | |
| -||- | SampleFlow_960 0.2 | |
| 12 | {ml/min}<br>InjectionValve Inject<br>InjectionValve Load | |
| -||- | BufferValveA A7 | transfer |
| -||- | SampleFlow_960 10.0 | from |
| 13 | {ml/min} | C18 |
| -||- | SampleFlow_960 0.5 | to |
| -||- | {ml/min} | Yb1 |
| 6 | InjectionValve Inject | |
| -||- | Valve7 2<br>Valve7 1<br>InjectionValve Load | |
| -||- | BufferValveA A4 | wash |
| -||- | SampleFlow_960 10.0 | Yb1 |
| 13 | {ml/min} | |
| -||- | SampleFlow_960 1.0 | |
| 16 | {ml/min}<br>Valve7 2<br>Valve7 1 | |
| -||- | BufferValveA A5 | transfer |
| -||- | SampleFlow_960 10.0 | from |
| 17 | {ml/min} | Yb1 |
| -||- | SampleFlow_960 1.0 | to |
| -||- | {ml/min} | Strep |
| 21 | Valve7 2 | |
| -||- | Valve8 2<br>Valve8 1<br>Valve7 1 | |
| -||- | BufferValveA A3 | wash |
| -||- | SampleFlow_960 10.0 | Strep |
| 22 | {ml/min} | |
| -||- | SampleFlow_960 0.6 | |
| 24 | {ml/min}<br>Valve7 2<br>Valve7 1 | |
| -||- | BufferValveA A6 | transfer |
| -||- | SampleFlow_960 10.0 | from |
| 25 | {ml/min} | Strep |
| 27 | SampleFlow_960 0.1 | to |
| 47 | {ml/min} | Yb2 |
| -||- | SampleFlow_960 0.0 | |
| -||- | {ml/min} | |
| 53 | SampleFlow_960 0.1 | |
| -||- | {ml/min}<br>Valve8 2<br>Valve9 5<br>Valve9 1<br>Valve8 1 | |
| -||- | BufferValveA A3 | wash |
| -||- | SampleFlow_960 10.0 | Yb2 |
| 54 | {ml/min} | |
| -||- | SampleFlow_960 0.3 | |
| 55 | {ml/min}<br>Valve9 5<br>Valve9 1 | |
| -||- | BufferValveA A1 | elute |
| -||- | SampleFlow_960 10.0 | from |
| 56 | {ml/min} | Yb2 |
| -||- | SampleFlow_960 0.2 | |
| 57 | {ml/min} | |
| 61 | Valve9 5 | |
| -||- | Fractionation<br>FractionationStop<br>Valve9 1 | |

TABLE 2-continued

| | Program | |
|---|---|---|
| Min. | ÄKTA command | Purpose |
| -\|\|- | BufferValveA A3 | equil. |
| -\|\|- | SampleFlow_960 10.0 | Yb2 |
| 62 | {ml/min} | |
| -\|\|- | SampleFlow_960 1.0 | |
| 67 | {ml/min} | |
| | Valve9 5 | |
| | Valve9 1 | |
| -\|\|- | BufferValveA A5 | equil. |
| -\|\|- | SampleFlow_960 10.0 | Strep |
| 68 | {ml/min} | |
| -\|\|- | SampleFlow_960 1.0 | |
| 75 | {ml/min} | |
| | Valve8 3 | |
| | Valve8 1 | |
| -\|\|- | BufferValveA A7 | equil. |
| -\|\|- | SampleFlow_960 10.0 | Yb1 |
| 76 | {ml/min} | |
| -\|\|- | SampleFlow_960 1.0 | |
| 81 | {ml/min} | |
| | Valve7 2 | |
| | Valve7 1 | |
| -\|\|- | BufferValveA A1 | equil. |
| -\|\|- | SampleFlow_960 10.0 | C18 |
| 77 | {ml/min} | |
| -\|\|- | SampleFlow_960 0.5 | |
| 87 | {ml/min} | |
| | InjectionValve Inject | |
| | InjectionValve Load | |

The system was given a fresh streptavidin column before the start of every run.

Example 14: Crosslinked Peptide Extraction from Linear Peptide Background

A peptide of the following form was synthesized using the building block bis(Fmoc-aminopropyl)glycine to cause a symmetric split in the peptide and by reacting the lysine of the peptide with the fluorophore NHS-Alexa 350 before Fmoc deprotection of the peptide's two N-termini. This gave us an example of a crosslink peptide that was fluorescent, so that we could quantitatively track its movement through our purification system.

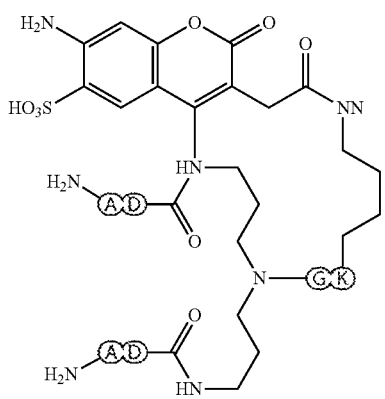

This peptide was mixed into a background of linear peptides made by reducing, iodoacetamide-alkylating and trypsinizing BSA. This allowed us to test our invention's ability to remove any absorbance coming from the background peptides while retaining the fluorescence signal from the crosslinked peptide.

A 200 µl solution containing 1 mg of background peptides plus our fluorescent crosslinked peptide was mixed with 60 µl of the hydroxamate N-tag stock from example 1 and 15 µl of the desthiobiotin N-tag stock from example 9. This caused each N-tag to be present at a 5.45-mM concentration. This solution was incubated at 37° C. for 6 hours to give the N-tags time to adhere to the N-termini.

The solution was then diluted into 3 ml of a 300-mM aqueous solution of carboxymethoxylamine to pacify any N-tags not properly adhered to N-termini.

The solution was then loaded onto our FPLC purification system and the automated program was run. This led to the crosslinked peptide eluting in a volume of 800 ul.

To this eluate was added 1 µl of a 300-mM solution of carboxymethoxylamine and the solution was heated to 67° C. for 5 hours to transfer the N-tags from the N-termini to the carboxymethoxylamine, thereby restoring the peptides to their unmodified state.

Finally, to this sample was neutralized by the addition of sodium phosphate at pH 8.0 and 75 µl of streptavidin resin. This resin was then removed by filtration. This removed stable N-tag oligomers that we have observed to form during the labeling of the N-termini.

Figure 17:
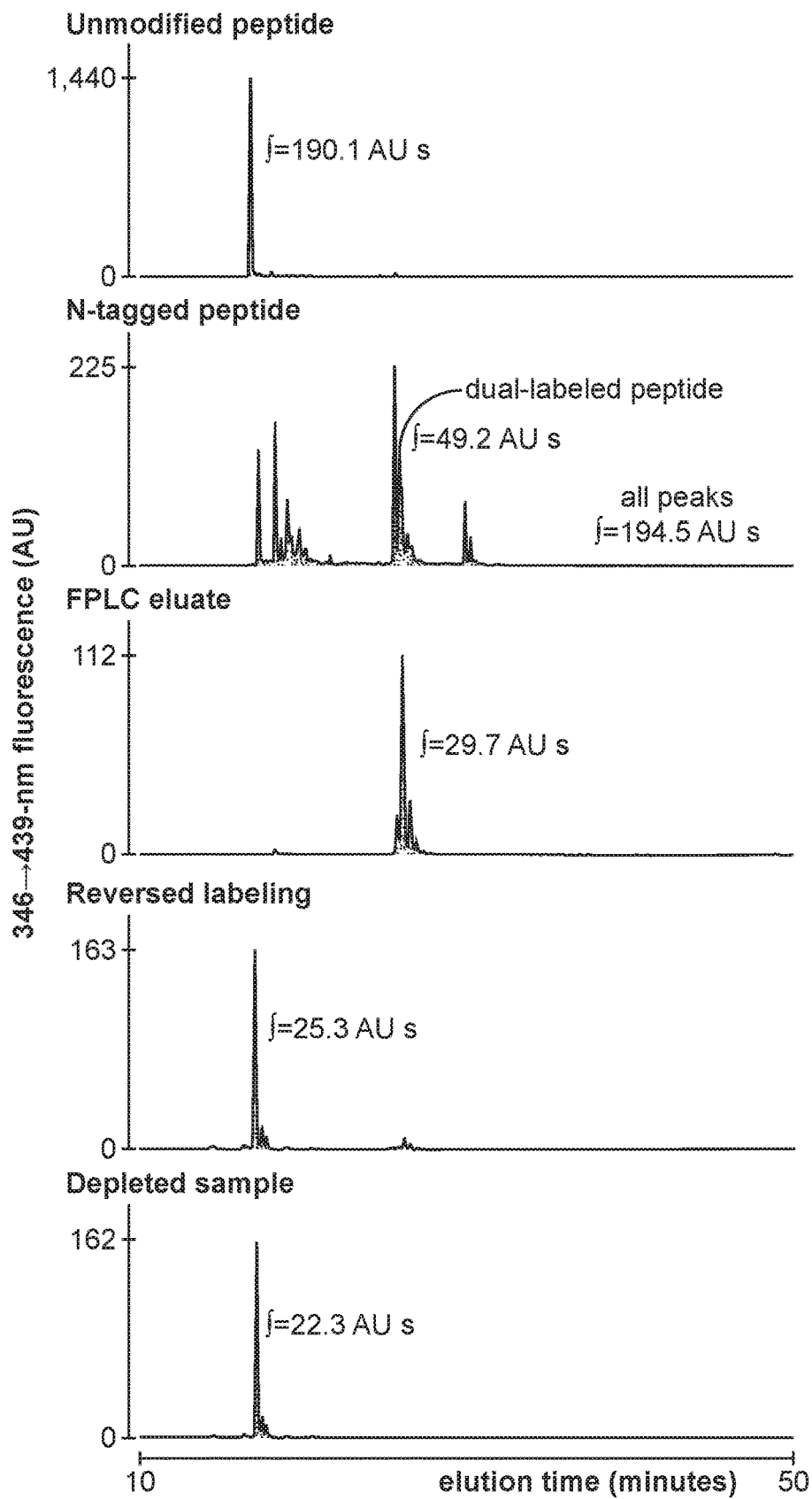
FIG. 17 illustrates the FPLC traces observed for purification procedure exemplified by example 14.

We ran this purification procedure repeatedly and aborted it at various steps to reveal what happened to the peptides (see, e.g., FIG. 17). Looking at the resulting fluorescence traces revealed that the labeling of the N-termini resulted in a variety of species, corresponding to all the labeling combinations possible. However, the FPLC only purified one of these, the dual-labeled specie containing both kinds of N-tags. In the end, the whole procedure had a yield of 11.7% for the crosslinked peptide.

Figure 18:
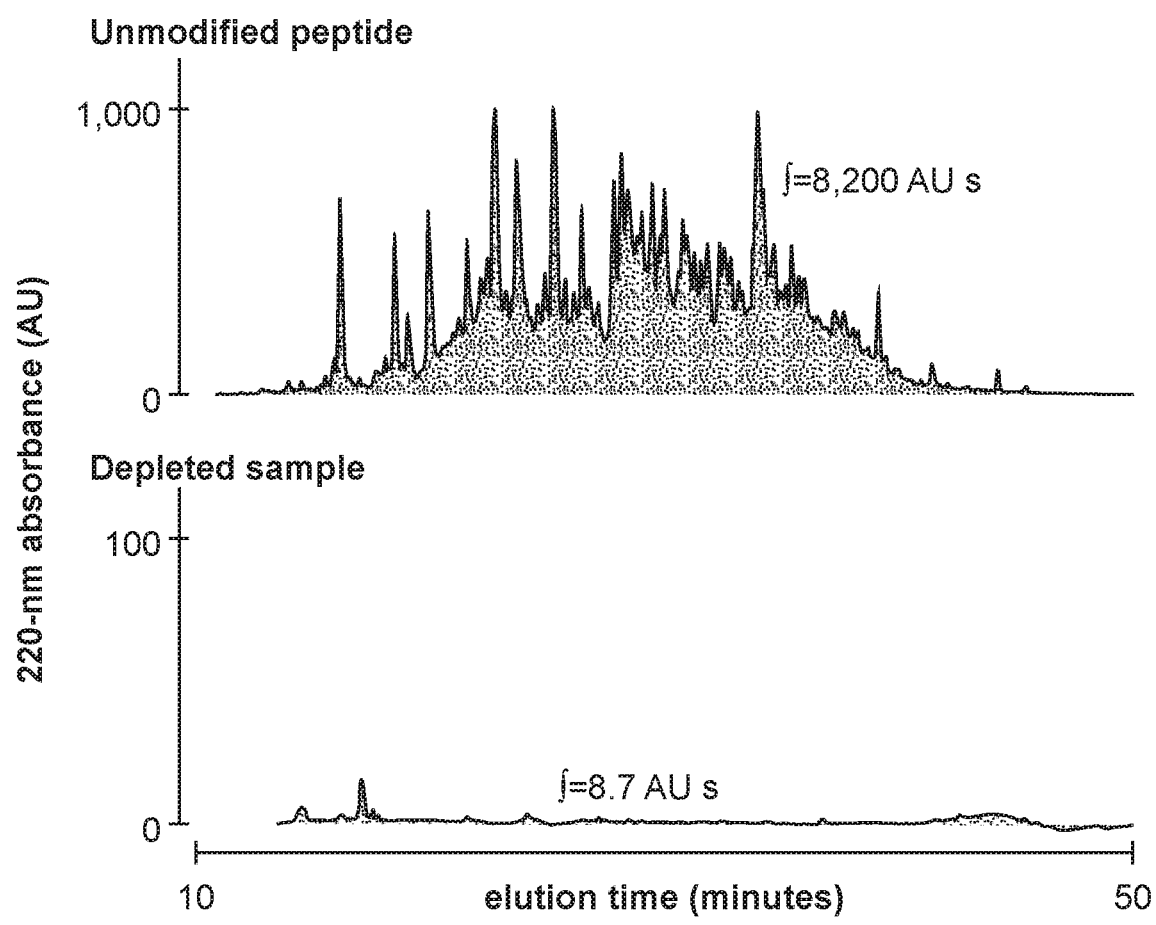
FIG. 18 illustrates the absorbance trace observed for purification procedure exemplified by example 14.

However, looking at the resulting absorbance traces revealed that only 0.106% of the absorbance signal survived our method (See e.g., FIG. 18).

Together, these two numbers mean that our method achieved a 110-fold enrichment ratio at a yield of 11.7%.

Example 15: Synthesis of a Chromatographic Column Designed for Separation of Peptides Tagged with a Single Kind of N-Tag We wanted to create a chromatographic medium on which molecules with a two hydroxamates would bind significantly better than molecules with a single hydroxamate. We reasoned that this could allow us to separate linear and crosslinked peptides after labeling them with only a single kind of N-tag.

For this purpose, we synthesized a novel IMAC column displaying the following interaction sites: ATTN. CWU: Shading has been verified to be removed.

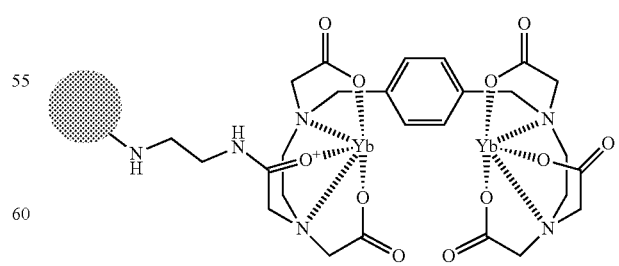

The reasoning here is that the colocalization of two hydroxamate binding sites would make double-labeled peptides bind much more tightly than single-labeled ones due to avidity.

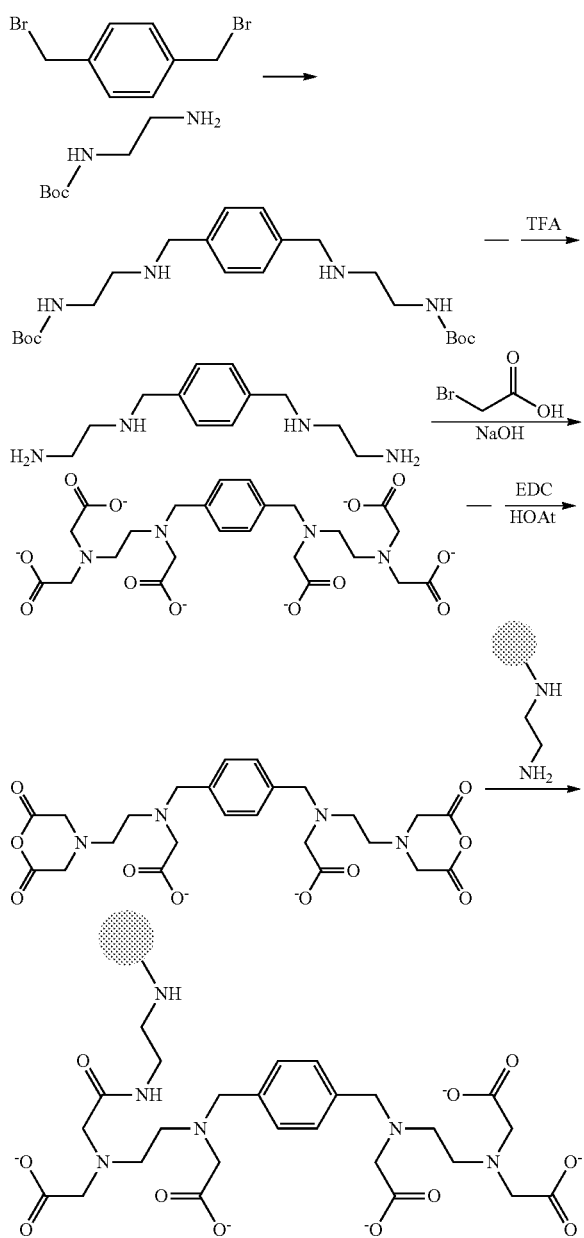

To synthesize this column, we reacted 511 mg of dibromoxylene with 613 µl of boc-ethylenediamine in 1.4 ml DIEA and 1.5 ml of tetrahydrofuran. This reaction was stirred for 12 hours at 60° C. It was then filtered to remove any solid precipitate and the solvent was rotavaped off.

The material was resuspended acid deprotected using trifluoroacetic acid. The solvent was then rotavaped off and the sample resuspended in water and washed thrice with dichloromethane. Finally, the water was rotavaped off.

The resulting molecule was resuspended in 5 ml of water with 1 ml of t-butyl bromoacetate. A 10-M solution of sodium hydroxide was slowly dripped into this reaction to keep its pH at about pH 7. The solvent was rotavaped off.

The resulting sample was reacted with EDC and HOAt to form anhydrides from the carboxylic acids.

0.5 ml of NHS-activated sepharose 4 fast flow resin from GE Healthcare was shaken with 5 ml of 10% ethylene diamine in methanol for 1 hour and then washed repeatedly with methanol to remove any free ethylene diamine.

This column was then shaken with the anhydride above to attach the chelator to the resin. The resin was then washed with sodium carbonate at pH 9.0 to hydrolyze any anhydrides still intact.

Finally, the column was loaded with the Yb(III) nitrate.

Figure 19:
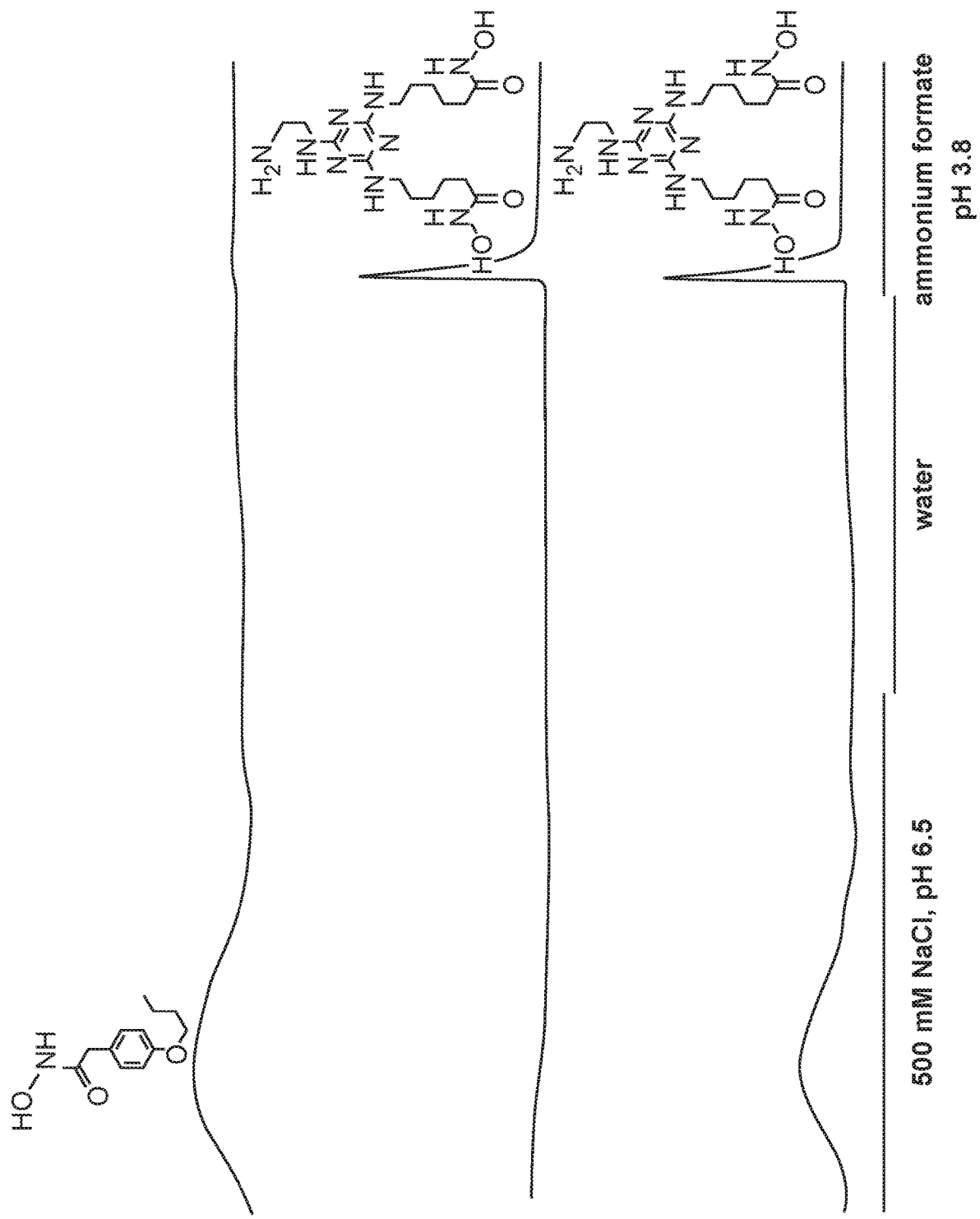
FIG. 19 illustrates the use of a chromatographic column designed for separation of peptides tagged with a single kind of N-tag.
Figure 20:
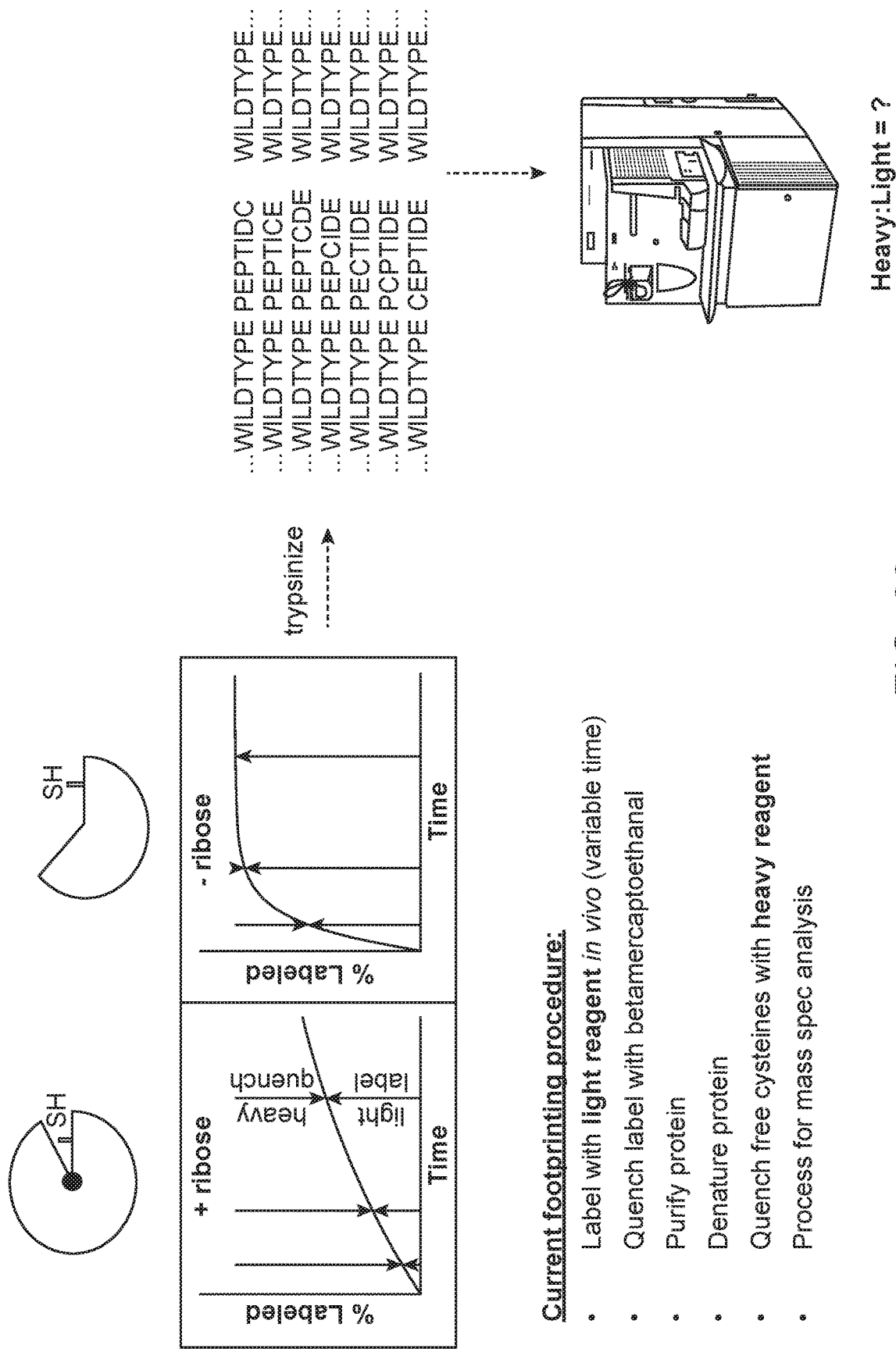
FIG. 20 illustrates a schematic for footprinting, demonstrating how solvent accessibility is encoded in a heavy:light ratio for analysis by mass spectrometry.

We ran two test molecules containing either a single or two hydroxamates on this column. FIG. 19 revealed that the single hydroxamate did not significantly bind the column while the double hydroxamate remained bound until it was eluted by lowering the pH of the buffer. This shows that the column synthesized has the ability to separate molecules depending on how many hydroxamates they contain, which will be applied to separate crosslinked and linear peptides depending on how many hydroxamate N-tags they have been tagged by.

Example 16: Development of Tools and Approaches for Mass Spectrometric Analysis of Shotgun Footprinting Cationic Gas-Phase Cleavable Cysteine Alkylating Agents Enable Precise Quantification of Heavy:Light Ratios Via Mass Spectrometry.

Quantification of mass spectrometric signals is most accurate when comparing species that are chemically identical but that differ in the number of heavy or light isotopes. However, we and others have observed that direct quantification of peptides labeled with isotope tags is made difficult by surrounding background ions, particularly if the labels differ in mass by only a single Dalton, as is typical for the small labeling reagents that are most useful for footprinting applications. To combat this barrier to good quantification, disclosed herein are labeling reagents that, after cleavage in the gas phase, produce reporter ions in a low-noise region of the mass spectrum, where the fragment ions can be more accurately quantified. Of note, existing gas-phase cleavable reagents designed for proteomics are prohibitively expensive on the scales required for footprinting. The reagents developed and disclosed herein have been demonstrated to be cost effective to prepare and generally more suitable for footprinting applications.

Figure 21:
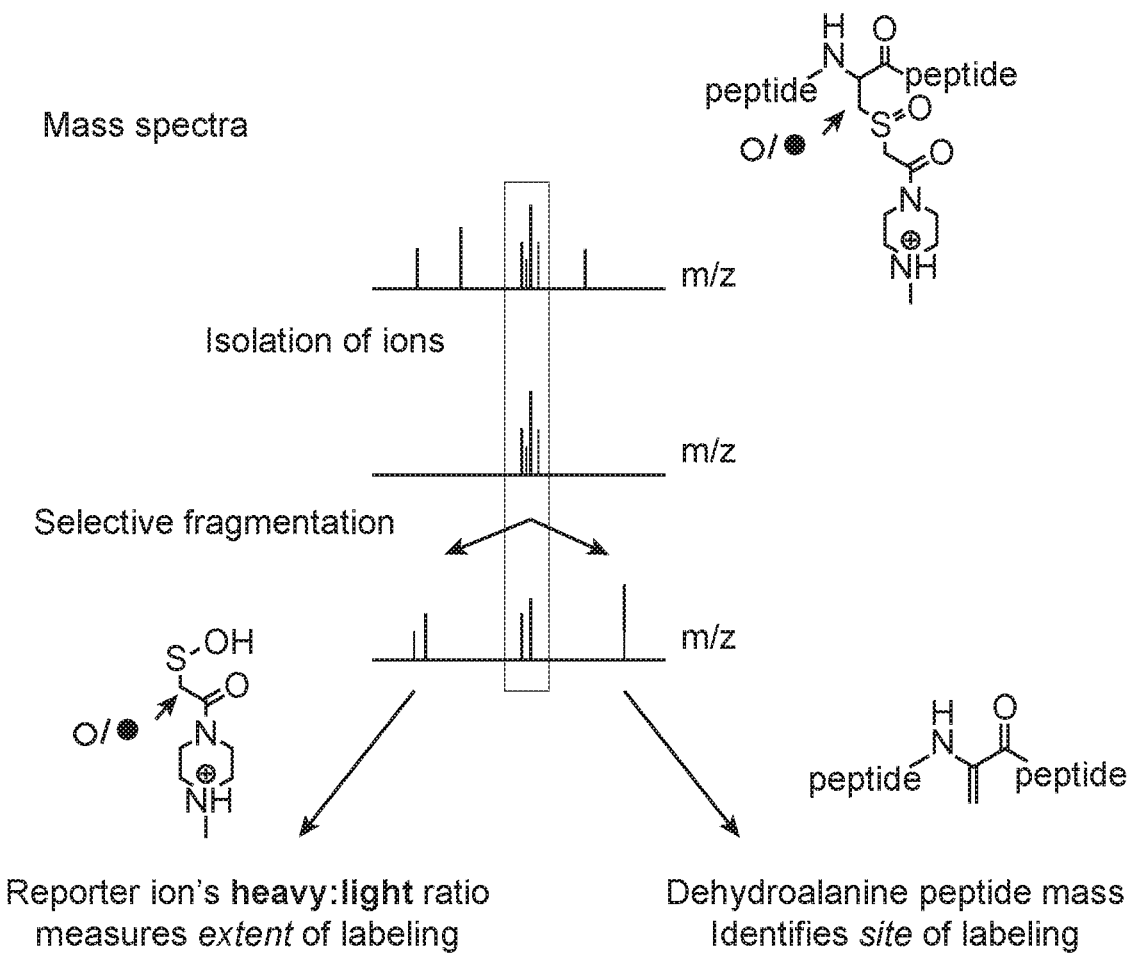
FIG. 21 illustrates a schematic demonstrating how gas-phase fragmentation of sulfoxide species enables quantification of reporter ion species in a low-noise region fo the mass spectrum.
Figure 22:
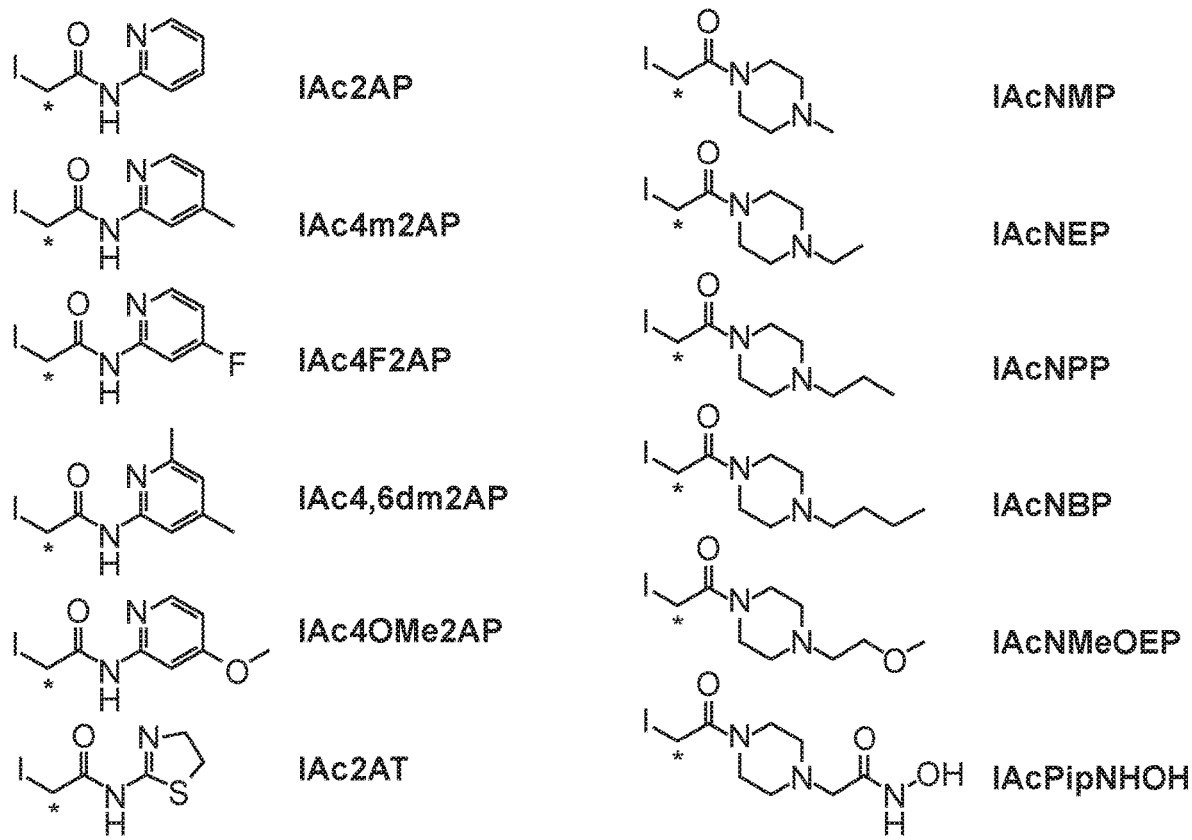
FIG. 22 illustrates the structures of exemplary cysteine-reactive footprinting reagents with mass tags for production of mass spectrometric reporter ions from sulfoxides.

The subject footprinting reagents satisfy several criteria. First, they irreversibly alkylate cysteine. For this purpose, the backbone of an exemplary label is the well-characterized cysteine alkylating agent iodoacetamide. Second, they produce detectable fragments in the gas phase. It has been observed that a sulfoxide species can, when activated with low collisional energy in the gas phase of a mass spectrometer, undergo a pericyclic rearrangement that produces a sulfenic acid fragment. By oxidizing any alkylated cysteine to the sulfoxide prior to LC-MS analysis production of similar fragments in the gas phase was enabled, producing a reporter ion and leaving behind a dehydroalanine in place of the alkylated cysteine in the peptide chain (FIG. 21). For these sulfenic acid reporter fragments to be directly visible in the mass spectrometer, they need to be charged. Thus, exemplary compounds were designed containing piperazinyl groups that would be protonated in the low pH of the mass spectrometer. Lastly, the reagents were easily synthesized in forms with both heavy and light isotopes, so the subject syntheses included the use of chloroacetyl chloride, which is commercially available with a heavy $^{13}C$ label as well as the standard $^{12}C$ (e.g. Scheme 1 and Scheme 2). We designed and synthesized twelve versions of these cationic gas-phase cleavable cysteine-alkylating agents with distinct masses (FIG. 22).

Figure 23:
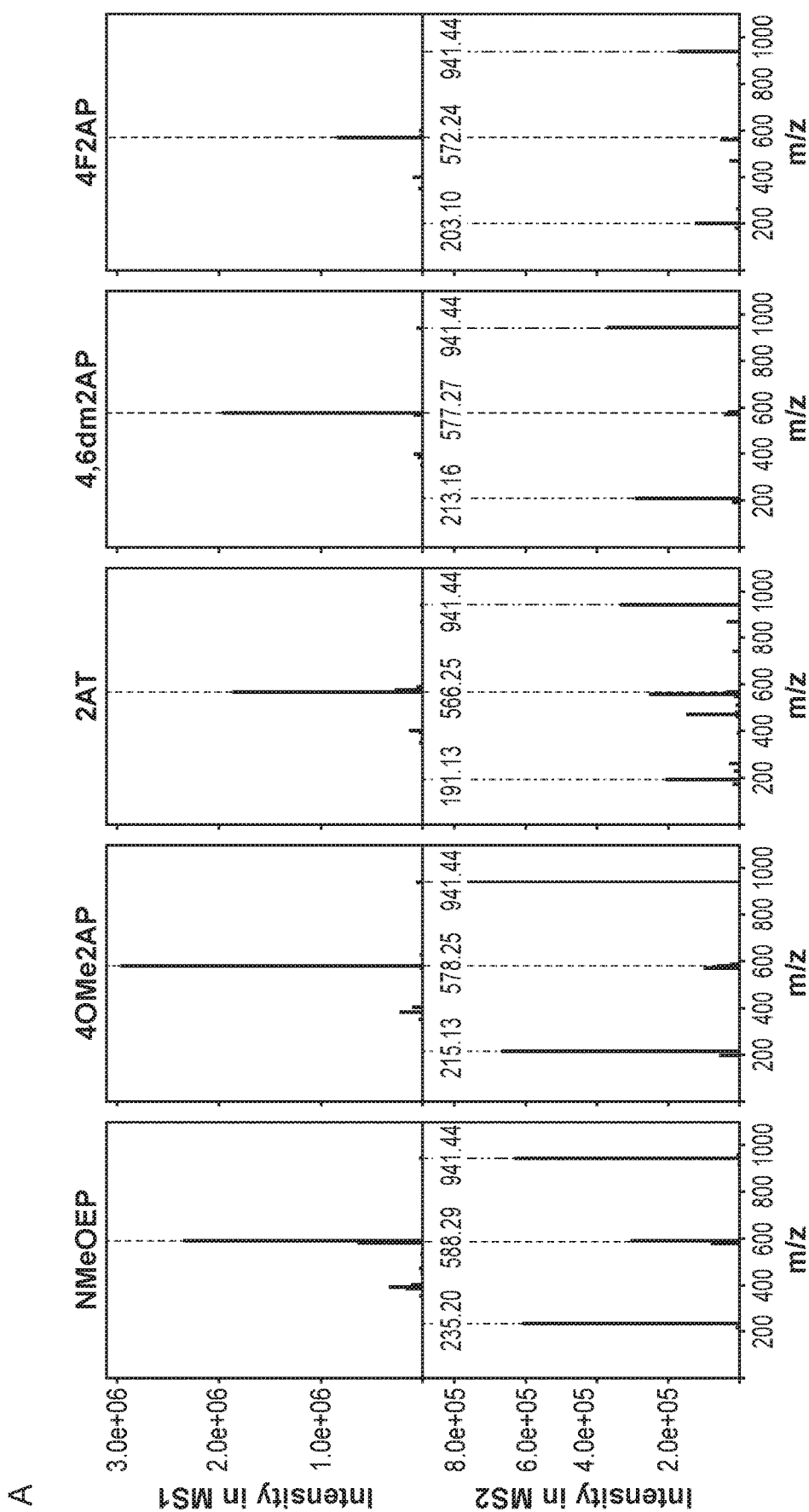
FIG. 23 shows the production of reporter ions from footprinting labels.
Figure 23:
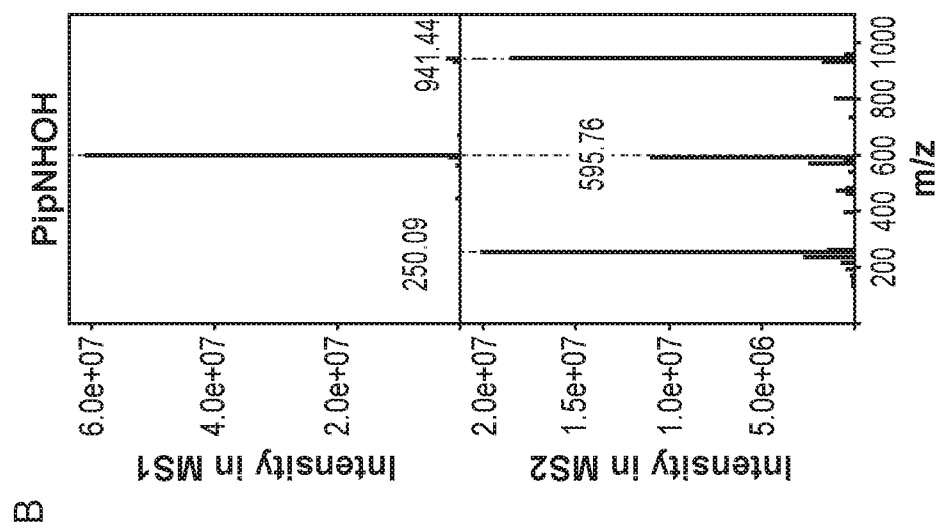

Gratifyingly, these reagents were observed produce measurable reporter ions in the gas phase, as we observed in the test case of a cysteine-containing peptide alkylated with the reagents and oxidized to the sulfoxide prior to LC-MS injection (FIG. 23).

FIG. 23 illustrates production of reporter ions from footprinting labels. The peptide NFEACTYK (SEQ ID NO: 2) was labeled with multiple (A) or one (B) footprinting labels, oxidized to the sulfoxide, and analyzed by mass spectrometry with low energy fragmentation. MS1 spectra of the labeled peptides are displayed in the upper rows; MS2 spectra of the fragmentation events are represented in the lower rows. Red highlights indicate the mass of the labeled peptide, blue highlights indicate the masses of the reporter ions resulting from fragmentation, and green highlights indicate the masses of the dehydroalanine peptide resulting from fragmentation.

To assess our ability to quantify heavy:light ratios with these reagents, we compared expected heavy:light ratios with observed heavy:light ratios in a preparation of the Ribose Binding Protein (RBP) that contained ten single cysteine mutations, allowing us to make these measurements in an excess of wild-type, unlabeled peptide that mimics a true footprinting experiment. We labeled the RBP library with each of three reagents (IAcNMP, IAcNEP, and IAcPipNHOH) in heavy or light form, pooled the three heavy samples and the three light samples, and then mixed the heavy and light pools together in ratios ranging from 1% heavy to 99% heavy. Each of the three reagents enabled robust quantification of each of the ten cysteine-containing peptides (FIG. 24).

Figures 24, 25:
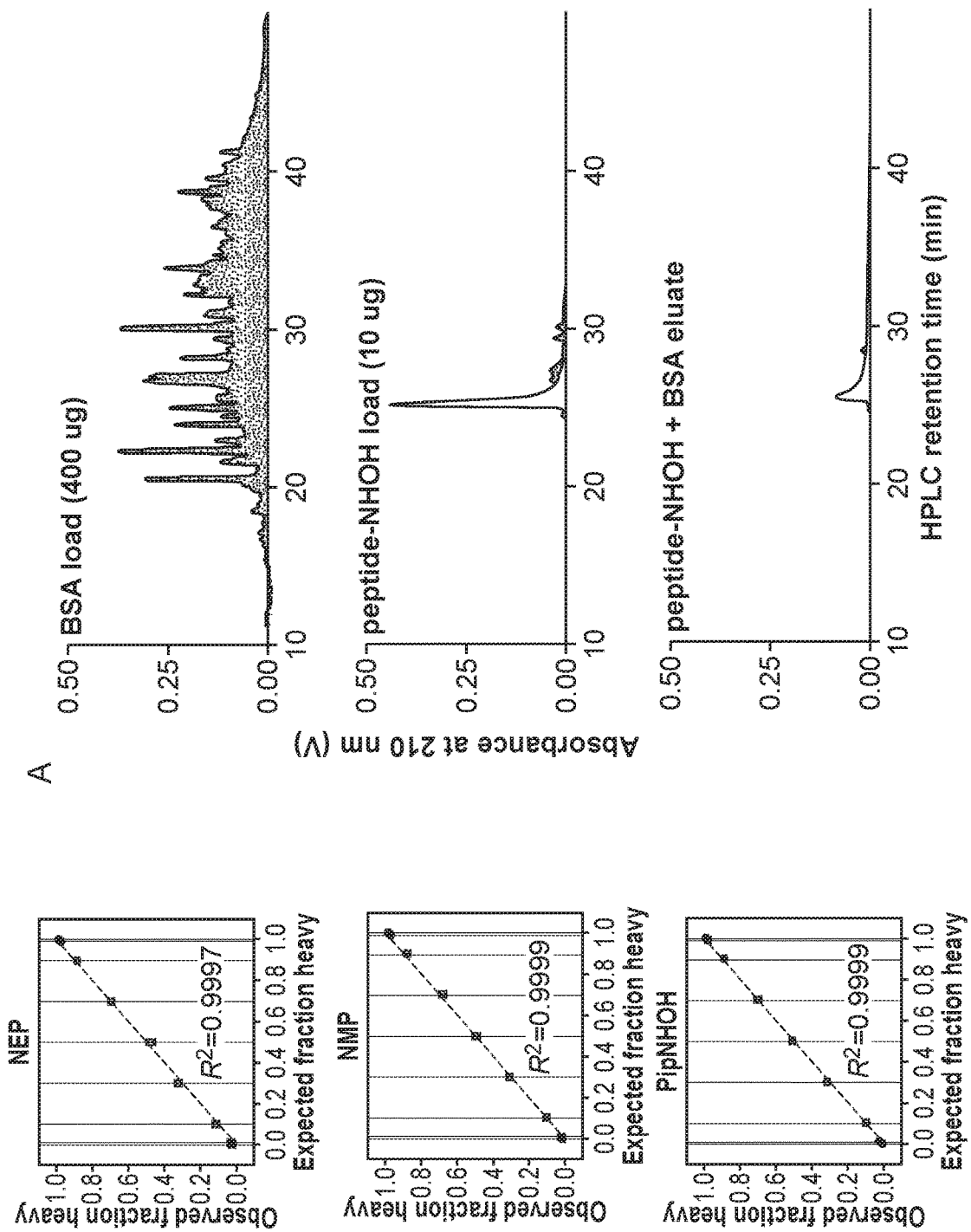
FIG. 24 shows linear quantification of reporter ions in ten single-cysteine mutants of RBP
FIG. 25 illustrates that introduction of a compact affinity tag into the cysteine-labeling agent increases the fractional abundance of probe-site peptides, improving coverage and quantification in complex samples.
Figure 25:
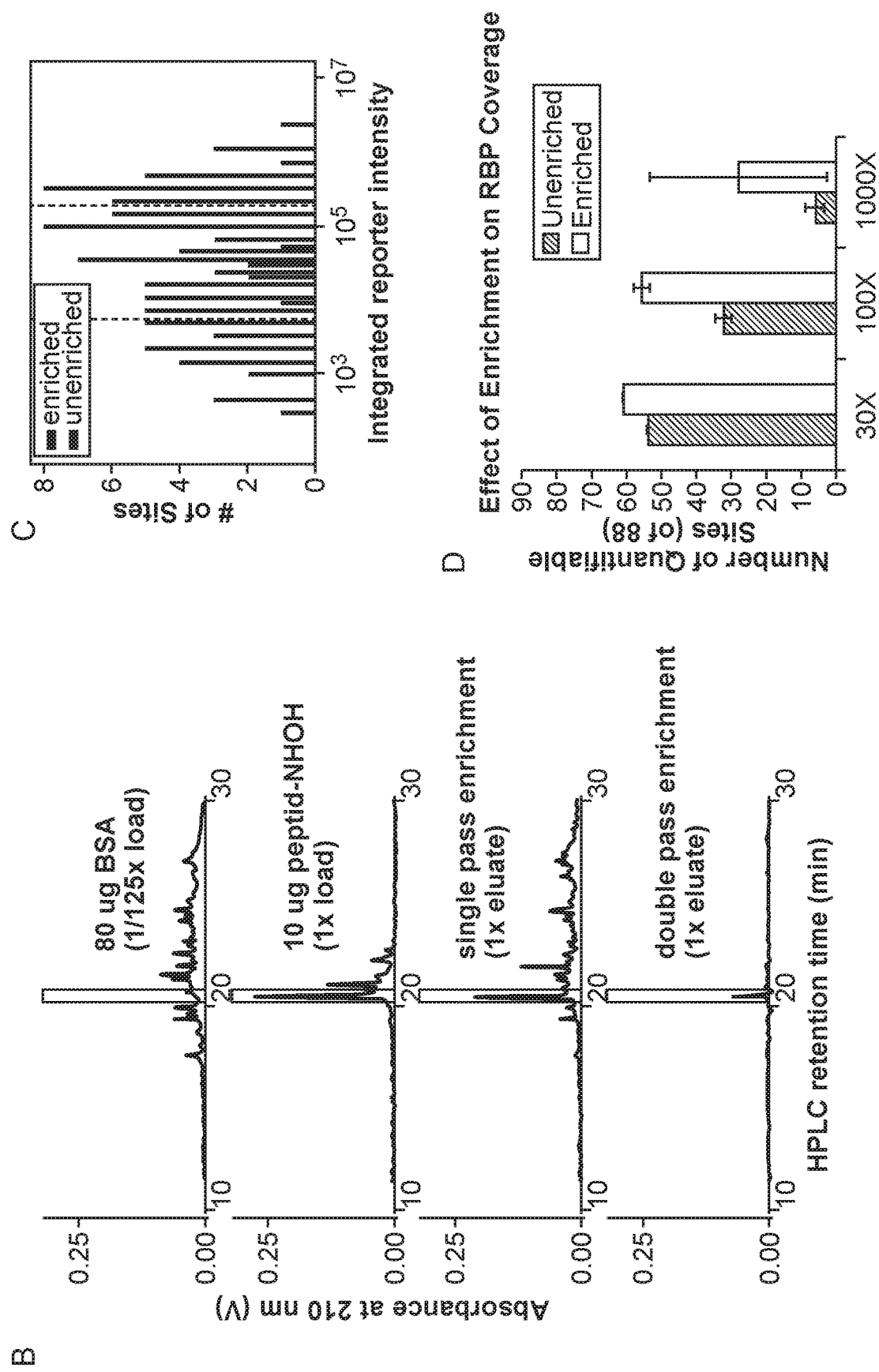

FIG. 24 shows the linear quantification of reporter ions in ten single-cysteine mutants of RBP. Denatured protein was alkylated with heavy or light alkylating agents (NMP, NEP, and PipNHOH) and then mixed in known ratios (vertical lines). Each point represents the mean fraction heavy observed in reporter ions from up to ten cysteine sites, corrected for the natural abundance of heavy isotopes and for the presence of contaminating alkylated species. Error bars represent standard deviations among measurements on different peptides. The dashed line indicates the values expected if the observed values exactly match the expected values.

Expedient Preparation of Shotgun Probe Libraries Enables Interrogation of a Protein of Interest.

To facilitate footprinting measurements across the whole surface of a protein of interest, we developed a shotgun approach to single-cysteine mutant library preparation. Our current library interrogates 116 of the 271 residues of RBP, prioritizing residues located in the mouth or hinge region of RBP or sites that are at least 30% exposed to solvent in either the ribose-bound or the apo structure.

In the footprinting workflow, we generated mutants and pool them for footprinting analysis, bypassing the biggest bottleneck in library preparation—the relatively laborious and expensive process of isolating and sequencing clonally pure members of the library—because we can take advantage of the mass spectrometer's ability to identify peptides whose residues have been mutated to cysteine. To facilitate rapid preparation of this library, we adapted the efficient and high-throughput Pfunkel site-directed mutagenesis method, allowing us to generate libraries containing hundreds of single cysteine mutants quickly (in 2 days) and cost-effectively (at $5 per site). Aside from its efficiency, Pfunkel mutagenesis is well suited to our approach because its main failure mode is production of a wild-type plasmid rather than a mutant plasmid. Unlike some methods of protein analysis where contamination with wild-type protein is deleterious, we employ mass spectrometric identification of peptides and are able to exclude wild-type protein from our analysis.

To test whether our modified Pfunkel mutagenesis method would yield an appropriate shotgun probe library, we isolated and sequenced 173 Pfunkel transformants. Of these, 140 contained the correct cysteine mutation, 26 were wild-type, 2 contained unintended silent mutation, and 5 contained unintended mutations that are likely to be expressed. Thus, 97% of the transformants produce wild-type protein or protein with the desired mutation. We regard this as an acceptable error rate for this shotgun approach, where the reduction in labor and expense associated with pooling transformants prior to clonal isolation enables rapid interrogation of a large percentage of the sites in a protein of interest.

A Compact Affinity Tag Increases Footprinting Sensitivity and Coverage.

Analysis of footprinted proteins by mass spectrometry is complicated by the fact that the informative peptides are significantly outnumbered by uninformative wild-type peptides that saturate the instrument, leading to poor detection and quantification of informative peptides. To overcome this hurdle, we sought to develop a method to enrich the informative peptides, which contain an alkylated cysteine. We synthesized an alkylating agent containing a hydroxamate moiety, which binds selectively to ytterbium, enabling IMAC enrichment, while also satisfying the previously described criteria for producing reporter ions in the gas-phase. Notably, this hydroxamate affinity label is compact, adding just 60 Da to the footprinting reagent and keeping the van der Waals radius of the footprinting reagent small.

To test the enrichment abilities of this affinity tag, we alkylated a synthetic cysteine-containing peptide with the hydroxamate label. We mixed this tagged peptide with a 1000-fold excess of tryptic peptides prepared from Bovine Serum Albumin, mimicking the abundance of a footprinted probe site in a 10,000 amino acid protein of interest. After loading the mixture onto an Yb-NTA column at pH 9, we eluted bound species at pH 3.75. A single pass over the column resulted in an 86-fold improvement in fractional abundance of an affinity-tagged synthetic peptide in a complex mixture of tryptic peptides, with a 70% yield for the peptide of interest. Subjecting enriched samples to a second enrichment column improved the fractional abundance of the affinity-tagged peptide >300-fold (FIG. 25).

FIG. 25 illustrates that introduction of a compact affinity tag into the cysteine-labeling agent increases the fractional abundance of probe-site peptides, improving coverage and quantification in complex samples. (A) HPLC chromatograms showing 10 µg of hydroxamate-labeled synthetic peptide and 400 ug tryptic BSA peptides before and after enrichment by Yb-NTA column. (B) HPLC chromatograms showing enrichment of 10 µg of hydroxamate-labeled synthetic peptide from 10,000 ug tryptic BSA peptides, by means of a single pass over a Yb-NTA column or by two passes over the column. (C) Improvement in mass spectrometric intensity of reporter ions from hydroxamate labeling of an RBP protein library with 88 single cysteine mutants in response to enrichment from wild-type RBP tryptic. Dashed lines indicate median reporter intensities. (D) Coverage of single-cysteine peptides quantified by mass spectrometry with and without enrichment. Hydroxamate-labeled cysteine-containing peptides from an RBP library of 88 cysteine mutants were measured in—or enriched from—a background of wildtype RBP peptides (in ~30-fold excess)

supplemented with tryptic BSA peptides for resulting backgrounds of 100-fold excess or 1000-fold excess of uninformative, unlabeled peptides.

To test whether enrichment improved our ability to measure footprinted sites, we labeled an RBP library containing 88 single cysteine mutants with the affinity labeled and analyzed them by mass spectrometer with and without enrichment. Because tryptic peptides are on average 10 amino acids long and RBP is 271 amino acids long and trypsinization produces a single affinity-tagged peptide per protein molecule, we expect unlabeled peptides to outnumber affinity-tagged peptides 27 fold. Gratifyingly, enrichment improves the intensity of reporter ions from labeled peptides 26 fold, while slightly improving the detected percentage of interrogated sites from 66% to 70%. Many proteins of interest are much larger than the 271 amino acid RBP, presenting a more challenging hurdle for enrichment. To mimic labeling a protein sample with 10,000 amino acids, we mixed affinity-tagged RBP library peptides with a 1000-fold excess of tryptic BSA peptides. Without enrichment, only 2-10% of the 88 RBP sites interrogated are measurable by mass spectrometry. However, enrichment boosts this coverage to 52%, suggesting that hydroxamate-mediated enrichment will improve the utility of footprinting for complex protein samples.

Example 17: Evaluating the Ability of In Vivo Footprinting to Measure Conformational Change in the Model Protein Ribose Binding Protein (RBP)

Footprinting of RBP in Cells Recapitulates Footprinting Measurements In Vitro.

Most footprinting has been conducted in vitro, on purified protein in a controlled environment. However, in vivo footprinting takes place in a more complex environment with a large population of potentially competing biomolecules not found in samples of purified protein. We assess whether footprinting in the complex cellular environment recapitulates results obtained in the simpler case of purified protein in vitro and whether our labeling reagents can easily access cytosolic proteins. We footprinted an RBP library in 3 different environments (in vitro purified protein, within the periplasm, and within the cytoplasm) and compared the measured rates, finding that they are consistent in the three environments, with a dynamic range of at least three orders of magnitude in the rates. (FIG. 26)

Figure 26:
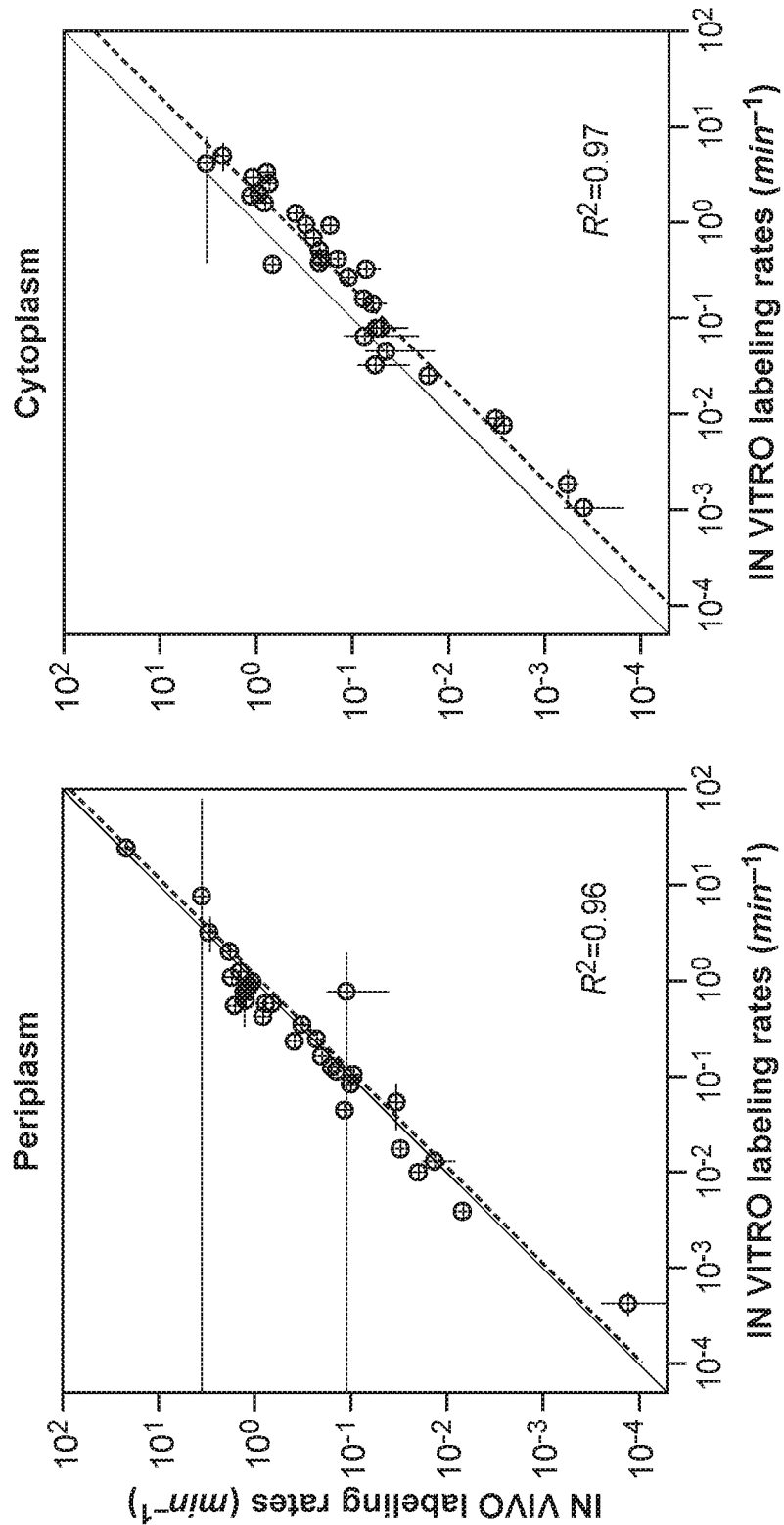
FIG. 26 illustrates correspondence between labeling rates in different environments

FIG. 26 shows correspondence between labeling rates in different environments. Footprinting rates were determined using heavy and light PipNHOH labels for an RBP cysteine library on protein expressed in the bacterial periplasm, on protein expressed in the bacterial cytoplasm, and in vitro on protein purified by osmotic shock from the periplasm. Each point represents the footprinting rates at a single cysteine site. Error bars represent the standard deviation of the fitted exponential rate parameter. The gray line indicates the values expected if the in vivo rates exactly match the in vitro rates. The blue dashed line represents the linear fit to the data. $R^2$ indicates the Pearson correlation coefficient for the logarithmically transformed rates.

In-Cell Footprinting Identifies a Dynamic Protein Interface.

We sought to determine whether in-cell footprinting can identify regions of RBP that are conformationally sensitive to the binding of ribose. We used footprinting to determine labeling rate in the presence and absence of ribose in the periplasm for two different RBP libraries, one biased toward the mouth and hinge region of the protein and one distributed across the surface of the protein. Footprinting identified 15 RBP sites whose solvent exposure changed in response to ribose binding and 23 sites that were unchanged. The sites that displayed differential footprinting in response to ribose are located in the mouth and hinge regions of RBP, while sites with no response are distributed throughout. (FIG. 27)

Figure 27:
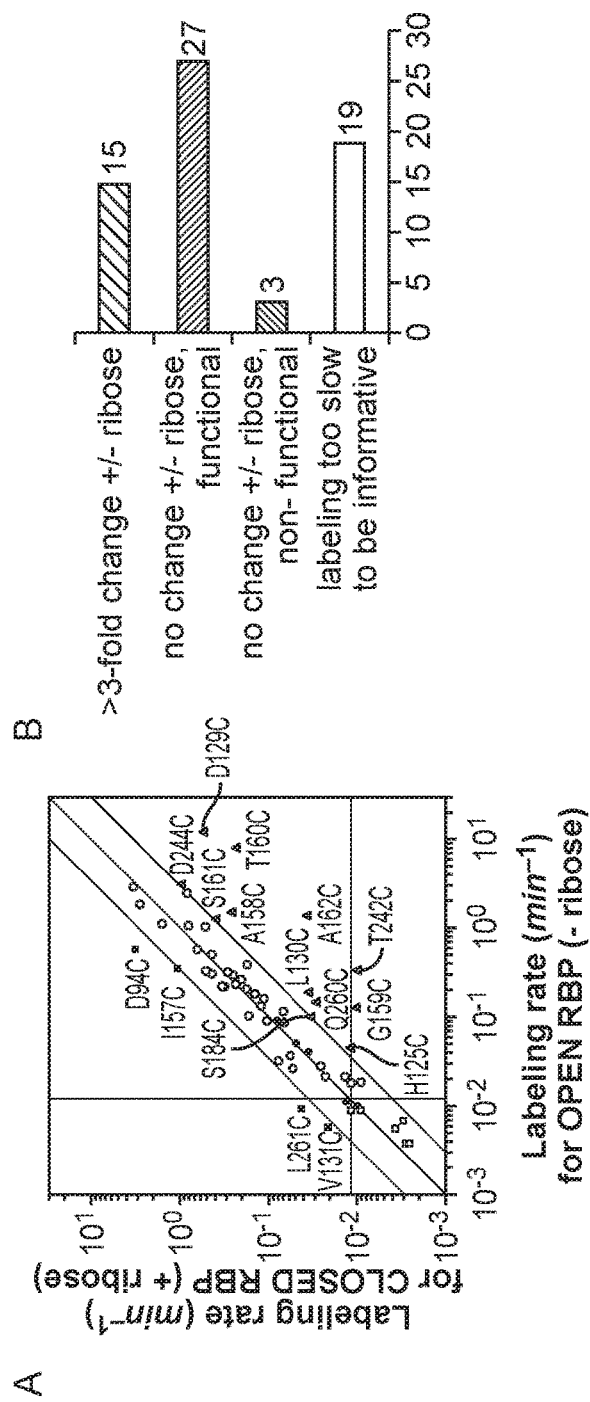
FIG. 27 illustrates that in-cell footprinting identifies a dynamic protein-protein interface.
Figure 27:
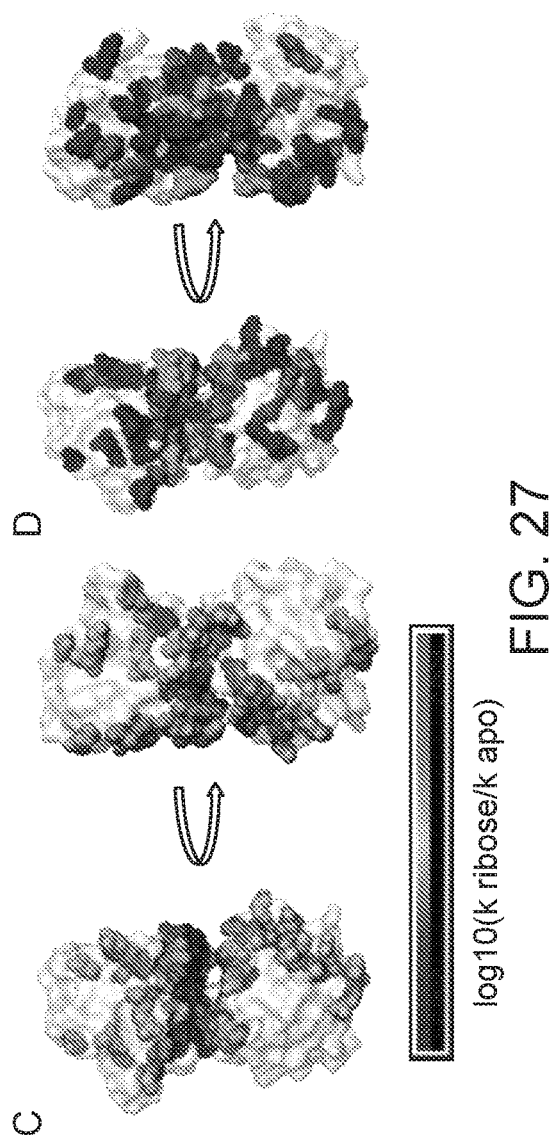

FIG. 27 shows in-cell footprinting identifies a dynamic protein-protein interface. (A) Correspondence between labeling rate constants measured in the bacterial periplasm in the presence or absence of 5 mM ribose. Horizontal and vertical lines represent upper and lower limits for confident determination of rates in these experiments. Diagonal lines indicate rates in the closed state that are 3×, 1×, or ⅓× as fast as rates in the closed states. (B) Categories of footprinting data obtained for 64 sites in RBP. (C) Location of cysteine sites for which footprinting was informative. Sites showing less than 3-fold change are colored gray. Sites showing more than a 3-fold change are colored by the fold change in labeling rates upon addition of ribose. (D) Location of residues for which footprinting data was obtained, colored by the data categories described in (B).

Example 18: Synthesis of Compound (1)

Figure 28:
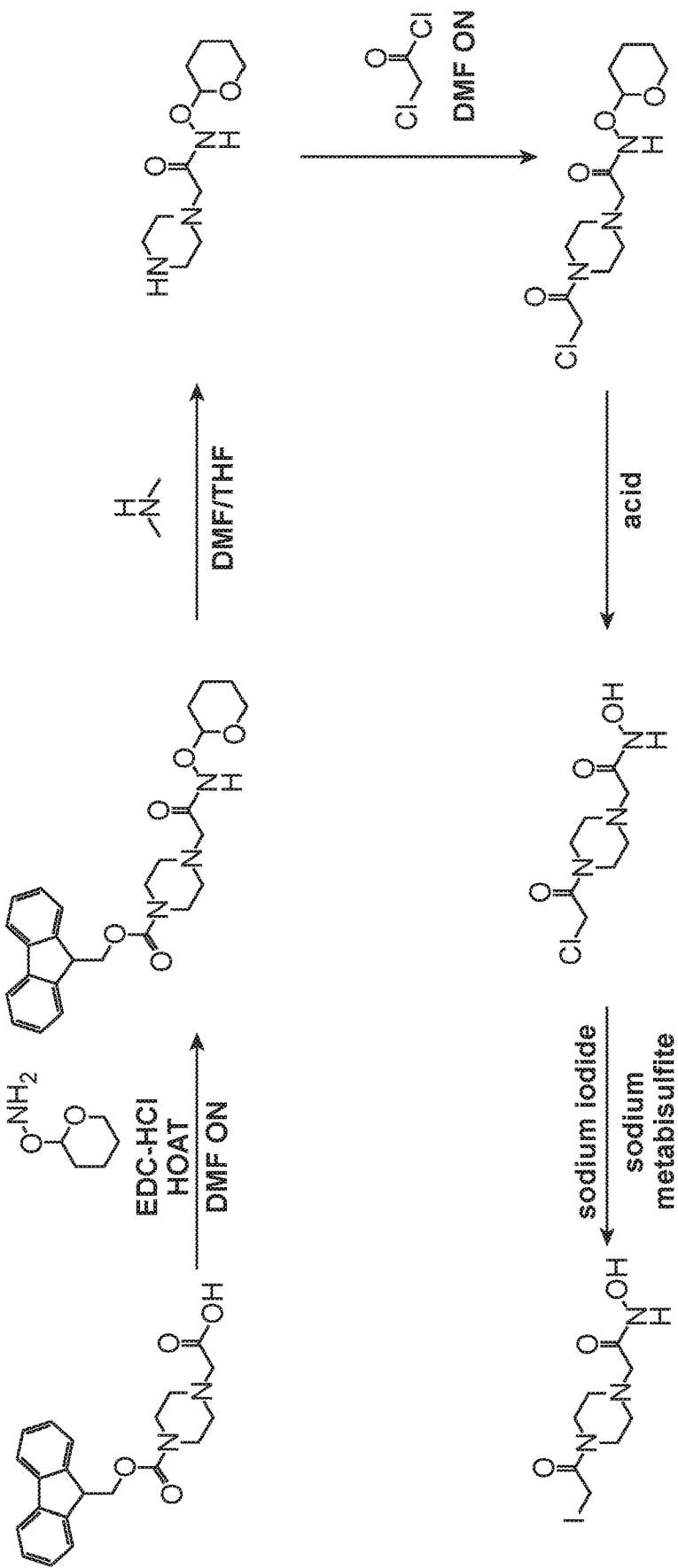
FIG. 28 illustrates the synthetic scheme for the synthesis of exemplary compound (1).

FIG. 28 sets out the synthetic scheme for the synthesis of exemplary compound (1). The procedure is as follows:

FmocPipCOOH (1.831 g, 5 mmol) was dissolved in 483 mL anhydrous dimethylformamide, to which was added EDC-HCl (5.788 g, 30 mmol), THP-OHNH (893.5 mg, 7.5 mmol), and 16.67 mL 0.6 M HOAT in dimethylformamide. The mixture was stirred at room temperature overnight, then dried by rotary evaporation. The product was resuspended in 200 mL dichloromethane and extracted against 200 mL water; the organic phase was collected, dried by rotary evaporation, and resuspended in 10 mL anhydrous dimethylformamide. The product's Fmoc protective group was removed by stirring with 10 mL 2 M dimethylamine in tetrahydrofuran for 6 hours. The product was dried by rotary evaporation, resuspended in water, extracted against ethyl-acetate, and the aqueous phase was dried by rotary evaporation. The product was resuspended in 5.88 mL anhydrous dimethylformamide and split in half into two separate vials. While each vial was stirring on ice, chloroacetylchloride (93.5 μL, 1.176 mmol) was added dropwise to one vial and chloroacetylchloride-2-$^{13}$C (94.3 μL, 1.176 mmol) was added dropwise to the other vial. After addition, the mixtures were stirred at room temperature for 9 hours. The products were dried by rotary evaporation and resuspended in 11.18 mL of a solution of sodium bisulfite (1 mg/mL) in methanol. To this was added 1.76 mL of a solution of sodium iodide (100 mg/mL) in methanol. The mixtures were stirred at room temperature overnight. The products were dried by rotary evaporation and resuspended in 900 μL water to precipitate molecular iodine. The products were centrifuged for 2 min at 16000 g. The supernatant was aspirated, chilled on ice, and again centrifuged for 2 min at 16000 g. The resulting supernatant was stored at −20° C.

Figure 29:
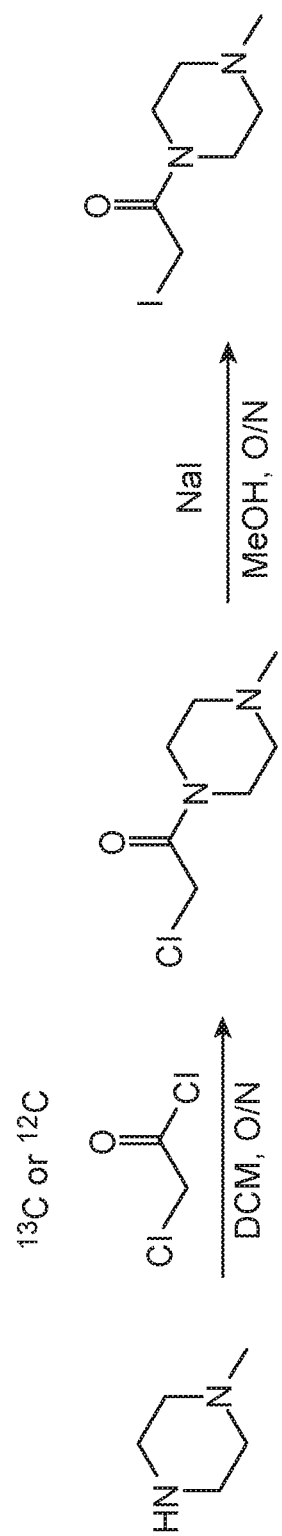
FIG. 29 illustrates the synthetic scheme for the synthesis of exemplary compound (8).

FIG. 29 sets out the synthetic scheme for the synthesis of compound (8). This same procedure is used for all other labels described in FIG. 22, using the appropriate amine in place of N-methylpiperazine, with the exception of Compound 1, which is described in Scheme 1.

Example 19: Synthesis of Aziethyl Chloride

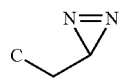

A mixture of 23.5 ml of 45% 2-chloroethanal in water and 27.7 ml of t-octylamine was stirred in an ice-water bath for 2 minutes and then centrifuged to induce phase separation. The upper phase containing an imine intermediate was isolated.

The imine was dissolved in 152 ml of methanol and 54 ml of triethylamine. 27.2 g of hydroxylamine-O-sulfonic acid dissolved in 136 ml of methanol was added dropwise. The reaction was stirred in an ice-water bath for 1 hour. The solvent was rotavaped off and the residue dissolved in 600 ml of ether. This was washed with aqueous Tris at pH 7.4 and water. The ether was rotavaped off to yield 24.2 mg of a diaziridine intermediate.

Figure 30:
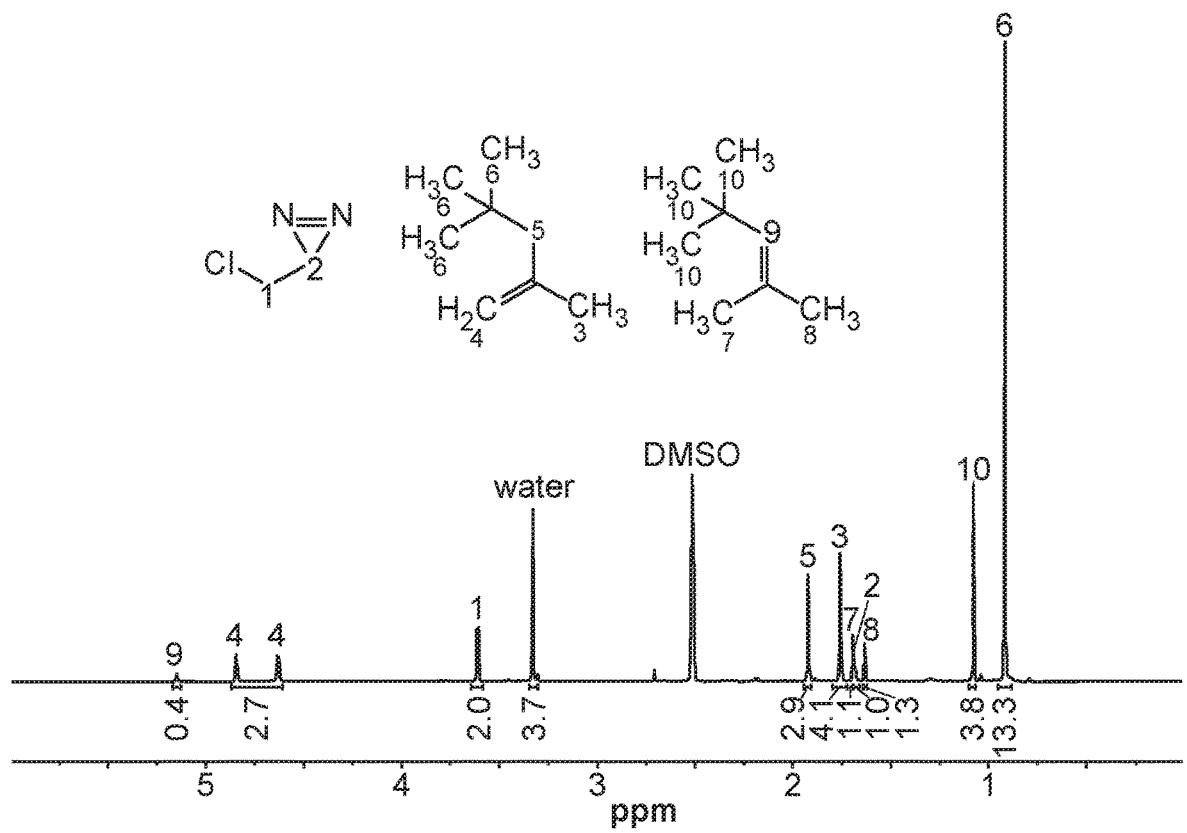
FIG. 30 provides a $^1$H-NMR spectrum in deuterated DMSO of a mixture of aziethyl chloride and t-octylamine-derived alkenes in the collection flask of Example 19 (e.g., as described herein).

6 g of the diaziridine was added to a two-necked flask with 6.8 g of tributylamine. An addition funnel was attached to one neck, a distilling head and distillate collection flask to the other. The collection flask was cooled on liquid nitrogen. The distilling head's recondensation tube was cooled by a flow of −60-° C. isopropanol. A vacuum pump kept the setup at 2 mbar of pressure. 5.2 g of N-bromosuccinimide dissolved in 17 ml of NMP was added dropwise via the addition funnel. This produced a 1.53 g mixture of aziethyl chloride and t-octylamine-derived alkenes in the collection flask, as verified by $^1$H-NMR in deuterated DMSO (FIG. 30).

The aziethyl chloride-containing mixture was used without removal of these alkene side products.

Example 20: Synthesis of Isoazipropanol

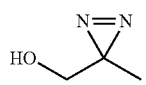

30 ml of hydroxyacetone, 300 ml of methanol and 78 ml of liquid ammonia were added to a flask cooled in a dry ice-isopropanol bath. 29.7 g of hydroxylamine-O-sulfonic acid in 300 ml of methanol was added dropwise. The mixture slowly reached room temperature over 14 hours. The white precipitate was filtered away and the methanol rotavaped off to yield a diaziridine intermediate.

Figure 31:
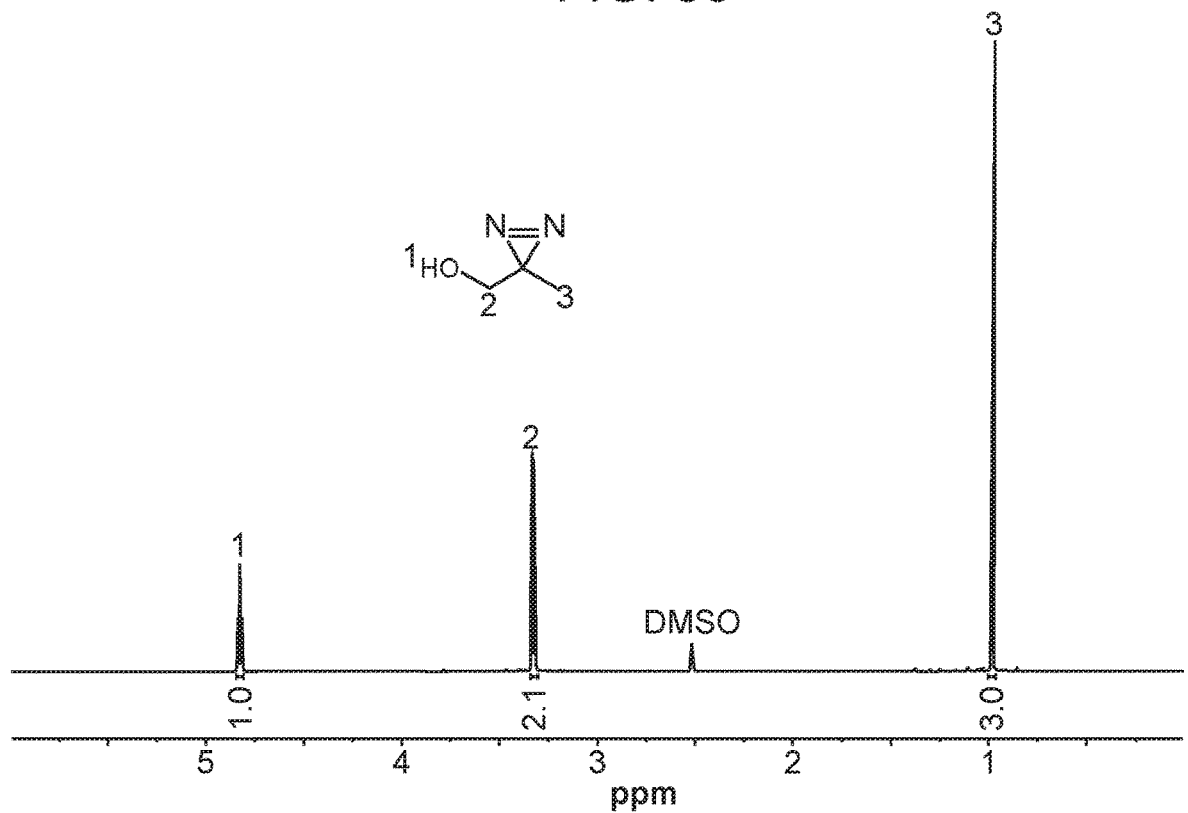
FIG. 31 provides a $^1$H-NMR spectrum in deuterated DMSO of isoazipropanol, Example 20 (e.g., as described herein).

The diaziridine was dissolved in 270 ml of ether, 39 ml of water and 95 ml of triethylamine. Into this was dripped a 10% ethereous solution of iodine until the solution no longer quenched the iodine's color. The solution was washed with 1-M hydrochloric acid, 20% sodium thiosulphate and aqueous sodium bicarbonate. The ether was rotavaped off to yield 4.18 g of isoazipropanol, as verified by 1H-NMR in deuterated DMSO (FIG. 31).

Example 21: Synthesis of Isoazipropyl Mesylate

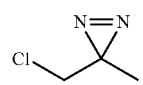

Figure 32:
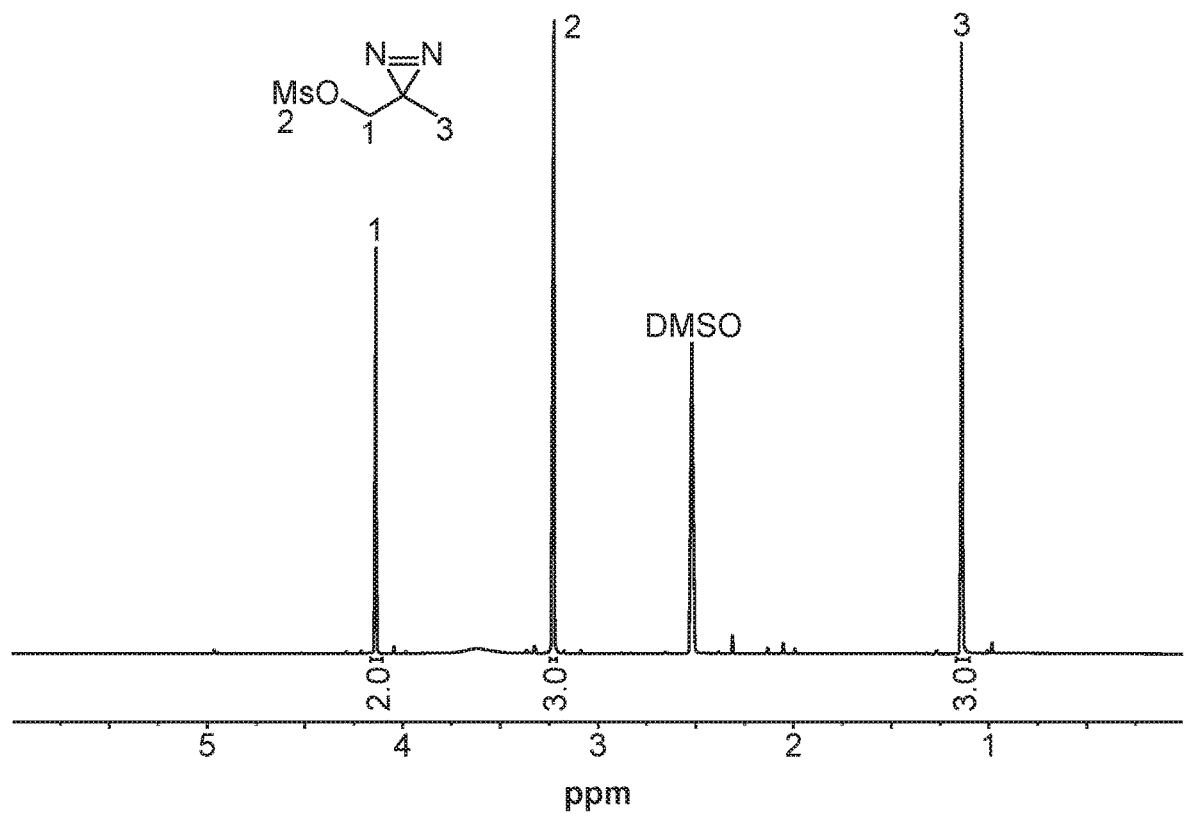
FIG. 32 provides a $^1$H-NMR spectrum in deuterated DMSO of isoazipropyl mesylate, Example 21 (e.g., as described herein).

1.5 g isoazipropanol, 60 ml of ether, 7.3 ml of triethylamine and 10.6 mg of DMAP were stirred in a flask in an ice-water bath. Into this was dripped 2 ml of mesyl chloride dissolved in 15 ml of ether. After 20 minutes, 3 ml of water were added. After 10 minutes, the solution was washed with aqueous citric acid, water, aqueous sodium bicarbonate and water. This produced 2.7 g of isoazipropyl mesylate, as verified by 1H-NMR in deuterated DMSO (FIG. 32).

Example 22: Synthesis of Azipropanol

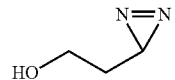

250 μl of 3,3-diethoxypropan-1-ol and 8 mg of tosylic acid was dissolved in 7.5 ml of acetone and 628 μl of water. This was heated to 65° C. for 30 minutes to liberate the aldehyde.

The reaction was cooled to room temperature and 252 μl of t-octylamine was added together with 20 mg of cesium carbonate. The mixture was stirred at room temperature for 5 minutes. The solvent was rotavaped off. The residue was dissolved in 10 ml ether and washed twice with 10 ml of water to yield an imine intermediate.

The imine was dissolved in 1.4 ml of methanol and 500 μl of TEA. 254 mg of hydroxylamine-O-sulfonic acid in 1.3 ml methanol was added dropwise. The reaction was stirred for 1 hour. The solvent was rotavaped off. The residue was dissolved in 6 ml ether and washed with aqueous Tris at pH 7.4 and water to yield a diaziridine intermediate.

Figure 33:
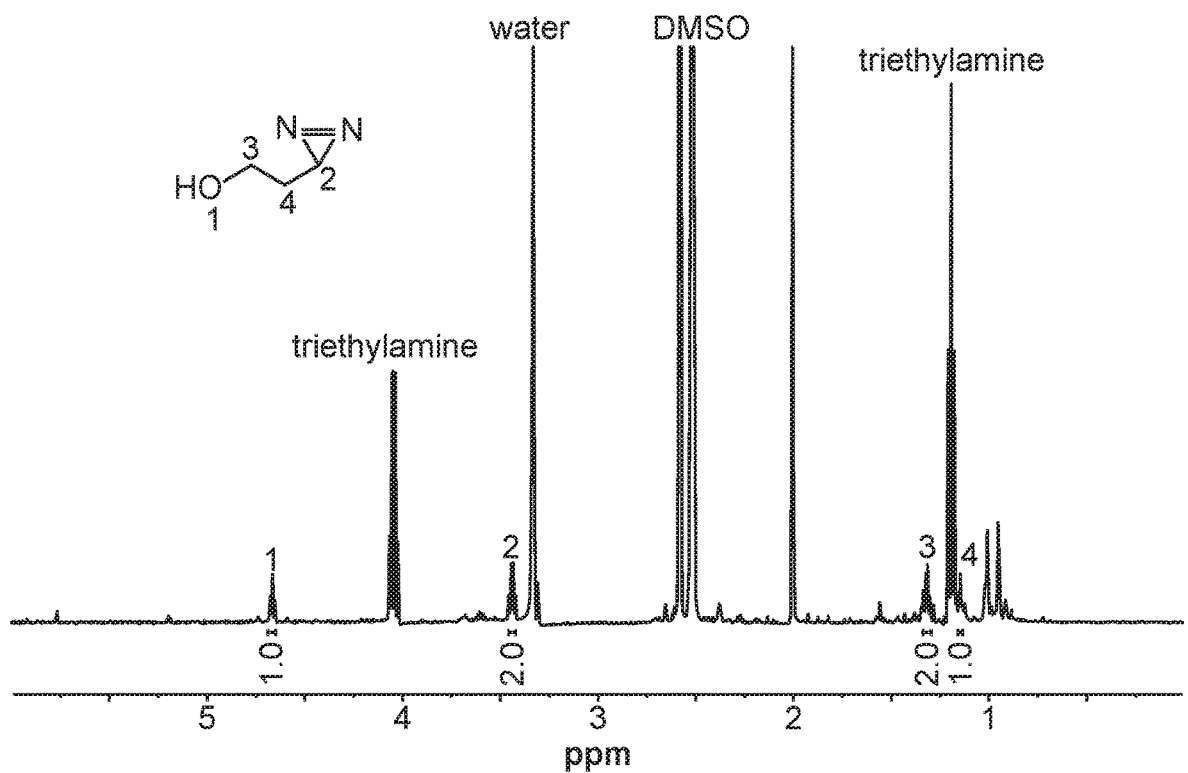
FIG. 33 provides a $^1$H-NMR spectrum in deuterated DMSO of azipropanol, Example 22 (e.g., as described herein).

The diaziridine was dissolved in 6.1 ml of acetone and 66 μl of TEA. 85 mg of N-bromosuccinimide was added and the reaction was stirred at room temperature for 30 minutes. The acetone was rotavaped off. The sample was dissolved in water, washed with dichloromethane, and extracted into ethyl acetate. This yielded 99.3 mg of azipropanol, as verified by $^1$H-NMR in deuterated DMSO (FIG. 33).

Example 23: Synthesis of Isoazibutanol

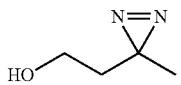

32.3 ml of 4-hydroxy-2-butanone, 287 ml of methanol and 78 ml of liquid ammonia were added to a flask cooled in a dry ice-isopropanol bath. 25 g of hydroxylamine-O-sulfonic acid in 287 ml of methanol was dripped into this mixture. The mixture was allowed to reach room temperature over 14 hours. The white precipitate was filtered away and the solvent rotavaped off to yield a diaziridine intermediate.

Figure 34:
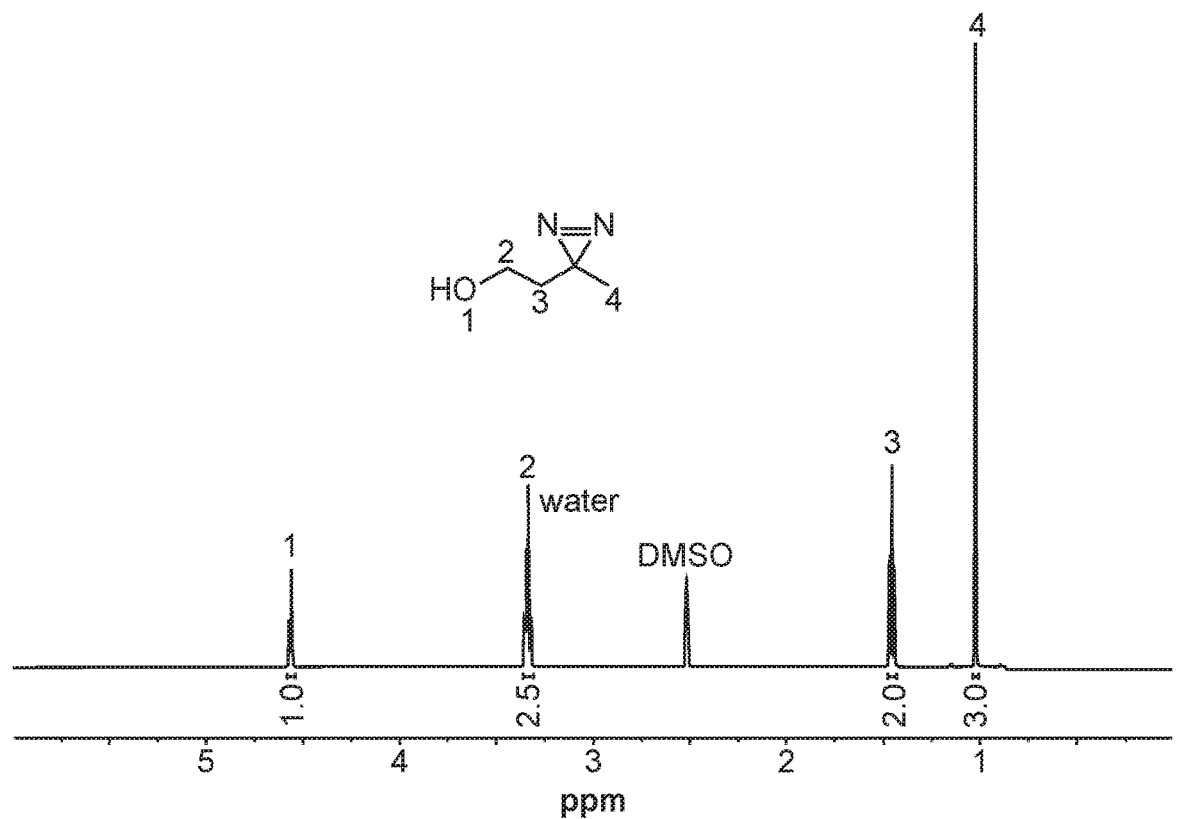
FIG. 34 provides a $^1$H-NMR spectrum in deuterated DMSO of isoazibutanol, Example 23 (e.g., as described herein).

The diaziridine was dissolved in 270 ml of ether, 39 ml of water and 95 ml of triethylamine. Into this was dripped a 10% ethereous iodine until the solution no longer quenched the iodine's color. The solution was washed with 1-M hydrochloric acid, with 20% aqueous sodium thiosulphate and with aqueous sodium bicarbonate. The ether was rotavaped off to yield 8.27 g of isoazibutanol, as verified by $^1$H-NMR in deuterated DMSO (FIG. 34).

Example 24: Synthesis of Isoazibutyl Mesylate

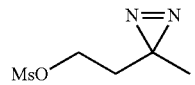

Figure 35:
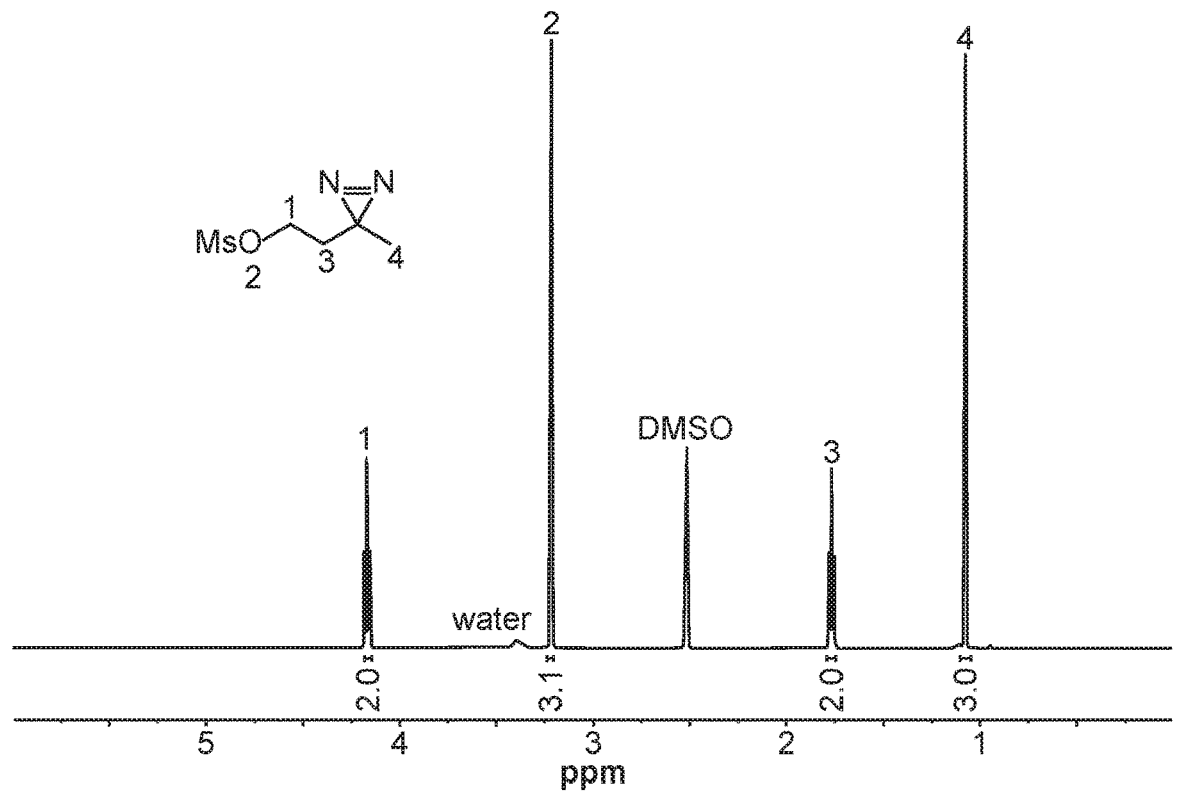
FIG. 35 provides a $^1$H-NMR spectrum in deuterated DMSO of 3-azibutyl mesylate, Example 24 (e.g., as described herein).

1.2 ml of azibutanol and 8 mg of DMAP were dissolved in 50 ml of ether and 5 ml of triethylamine. 1.5 ml of mesyl chloride in 12.5 ml of ether was added dropwise. The reaction stirred on ice for 20 minutes. 3 ml of water was added, and the reaction was stirred for 10 minutes. The sample was washed with 50 ml of aqueous saturated citric acid, 25 ml of water, 50 ml of aqueous saturated sodium bicarbonate and 25 ml of water. The solvent was rotavaped off to yield 1.76 g of a 3-azibutyl mesylate, as verified by $^1$H-NMR in deuterated DMSO (FIG. 35).

Example 25: Synthesis of Aziethyl Cysteine

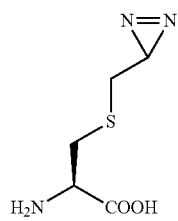 [SMILES: N[C@@H](CSCC1N=N1)C(=O)O]

154 mg of boc-cysteine, 1.36 g cesium carbonate, 126 mg of aziethyl chloride-alkene mix from example 19, 9 mg TCEP were dissolved in 27 ml methanol and 0.5 ml water. The mixture was stirred overnight. The methanol was rotavaped off and the residue dissolved in ether. The solution was washed with aqueous citric acid and water. The ether was rotavaped off to yield boc-aziethyl cysteine.

Figure 36:
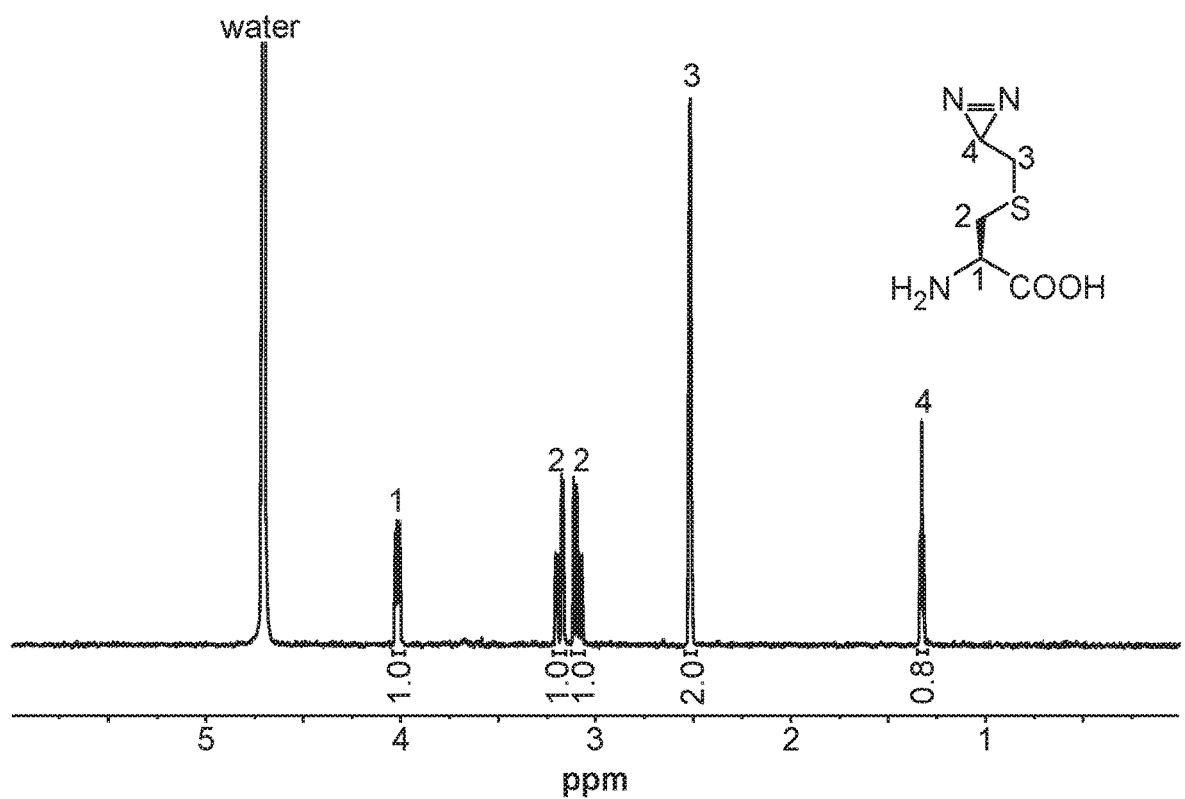
FIG. 36 provides a $^1$H-NMR spectrum in deuterated $D_2O$ of aziethyl cysteine hydrochloride, Example 25 (e.g., as described herein).

This was dissolved in 6.5 ml of 4-N HCl in dioxane and stirred for 30 minutes. The solvent was rotavaped off. The residue was dissolved in water, washed with dichloromethane and rotavaped to dryness. This yielded 126 mg of aziethyl cysteine hydrochloride, as verified by $^1$H-NMR in D$_2$O (FIG. 36).

Example 26: Synthesis of Isoazipropyl Cysteine

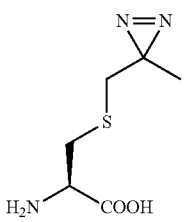

1.7 g of boc-cysteine, 15 g of cesium carbonate, 2.8 g of isoazipropyl mesylate and 0.1 g of TCEP were dissolved in 300 ml of methanol and 6 ml of water. The mixture was stirred overnight. The methanol was rotavaped off and the residue dissolved in ether. The solution was washed with aqueous citric acid and water. The ether was rotavaped off to yield boc-isoazipropyl cysteine.

Figure 37:
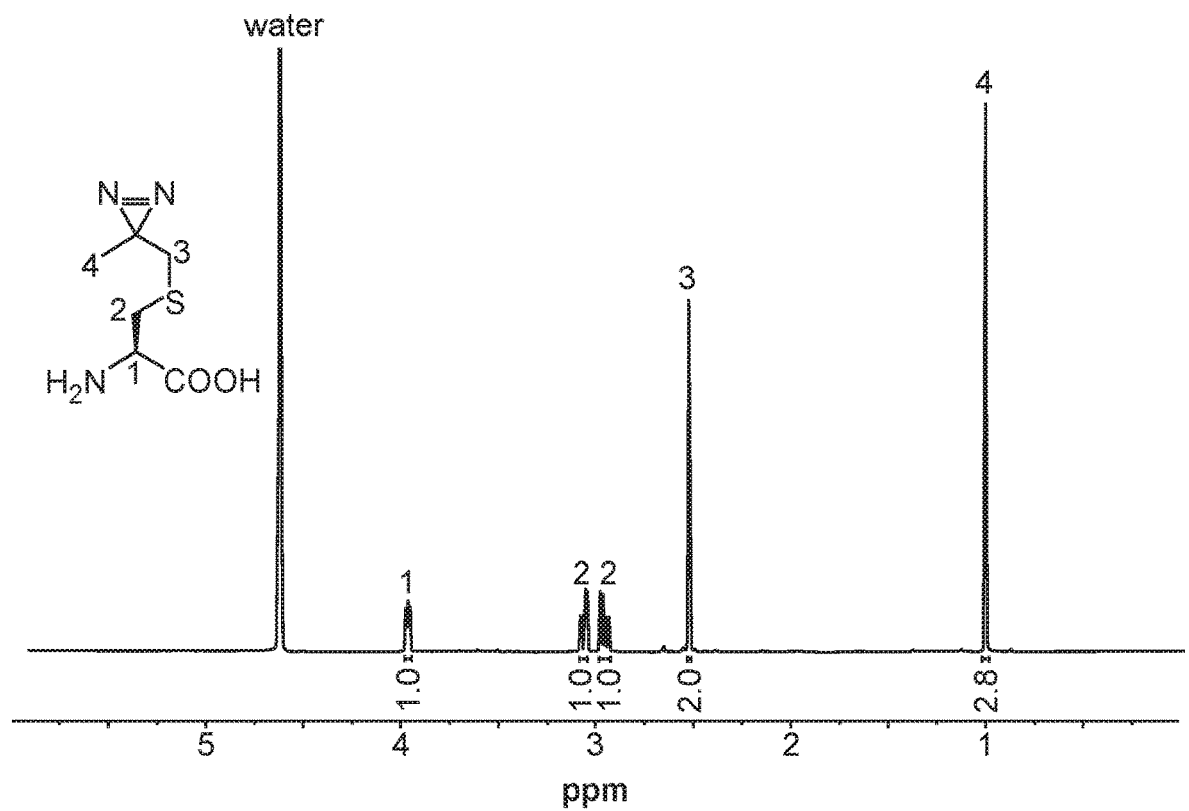
FIG. 37 provides a $^1$H-NMR spectrum in deuterated $D_2O$ of isoazipropyl cysteine hydrochloride, Example 26 (e.g., as described herein).

This was dissolved in 75 ml of 4-N HCl in dioxane and stirred for 30 minutes. The solvent was rotavaped off. The residue was dissolved in water, washed with dichloromethane and rotavaped to dryness. This yielded 1.6 g of isoazipropyl cysteine hydrochloride, as verified by $^1$H-NMR in D$_2$O (FIG. 37).

Example 27: Synthesis of Isoazibutyl Cysteine

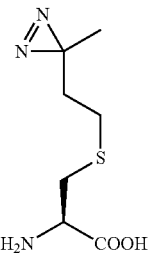

1.45 g of boc-cysteine, 7 g of cesium carbonate, 1.75 g of isoazibutyl mesylate and 0.4 g of TCEP were dissolved in 100 ml of methanol and 3.5 ml of water. The mixture was stirred overnight. The methanol was rotavaped off and the residue dissolved in ether. The solution was washed with aqueous citric acid and water. The ether was removed by rotary evaporation to yield boc-isoazibutyl cysteine.

Figure 38:
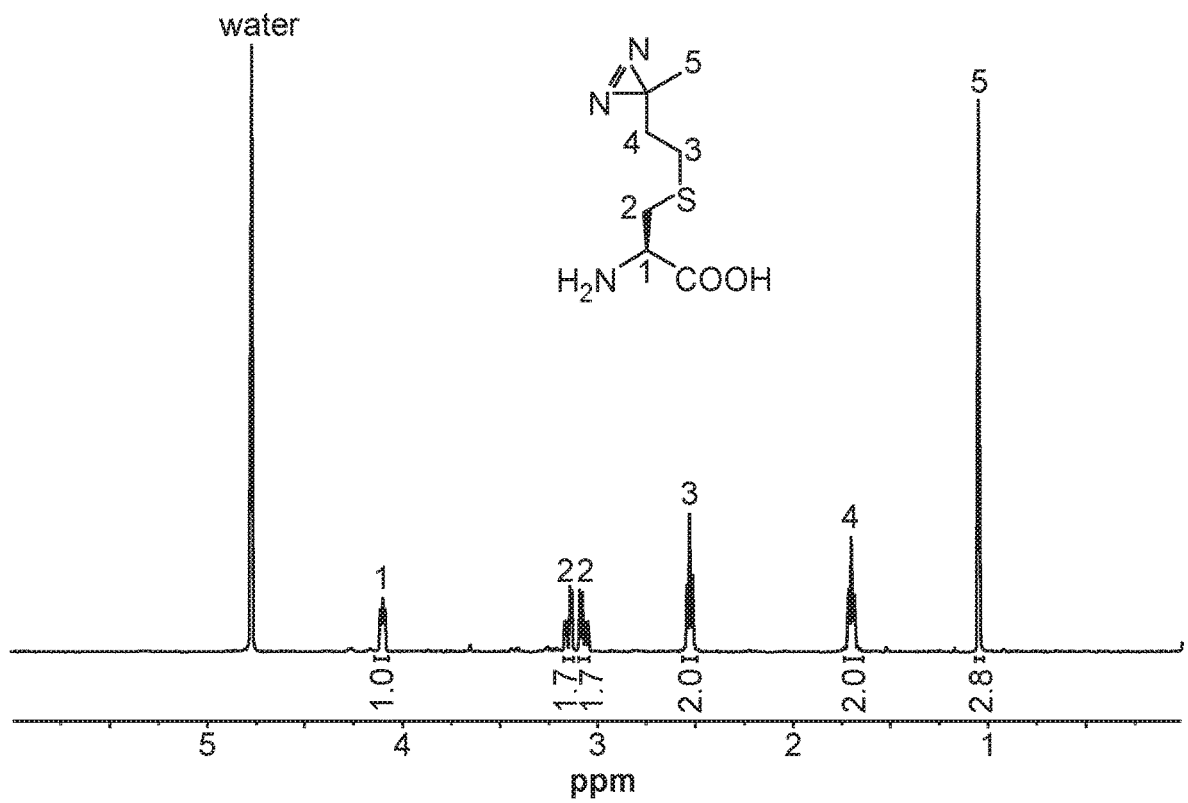
FIG. 38 provides a $^1$H-NMR spectrum in deuterated $D_2O$ of isoazibutyl cysteine hydrochloride, Example 27 (e.g., as described herein).
Figure 39:
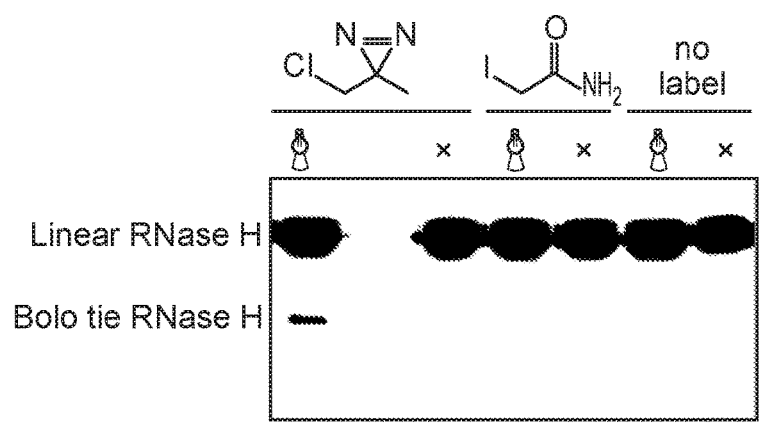
FIG. 39 illustrates the in vitro intraprotein crosslinking using 2-azipropyl chloride.
Figure 40:
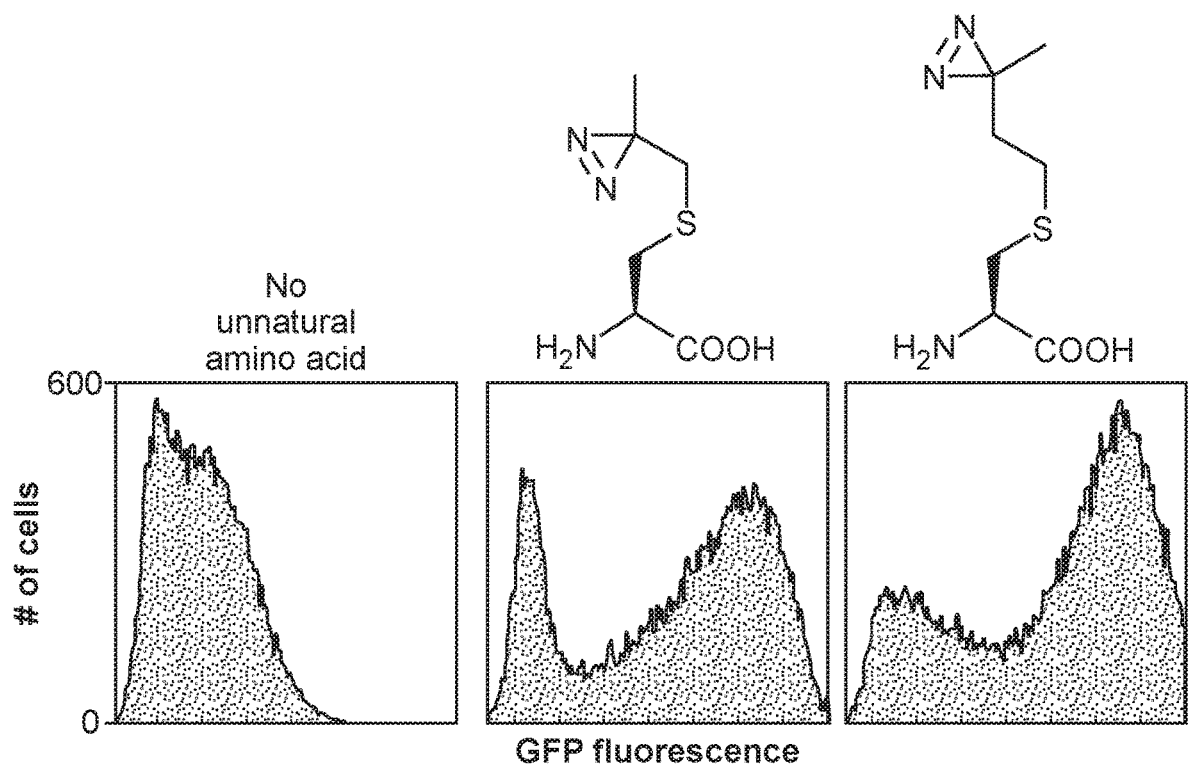
FIG. 40 illustrates the translational incorporation of isoazipropyl cysteine and azibutyl cysteine.
Figure 41:
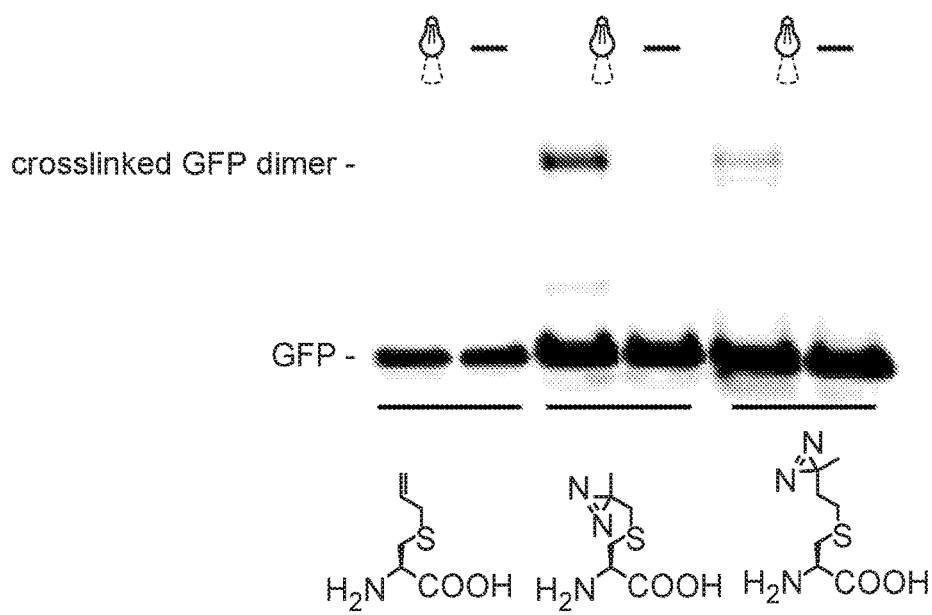
FIG. 41 illustrates in vivo interprotein crosslinking using 2-azipropyl cysteine and 3-azibutyl cysteine.
Figure 42:
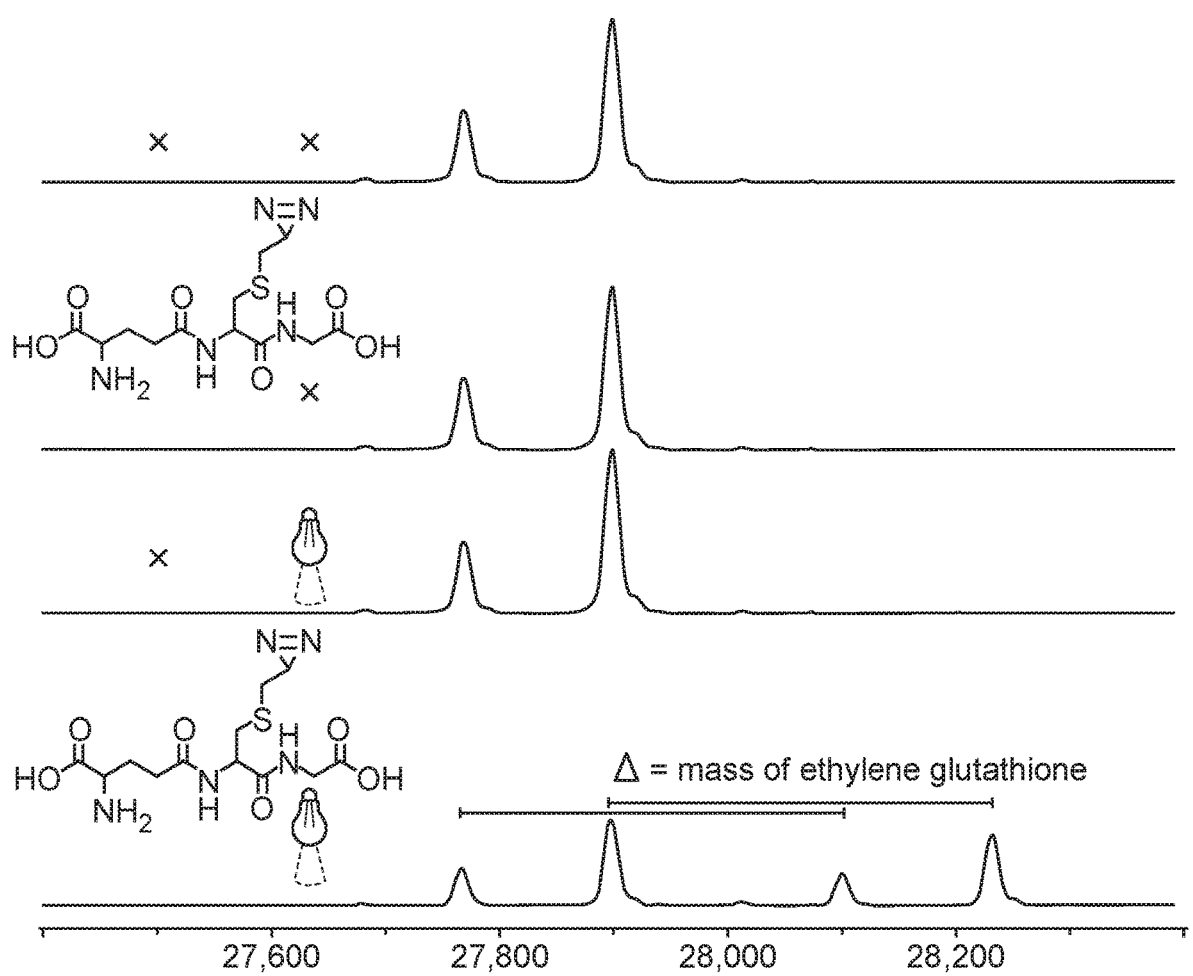
FIG. 42 illustrates in vivo interprotein crosslinking using 2-azipropyl cysteine and 3-azibutyl cysteine by LCMS.
Figure 43:
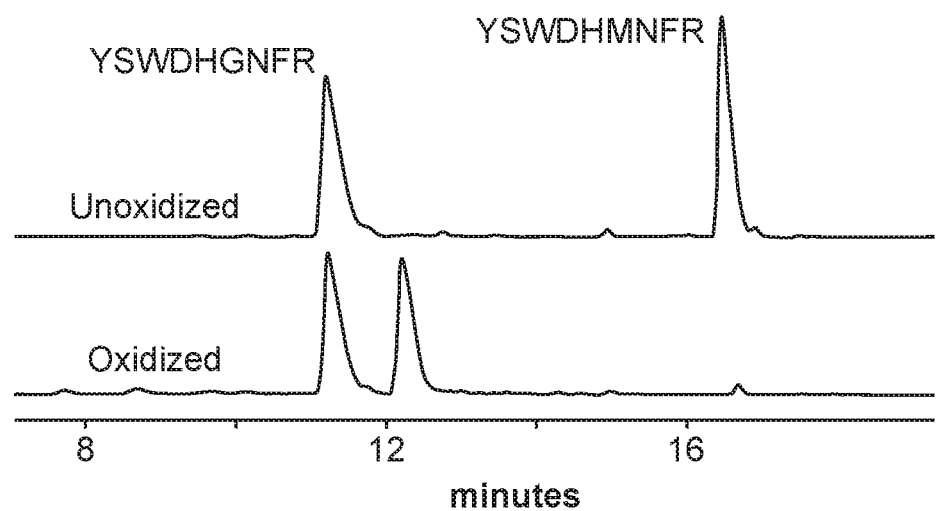
FIG. 43 illustrates reverse-phase HPLC traces before and after the oxidation procedure exemplified by Example 34. The sequences are set forth from left to right as SEQ ID NOs: 8-9.
Figure 44:
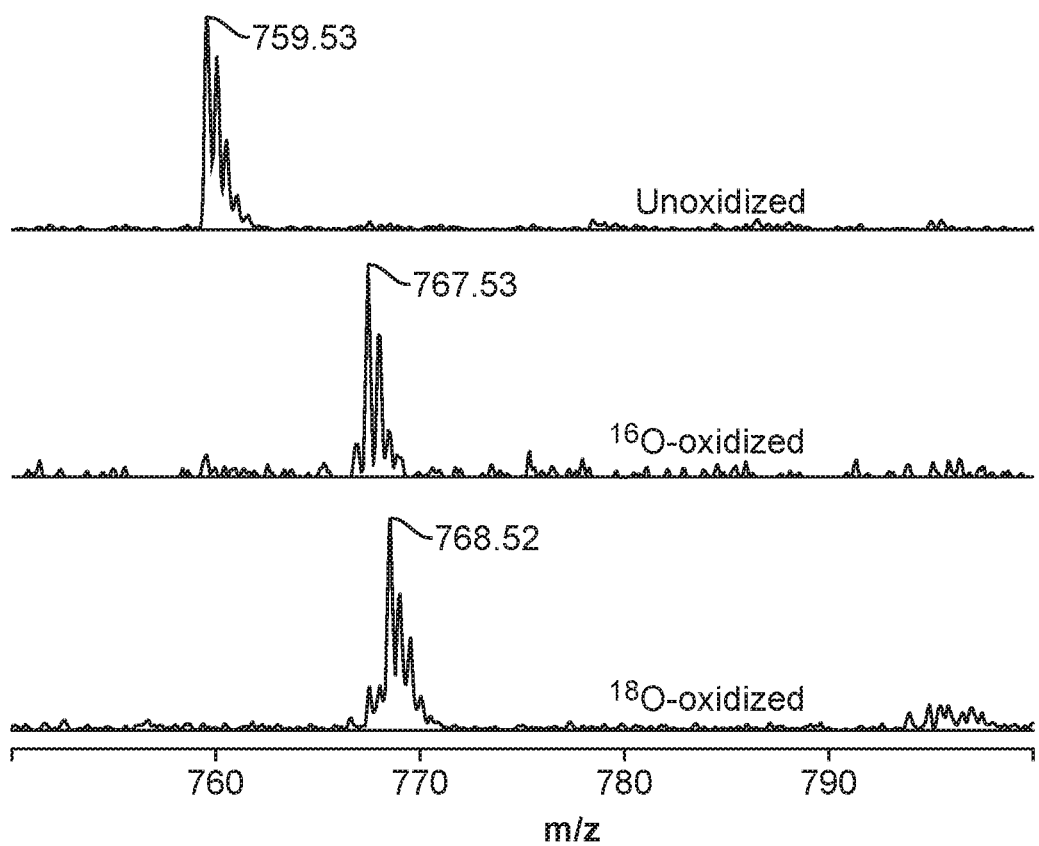
FIG. 44 illustrates mass spectra observing the oxidation of thioethers to $^{18}$O-containing sulfoxides, exemplified by Example 34.

This was dissolved in 62 ml of 4-N HCl in dioxane and stirred for 30 minutes. The solvent was rotavaped off. The residue was dissolved in water, washed with dichloromethane and rotavaped to drynesss. This yielded 1.4 g of isoazibutyl cysteine hydrochloride, as verified by $^1$H-NMR in D$_2$O (FIG. 38).

Example 28: Chemical Anchoring of Isoazipropyl Chloride to a Protein

A modified RNase H containing a single cysteine was expressed in *E. coli* and purified and purified by Ni-IMAC and heparin chromatography.

To 2.75 mg of this protein in 20 ml of 100-mM bicine, 1-mM TCEP, 600-mM NaCl, 100-mM KCl, pH 8.6 was added either 0 or 10 ul of isoazipropyl chloride. These mixtures were incubated for 1 hour at 37° C. The proteins were repurified by heparin chromatography to remove TCEP and isoazipropyl chloride, and the number of free cysteines per protein was determined using Ellman's assay. Whereas the sample that had not seen isoazipropyl chloride had an average of 1.0 free cysteines per protein, the sample that had seen the isoazoproopyl chloride had an average of 0.15 free cysteines per protein. This indicates that the crosslinker anchored onto 85% of the protein's cysteines.

Example 29: In Vitro Intraprotein Crosslinking Using 2-Azipropyl Chloride

A modified RNase H containing a single cysteine was expressed, purified, alkylated with isoazipropyl chloride and repurified as above.

The alkylated protein was illuminated with a mercury arc lamp through filters selecting for light in the 310-370-nm range. This caused a new faster-migrating band to appear by denaturing SDS-PAGE (see e.g., FIG. 29).

This suggests that intramolecular crosslinking is covalently locking the protein into a bolo tie-shaped conformation that migrates faster due to its smaller Stokes radius. This interpretation is supported by the confirmation that this band did not appear without illumination or when the protein was unalkylated or alkylated with iodoacetamide instead of the crosslinker.

Example 30: Translational Incorporation of Isoazipropyl Cysteine and Azibutyl Cysteine Leucine and tryptophan auxotrophic S. cerevisiae were cotransfected with plasmids expressing GFP with an amber mutation at the GFP dimer interface (Ai et al., 2010) and the artificial amino acid incorporation machinery AK-1 (Wang et al., 2008). The cells were grown on a plate made without tryptophan or leucine and resuspended in similarly restrictive media.

The cells were incubated with 4 mM of either nothing, isoazipropyl cysteine or isoazibutyl cysteine for 5 hours at 30° C. before they were examined by flow cytometry looking at GFP fluorescence. This analysis was focused on the subset of cells with high forward scatter.

A portion of the cells produced significantly more functional GFP when given either of the two amino acid crosslinker analogues. The lack of response in the remaining cells is attributed to dead cell debrie and loss the GFP or AK-1 plasmid. The data shows efficient translational incorporation of the crosslinkers in vivo. This makes it possible to insert the crosslinker through either targeted or batch mutagenesis. See e.g., FIG. 40.

Example 31: In Vivo Interprotein Crosslinking Using 2-Azipropyl Cysteine and 3-Azibutyl Cysteine S. cervisae was made to express GFP containing isoazipropyl chloride or isoazibutyl chloride as described above. These cells were illuminated by a 365-nm diode (a Prizmatix Mic-LED-365 powered by a BLCC-02 at 0.5 ampere) for 1 minute and then cryogenically ground. Their protein was run on a denaturing SDS-PAGE gel to look for higher-molecular weight species resulting from crosslinking between the two GFP monomers (see e.g., FIG. 41).

Isoazibutyl cysteine achieved interprotein crosslinking for 8% of the proteins. Isoazipropyl cysteine achieved 2%. The lack of similar crosslinking when canonical AK-1 substrate allylcysteine was used instead confirms that the crosslinking is attributable to the azicysteines.

Example 32: In Vivo Interprotein Crosslinking Using 2-Azipropyl Cysteine and 3-Azibutyl Cysteine Aziethyl chloride was anchored to glutathione. 25 mg of glutathione and 5 mg of TCEP were dissolved in 2 ml of methanol, 1 ml of water and 50 ul of TEA. To this were added 41 ul of the aziethyl chloride-alkene mixture synthesized in example 19. The mixture was stirred overnight, lyophilized and resuspended in 2.6 ml of water to make a 30-mM solution. This aziethyl glutathione solution was used without any purification.

7 mg/ml of GST was incubated with 0 or 1 mM of aziethyl glutathione. This mixture was placed beneath 337-nm light source (Laser Science, Inc. VSL-337ND-S) for either 0 or 30 minutes and then subjected to whole-protein LCMS.

The data showed to isoforms for the protein that could be explained as being the version with or without the N-terminal methionine. More importantly, the data showed that 40% of GST molecules shifted as expected from covalent crosslinking to aziethyl glutathione (see, e.g., FIG. 42).

The lack of similar crosslinking without the aziethyl glutathione or illumination confirms that this crosslinking is attributable to light activation of the crosslinker.

Example 33: Specific Oxidation of Thioethers

2 µl of 250-mM sodium citrate at pH 5.0, 2 µl of 25-mM chloramine-T and 10 µl of 300-mM DTT were lyophilized in separate 200-µl tubes.

The peptide to be oxidized are zip tipped and speedvaced. 50 µl of water is used to sequentially suspend the citric acid, the chloramine-T and the peptides. After 1-minute, the DTT is also suspended to quench the oxidation.

We tested how well this oxidizes thioethers like those found in our crosslink bridges without loss of, or collateral damage to, the peptide. Two synthetic peptides with were made. The first contains all the moieties found in a protein that we wish to remain unaffected by our procedure. The second contains a single thioether that we wish to quantitatively oxidize. This mixture was examined by reverse-phase HPLC before and after our oxidation procedure (see, e.g., FIG. 43).

The procedure had a yield over 80%, showed no unintended changes to the peptides while quantitatively oxidizing the thioethers.

Example 34: Oxidation of Thioethers to $^{18}$O-Containing Sulfoxides

The thioether oxidation procedure described above was designed to allow economical incorporation of heavy oxygen isotopes into the resulting sulfoxide. This necessitated that the oxygen come from water, the $^{18}$O variant of which is relatively cheaply. Labeling our crosslinks with $^{18}$O facilitates their detection, as explained in example 19.

We tested whether our oxidation procedure allowed us to control the isotopic identity of the oxygen in the resulting sulfoxide. A peptide was alkylated with iodoacetamide to convert its cysteine to a thioether. This was then oxidized by the above procedure using either $^{16}$O or $^{18}$O water. The resulting peptides were examined by mass spectrometry (see, e.g., FIG. 44).

The peptide was easily detected in its charge +2 form. Regular water added a mass of 16.00 amu, while $^{18}$O water added 17.99 amu.

Example 35: Synthesis of a Test Peptide for Crosslink Oxidation and MS Detection A peptide of the following form was synthesized:

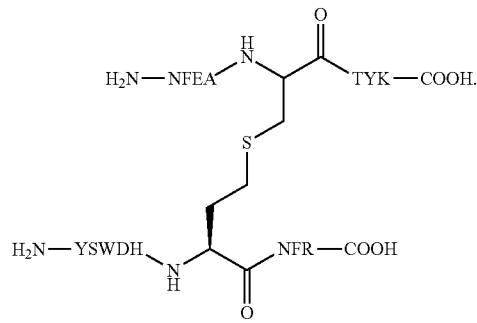

333 nmol of a synthetic peptide was suspended in 900 µl of 1-M sodium phosphate at pH 8. This was mixed with 900 µl of aqueous 1-mM 4-fluoro-3-nitrobenzonitrile and left for 1 hour. The resulting alkylated peptide was purified by C18 reverse-phase HPLC, running a water-acetonitrile gradient in the presence of 0.1% TFA.

1.5 ml of HPLC eluate was diluted with 1.5 ml water and 15 µl of aqueous 250-mM MMPP. The resulting oxidation was run at room temperature for 10 minutes before the reaction was again cleaned up by HPLC to isolate the sulfoxide-containing peptides.

1.5 ml of HPLC eluate was diluted with 1.5 ml of water and heated to 100° C. for 1 hour to promote beta elimination. The resulting dehydroalanine-containing peptide was purified by HPLC and speed-vaced.

The dehydroalanine peptide was resuspended in 30 µl of aqueous 1-mM TCEP, 50-mM sodium phosphate at pH 8. This solution was added to 134 nmol of a synthetic peptide that contains a homocysteine. The mixture with both peptides was heated at 70° C. for 1 hour. Afterwards, 10 µl of buffer containing 100-mM iodoacetamide, 1-mM TCEP and 50-mM sodium phosphate at pH 8 was added to alkylate any unreacted homocysteine peptides, as this helped separate them from the product by HPLC. The cystathione-linked peptide pair was purified by HPLP, speed-vaced and resuspended in water.

Example 35: Automated Identification of Crosslinks by their Cleavage

The purified crosslinked peptide pair as described above was mixed with background peptides from trypsinized RNase H, and the sample was oxidized according to the method of example 34. It was then analyzed by LCMS.

The instrument was operated by control software written to search for fragmentation of our crosslinked peptide. This software picked peaks from the MS1 spectrum and subjects them to very gentle CID at 15% CID Energy on a Thermo LTQ Velos. This is generally too low to break anything in the regular peptides, but it was sufficient to break the oxidized crosslinks and cause some of the crosslink donor peptides to lose water. Three new peaks therefore result: one for the crosslink acceptor peptide and two for the crosslink donor peptide. These peaks have a defined mathematical relationship to each other and to the parent peak. The control software searched for this relationship in the data in real time.

Except for peaks in an envelope around the m/z value of the parent peak, the software iterated through all combinations of three peaks in the MS2 spectrum to look for an appropriate mass relationship.

An appropriate mass relationship was found when the mass of the first peak equals the mass of the second plus water, and the masses of the first and third peaks add up to the mass of the MS1 parent peak.

Since the charges of the peaks can be unclear, the software iteratively assumed several possible charges. It allowed for a parent peak charge of up to +6, it assumed that the first and second peaks must have the same charge and that the charges of the first and third peaks must add up to that assumed for the parent peak. If any such combination of charges led to an appropriate mass relationship, a putative crosslink had been found.

When a putative crosslink was found, each of the MS2 peaks involved were fragmented and the fragments examined by MS3 at high resolution. Additionally, the MS2 spectrum was re-collected at higher resolution.

Figure 45:
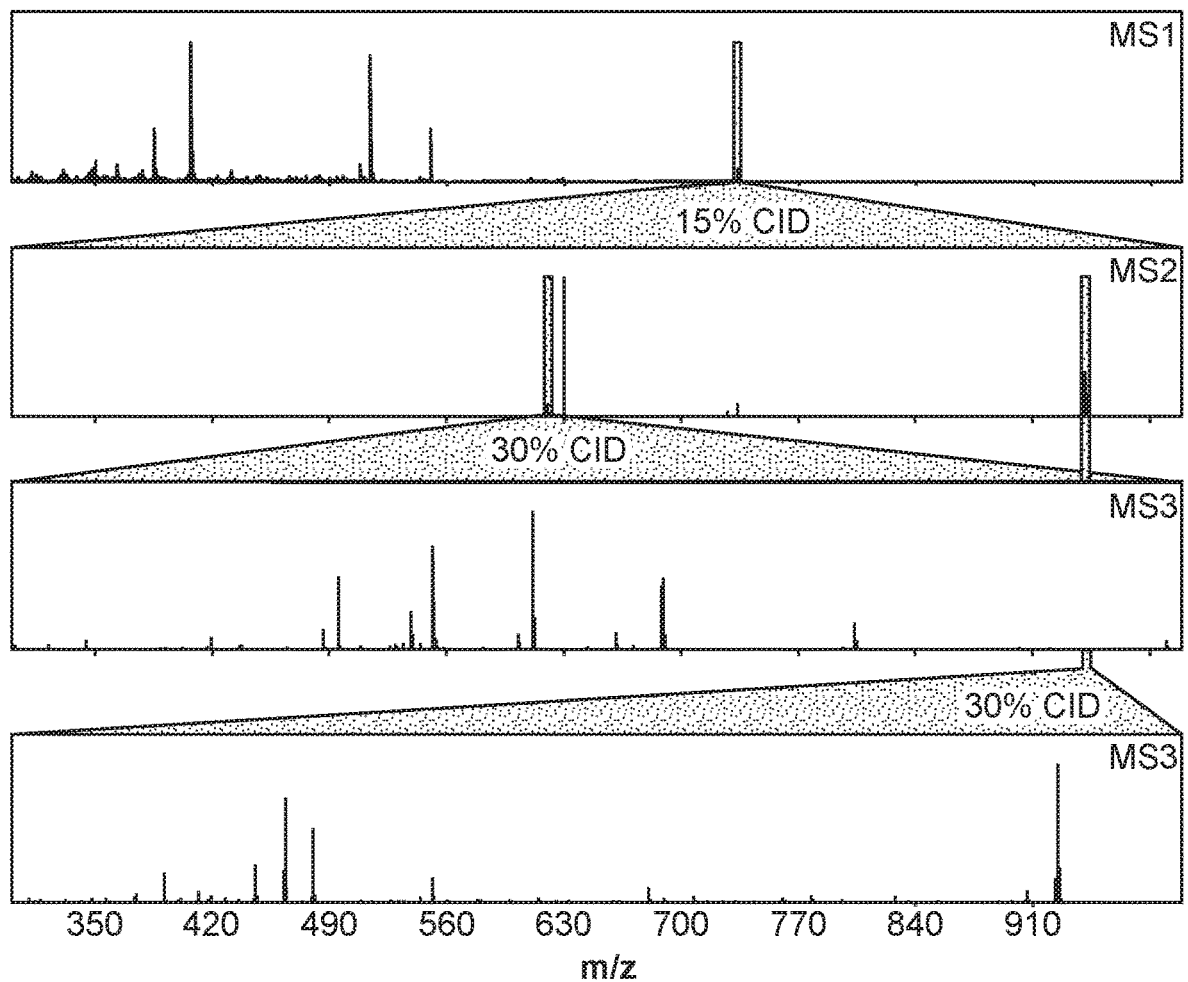
FIG. 45 illustrates LC spectra obtained during the automated identification of the subject crosslinks by their cleavage.

The spectra shown in FIG. 45 were among those gathered when the crosslinked peptide eluted of the LC. This set of spectra shows that the software correctly identified a set of MS2 peaks as newly separated peptides that were crosslinked at the MS1 stage. It fragmented these MS2 peaks, yielding spectra suitable for determining the sequences of each peptide, including mass scars left on the specific amino acids that had formed the crosslink. Separating the peptides after the MS1 stage left a fragmentation relationship guaranteeing that the identified peptides were crosslinked to one another and not to some other peptides.

Figure 46:
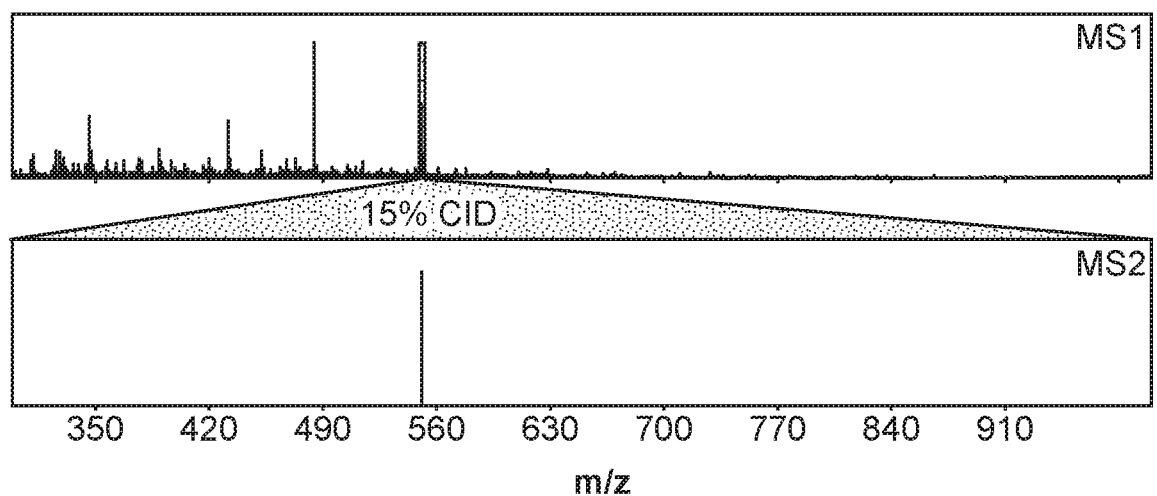
FIG. 46 illustrates the LC spectra obtained when the software interrogated an MS1 peak corresponding to a peptide from the RNase H tryptic digest background.

By contrast, when the software interrogated an MS1 peak corresponding to a peptide from the RNase H tryptic digest background, the spectra shown in FIG. 46 were typical. The lack of any appropriate mass relationship in these spectra immediately let the software know not to waste time on MS3 spectra or on recollecting the MS2 spectrum at higher resolution. Instead, it spent its time interrogating more MS1 peaks for the crosslink behavior.

However, we did observe instances where even the very gentle fragmentation applied led to non-crosslinked peaks showing some fragmentation. Since loss of water is common during CID, a subset of these events exhibited an appropriate mass relationship and triggered our software to collect MS3 spectra. This wasted a minor amount of instrument time. More significantly, it generated data that had the potential to be misleading. It was for this reason that we developed the oxidation procedure outlined above and shown in example 34 to be able to oxidize the crosslink thioethers with 180 water. It is this oxygen that is lost in the water when a genuine crosslink is broken during CID. This allowed us to set a new definition for what we consider an appropriate mass relationship where the mass difference.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A method of purifying a biological macromolecule, the method comprising:
   (a) contacting the biological macromolecule with a compound of formula (II) or formula (III):

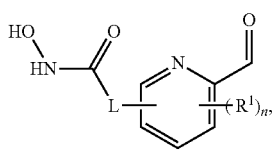

(II)

wherein:
L is an optional linker,
$R^1$ is an optional group selected from halogen, deuterium, alkyl and substituted alkyl, and
n is an integer from 0 to 3;

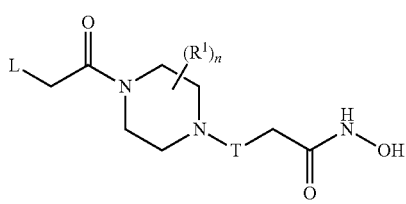

(III)

wherein:
T is an optional linker/tether,
L is a leaving group,
$R^1$ is an optional group selected from halogen, deuterium, alkyl and substituted alkyl, and
n is an integer from 0 to 8;
to produce a tagged moiety that comprises the biological macromolecule and a hydroxamate group; and
(b) purifying the tagged moiety by immobilized metal affinity chromatography (IMAC).

2. The method of claim 1, wherein the IMAC is done using a resin that is loaded with an ytterbium (III) ion (Yb(III)), a nickel (II) ion (Ni(II)), or a cobalt (II) ion (Co(II)).

3. The method of claim 1, wherein the compound is of the formula (II):

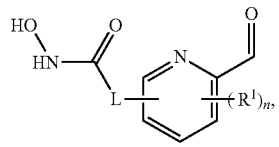

(II)

wherein:
L is an optional linker
$R^1$ is an optional group selected from halogen, deuterium, alkyl and substituted alkyl; and
n is an integer from 0 to 3.

4. The method of claim 3, having structure 1 or structure 3:

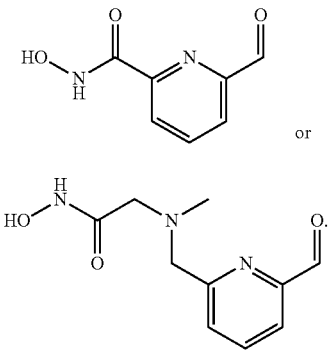

(structure 1)

or (structure 3)

5. The method of claim 1, wherein the compound is of the formula (IIA):

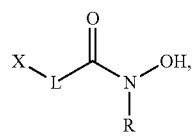

(IIA)

wherein:

L is an optional linker

R is selected from hydrogen, alkyl or substituted alkyl; and

X is selected from an alkyl halide, haloacetyl, maleimide, thiosulfate or pyridyl disulfide.

6. The method of claim 5, wherein the compound of formula (IIA) is selected from the group consisting of:

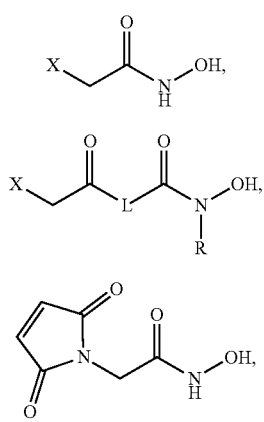

(IIA1)

(IIA2)

(IIA3)

(IIA4)

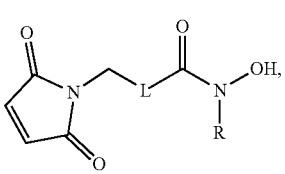

-continued

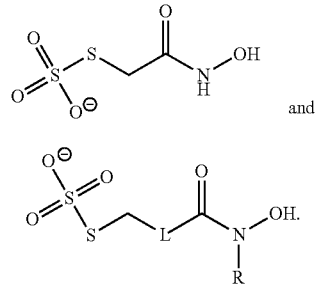

(IIA5)

and (IIA6)

7. The method of claim 1, wherein the compound is of the formula (III):

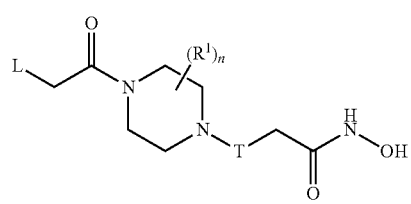

(III)

wherein:

T is an optional linker/tether;

L is a leaving group;

R¹ is an optional group selected from halogen, deuterium, alkyl and substituted alkyl; and n is an integer from 0 to 8.

8. The method of claim 7, having the structure (2):

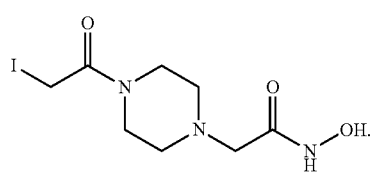

(2)

9. The method of claim 1, wherein the compound of formula (II) or (III) has a size ranging from 60 Da to 230 Da.

10. The method of claim 1, wherein the compound of formula (II) or (III) has a size ranging from 60 Da to 170 Da.

11. A kit comprising:

a compound of formula (II) or formula (III):

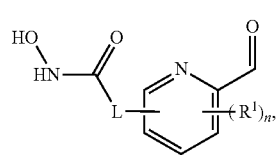

(II)

wherein:

L is an optional linker,

R¹ is an optional group selected from halogen, deuterium, alkyl and substituted alkyl, and n is an integer from 0 to 3;

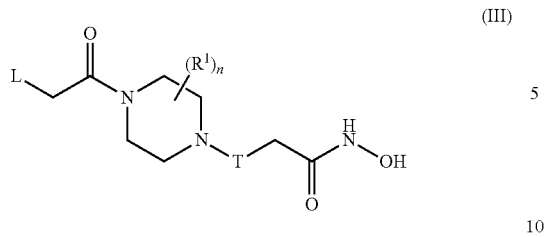

wherein:
T is an optional linker/tether,
L is a leaving group,
$R^1$ is an optional group selected from halogen, deuterium, alkyl and substituted alkyl, and
n is an integer from 0 to 8;
an immobilized metal affinity chromatography (IMAC) resin; and
a metal ion configured for loading onto the resin, wherein the metal ion is capable of binding a compound of formula (II) or (III).

12. The kit of claim 11, wherein the metal ion is a ytterbium (III) ion (Yb(III)), a nickel (II) ion (N(II), or a cobalt (II) ion (Co(II)).

* * * * *